(12) United States Patent
Datar et al.

(10) Patent No.: US 12,062,191 B2
(45) Date of Patent: Aug. 13, 2024

(54) FOOD DETECTION USING A SENSOR ARRAY

(71) Applicant: 7-Eleven, Inc., Irving, TX (US)

(72) Inventors: Sumedh Vilas Datar, Grapevine, TX (US); Sailesh Bharathwaaj Krishnamurthy, Irving, TX (US); Shahmeer Ali Mirza, Celina, TX (US)

(73) Assignee: 7-ELEVEN, INC., Irving, TX (US)

( * ) Notice: Subject to any disclaimer, the term of this patent is extended or adjusted under 35 U.S.C. 154(b) by 216 days.

(21) Appl. No.: 17/104,889

(22) Filed: Nov. 25, 2020

(65) Prior Publication Data

US 2021/0124947 A1 Apr. 29, 2021

Related U.S. Application Data

(63) Continuation-in-part of application No. 16/663,710, filed on Oct. 25, 2019, and a continuation-in-part of
(Continued)

(51) Int. Cl.
*G06T 7/246* (2017.01)
*G06T 7/292* (2017.01)
(Continued)

(52) U.S. Cl.
CPC .............. *G06T 7/248* (2017.01); *G06T 7/292* (2017.01); *G06V 10/44* (2022.01); *G06V 10/764* (2022.01);
(Continued)

(58) Field of Classification Search
CPC ............. G06T 7/248; G06T 7/292; G06T 2207/30208; G06T 2207/20084;
(Continued)

(56) References Cited

U.S. PATENT DOCUMENTS 5,013,896 A 5/1991 Ono et al.
5,838,828 A * 11/1998 Mizuki .................. G06T 7/246
348/700
(Continued)

FOREIGN PATENT DOCUMENTS

CA 1290453 C 10/1991
CA 2201423 C 10/1998
(Continued)

OTHER PUBLICATIONS

Krishnamurthy, S. B. et al., "Scalable Position Tracking System for Tracking Position in Large Spaces," U.S. Appl. No. 16/663,633, filed Oct. 25, 2019, 117 pages.
(Continued)

*Primary Examiner* — Kenny A Cese
(74) *Attorney, Agent, or Firm* — Baker Botts L.L.P.

(57) ABSTRACT

An object tracking system that includes a sensor that is configured to capture frames of at least a portion of a global plane for a space. The system is configured to receive a first frame from the sensor. The first frame includes a region-of-interest (ROI) marker within the space. The system is further configured to identify pixel locations within the first frame corresponding with the ROI marker and to define a zone for subsequent frames from the sensor corresponding with the pixel locations. The system is further configured to receive a second frame from the sensor, to detect an object within the zone, and to identify the object. The system is further configured to determine a person is within the second frame and to modify a digital cart that is associated with the person based on the identified object.

20 Claims, 71 Drawing Sheets

Related U.S. Application Data application No. 16/663,766, filed on Oct. 25, 2019, now Pat. No. 11,132,550, and a continuation-in-part of application No. 16/663,451, filed on Oct. 25, 2019, now Pat. No. 10,943,287, and a continuation-in-part of application No. 16/663,794, filed on Oct. 25, 2019, now Pat. No. 11,367,124, and a continuation-in-part of application No. 16/663,822, filed on Oct. 25, 2019, now Pat. No. 11,113,837, and a continuation-in-part of application No. 16/941,415, filed on Jul. 28, 2020, now Pat. No. 11,430,222, which is a continuation of application No. 16/794,057, filed on Feb. 18, 2020, now Pat. No. 10,769,451, which is a continuation of application No. 16/663,472, filed on Oct. 25, 2019, now Pat. No. 10,614,318, application No. 17/104,889, filed on Nov. 25, 2020 is a continuation-in-part of application No. 16/663,856, filed on Oct. 25, 2019, now Pat. No. 10,956,777, and a continuation-in-part of application No. 16/664,160, filed on Oct. 25, 2019, now Pat. No. 11,568,554, and a continuation-in-part of application No. 17/071,262, filed on Oct. 15, 2020, now Pat. No. 11,974,077, which is a continuation of application No. 16/857,990, filed on Apr. 24, 2020, now Pat. No. 10,853,663, which is a continuation of application No. 16/793,998, filed on Feb. 18, 2020, now Pat. No. 10,685,237, which is a continuation of application No. 16/663,500, filed on Oct. 25, 2019, now Pat. No. 10,621,444, application No. 17/104,889, filed on Nov. 25, 2020 is a continuation-in-part of application No. 16/857,990, filed on Apr. 24, 2020, now Pat. No. 10,853,663, and a continuation-in-part of application No. 16/664,219, filed on Oct. 25, 2019, now Pat. No. 11,107,226, and a continuation-in-part of application No. 16/664,269, filed on Oct. 25, 2019, now Pat. No. 11,004,219, and a continuation of application No. 16/664,332, filed on Oct. 25, 2019, now Pat. No. 11,176,686, and a continuation-in-part of application No. 16/664,363, filed on Oct. 25, 2019, now Pat. No. 11,080,529, and a continuation-in-part of application No. 16/664,391, filed on Oct. 25, 2019, now Pat. No. 11,062,147, and a continuation-in-part of application No. 16/664,426, filed on Oct. 25, 2019, now Pat. No. 11,308,630, and a continuation-in-part of application No. 16/884,434, filed on May 27, 2020, now Pat. No. 11,205,277, which is a continuation of application No. 16/663,533, filed on Oct. 25, 2019, now Pat. No. 10,789,720, application No. 17/104,889, filed on Nov. 25, 2020 is a continuation-in-part of application No. 16/663,901, filed on Oct. 25, 2019, now Pat. No. 11,430,046, and a continuation-in-part of application No. 16/663,948, filed on Oct. 25, 2019, now Pat. No. 11,257,225.

(51) Int. Cl.
　　*G06V 10/44*　　　　(2022.01)
　　*G06V 10/764*　　　(2022.01)
　　*G06V 20/40*　　　　(2022.01)
　　*G06V 20/52*　　　　(2022.01)
　　*G06V 40/10*　　　　(2022.01)

(52) U.S. Cl.
　　CPC .............. *G06V 20/41* (2022.01); *G06V 20/52* (2022.01); *G06V 40/107* (2022.01); *G06T 2207/30208* (2013.01); *G06V 20/44* (2022.01); *G06V 2201/07* (2022.01)

(58) Field of Classification Search
　　CPC .......... G06T 2207/10024; G06T 2207/30241; G06T 2207/30232; G06T 2207/30196; G06V 40/107; G06V 10/255; G06V 10/44; G06V 10/764; G06V 20/41; G06V 20/52; G06V 20/44; G06V 2201/07
　　See application file for complete search history.

(56) References Cited

U.S. PATENT DOCUMENTS

| | | |
|---|---|---|
| 6,437,819 B1 | 8/2002 | Loveland |
| 6,725,206 B1 | 4/2004 | Coveley |
| 7,672,876 B2 | 3/2010 | Bonner et al. |
| 7,844,509 B2 | 11/2010 | Bodin et al. |
| 7,848,964 B2 | 12/2010 | Bonner et al. |
| 9,014,999 B2 | 4/2015 | Turbell et al. |
| 9,159,047 B2 | 10/2015 | Winkel |
| 9,477,955 B2 | 10/2016 | Goncalves |
| 9,886,827 B2 | 2/2018 | Schoner |
| 9,911,290 B1 | 3/2018 | Zalewski et al. |
| 9,972,187 B1 | 5/2018 | Srinivasan et al. |
| 9,984,354 B1 | 5/2018 | Chinoy et al. |
| 9,996,818 B1 | 6/2018 | Ren et al. |
| 10,055,853 B1 | 8/2018 | Fisher et al. |
| 10,064,502 B1 | 9/2018 | Gyori et al. |
| 10,127,438 B1 | 11/2018 | Fisher et al. |
| 10,133,933 B1 | 11/2018 | Fisher et al. |
| 10,134,004 B1 | 11/2018 | Liberato, Jr. et al. |
| 10,140,483 B1 | 11/2018 | Huebner et al. |
| 10,140,820 B1 | 11/2018 | Zalewski et al. |
| 10,157,452 B1 | 12/2018 | Tighe et al. |
| 10,169,660 B1 | 1/2019 | Ren et al. |
| 10,181,113 B2 | 1/2019 | Rivalto et al. |
| 10,198,710 B1 | 2/2019 | Hahn et al. |
| 10,244,363 B1 | 3/2019 | Niranjayan et al. |
| 10,250,868 B1 | 4/2019 | Arnold et al. |
| 10,262,293 B1 | 4/2019 | Prater et al. |
| 10,268,983 B2 | 4/2019 | Kumar et al. |
| 10,282,852 B1 | 5/2019 | Buibas et al. |
| 10,291,862 B1 | 5/2019 | Liberato et al. |
| 10,296,814 B1 | 5/2019 | Kumar et al. |
| 10,303,133 B1 | 5/2019 | Dhalla et al. |
| 10,318,907 B1 | 6/2019 | Bergstrom et al. |
| 10,318,917 B1 | 6/2019 | Goldstein et al. |
| 10,318,919 B2 | 6/2019 | Bermudez Rodriguez et al. |
| 10,321,275 B1 | 6/2019 | Orlov et al. |
| 10,332,066 B1 | 6/2019 | Palaniappan et al. |
| 10,339,411 B1 | 7/2019 | Hua et al. |
| 10,353,982 B1 | 7/2019 | Kumar et al. |
| 10,360,247 B2 | 7/2019 | Hebbalaguppe et al. |
| 10,366,306 B1 | 7/2019 | Raghavan et al. |
| 10,368,057 B1 | 7/2019 | Saran et al. |
| 10,384,869 B1 | 8/2019 | Shiee et al. |
| 10,388,019 B1 | 8/2019 | Hua et al. |
| 10,442,852 B2 | 9/2019 | Thiagarajan et al. |
| 10,438,277 B1 | 10/2019 | Jiang et al. |
| 10,445,694 B2 | 10/2019 | Fisher et al. |
| 10,459,103 B1 | 10/2019 | Shi et al. |
| 10,466,095 B1 | 11/2019 | O'Neill et al. |
| 10,474,991 B2 | 11/2019 | Fisher et al. |
| 10,474,992 B2 | 11/2019 | Fisher et al. |
| 10,474,993 B2 | 11/2019 | Fisher et al. |
| 10,475,185 B1 | 11/2019 | Raghavan et al. |
| 10,614,318 B1 | 4/2020 | Mirza et al. |
| 10,621,444 B1 | 4/2020 | Mirza et al. |
| 10,685,237 B1 | 6/2020 | Mirza et al. |
| 10,769,451 B1 | 9/2020 | Mirza et al. |
| 10,789,720 B1 | 9/2020 | Mirza et al. |
| 11,488,231 B1* | 11/2022 | Dsouza ................ G06V 20/62 |
| 2003/0107649 A1 | 6/2003 | Flickner et al. |
| 2003/0158796 A1 | 8/2003 | Balent |
| 2006/0279630 A1 | 12/2006 | Aggarwal et al. |
| 2007/0011099 A1 | 1/2007 | Sheehan |
| 2007/0069014 A1 | 3/2007 | Heckel et al. |
| 2007/0282665 A1 | 12/2007 | Buehler et al. |
| 2008/0226119 A1 | 9/2008 | Candelore et al. |

(56) References Cited

U.S. PATENT DOCUMENTS

| | | | |
|---|---|---|---|
| 2008/0279481 A1 | 11/2008 | Ando | |
| 2009/0063307 A1 | 3/2009 | Groenovelt et al. | |
| 2009/0128335 A1 | 5/2009 | Leung | |
| 2010/0046842 A1 | 2/2010 | Conwell | |
| 2010/0138281 A1 | 6/2010 | Zhang et al. | |
| 2010/0318440 A1 | 12/2010 | Coveley | |
| 2011/0246064 A1 | 10/2011 | Nicholson | |
| 2012/0206605 A1 | 8/2012 | Buehler et al. | |
| 2012/0209741 A1 | 8/2012 | Bonner et al. | |
| 2013/0117053 A2 | 5/2013 | Campbell | |
| 2013/0179303 A1 | 7/2013 | Petrou et al. | |
| 2013/0284806 A1 | 10/2013 | Margalit | |
| 2014/0016845 A1 | 1/2014 | Gazit et al. | |
| 2014/0052555 A1 | 2/2014 | MacIntosh | |
| 2014/0132728 A1 | 5/2014 | Verano et al. | |
| 2014/0152847 A1 | 6/2014 | Zomet et al. | |
| 2014/0171116 A1 | 6/2014 | LaMarca et al. | |
| 2014/0201042 A1 | 7/2014 | Meyer | |
| 2014/0342754 A1 | 11/2014 | Liu et al. | |
| 2015/0029339 A1 | 1/2015 | Kobres et al. | |
| 2016/0092739 A1 | 3/2016 | Oami et al. | |
| 2016/0098095 A1 | 4/2016 | Gonzalez-Banos et al. | |
| 2016/0205341 A1 | 7/2016 | Hollander et al. | |
| 2017/0061416 A1* | 3/2017 | Morate | G06F 16/51 |
| 2017/0147885 A1* | 5/2017 | Aggarwal | G06V 20/53 |
| 2017/0147903 A1* | 5/2017 | Booth | G06V 10/462 |
| 2017/0150118 A1 | 5/2017 | Pacheco et al. | |
| 2017/0323376 A1 | 11/2017 | Glaser et al. | |
| 2018/0048894 A1 | 2/2018 | Chen et al. | |
| 2018/0109338 A1 | 4/2018 | Walden et al. | |
| 2018/0150685 A1 | 5/2018 | Ebrom et al. | |
| 2018/0374239 A1 | 12/2018 | Wallack et al. | |
| 2019/0043003 A1* | 2/2019 | Fisher | G06N 3/04 |
| 2019/0138986 A1 | 5/2019 | Puerini et al. | |
| 2019/0147709 A1 | 5/2019 | Schoner | |
| 2019/0149725 A1* | 5/2019 | Adato | H04N 1/00 348/158 |
| 2019/0156274 A1 | 5/2019 | Fisher et al. | |
| 2019/0156275 A1 | 5/2019 | Fisher et al. | |
| 2019/0156276 A1 | 5/2019 | Fisher et al. | |
| 2019/0156277 A1 | 5/2019 | Fisher et al. | |
| 2019/0156506 A1 | 5/2019 | Fisher et al. | |
| 2019/0236531 A1 | 8/2019 | Adato et al. | |
| 2019/0244386 A1 | 8/2019 | Fisher et al. | |
| 2019/0244500 A1 | 8/2019 | Fisher et al. | |
| 2019/0251499 A1 | 8/2019 | Kumar et al. | |
| 2019/0313063 A1 | 10/2019 | Wang et al. | |
| 2019/0347611 A1 | 11/2019 | Fisher et al. | |
| 2020/0211343 A1* | 7/2020 | Mullins | G08B 13/19 |
| 2020/0402139 A1* | 12/2020 | Higa | G07G 1/14 |
| 2020/0410572 A1* | 12/2020 | Higa | G06F 9/5027 |
| 2021/0166037 A1* | 6/2021 | Higa | G06T 7/254 |

FOREIGN PATENT DOCUMENTS

| | | |
|---|---|---|
| CN | 110009836 A | 7/2019 |
| EP | 0348484 A1 | 1/1990 |
| WO | 2019032304 A1 | 2/2019 |
| WO | 2019038965 A1 | 2/2019 |
| WO | 2019038968 A1 | 2/2019 |
| WO | 2019093293 A1 | 5/2019 |
| WO | 2019181364 A1 | 9/2019 |

OTHER PUBLICATIONS

Boulio, C. A. et al., "Sensor Array for Scalable Position Tracking System," U.S. Appl. No. 16/663,415, filed Oct. 25, 2019, 113 pages.

Paul, D. et al., "Custom Rack for Scalable Position Tracking System," U.S. Appl. No. 16/633,669, filed Oct. 25, 2019, 110 pages.

Krishnamurthy, S. B. et al., "Tracking Positions Using a Scalable Position Tracking System," U.S. Appl. No. 16/633,432, filed Oct. 25, 2019, 122 pages.

Krishnamurthy, S. B. et al., "Topview Object Tracking Using a Sensor Array," U.S. Appl. No. 16/663,710, filed Oct. 25, 2019, 199 pages.

Krishnamurthy, S. B. et al., "Detecting Shelf Interactions Using a Sensor Array," U.S. Appl. No. 16/663,766, filed Oct. 25, 2019, 205 pages.

Vakacharla, S. et al., "Topview Item Tracking Using a Sensor Array," U.S. Appl. No. 16/663,451, filed Oct. 25, 2019, 204 pages.

Mirza, S. A. et al., "Detecting and Identifying Misplaced Items Using a Sensor Array," U.S. Appl. No. 16/663,794, filed Oct. 25, 2019, 200 pages.

Mirza, S. A. et al., "Sensor Mapping to a Global Coordinate System," U.S. Appl. No. 16/663,822, filed Oct. 25, 2019, 204 pages.

Mirza, S. A. et al., "Sensor Mapping to a Global Coordinate System Using a Marker Grid," U.S. Appl. No. 16/663,472, filed Oct. 25, 2019, 206 pages.

Mirza, S. A. et al., "Shelf Position Calibration in a Global Coordinate System Using a Sensor Array," U.S. Appl. No. 16/663,856, filed Oct. 25, 2019, 206 pages.

Magee, M. R. et al., "Customer-Based Video Feed," U.S. Appl. No. 16/664,470, filed Oct. 25, 2019, 103 pages.

Mirza, S. A. et al., "System and Method for Presenting a Virtual Store Shelf That Emulates a Physical Store Shelf," U.S. Appl. No. 16/664,490, filed Oct. 25, 2019, 103 pages.

Nguyen, T. N. et al., "Contour-Based Detection of Closely Spaced Objects," U.S. Appl. No. 16/664,160, filed Oct. 25, 2019, 199 pages.

Mirza, S. A. et al., "Object Re-Identification During Image Tracking," U.S. Appl. No. 16/664,219, filed Oct. 25, 2019, 201 pages.

Chinnam, M. M. et al., "Vector-Based Object Re-Identification During Image Tracking," U.S. Appl. No. 16/664,269, filed Oct. 25, 2019, 199 pages.

Mirza, S. A. et al., "Image-Based Action Detection Using Contour Dilation," U.S. Appl. No. 16/664,332, filed Oct. 25, 2019, 199 pages.

Mirza, S. A. et al., "Determining Candidate Object Identities During Image Tracking," U.S. Appl. No. 16/664,363, filed Oct. 25, 2019, 201 pages.

Mirza, S. A. et al., "Object Assignment During Image Tracking," U.S. Appl. No. 16/664,391, filed Oct. 25, 2019, 198 pages.

Krishnamurthy, S. B. et al., "Auto-Exclusion Zone for Contour-Based Object Detection," U.S. Appl. No. 16/664,426, filed Oct. 25, 2019, 199 pages.

Mirza, S. A. et al., "Multi-Camera Image Tracking on a Global Plane," U.S. Appl. No. 16/663,533, filed Oct. 25, 2019, 198 pages.

Mirza, S. A. et al., "Feedback and Training for a Machine Learning Algorithm Configured to Determine Customer Purchases During a Shopping Session at a Physical Store," U.S. Appl. No. 16/663,564, filed Oct. 25, 2019, 97 pages.

Mirza, S. A. et al., "Identifying Non-Uniform Weight Objects Using a Sensor Array," U.S. Appl. No. 16/663,901, filed Oct. 25, 2019, 199 pages.

Magee, M. R. et al., "System and Method for Populating a Virtual Shopping Cart Based on Video of a Customer's Shopping Session at a Physical Store," U.S. Appl. No. 16/663,589, filed Oct. 25, 2019, 103 pages.

Magee, M. R. et al., "Tool for Generating a Virtual Store That Emulates a Physical Store," U.S. Appl. No. 16/664,529, filed Oct. 25, 2019, 100 pages.

Mirza, S. A. et al., "Sensor Mapping to a Global Coordinate System Using Homography," U.S. Appl. No. 16/663,948, filed Oct. 25, 2019, 197 pages.

Mirza, S. A. et al., "Action Detection During Image Tracking," U.S. Appl. No. 16/663,500, filed Oct. 25, 2019, 198 pages.

Mirza, S. A. et al., "Action Detection During Image Tracking," U.S. Appl. No. 16/793,998, filed Feb. 18, 2020, 198 pages.

Mirza, S. A. et al., "Action Detection During Image Tracking," U.S. Appl. No. 16/857,990, filed Apr. 24, 2020, 200 pages.

Mirza, S. A. et al., "Action Detection During Image Tracking," U.S. Appl. No. 17/071,262, filed Oct. 15, 2020, 198 pages.

Mirza, S. A. et al., "Sensor Mapping to a Global Coordinate System Using a Marker Grid," U.S. Appl. No. 16/941,415, filed Jul. 28, 2020, 205 pages.

Mirza, S. A. et al., "Multi-Camera Image Tracking on a Global Plane," U.S. Appl. No. 16/884,434, filed May 27, 2020, 200 pages.

(56) References Cited

OTHER PUBLICATIONS

Patent Cooperation Treaty, International Search Report and Written Opinion, International Application No. PCT/US2021/072540, date of mailing Mar. 15, 2022, 11 pages.

Xiaochen Liu et al: "Grab: Fast and Accurate Sensor Processing for Cashier-Free Shopping", arxiv.org, Cornell University Library, 201 Olin Library Cornell University Ithaca, NY 14853, Jan. 4, 2020 (Jan. 4, 2020), XP081572231, 16 pages.

KIPO's Notice of Preliminary Rejection for Korean Application No. 10-2022-7017154 dated Feb. 21, 2024 (Feb. 21, 2024); English Translation; 7 pages.

[Machine English Translation] Japanese Notice of Allowance for JP Application No. 2022-523937; date mailed Jun. 4, 2024 (Jun. 4, 2024); 3 pages.

\* cited by examiner

FOOD DETECTION USING A SENSOR ARRAY

CROSS-REFERENCE TO RELATED APPLICATIONS

This application is a continuation-in-part of:

U.S. patent application Ser. No. 16/663,710 filed Oct. 25, 2019, by Sailesh Bharathwaaj Krishnamurthy et al., and entitled "TOPVIEW OBJECT TRACKING USING A SENSOR ARRAY";

U.S. patent application Ser. No. 16/663,766 filed Oct. 25, 2019, by Sailesh Bharathwaaj Krishnamurthy et al., and entitled "DETECTING SHELF INTERACTIONS USING A SENSOR ARRAY";

U.S. patent application Ser. No. 16/663,451 filed Oct. 25, 2019, by Sarath Vakacharla et al., and entitled "TOPVIEW ITEM TRACKING USING A SENSOR ARRAY";

U.S. patent application Ser. No. 16/663,794 filed Oct. 25, 2019, by Shahmeer Ali Mirza et al., and entitled "DETECTING AND IDENTIFYING MISPLACED ITEMS USING A SENSOR ARRAY";

U.S. patent application Ser. No. 16/663,822 filed Oct. 25, 2019, by Shahmeer Ali Mirza et al., and entitled "SENSOR MAPPING TO A GLOBAL COORDINATE SYSTEM";

U.S. patent application Ser. No. 16/941,415 filed Jul. 28, 2020, by Shahmeer Ali Mirza et al., and entitled "SENSOR MAPPING TO A GLOBAL COORDINATE SYSTEM USING A MARKER GRID", which is a continuation of U.S. patent application Ser. No. 16/794,057 filed Feb. 18, 2020, by Shahmeer Ali Mirza et al., and entitled "SENSOR MAPPING TO A GLOBAL COORDINATE SYSTEM USING A MARKER GRID", now U.S. Pat. No. 10,769,451 issued Sep. 8, 2020, which is a continuation of U.S. patent application Ser. No. 16/663,472 filed Oct. 25, 2019, by Shahmeer Ali Mirza et al., and entitled "SENSOR MAPPING TO A GLOBAL COORDINATE SYSTEM USING A MARKER GRID", now U.S. Pat. No. 10,614,318 issued Apr. 7, 2020;

U.S. patent application Ser. No. 16/663,856 filed Oct. 25, 2019, by Shahmeer Ali Mirza et al., and entitled "SHELF POSITION CALIBRATION IN A GLOBAL COORDINATE SYSTEM USING A SENSOR ARRAY";

U.S. patent application Ser. No. 16/664,160 filed Oct. 25, 2019, by Trong Nghia Nguyen et al., and entitled "CONTOUR-BASED DETECTION OF CLOSELY SPACED OBJECTS";

U.S. patent application Ser. No. 17/071,262 filed Oct. 15, 2020, by Shahmeer Ali Mirza et al., and entitled "ACTION DETECTION DURING IMAGE TRACKING", which is a continuation of U.S. patent application Ser. No. 16/857,990 filed Apr. 24, 2020, by Shahmeer Ali Mirza et al., and entitled "ACTION DETECTION DURING IMAGE TRACKING", which is a continuation of U.S. patent application Ser. No. 16/793,998 filed Feb. 18, 2020, by Shahmeer Ali Mirza et al., and entitled "ACTION DETECTION DURING IMAGE TRACKING", now U.S. Pat. No. 10,685,237 issued Jun. 16, 2020, which is a continuation of U.S. patent application Ser. No. 16/663,500 filed Oct. 25, 2019, by Shahmeer Ali Mirza et al., and entitled "ACTION DETECTION DURING IMAGE TRACKING", now U.S. Pat. No. 10,621,444 issued Apr. 14, 2020;

U.S. patent application Ser. No. 16/857,990 filed Apr. 24, 2020, by Shahmeer Ali Mirza et al., and entitled "ACTION DETECTION DURING IMAGE TRACKING", which is a continuation of U.S. patent application Ser. No. 16/793,998 filed Feb. 18, 2020, by Shahmeer Ali Mirza et al., and entitled "ACTION DETECTION DURING IMAGE TRACKING", now U.S. Pat. No. 10,685,237 issued Jun. 16, 2020, which is a continuation of U.S. patent application Ser. No. 16/663,500 filed Oct. 25, 2019, by Shahmeer Ali Mirza et al., and entitled "ACTION DETECTION DURING IMAGE TRACKING", now U.S. Pat. No. 10,621,444 issued Apr. 14, 2020;

U.S. patent application Ser. No. 16/664,219 filed Oct. 25, 2019, by Shahmeer Ali Mirza et al., and entitled "OBJECT RE-IDENTIFICATION DURING IMAGE TRACKING";

U.S. patent application Ser. No. 16/664,269 filed Oct. 25, 2019, by Madan Mohan Chinnam et al., and entitled "VECTOR-BASED OBJECT RE-IDENTIFICATION DURING IMAGE TRACKING";

U.S. patent application Ser. No. 16/664,332 filed Oct. 25, 2019, by Shahmeer Ali Mirza et al., and entitled "IMAGE-BASED ACTION DETECTION USING CONTOUR DILATION";

U.S. patent application Ser. No. 16/664,363 filed Oct. 25, 2019, by Shahmeer Ali Mirza et al., and entitled "DETERMINING CANDIDATE OBJECT IDENTITIES DURING IMAGE TRACKING";

U.S. patent application Ser. No. 16/664,391 filed Oct. 25, 2019, by Shahmeer Ali Mirza et al., and entitled "OBJECT ASSIGNMENT DURING IMAGE TRACKING";

U.S. patent application Ser. No. 16/664,426 filed Oct. 25, 2019, by Sailesh Bharathwaaj Krishnamurthy et al., and entitled "AUTO-EXCLUSION ZONE FOR CONTOUR-BASED OBJECT DETECTION";

U.S. patent application Ser. No. 16/884,434 filed May 27, 2020, by Shahmeer Ali Mirza et al., and entitled "MULTI-CAMERA IMAGE TRACKING ON A GLOBAL PLANE", which is a continuation of U.S. patent application Ser. No. 16/663,533 filed Oct. 25, 2019, by Shahmeer Ali Mirza et al., and entitled "MULTI-CAMERA IMAGE TRACKING ON A GLOBAL PLANE", now U.S. Pat. No. 10,789,720 issued Sep. 29, 2020;

U.S. patent application Ser. No. 16/663,901 filed Oct. 25, 2019, by Shahmeer Ali Mirza et al., and entitled "IDENTIFYING NON-UNIFORM WEIGHT OBJECTS USING A SENSOR ARRAY"; and U.S. patent application Ser. No. 16/663,948 filed Oct. 25, 2019, by Shahmeer Ali Mirza et al., and entitled "SENSOR MAPPING TO A GLOBAL COORDINATE SYSTEM USING HOMOGRAPHY", which are all incorporated herein by reference.

TECHNICAL FIELD

The present disclosure relates generally to object detection and tracking, and more specifically, to food detection using a sensor array.

BACKGROUND

Identifying and tracking objects within a space poses several technical challenges. Existing systems use various image processing techniques to identify objects (e.g. people). For example, these systems may identify different features of a person that can be used to later identify the person in an image. This process is computationally intensive when the image includes several people. For example, to identify a person in an image of a busy environment, such as a store, would involve identifying everyone in the image and then comparing the features for a person against every person in the image. In addition to being computationally intensive, this process requires a significant amount of time which means that this process is not compatible with real-time applications such as video streams. This problem becomes intractable when trying to simultaneously identify and track multiple objects. In addition, existing systems lack the ability to determine a physical location for an object that is located within an image.

SUMMARY

Position tracking systems are used to track the physical positions of people and/or objects in a physical space (e.g., a store). These systems typically use a sensor (e.g., a camera) to detect the presence of a person and/or object and a computer to determine the physical position of the person and/or object based on signals from the sensor. In a store setting, other types of sensors can be installed to track the movement of inventory within the store. For example, weight sensors can be installed on racks and shelves to determine when items have been removed from those racks and shelves. By tracking both the positions of persons in a store and when items have been removed from shelves, it is possible for the computer to determine which person in the store removed the item and to charge that person for the item without needing to ring up the item at a register. In other words, the person can walk into the store, take items, and leave the store without stopping for the conventional checkout process.

For larger physical spaces (e.g., convenience stores and grocery stores), additional sensors can be installed throughout the space to track the position of people and/or objects as they move about the space. For example, additional cameras can be added to track positions in the larger space and additional weight sensors can be added to track additional items and shelves. Increasing the number of cameras poses a technical challenge because each camera only provides a field of view for a portion of the physical space. This means that information from each camera needs to be processed independently to identify and track people and objects within the field of view of a particular camera. The information from each camera then needs to be combined and processed as a collective in order to track people and objects within the physical space.

The system disclosed in the present application provides a technical solution to the technical problems discussed above by generating a relationship between the pixels of a camera and physical locations within a space. The disclosed system provides several practical applications and technical advantages which include 1) a process for generating a homography that maps pixels of a sensor (e.g. a camera) to physical locations in a global plane for a space (e.g. a room); 2) a process for determining a physical location for an object within a space using a sensor and a homography that is associated with the sensor; 3) a process for handing off tracking information for an object as the object moves from the field of view of one sensor to the field of view of another sensor; 4) a process for detecting when a sensor or a rack has moved within a space using markers; 5) a process for detecting where a person is interacting with a rack using a virtual curtain; 6) a process for associating an item with a person using a predefined zone that is associated with a rack; 7) a process for identifying and associating items with a non-uniform weight to a person; and 8) a process for identifying an item that has been misplaced on a rack based on its weight.

In one embodiment, the tracking system may be configured to generate homographies for sensors. A homography is configured to translate between pixel locations in an image from a sensor (e.g. a camera) and physical locations in a physical space. In this configuration, the tracking system determines coefficients for a homography based on the physical location of markers in a global plane for the space and the pixel locations of the markers in an image from a sensor. This configuration will be described in more detail using FIGS. 2-7.

In one embodiment, the tracking system is configured to calibrate a shelf position within the global plane using sensors. In this configuration, the tracking system periodically compares the current shelf location of a rack to an expected shelf location for the rack using a sensor. In the event that the current shelf location does not match the expected shelf location, then the tracking system uses one or more other sensors to determine whether the rack has moved or whether the first sensor has moved. This configuration will be described in more detail using FIGS. 8 and 9.

In one embodiment, the tracking system is configured to hand off tracking information for an object (e.g. a person) as it moves between the field of views of adjacent sensors. In this configuration, the tracking system tracks an object's movement within the field of view of a first sensor and then hands off tracking information (e.g. an object identifier) for the object as it enters the field of view of a second adjacent sensor. This configuration will be described in more detail using FIGS. 10 and 11.

In one embodiment, the tracking system is configured to detect shelf interactions using a virtual curtain. In this configuration, the tracking system is configured to process an image captured by a sensor to determine where a person is interacting with a shelf of a rack. The tracking system uses a predetermined zone within the image as a virtual curtain that is used to determine which region and which shelf of a rack that a person is interacting with. This configuration will be described in more detail using FIGS. 12-14.

In one embodiment, the tracking system is configured to detect when an item has been picked up from a rack and to determine which person to assign the item to using a predefined zone that is associated with the rack. In this configuration, the tracking system detects that an item has been picked up using a weight sensor. The tracking system then uses a sensor to identify a person within a predefined zone that is associated with the rack. Once the item and the person have been identified, the tracking system will add the item to a digital cart that is associated with the identified person. This configuration will be described in more detail using FIGS. 15 and 18.

In one embodiment, the tracking system is configured to identify an object that has a non-uniform weight and to assign the item to a person's digital cart. In this configuration, the tracking system uses a sensor to identify markers (e.g. text or symbols) on an item that has been picked up. The tracking system uses the identified markers to then identify which item was picked up. The tracking system then uses the sensor to identify a person within a predefined zone that is associated with the rack. Once the item and the person have been identified, the tracking system will add the item to a digital cart that is associated with the identified person. This configuration will be described in more detail using FIGS. 16 and 18.

In one embodiment, the tracking system is configured to detect and identify items that have been misplaced on a rack. For example, a person may put back an item in the wrong location on the rack. In this configuration, the tracking system uses a weight sensor to detect that an item has been put back on a rack and to determine that the item is not in the correct location based on its weight. The tracking system then uses a sensor to identify the person that put the item on the rack and analyzes their digital cart to determine which item they put back based on the weights of the items in their digital cart. This configuration will be described in more detail using FIGS. 17 and 18.

In one embodiment, the tracking system is configured to determine pixel regions from images generated by each sensor which should be excluded during object tracking. These pixel regions, or "auto-exclusion zones," may be updated regularly (e.g., during times when there are no people moving through a space). The auto-exclusion zones may be used to generate a map of the physical portions of the space that are excluded during tracking. This configuration is described in more detail using FIGS. 19 through 21.

In one embodiment, the tracking system is configured to distinguish between closely spaced people in a space. For instance, when two people are standing, or otherwise located, near each other, it may be difficult or impossible for previous systems to distinguish between these people, particularly based on top-view images. In this embodiment, the system identifies contours at multiple depths in top-view depth images in order to individually detect closely spaced objects. This configuration is described in more detail using FIGS. 22 and 23.

In one embodiment, the tracking system is configured to track people both locally (e.g., by tracking pixel positions in images received from each sensor) and globally (e.g., by tracking physical positions on a global plane corresponding to the physical coordinates in the space). Person tracking may be more reliable when performed both locally and globally. For example, if a person is "lost" locally (e.g., if a sensor fails to capture a frame and a person is not detected by the sensor), the person may still be tracked globally based on an image from a nearby sensor, an estimated local position of the person determined using a local tracking algorithm, and/or an estimated global position determined using a global tracking algorithm. This configuration is described in more detail using FIGS. 24A-C through 26.

In one embodiment, the tracking system is configured to maintain a record, which is referred to in this disclosure as a "candidate list," of possible person identities, or identifiers (i.e., the usernames, account numbers, etc. of the people being tracked), during tracking. A candidate list is generated and updated during tracking to establish the possible identities of each tracked person. Generally, for each possible identity or identifier of a tracked person, the candidate list also includes a probability that the identity, or identifier, is believed to be correct. The candidate list is updated following interactions (e.g., collisions) between people and in response to other uncertainty events (e.g., a loss of sensor data, imaging errors, intentional trickery, etc.). This configuration is described in more detail using FIGS. 27 and 28.

In one embodiment, the tracking system is configured to employ a specially structured approach for object re-identification when the identity of a tracked person becomes uncertain or unknown (e.g., based on the candidate lists described above). For example, rather than relying heavily on resource-expensive machine learning-based approaches to re-identify people, "lower-cost" descriptors related to observable characteristics (e.g., height, color, width, volume, etc.) of people are used first for person re-identification. "Higher-cost" descriptors (e.g., determined using artificial neural network models) are used when the lower-cost descriptors cannot provide reliable results. For instance, in some cases, a person may first be re-identified based on his/her height, hair color, and/or shoe color. However, if these descriptors are not sufficient for reliably re-identifying the person (e.g., because other people being tracked have similar characteristics), progressively higher-level approaches may be used (e.g., involving artificial neural networks that are trained to recognize people) which may be more effective at person identification but which generally involve the use of more processing resources. These configurations are described in more detail using FIGS. 29 through 32.

In one embodiment, the tracking system is configured to employ a cascade of algorithms (e.g., from more simple approaches based on relatively straightforwardly determined image features to more complex strategies involving artificial neural networks) to assign an item picked up from a rack to the correct person. The cascade may be triggered, for example, by (i) the proximity of two or more people to the rack, (ii) a hand crossing into the zone (or a "virtual curtain") adjacent to the rack, and/or (iii) a weight signal indicating an item was removed from the rack. In yet another embodiment, the tracking system is configured to employ a unique contour-based approach to assign an item to the correct person. For instance, if two people may be reaching into a rack to pick up an item, a contour may be "dilated" from a head height to a lower height in order to determine which person's arm reached into the rack to pick up the item. If the results of this computationally efficient contour-based approach do not satisfy certain confidence criteria, a more computationally expensive approach may be used involving pose estimation. These configurations are described in more detail using FIGS. 33A-C through 35.

In one embodiment, the tracking system is configured to track an item after it exits a rack, identify a position at which the item stops moving, and determines which person is nearest to the stopped item. The nearest person is generally assigned the item. This configuration may be used, for instance, when an item cannot be assigned to the correct person even using an artificial neural network for pose estimation. This configuration is described in more detail using FIGS. 36A, 36B, and 37.

In one embodiment, the tracking system is configured to detect when a person removes or replaces an item from a rack using triggering events and a wrist-based region-of-interest (ROI). In this configuration, the tracking system uses a combination of triggering events and ROIs to detect when an item has been removed or replaced from a rack, identifies the item, and then modifies a digital cart of a person that is adjacent to the rack based on the identified item. This configuration is described in more detail using FIGS. 39-42.

In one embodiment, the tracking system is configured to employ a machine learning model to detect differences between a series of images over time. In this configuration, the tracking system is configured to use the machine learning model to determine whether an item has been removed or replaced from a rack. After detecting that an item has been removed or replaces from a rack, the tracking system may then identify the item and modify a digital cart of a person that is adjacent to the rack based on the identified item. This configuration is described in more detail using FIGS. 43-44.

In one embodiment, the tracking system is configured to detect when a person is interacting with a self-serve beverage machine and to track the beverages that are obtained by the person. In this configuration, the tracking system may employ one or more zones that are used to automatically detect the type and size of beverages that a person is retrieving from the self-serve beverage machine. After determining the type and size of beverages that a person retrieves, the tracking system then modifies a digital cart of the person based on the identified beverages. This configuration is described in more detail using FIGS. 45-47.

In one embodiment, the tracking system is configured to employ a sensor mounting system with adjustable camera positions. The sensor mounting system generally includes a sensor, a mounting ring, a faceplate support, and a faceplate. The mounting ring includes a first opening and a first plurality of threads that are disposed on an interior surface of the first opening. The faceplate support is disposed within the first opening of the mounting ring. The faceplate support includes a second plurality of threads that are configured to engage the first plurality of threads of the mounting ring and a second opening. The faceplate is disposed within the second opening of the faceplate support. The faceplate is coupled to the sensor and is configured to rotate within the second opening of the faceplate support. This configuration is described in more detail using FIGS. 48-56.

In one embodiment, the tracking system is configured to using distance measuring devices (e.g. draw wire encoders) to generate a homography for a sensor. In this configuration, a platform that comprises one or more markers is repositioned within the field of view of a sensor. The tracking system is configured to obtain location information for the platform and the markers from the distance measuring devices while the platform is repositioned within a space. The tracking system then computes a homography for the sensor based on the location information from the distance measuring device and the pixel locations of the markers within a frame captured by the sensor. This configuration is described in more detail using FIGS. 57-59.

In one embodiment, the tracking system is configured to define a zone within a frame from a sensor using a region-of-interest (ROI) marker. In this configuration, the tracking system uses the ROI marker to define a zone within frames from a sensor. The tracking system then uses the defined zone to reduce the search space when performing object detection to determine whether a person is removing or replacing an item from a food rack. This configuration is described in more detail using FIGS. 60-64.

In one embodiment, the tracking system is configured to update a homography for a sensor in response to determining that the sensor has moved since its homography was first computed. In this configuration, the tracking system determines translation coefficients and/or rotation coefficients and updates the homography for the sensor by applying the translation coefficients and/or rotation coefficients. This configuration is described in more detail using FIGS. 65-67.

In one embodiment, the tracking system is configured to detect and correct homography errors based on the location of a sensor. In this configuration, the tracking system determines an error between an estimated location of a sensor using a homography and the actual location of the sensor. The tracking system is configured to recompute the homography for the sensor in response to determining that the error is beyond the accuracy tolerances of the system. This configuration is described in more detail using FIGS. 69 and 70.

In one embodiment, the tracking system is configured to detect and correct homography errors using distances between markers. In this configuration, the tracking system determines whether a distance measurement error that is computed using a homography exceeds the accuracy tolerances of the system. The tracking system is configured to recompute the homography for a sensor in response to determining that the distance measurement error is beyond the accuracy tolerances of the system. This configuration is described in more detail using FIGS. 70 and 71.

In one embodiment, the tracking system is configured to detect and correct homography errors using a disparity mapping between adjacent sensors. In this configuration, the tracking system determines whether a pixel location that is computed using a homography is within the accuracy tolerances of the system. The tracking system is configured to recompute the homography in response to determining the results of using the homography are beyond the accuracy tolerances of the system. This configuration is described in more detail using FIGS. 72 and 73.

In one embodiment, the tracking system is configured to detect and correct homography errors using adjacent sensors. In this configuration, the tracking system determines whether a distance measurement error that is computed using adjacent sensors exceeds the accuracy tolerances of the system. The tracking system is configured to recompute the homographies for the sensors in response to determining that the distance measurement error is beyond the accuracy tolerances of the system. This configuration is described in more detail using FIGS. 74 and 75.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Position tracking systems are used to track the physical positions of people and/or objects in a physical space (e.g., a store). These systems typically use a sensor (e.g., a camera) to detect the presence of a person and/or object and a computer to determine the physical position of the person and/or object based on signals from the sensor. In a store setting, other types of sensors can be installed to track the movement of inventory within the store. For example, weight sensors can be installed on racks and shelves to determine when items have been removed from those racks and shelves. By tracking both the positions of persons in a store and when items have been removed from shelves, it is possible for the computer to determine which person in the store removed the item and to charge that person for the item without needing to ring up the item at a register. In other words, the person can walk into the store, take items, and leave the store without stopping for the conventional checkout process.

For larger physical spaces (e.g., convenience stores and grocery stores), additional sensors can be installed throughout the space to track the position of people and/or objects as they move about the space. For example, additional cameras can be added to track positions in the larger space and additional weight sensors can be added to track additional items and shelves. Increasing the number of cameras poses a technical challenge because each camera only provides a field of view for a portion of the physical space. This means that information from each camera needs to be processed independently to identify and track people and objects within the field of view of a particular camera. The information from each camera then needs to be combined and processed as a collective in order to track people and objects within the physical space.

Additional information is disclosed in U.S. patent application Ser. No. 16/663,633 entitled, "Scalable Position Tracking System For Tracking Position In Large Spaces" and U.S. patent application Ser. No. 16/664,470 entitled, "Customer-Based Video Feed" which are both hereby incorporated by reference herein as if reproduced in their entirety.

Tracking System Overview

Figure 1:
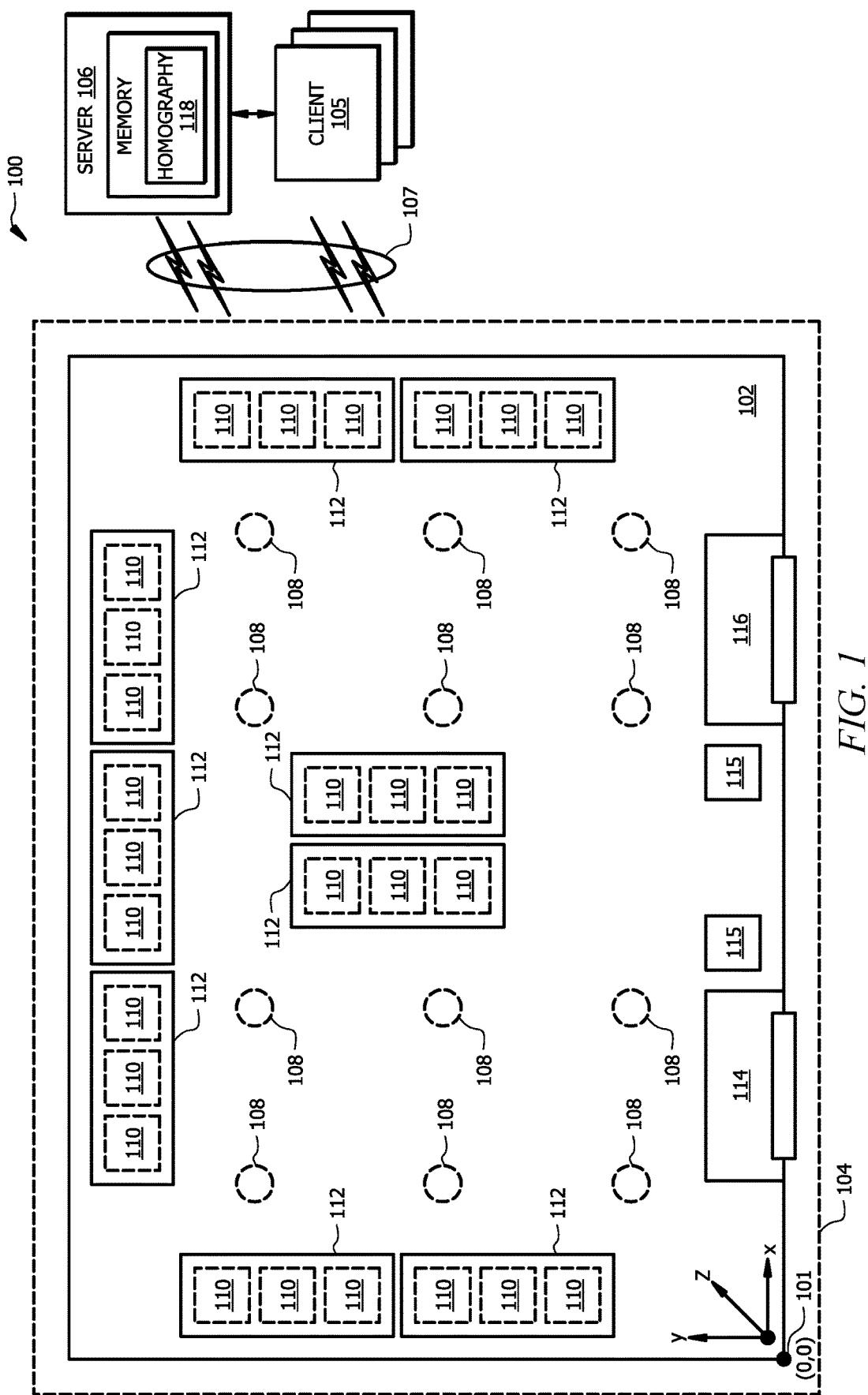
FIG. 1 is a schematic diagram of an embodiment of a tracking system configured to track objects within a space.

FIG. 1 is a schematic diagram of an embodiment of a tracking system 100 that is configured to track objects within a space 102. As discussed above, the tracking system 100 may be installed in a space 102 (e.g. a store) so that shoppers need not engage in the conventional checkout process. Although the example of a store is used in this disclosure, this disclosure contemplates that the tracking system 100 may be installed and used in any type of physical space (e.g. a room, an office, an outdoor stand, a mall, a supermarket, a convenience store, a pop-up store, a warehouse, a storage center, an amusement park, an airport, an office building, etc.). Generally, the tracking system 100 (or components thereof) is used to track the positions of people and/or objects within these spaces 102 for any suitable purpose. For example, at an airport, the tracking system 100 can track the positions of travelers and employees for security purposes. As another example, at an amusement park, the tracking system 100 can track the positions of park guests to gauge the popularity of attractions. As yet another example, at an office building, the tracking system 100 can track the positions of employees and staff to monitor their productivity levels.

In FIG. 1, the space 102 is a store that comprises a plurality of items that are available for purchase. The tracking system 100 may be installed in the store so that shoppers need not engage in the conventional checkout process to purchase items from the store. In this example, the store may be a convenience store or a grocery store. In other examples, the store may not be a physical building, but a physical space or environment where shoppers may shop. For example, the store may be a grab and go pantry at an airport, a kiosk in an office building, an outdoor market at a park, etc.

In FIG. 1, the space 102 comprises one or more racks 112. Each rack 112 comprises one or more shelves that are configured to hold and display items. In some embodiments, the space 102 may comprise refrigerators, coolers, freezers, or any other suitable type of furniture for holding or displaying items for purchase. The space 102 may be configured as shown or in any other suitable configuration.

In this example, the space 102 is a physical structure that includes an entryway through which shoppers can enter and exit the space 102. The space 102 comprises an entrance area 114 and an exit area 116. In some embodiments, the entrance area 114 and the exit area 116 may overlap or are the same area within the space 102. The entrance area 114 is adjacent to an entrance (e.g. a door) of the space 102 where a person enters the space 102. In some embodiments, the entrance area 114 may comprise a turnstile or gate that controls the flow of traffic into the space 102. For example, the entrance area 114 may comprise a turnstile that only allows one person to enter the space 102 at a time. The entrance area 114 may be adjacent to one or more devices (e.g. sensors 108 or a scanner 115) that identify a person as they enter space 102. As an example, a sensor 108 may capture one or more images of a person as they enter the space 102. As another example, a person may identify themselves using a scanner 115. Examples of scanners 115 include, but are not limited to, a QR code scanner, a barcode scanner, a near-field communication (NFC) scanner, or any other suitable type of scanner that can receive an electronic code embedded with information that uniquely identifies a person. For instance, a shopper may scan a personal device (e.g. a smart phone) on a scanner 115 to enter the store. When the shopper scans their personal device on the scanner 115, the personal device may provide the scanner 115 with an electronic code that uniquely identifies the shopper. After the shopper is identified and/or authenticated, the shopper is allowed to enter the store. In one embodiment, each shopper may have a registered account with the store to receive an identification code for the personal device.

After entering the space 102, the shopper may move around the interior of the store. As the shopper moves throughout the space 102, the shopper may shop for items by removing items from the racks 112. The shopper can remove multiple items from the racks 112 in the store to purchase those items. When the shopper has finished shopping, the shopper may leave the store via the exit area 116. The exit area 116 is adjacent to an exit (e.g. a door) of the space 102 where a person leaves the space 102. In some embodiments, the exit area 116 may comprise a turnstile or gate that controls the flow of traffic out of the space 102. For example, the exit area 116 may comprise a turnstile that only allows one person to leave the space 102 at a time. In some embodiments, the exit area 116 may be adjacent to one or more devices (e.g. sensors 108 or a scanner 115) that identify a person as they leave the space 102. For example, a shopper may scan their personal device on the scanner 115 before a turnstile or gate will open to allow the shopper to exit the store. When the shopper scans their personal device on the scanner 115, the personal device may provide an electronic code that uniquely identifies the shopper to indicate that the shopper is leaving the store. When the shopper leaves the store, an account for the shopper is charged for the items that the shopper removed from the store. Through this process the tracking system 100 allows the shopper to leave the store with their items without engaging in a conventional checkout process.

Global Plane Overview

In order to describe the physical location of people and objects within the space 102, a global plane 104 is defined for the space 102. The global plane 104 is a user-defined coordinate system that is used by the tracking system 100 to identify the locations of objects within a physical domain (i.e. the space 102). Referring to FIG. 1 as an example, a global plane 104 is defined such that an x-axis and a y-axis are parallel with a floor of the space 102. In this example, the z-axis of the global plane 104 is perpendicular to the floor of the space 102. A location in the space 102 is defined as a reference location 101 or origin for the global plane 104. In FIG. 1, the global plane 104 is defined such that reference location 101 corresponds with a corner of the store. In other examples, the reference location 101 may be located at any other suitable location within the space 102.

In this configuration, physical locations within the space 102 can be described using (x,y) coordinates in the global plane 104. As an example, the global plane 104 may be defined such that one unit in the global plane 104 corresponds with one meter in the space 102. In other words, an x-value of one in the global plane 104 corresponds with an offset of one meter from the reference location 101 in the space 102. In this example, a person that is standing in the corner of the space 102 at the reference location 101 will have an (x,y) coordinate with a value of (0,0) in the global plane 104. If person moves two meters in the positive x-axis direction and two meters in the positive y-axis direction, then their new (x,y) coordinate will have a value of (2,2). In other examples, the global plane 104 may be expressed using inches, feet, or any other suitable measurement units.

Once the global plane 104 is defined for the space 102, the tracking system 100 uses (x,y) coordinates of the global plane 104 to track the location of people and objects within the space 102. For example, as a shopper moves within the interior of the store, the tracking system 100 may track their current physical location within the store using (x,y) coordinates of the global plane 104.

Tracking System Hardware

In one embodiment, the tracking system 100 comprises one or more clients 105, one or more servers 106, one or more scanners 115, one or more sensors 108, and one or more weight sensors 110. The one or more clients 105, one or more servers 106, one or more scanners 115, one or more sensors 108, and one or more weight sensors 110 may be in signal communication with each other over a network 107. The network 107 may be any suitable type of wireless and/or wired network including, but not limited to, all or a portion of the Internet, an Intranet, a Bluetooth network, a WIFI network, a Zigbee network, a Z-wave network, a private network, a public network, a peer-to-peer network, the public switched telephone network, a cellular network, a local area network (LAN), a metropolitan area network (MAN), a wide area network (WAN), and a satellite network. The network 107 may be configured to support any suitable type of communication protocol as would be appreciated by one of ordinary skill in the art. The tracking system 100 may be configured as shown or in any other suitable configuration.

Sensors

The tracking system 100 is configured to use sensors 108 to identify and track the location of people and objects within the space 102. For example, the tracking system 100 uses sensors 108 to capture images or videos of a shopper as they move within the store. The tracking system 100 may process the images or videos provided by the sensors 108 to identify the shopper, the location of the shopper, and/or any items that the shopper picks up.

Examples of sensors 108 include, but are not limited to, cameras, video cameras, web cameras, printed circuit board (PCB) cameras, depth sensing cameras, time-of-flight cameras, LiDARs, structured light cameras, or any other suitable type of imaging device.

Figure 4:
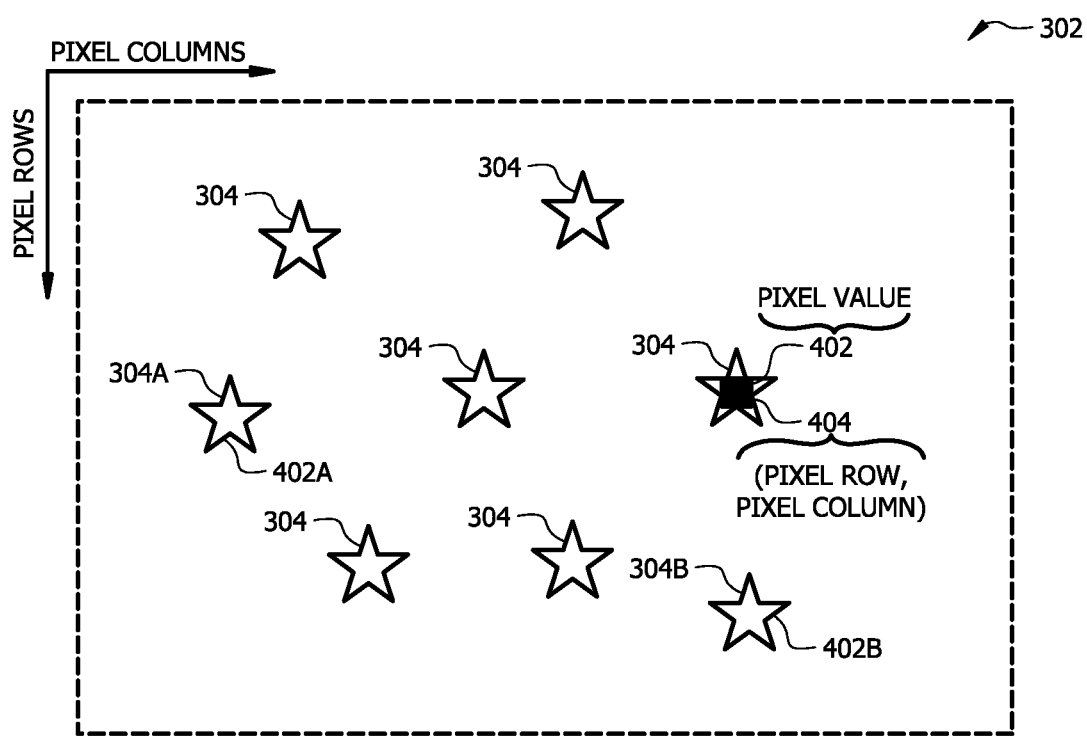
FIG. 4 is an example of a frame from a sensor in the tracking system.

Each sensor 108 is positioned above at least a portion of the space 102 and is configured to capture overhead view images or videos of at least a portion of the space 102. In one embodiment, the sensors 108 are generally configured to produce videos of portions of the interior of the space 102. These videos may include frames or images 302 of shoppers within the space 102. Each frame 302 is a snapshot of the people and/or objects within the field of view of a particular sensor 108 at a particular moment in time. A frame 302 may be a two-dimensional (2D) image or a three-dimensional (3D) image (e.g. a point cloud or a depth map). In this configuration, each frame 302 is of a portion of a global plane 104 for the space 102. Referring to FIG. 4 as an example, a frame 302 comprises a plurality of pixels that are each associated with a pixel location 402 within the frame 302. The tracking system 100 uses pixel locations 402 to describe the location of an object with respect to pixels in a frame 302 from a sensor 108. In the example shown in FIG. 4, the tracking system 100 can identify the location of different marker 304 within the frame 302 using their respective pixel locations 402. The pixel location 402 corresponds with a pixel row and a pixel column where a pixel is located within the frame 302. In one embodiment, each pixel is also associated with a pixel value 404 that indicates a depth or distance measurement in the global plane 104. For example, a pixel value 404 may correspond with a distance between a sensor 108 and a surface in the space 102.

Each sensor 108 has a limited field of view within the space 102. This means that each sensor 108 may only be able to capture a portion of the space 102 within their field of view. To provide complete coverage of the space 102, the tracking system 100 may use multiple sensors 108 configured as a sensor array. In FIG. 1, the sensors 108 are configured as a three by four sensor array. In other examples, a sensor array may comprise any other suitable number and/or configuration of sensors 108. In one embodiment, the sensor array is positioned parallel with the floor of the space 102. In some embodiments, the sensor array is configured such that adjacent sensors 108 have at least partially overlapping fields of view. In this configuration, each sensor 108 captures images or frames 302 of a different portion of the space 102 which allows the tracking system 100 to monitor the entire space 102 by combining information from frames 302 of multiple sensors 108. The tracking system 100 is configured to map pixel locations 402 within each sensor 108 to physical locations in the space 102 using homographies 118. A homography 118 is configured to translate between pixel locations 402 in a frame 302 captured by a sensor 108 and (x,y) coordinates in the global plane 104 (i.e. physical locations in the space 102). The tracking system 100 uses homographies 118 to correlate between a pixel location 402 in a particular sensor 108 with a physical location in the space 102. In other words, the tracking system 100 uses homographies 118 to determine where a person is physically located in the space 102 based on their pixel location 402 within a frame 302 from a sensor 108. Since the tracking system 100 uses multiple sensors 108 to monitor the entire space 102, each sensor 108 is uniquely associated with a different homography 118 based on the sensor's 108 physical location within the space 102. This configuration allows the tracking system 100 to determine where a person is physically located within the entire space 102 based on which sensor 108 they appear in and their location within a frame 302 captured by that sensor 108. Additional information about homographies 118 is described in FIGS. 2-7.

Weight Sensors

The tracking system 100 is configured to use weight sensors 110 to detect and identify items that a person picks up within the space 102. For example, the tracking system 100 uses weight sensors 110 that are located on the shelves of a rack 112 to detect when a shopper removes an item from the rack 112. Each weight sensor 110 may be associated with a particular item which allows the tracking system 100 to identify which item the shopper picked up.

A weight sensor 110 is generally configured to measure the weight of objects (e.g. products) that are placed on or near the weight sensor 110. For example, a weight sensor 110 may comprise a transducer that converts an input mechanical force (e.g. weight, tension, compression, pressure, or torque) into an output electrical signal (e.g. current or voltage). As the input force increases, the output electrical signal may increase proportionally. The tracking system 100 is configured to analyze the output electrical signal to determine an overall weight for the items on the weight sensor 110.

Examples of weight sensors 110 include, but are not limited to, a piezoelectric load cell or a pressure sensor. For example, a weight sensor 110 may comprise one or more load cells that are configured to communicate electrical signals that indicate a weight experienced by the load cells. For instance, the load cells may produce an electrical current that varies depending on the weight or force experienced by the load cells. The load cells are configured to communicate the produced electrical signals to a server 105 and/or a client 106 for processing.

Weight sensors 110 may be positioned onto furniture (e.g. racks 112) within the space 102 to hold one or more items. For example, one or more weight sensors 110 may be positioned on a shelf of a rack 112. As another example, one or more weight sensors 110 may be positioned on a shelf of a refrigerator or a cooler. As another example, one or more weight sensors 110 may be integrated with a shelf of a rack 112. In other examples, weight sensors 110 may be positioned in any other suitable location within the space 102.

In one embodiment, a weight sensor 110 may be associated with a particular item. For instance, a weight sensor 110 may be configured to hold one or more of a particular item and to measure a combined weight for the items on the weight sensor 110. When an item is picked up from the weight sensor 110, the weight sensor 110 is configured to detect a weight decrease. In this example, the weight sensor 110 is configured to use stored information about the weight of the item to determine a number of items that were removed from the weight sensor 110. For example, a weight sensor 110 may be associated with an item that has an individual weight of eight ounces. When the weight sensor 110 detects a weight decrease of twenty-four ounces, the weight sensor 110 may determine that three of the items were removed from the weight sensor 110. The weight sensor 110 is also configured to detect a weight increase when an item is added to the weight sensor 110. For example, if an item is returned to the weight sensor 110, then the weight sensor 110 will determine a weight increase that corresponds with the individual weight for the item associated with the weight sensor 110.

Servers

A server 106 may be formed by one or more physical devices configured to provide services and resources (e.g. data and/or hardware resources) for the tracking system 100. Additional information about the hardware configuration of a server 106 is described in FIG. 38. In one embodiment, a server 106 may be operably coupled to one or more sensors 108 and/or weight sensors 110. The tracking system 100 may comprise any suitable number of servers 106. For example, the tracking system 100 may comprise a first server 106 that is in signal communication with a first plurality of sensors 108 in a sensor array and a second server 106 that is in signal communication with a second plurality of sensors 108 in the sensor array. As another example, the tracking system 100 may comprise a first server 106 that is in signal communication with a plurality of sensors 108 and a second server 106 that is in signal communication with a plurality of weight sensors 110. In other examples, the tracking system 100 may comprise any other suitable number of servers 106 that are each in signal communication with one or more sensors 108 and/or weight sensors 110.

A server 106 may be configured to process data (e.g. frames 302 and/or video) for one or more sensors 108 and/or weight sensors 110. In one embodiment, a server 106 may be configured to generate homographies 118 for sensors 108. As discussed above, the generated homographies 118 allow the tracking system 100 to determine where a person is physically located within the entire space 102 based on which sensor 108 they appear in and their location within a frame 302 captured by that sensor 108. In this configuration, the server 106 determines coefficients for a homography 118 based on the physical location of markers in the global plane 104 and the pixel locations of the markers in an image from a sensor 108. Examples of the server 106 performing this process are described in FIGS. 2-7.

In one embodiment, a server 106 is configured to calibrate a shelf position within the global plane 104 using sensors 108. This process allows the tracking system 100 to detect when a rack 112 or sensor 108 has moved from its original location within the space 102. In this configuration, the server 106 periodically compares the current shelf location of a rack 112 to an expected shelf location for the rack 112 using a sensor 108. In the event that the current shelf location does not match the expected shelf location, then the server 106 will use one or more other sensors 108 to determine whether the rack 112 has moved or whether the first sensor 108 has moved. An example of the server 106 performing this process is described in FIGS. 8 and 9.

In one embodiment, a server 106 is configured to hand off tracking information for an object (e.g. a person) as it moves between the fields of view of adjacent sensors 108. This process allows the tracking system 100 to track people as they move within the interior of the space 102. In this configuration, the server 106 tracks an object's movement within the field of view of a first sensor 108 and then hands off tracking information (e.g. an object identifier) for the object as it enters the field of view of a second adjacent sensor 108. An example of the server 106 performing this process is described in FIGS. 10 and 11.

In one embodiment, a server 106 is configured to detect shelf interactions using a virtual curtain. This process allows the tracking system 100 to identify items that a person picks up from a rack 112. In this configuration, the server 106 is configured to process an image captured by a sensor 108 to determine where a person is interacting with a shelf of a rack 112. The server 106 uses a predetermined zone within the image as a virtual curtain that is used to determine which region and which shelf of a rack 112 that a person is interacting with. An example of the server 106 performing this process is described in FIGS. 12-14.

In one embodiment, a server 106 is configured to detect when an item has been picked up from a rack 112 and to determine which person to assign the item to using a predefined zone that is associated with the rack 112. This process allows the tracking system 100 to associate items on a rack 112 with the person that picked up the item. In this configuration, the server 106 detects that an item has been picked up using a weight sensor 110. The server 106 then uses a sensor 108 to identify a person within a predefined zone that is associated with the rack 112. Once the item and the person have been identified, the server 106 will add the item to a digital cart that is associated with the identified person. An example of the server 106 performing this process is described in FIGS. 15 and 18.

In one embodiment, a server 106 is configured to identify an object that has a non-uniform weight and to assign the item to a person's digital cart. This process allows the tracking system 100 to identify items that a person picks up that cannot be identified based on just their weight. For example, the weight of fresh food is not constant and will vary from item to item. In this configuration, the server 106 uses a sensor 108 to identify markers (e.g. text or symbols) on an item that has been picked up. The server 106 uses the identified markers to then identify which item was picked up. The server 106 then uses the sensor 108 to identify a person within a predefined zone that is associated with the rack 112. Once the item and the person have been identified, the server 106 will add the item to a digital cart that is associated with the identified person. An example of the server 106 performing this process is described in FIGS. 16 and 18.

In one embodiment, a server 106 is configured to identify items that have been misplaced on a rack 112. This process allows the tracking system 100 to remove items from a shopper's digital cart when the shopper puts down an item regardless of whether they put the item back in its proper location. For example, a person may put back an item in the wrong location on the rack 112 or on the wrong rack 112. In this configuration, the server 106 uses a weight sensor 110 to detect that an item has been put back on rack 112 and to determine that the item is not in the correct location based on its weight. The server 106 then uses a sensor 108 to identify the person that put the item on the rack 112 and analyzes their digital cart to determine which item they put back based on the weights of the items in their digital cart. An example of the server 106 performing this process is described in FIGS. 17 and 18.

Clients

In some embodiments, one or more sensors 108 and/or weight sensors 110 are operably coupled to a server 106 via a client 105. In one embodiment, the tracking system 100 comprises a plurality of clients 105 that may each be operably coupled to one or more sensors 108 and/or weight sensors 110. For example, first client 105 may be operably coupled to one or more sensors 108 and/or weight sensors 110 and a second client 105 may be operably coupled to one or more other sensors 108 and/or weight sensors 110. A client 105 may be formed by one or more physical devices configured to process data (e.g. frames 302 and/or video) for one or more sensors 108 and/or weight sensors 110. A client 105 may act as an intermediary for exchanging data between a server 106 and one or more sensors 108 and/or weight sensors 110. The combination of one or more clients 105 and a server 106 may also be referred to as a tracking subsystem. In this configuration, a client 105 may be configured to provide image processing capabilities for images or frames 302 that are captured by a sensor 108. The client 105 is further configured to send images, processed images, or any other suitable type of data to the server 106 for further processing and analysis. In some embodiments, a client 105 may be configured to perform one or more of the processes described above for the server 106.

Sensor Mapping Process

Figure 2:
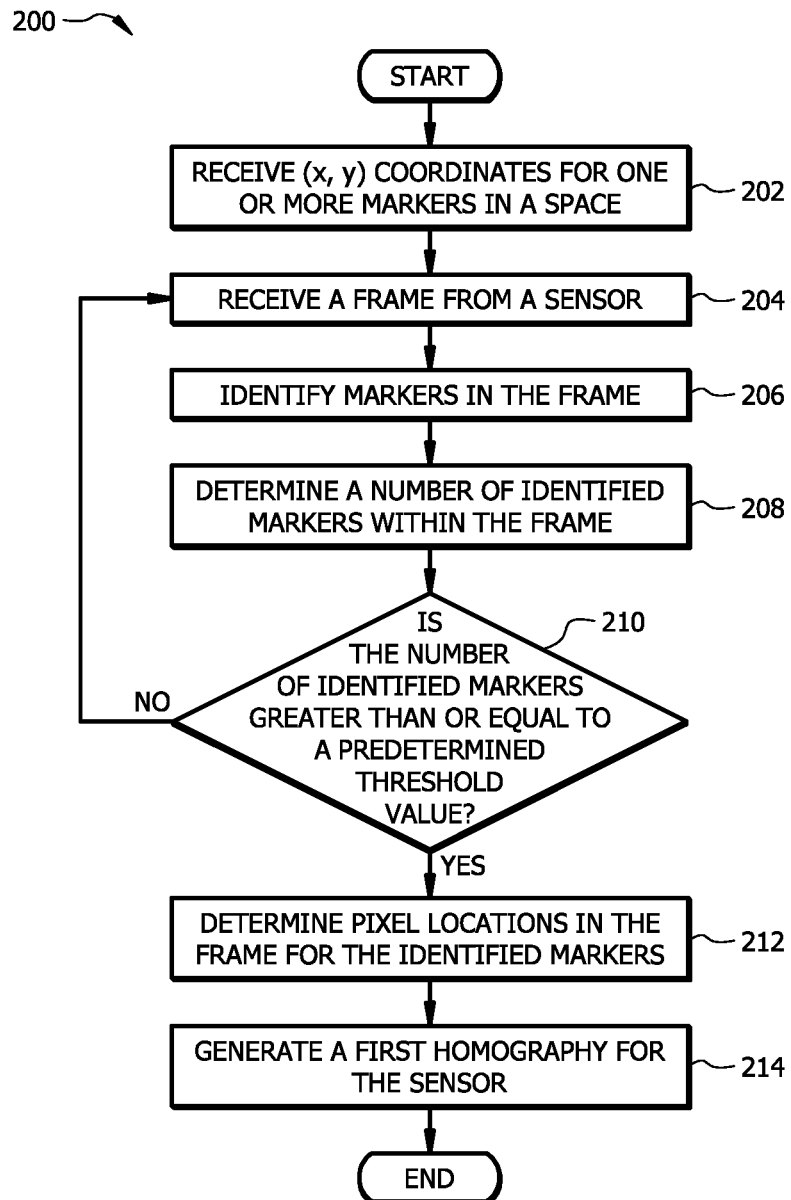
FIG. 2 is a flowchart of an embodiment of a sensor mapping method for the tracking system.

FIG. 2 is a flowchart of an embodiment of a sensor mapping method 200 for the tracking system 100. The tracking system 100 may employ method 200 to generate a homography 118 for a sensor 108. As discussed above, a homography 118 allows the tracking system 100 to determine where a person is physically located within the entire space 102 based on which sensor 108 they appear in and their location within a frame 302 captured by that sensor 108. Once generated, the homography 118 can be used to translate between pixel locations 402 in images (e.g. frames 302) captured by a sensor 108 and (x,y) coordinates 306 in the global plane 104 (i.e. physical locations in the space 102). The following is a non-limiting example of the process for generating a homography 118 for a single sensor 108. This same process can be repeated for generating a homography 118 for other sensors 108.

Figure 3:
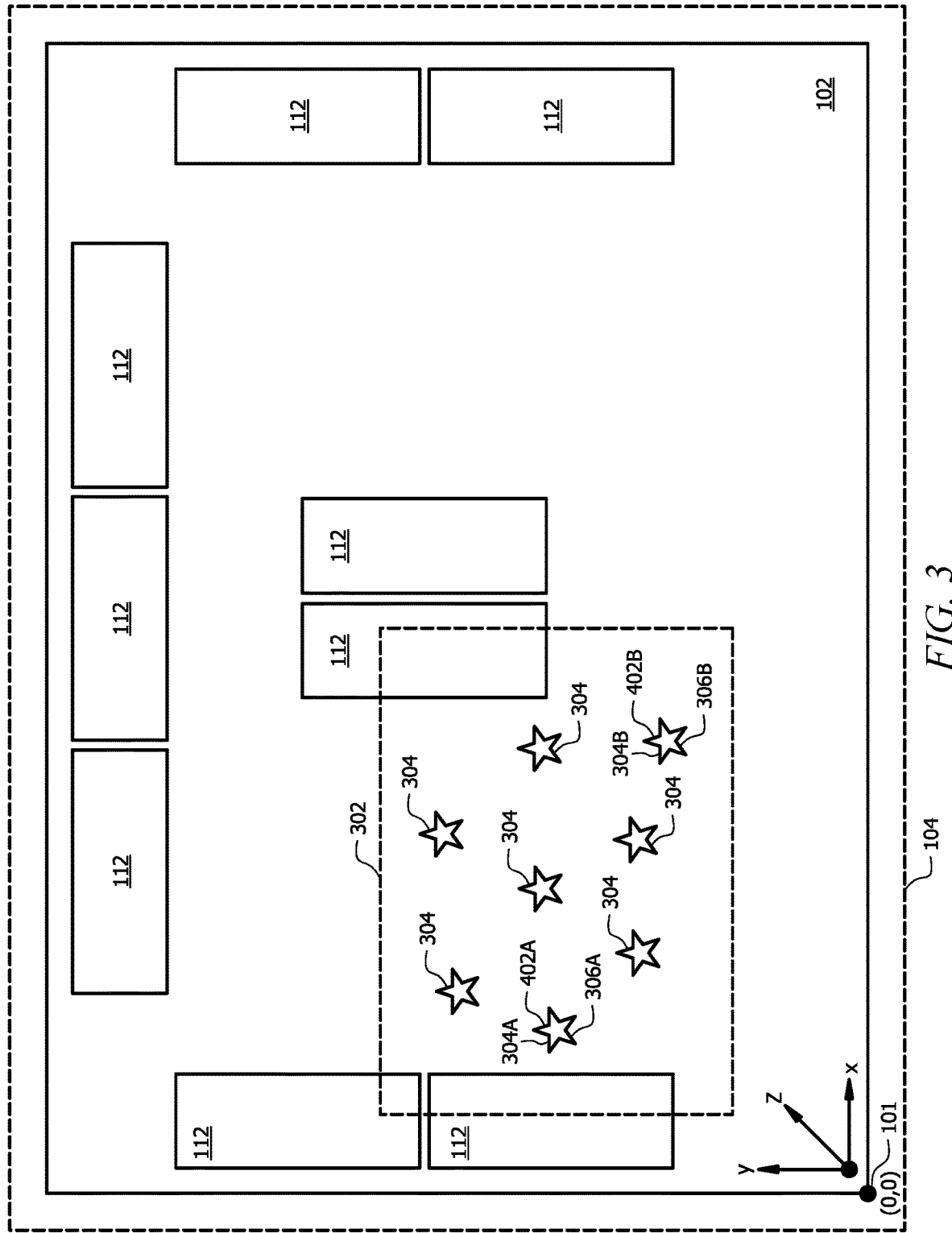
FIG. 3 is an example of a sensor mapping process for the tracking system.

At step 202, the tracking system 100 receives (x,y) coordinates 306 for markers 304 in the space 102. Referring to FIG. 3 as an example, each marker 304 is an object that identifies a known physical location within the space 102. The markers 304 are used to demarcate locations in the physical domain (i.e. the global plane 104) that can be mapped to pixel locations 402 in a frame 302 from a sensor 108. In this example, the markers 304 are represented as stars on the floor of the space 102. A marker 304 may be formed of any suitable object that can be observed by a sensor 108. For example, a marker 304 may be tape or a sticker that is placed on the floor of the space 102. As another example, a marker 304 may be a design or marking on the floor of the space 102. In other examples, markers 304 may be positioned in any other suitable location within the space 102 that is observable by a sensor 108. For instance, one or more markers 304 may be positioned on top of a rack 112.

In one embodiment, the (x,y) coordinates 306 for markers 304 are provided by an operator. For example, an operator may manually place markers 304 on the floor of the space 102. The operator may determine an (x,y) location 306 for a marker 304 by measuring the distance between the marker 304 and the reference location 101 for the global plane 104.

The operator may then provide the determined (x,y) location 306 to a server 106 or a client 105 of the tracking system 100 as an input.

Referring to the example in FIG. 3, the tracking system 100 may receive a first (x,y) coordinate 306A for a first marker 304A in a space 102 and a second (x,y) coordinate 306B for a second marker 304B in the space 102. The first (x,y) coordinate 306A describes the physical location of the first marker 304A with respect to the global plane 104 of the space 102. The second (x,y) coordinate 306B describes the physical location of the second marker 304B with respect to the global plane 104 of the space 102. The tracking system 100 may repeat the process of obtaining (x,y) coordinates 306 for any suitable number of additional markers 304 within the space 102.

Once the tracking system 100 knows the physical location of the markers 304 within the space 102, the tracking system 100 then determines where the markers 304 are located with respect to the pixels in the frame 302 of a sensor 108. Returning to FIG. 2 at step 204, the tracking system 100 receives a frame 302 from a sensor 108. Referring to FIG. 4 as an example, the sensor 108 captures an image or frame 302 of the global plane 104 for at least a portion of the space 102. In this example, the frame 302 comprises a plurality of markers 304.

Returning to FIG. 2 at step 206, the tracking system 100 identifies markers 304 within the frame 302 of the sensor 108. In one embodiment, the tracking system 100 uses object detection to identify markers 304 within the frame 302. For example, the markers 304 may have known features (e.g. shape, pattern, color, text, etc.) that the tracking system 100 can search for within the frame 302 to identify a marker 304. Referring to the example in FIG. 3, each marker 304 has a star shape. In this example, the tracking system 100 may search the frame 302 for star shaped objects to identify the markers 304 within the frame 302. The tracking system 100 may identify the first marker 304A, the second marker 304B, and any other markers 304 within the frame 302. In other examples, the tracking system 100 may use any other suitable features for identifying markers 304 within the frame 302. In other embodiments, the tracking system 100 may employ any other suitable image processing technique for identifying markers 302 within the frame 302. For example, the markers 304 may have a known color or pixel value. In this example, the tracking system 100 may use thresholds to identify the markers 304 within frame 302 that correspond with the color or pixel value of the markers 304.

Returning to FIG. 2 at step 208, the tracking system 100 determines the number of identified markers 304 within the frame 302. Here, tracking system 100 counts the number of markers 304 that were detected within the frame 302. Referring to the example in FIG. 3, the tracking system 100 detects eight markers 304 within the frame 302.

Returning to FIG. 2 at step 210, the tracking system 100 determines whether the number of identified markers 304 is greater than or equal to a predetermined threshold value. In some embodiments, the predetermined threshold value is proportional to a level of accuracy for generating a homography 118 for a sensor 108. Increasing the predetermined threshold value may increase the accuracy when generating a homography 118 while decreasing the predetermined threshold value may decrease the accuracy when generating a homography 118. As an example, the predetermined threshold value may be set to a value of six. In the example shown in FIG. 3, the tracking system 100 identified eight markers 304 which is greater than the predetermined threshold value. In other examples, the predetermined threshold value may be set to any other suitable value. The tracking system 100 returns to step 204 in response to determining that the number of identified markers 304 is less than the predetermined threshold value. In this case, the tracking system 100 returns to step 204 to capture another frame 302 of the space 102 using the same sensor 108 to try to detect more markers 304. Here, the tracking system 100 tries to obtain a new frame 302 that includes a number of markers 304 that is greater than or equal to the predetermined threshold value. For example, the tracking system 100 may receive new frame 302 of the space 102 after an operator adds one or more additional markers 304 to the space 102. As another example, the tracking system 100 may receive new frame 302 after lighting conditions have been changed to improve the detectability of the markers 304 within the frame 302. In other examples, the tracking system 100 may receive new frame 302 after any kind of change that improves the detectability of the markers 304 within the frame 302.

The tracking system 100 proceeds to step 212 in response to determining that the number of identified markers 304 is greater than or equal to the predetermined threshold value. At step 212, the tracking system 100 determines pixel locations 402 in the frame 302 for the identified markers 304. For example, the tracking system 100 determines a first pixel location 402A within the frame 302 that corresponds with the first marker 304A and a second pixel location 402B within the frame 302 that corresponds with the second marker 304B. The first pixel location 402A comprises a first pixel row and a first pixel column indicating where the first marker 304A is located in the frame 302. The second pixel location 402B comprises a second pixel row and a second pixel column indicating where the second marker 304B is located in the frame 302.

At step 214, the tracking system 100 generates a homography 118 for the sensor 108 based on the pixel locations 402 of identified markers 304 with the frame 302 of the sensor 108 and the (x,y) coordinate 306 of the identified markers 304 in the global plane 104. In one embodiment, the tracking system 100 correlates the pixel location 402 for each of the identified markers 304 with its corresponding (x,y) coordinate 306. Continuing with the example in FIG. 3, the tracking system 100 associates the first pixel location 402A for the first marker 304A with the first (x,y) coordinate 306A for the first marker 304A. The tracking system 100 also associates the second pixel location 402B for the second marker 304B with the second (x,y) coordinate 306B for the second marker 304B. The tracking system 100 may repeat the process of associating pixel locations 402 and (x,y) coordinates 306 for all of the identified markers 304.

The tracking system 100 then determines a relationship between the pixel locations 402 of identified markers 304 with the frame 302 of the sensor 108 and the (x,y) coordinates 306 of the identified markers 304 in the global plane 104 to generate a homography 118 for the sensor 108. The generated homography 118 allows the tracking system 100 to map pixel locations 402 in a frame 302 from the sensor 108 to (x,y) coordinates 306 in the global plane 104. Additional information about a homography 118 is described in FIGS. 5A and 5B. Once the tracking system 100 generates the homography 118 for the sensor 108, the tracking system 100 stores an association between the sensor 108 and the generated homography 118 in memory (e.g. memory 3804).

The tracking system 100 may repeat the process described above to generate and associate homographies 118 with other sensors 108. Continuing with the example in FIG. 3, the tracking system 100 may receive a second frame 302 from a second sensor 108. In this example, the second frame 302 comprises the first marker 304A and the second marker 304B. The tracking system 100 may determine a third pixel location 402 in the second frame 302 for the first marker 304A, a fourth pixel location 402 in the second frame 302 for the second marker 304B, and pixel locations 402 for any other markers 304. The tracking system 100 may then generate a second homography 118 based on the third pixel location 402 in the second frame 302 for the first marker 304A, the fourth pixel location 402 in the second frame 302 for the second marker 304B, the first (x,y) coordinate 306A in the global plane 104 for the first marker 304A, the second (x,y) coordinate 306B in the global plane 104 for the second marker 304B, and pixel locations 402 and (x,y) coordinates 306 for other markers 304. The second homography 118 comprises coefficients that translate between pixel locations 402 in the second frame 302 and physical locations (e.g. (x,y) coordinates 306) in the global plane 104. The coefficients of the second homography 118 are different from the coefficients of the homography 118 that is associated with the first sensor 108. This process uniquely associates each sensor 108 with a corresponding homography 118 that maps pixel locations 402 from the sensor 108 to (x,y) coordinates 306 in the global plane 104.

Homographies

Figure 5A:
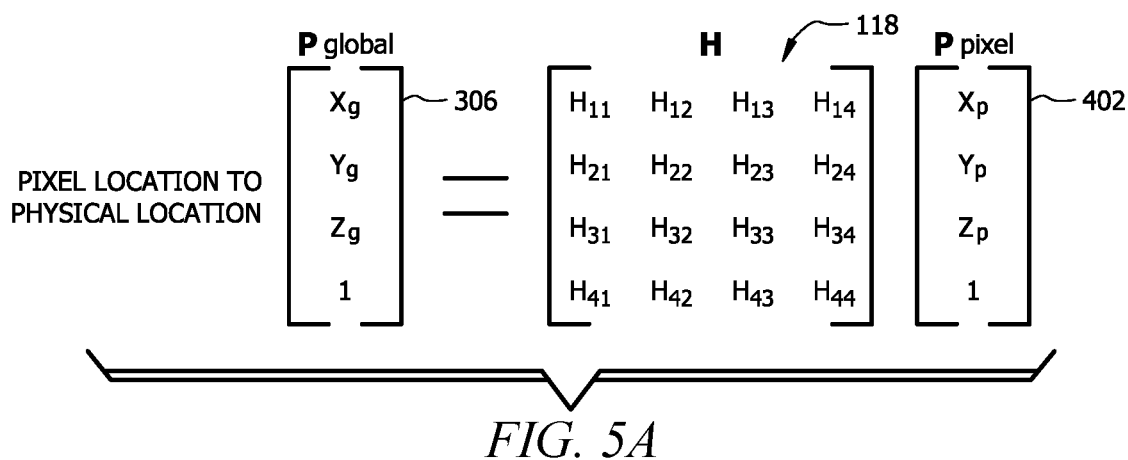
FIG. 5A is an example of a sensor mapping for a sensor in the tracking system.
Figure 5B:
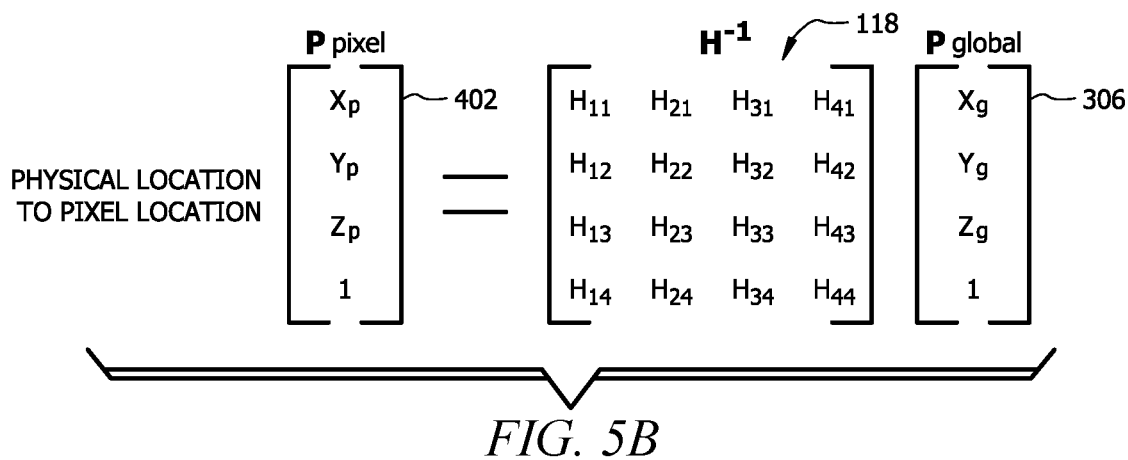
FIG. 5B is another example of a sensor mapping for a sensor in the tracking system.

An example of a homography 118 for a sensor 108 is described in FIGS. 5A and 5B. Referring to FIG. 5A, a homography 118 comprises a plurality of coefficients configured to translate between pixel locations 402 in a frame 302 and physical locations (e.g. (x,y) coordinates 306) in the global plane 104. In this example, the homography 118 is configured as a matrix and the coefficients of the homography 118 are represented as $H_{11}$, $H_{12}$, $H_{13}$, $H_{14}$, $H_{21}$, $H_{22}$, $H_{23}$, $H_{24}$, $H_{31}$, $H_{32}$, $H_{33}$, $H_{34}$, $H_{41}$, $H_{42}$, $H_{43}$, and $H_{44}$. The tracking system 100 may generate the homography 118 by defining a relationship or function between pixel locations 402 in a frame 302 and physical locations (e.g. (x,y) coordinates 306) in the global plane 104 using the coefficients. For example, the tracking system 100 may define one or more functions using the coefficients and may perform a regression (e.g. least squares regression) to solve for values for the coefficients that project pixel locations 402 of a frame 302 of a sensor to (x,y) coordinates 306 in the global plane 104. Referring to the example in FIG. 3, the homography 118 for the sensor 108 is configured to project the first pixel location 402A in the frame 302 for the first marker 304A to the first (x,y) coordinate 306A in the global plane 104 for the first marker 304A and to project the second pixel location 402B in the frame 302 for the second marker 304B to the second (x,y) coordinate 306B in the global plane 104 for the second marker 304B. In other examples, the tracking system 100 may solve for coefficients of the homography 118 using any other suitable technique. In the example shown in FIG. 5A, the z-value at the pixel location 402 may correspond with a pixel value 404. In this case, the homography 118 is further configured to translate between pixel values 404 in a frame 302 and z-coordinates (e.g. heights or elevations) in the global plane 104.

Using Homographies

Once the tracking system 100 generates a homography 118, the tracking system 100 may use the homography 118 to determine the location of an object (e.g. a person) within the space 102 based on the pixel location 402 of the object in a frame 302 of a sensor 108. For example, the tracking system 100 may perform matrix multiplication between a pixel location 402 in a first frame 302 and a homography 118 to determine a corresponding (x,y) coordinate 306 in the global plane 104. For example, the tracking system 100 receives a first frame 302 from a sensor 108 and determines a first pixel location in the frame 302 for an object in the space 102. The tracking system 100 may then apply the homography 118 that is associated with the sensor 108 to the first pixel location 402 of the object to determine a first (x,y) coordinate 306 that identifies a first x-value and a first y-value in the global plane 104 where the object is located.

In some instances, the tracking system 100 may use multiple sensors 108 to determine the location of the object. Using multiple sensors 108 may provide more accuracy when determining where an object is located within the space 102. In this case, the tracking system 100 uses homographies 118 that are associated with different sensors 108 to determine the location of an object within the global plane 104. Continuing with the previous example, the tracking system 100 may receive a second frame 302 from a second sensor 108. The tracking system 100 may determine a second pixel location 402 in the second frame 302 for the object in the space 102. The tracking system 100 may then apply a second homography 118 that is associated the second sensor 108 to the second pixel location 402 of the object to determine a second (x,y) coordinate 306 that identifies a second x-value and a second y-value in the global plane 104 where the object is located.

When the first (x,y) coordinate 306 and the second (x,y) coordinate 306 are the same, the tracking system 100 may use either the first (x,y) coordinate 306 or the second (x,y) coordinate 306 as the physical location of the object within the space 102. The tracking system 100 may employ any suitable clustering technique between the first (x,y) coordinate 306 and the second (x,y) coordinate 306 when the first (x,y) coordinate 306 and the second (x,y) coordinate 306 are not the same. In this case, the first (x,y) coordinate 306 and the second (x,y) coordinate 306 are different so the tracking system 100 will need to determine the physical location of the object within the space 102 based on the first (x,y) location 306 and the second (x,y) location 306. For example, the tracking system 100 may generate an average (x,y) coordinate for the object by computing an average between the first (x,y) coordinate 306 and the second (x,y) coordinate 306. As another example, the tracking system 100 may generate a median (x,y) coordinate for the object by computing a median between the first (x,y) coordinate 306 and the second (x,y) coordinate 306. In other examples, the tracking system 100 may employ any other suitable technique to resolve differences between the first (x,y) coordinate 306 and the second (x,y) coordinate 306.

The tracking system 100 may use the inverse of the homography 118 to project from (x,y) coordinates 306 in the global plane 104 to pixel locations 402 in a frame 302 of a sensor 108. For example, the tracking system 100 receives an (x,y) coordinate 306 in the global plane 104 for an object. The tracking system 100 identifies a homography 118 that is associated with a sensor 108 where the object is seen. The tracking system 100 may then apply the inverse homography 118 to the (x,y) coordinate 306 to determine a pixel location 402 where the object is located in the frame 302 for the sensor 108. The tracking system 100 may compute the matrix inverse of the homograph 500 when the homography 118 is represented as a matrix. Referring to FIG. 5B as an example, the tracking system 100 may perform matrix multiplication between an (x,y) coordinates 306 in the global plane 104 and the inverse homography 118 to determine a corresponding pixel location 402 in the frame 302 for the sensor 108.

Sensor Mapping Using a Marker Grid

Figure 6:
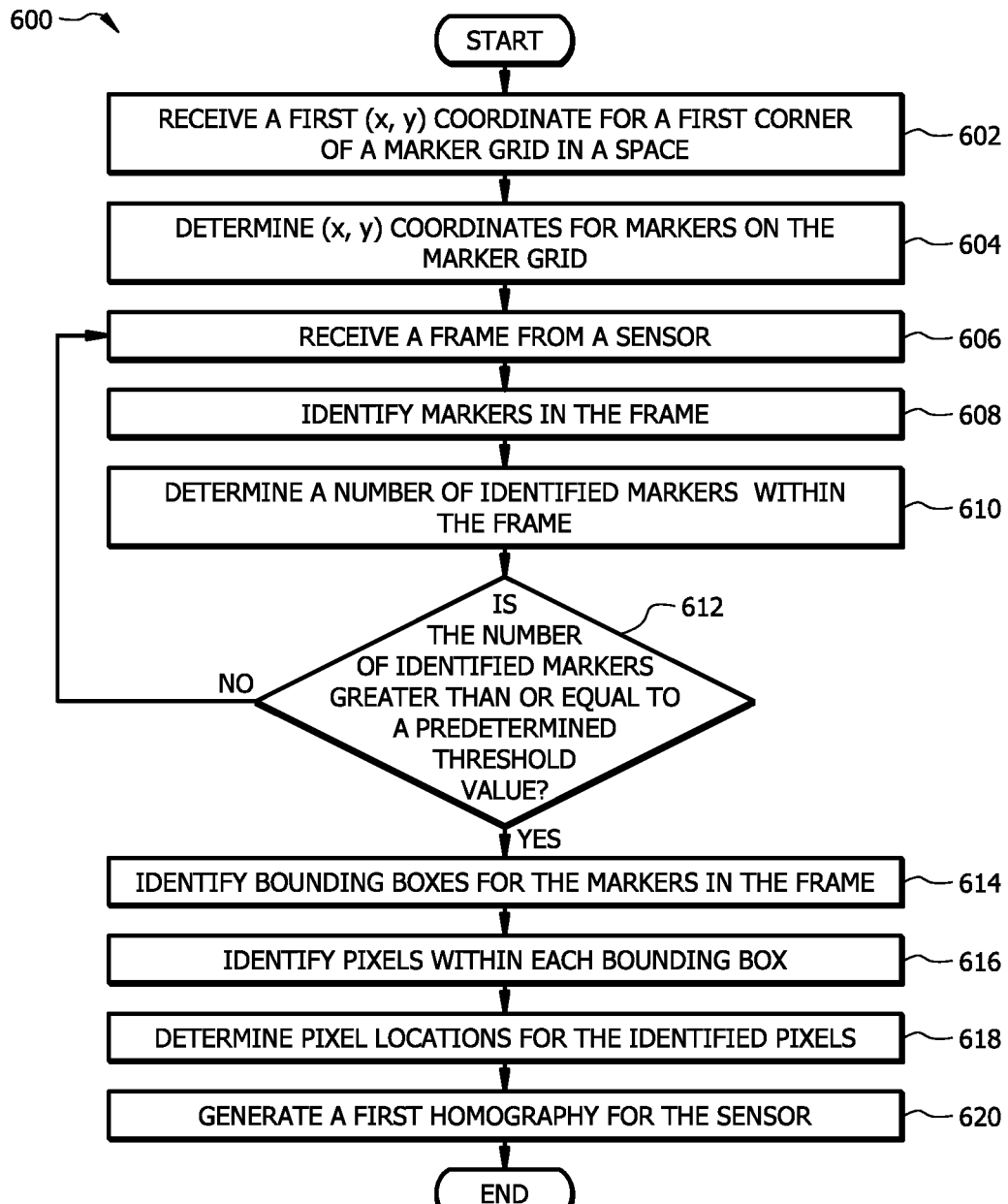
FIG. 6 is a flowchart of an embodiment of a sensor mapping method for the tracking system using a marker grid.

FIG. 6 is a flowchart of an embodiment of a sensor mapping method 600 for the tracking system 100 using a marker grid 702. The tracking system 100 may employ method 600 to reduce the amount of time it takes to generate a homography 118 for a sensor 108. For example, using a marker grid 702 reduces the amount of setup time required to generate a homography 118 for a sensor 108. Typically, each marker 304 is placed within a space 102 and the physical location of each marker 304 is determined independently. This process is repeated for each sensor 108 in a sensor array. In contrast, a marker grid 702 is a portable surface that comprises a plurality of markers 304. The marker grid 702 may be formed using carpet, fabric, poster board, foam board, vinyl, paper, wood, or any other suitable type of material. Each marker 304 is an object that identifies a particular location on the marker grid 702. Examples of markers 304 include, but are not limited to, shapes, symbols, and text. The physical locations of each marker 304 on the marker grid 702 are known and are stored in memory (e.g. marker grid information 716). Using a marker grid 702 simplifies and speeds up the process of placing and determining the location of markers 304 because the marker grid 702 and its markers 304 can be quickly repositioned anywhere within the space 102 without having to individually move markers 304 or add new markers 304 to the space 102. Once generated, the homography 118 can be used to translate between pixel locations 402 in frame 302 captured by a sensor 108 and (x,y) coordinates 306 in the global plane 104 (i.e. physical locations in the space 102).

Figure 7:
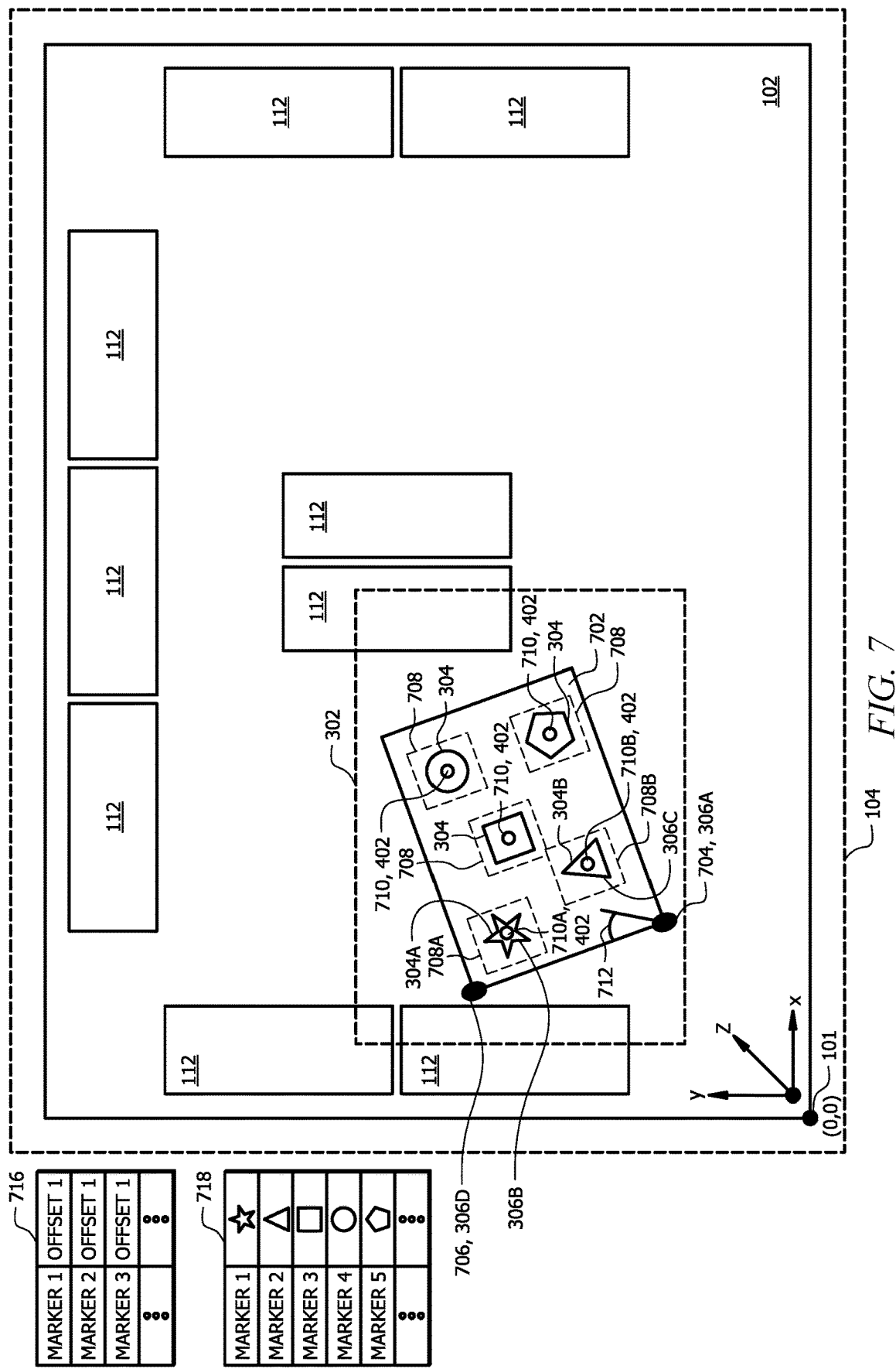
FIG. 7 is an example of a sensor mapping process for the tracking system using a marker grid.

At step 602, the tracking system 100 receives a first (x,y) coordinate 306A for a first corner 704 of a marker grid 702 in a space 102. Referring to FIG. 7 as an example, the marker grid 702 is configured to be positioned on a surface (e.g. the floor) within the space 102 that is observable by one or more sensors 108. In this example, the tracking system 100 receives a first (x,y) coordinate 306A in the global plane 104 for a first corner 704 of the marker grid 702. The first (x,y) coordinate 306A describes the physical location of the first corner 704 with respect to the global plane 104. In one embodiment, the first (x,y) coordinate 306A is based on a physical measurement of a distance between a reference location 101 in the space 102 and the first corner 704. For example, the first (x,y) coordinate 306A for the first corner 704 of the marker grid 702 may be provided by an operator. In this example, an operator may manually place the marker grid 702 on the floor of the space 102. The operator may determine an (x,y) location 306 for the first corner 704 of the marker grid 702 by measuring the distance between the first corner 704 of the marker grid 702 and the reference location 101 for the global plane 104. The operator may then provide the determined (x,y) location 306 to a server 106 or a client 105 of the tracking system 100 as an input.

In another embodiment, the tracking system 100 may receive a signal from a beacon located at the first corner 704 of the marker grid 702 that identifies the first (x,y) coordinate 306A. An example of a beacon includes, but is not limited to, a Bluetooth beacon. For example, the tracking system 100 may communicate with the beacon and determine the first (x,y) coordinate 306A based on the time-of-flight of a signal that is communicated between the tracking system 100 and the beacon. In other embodiments, the tracking system 100 may obtain the first (x,y) coordinate 306A for the first corner 704 using any other suitable technique.

Returning to FIG. 6 at step 604, the tracking system 100 determines (x,y) coordinates 306 for the markers 304 on the marker grid 702. Returning to the example in FIG. 7, the tracking system 100 determines a second (x,y) coordinate 306B for a first marker 304A on the marker grid 702. The tracking system 100 comprises marker grid information 716 that identifies offsets between markers 304 on the marker grid 702 and the first corner 704 of the marker grid 702. In this example, the offset comprises a distance between the first corner 704 of the marker grid 702 and the first marker 304A with respect to the x-axis and the y-axis of the global plane 104. Using the marker grid information 1912, the tracking system 100 is able to determine the second (x,y) coordinate 306B for the first marker 304A by adding an offset associated with the first marker 304A to the first (x,y) coordinate 306A for the first corner 704 of the marker grid 702.

In one embodiment, the tracking system 100 determines the second (x,y) coordinate 306B based at least in part on a rotation of the marker grid 702. For example, the tracking system 100 may receive a fourth (x,y) coordinate 306D that identifies x-value and a y-value in the global plane 104 for a second corner 706 of the marker grid 702. The tracking system 100 may obtain the fourth (x,y) coordinate 306D for the second corner 706 of the marker grid 702 using a process similar to the process described in step 602. The tracking system 100 determines a rotation angle 712 between the first (x,y) coordinate 306A for the first corner 704 of the marker grid 702 and the fourth (x,y) coordinate 306D for the second corner 706 of the marker grid 702. In this example, the rotation angle 712 is about the first corner 704 of the marker grid 702 within the global plane 104. The tracking system 100 then determines the second (x,y) coordinate 306B for the first marker 304A by applying a translation by adding the offset associated with the first marker 304A to the first (x,y) coordinate 306A for the first corner 704 of the marker grid 702 and applying a rotation using the rotation angle 712 about the first (x,y) coordinate 306A for the first corner 704 of the marker grid 702. In other examples, the tracking system 100 may determine the second (x,y) coordinate 306B for the first marker 304A using any other suitable technique.

The tracking system 100 may repeat this process for one or more additional markers 304 on the marker grid 702. For example, the tracking system 100 determines a third (x,y) coordinate 306C for a second marker 304B on the marker grid 702. Here, the tracking system 100 uses the marker grid information 716 to identify an offset associated with the second marker 304A. The tracking system 100 is able to determine the third (x,y) coordinate 306C for the second marker 304B by adding the offset associated with the second marker 304B to the first (x,y) coordinate 306A for the first corner 704 of the marker grid 702. In another embodiment, the tracking system 100 determines a third (x,y) coordinate 306C for a second marker 304B based at least in part on a rotation of the marker grid 702 using a process similar to the process described above for the first marker 304A.

Once the tracking system 100 knows the physical location of the markers 304 within the space 102, the tracking system 100 then determines where the markers 304 are located with respect to the pixels in the frame 302 of a sensor 108. At step 606, the tracking system 100 receives a frame 302 from a sensor 108. The frame 302 is of the global plane 104 that includes at least a portion of the marker grid 702 in the space 102. The frame 302 comprises one or more markers 304 of the marker grid 702. The frame 302 is configured similar to the frame 302 described in FIGS. 2-4. For example, the frame 302 comprises a plurality of pixels that are each associated with a pixel location 402 within the frame 302. The pixel location 402 identifies a pixel row and a pixel column where a pixel is located. In one embodiment, each pixel is associated with a pixel value 404 that indicates a depth or distance measurement. For example, a pixel value 404 may correspond with a distance between the sensor 108 and a surface within the space 102.

At step 610, the tracking system 100 identifies markers 304 within the frame 302 of the sensor 108. The tracking system 100 may identify markers 304 within the frame 302 using a process similar to the process described in step 206 of FIG. 2. For example, the tracking system 100 may use object detection to identify markers 304 within the frame 302. Referring to the example in FIG. 7, each marker 304 is a unique shape or symbol. In other examples, each marker 304 may have any other unique features (e.g. shape, pattern, color, text, etc.). In this example, the tracking system 100 may search for objects within the frame 302 that correspond with the known features of a marker 304. Tracking system 100 may identify the first marker 304A, the second marker 304B, and any other markers 304 on the marker grid 702.

In one embodiment, the tracking system 100 compares the features of the identified markers 304 to the features of known markers 304 on the marker grid 702 using a marker dictionary 718. The marker dictionary 718 identifies a plurality of markers 304 that are associated with a marker grid 702. In this example, the tracking system 100 may identify the first marker 304A by identifying a star on the marker grid 702, comparing the star to the symbols in the marker dictionary 718, and determining that the star matches one of the symbols in the marker dictionary 718 that corresponds with the first marker 304A. Similarly, the tracking system 100 may identify the second marker 304B by identifying a triangle on the marker grid 702, comparing the triangle to the symbols in the marker dictionary 718, and determining that the triangle matches one of the symbols in the marker dictionary 718 that corresponds with the second marker 304B. The tracking system 100 may repeat this process for any other identified markers 304 in the frame 302.

In another embodiment, the marker grid 702 may comprise markers 304 that contain text. In this example, each marker 304 can be uniquely identified based on its text. This configuration allows the tracking system 100 to identify markers 304 in the frame 302 by using text recognition or optical character recognition techniques on the frame 302. In this case, the tracking system 100 may use a marker dictionary 718 that comprises a plurality of predefined words that are each associated with a marker 304 on the marker grid 702. For example, the tracking system 100 may perform text recognition to identify text with the frame 302. The tracking system 100 may then compare the identified text to words in the marker dictionary 718. Here, the tracking system 100 checks whether the identified text matched any of the known text that corresponds with a marker 304 on the marker grid 702. The tracking system 100 may discard any text that does not match any words in the marker dictionary 718. When the tracking system 100 identifies text that matches a word in the marker dictionary 718, the tracking system 100 may identify the marker 304 that corresponds with the identified text. For instance, the tracking system 100 may determine that the identified text matches the text associated with the first marker 304A. The tracking system 100 may identify the second marker 304B and any other markers 304 on the marker grid 702 using a similar process.

Returning to FIG. 6 at step 610, the tracking system 100 determines a number of identified markers 304 within the frame 302. Here, tracking system 100 counts the number of markers 304 that were detected within the frame 302. Referring to the example in FIG. 7, the tracking system 100 detects five markers 304 within the frame 302.

Returning to FIG. 6 at step 614, the tracking system 100 determines whether the number of identified markers 304 is greater than or equal to a predetermined threshold value. The tracking system 100 may compare the number of identified markers 304 to the predetermined threshold value using a process similar to the process described in step 210 of FIG. 2. The tracking system 100 returns to step 606 in response to determining that the number of identified markers 304 is less than the predetermined threshold value. In this case, the tracking system 100 returns to step 606 to capture another frame 302 of the space 102 using the same sensor 108 to try to detect more markers 304. Here, the tracking system 100 tries to obtain a new frame 302 that includes a number of markers 304 that is greater than or equal to the predetermined threshold value. For example, the tracking system 100 may receive new frame 302 of the space 102 after an operator repositions the marker grid 702 within the space 102. As another example, the tracking system 100 may receive new frame 302 after lighting conditions have been changed to improve the detectability of the markers 304 within the frame 302. In other examples, the tracking system 100 may receive new frame 302 after any kind of change that improves the detectability of the markers 304 within the frame 302.

The tracking system 100 proceeds to step 614 in response to determining that the number of identified markers 304 is greater than or equal to the predetermined threshold value. Once the tracking system 100 identifies a suitable number of markers 304 on the marker grid 702, the tracking system 100 then determines a pixel location 402 for each of the identified markers 304. Each marker 304 may occupy multiple pixels in the frame 302. This means that for each marker 304, the tracking system 100 determines which pixel location 402 in the frame 302 corresponds with its (x,y) coordinate 306 in the global plane 104. In one embodiment, the tracking system 100 using bounding boxes 708 to narrow or restrict the search space when trying to identify pixel location 402 for markers 304. A bounding box 708 is a defined area or region within the frame 302 that contains a marker 304. For example, a bounding box 708 may be defined as a set of pixels or a range of pixels of the frame 302 that comprise a marker 304.

At step 614, the tracking system 100 identifies bounding boxes 708 for markers 304 within the frame 302. In one embodiment, the tracking system 100 identifies a plurality of pixels in the frame 302 that correspond with a marker 304 and then defines a bounding box 708 that encloses the pixels corresponding with the marker 304. The tracking system 100 may repeat this process for each of the markers 304. Returning to the example in FIG. 7, the tracking system 100 may identify a first bounding box 708A for the first marker 304A, a second bounding box 708B for the second marker 304B, and bounding boxes 708 for any other identified markers 304 within the frame 302.

In another embodiment, the tracking system may employ text or character recognition to identify the first marker 304A when the first marker 304A comprises text. For example, the tracking system 100 may use text recognition to identify pixels with the frame 302 that comprises a word corresponding with a marker 304. The tracking system 100 may then define a bounding box 708 that encloses the pixels corresponding with the identified word. In other embodiments, the tracking system 100 may employ any other suitable image processing technique for identifying bounding boxes 708 for the identified markers 304.

Returning to FIG. 6 at step 616, the tracking system 100 identifies a pixel 710 within each bounding box 708 that corresponds with a pixel location 402 in the frame 302 for a marker 304. As discussed above, each marker 304 may occupy multiple pixels in the frame 302 and the tracking system 100 determines which pixel 710 in the frame 302 corresponds with the pixel location 402 for an (x,y) coordinate 306 in the global plane 104. In one embodiment, each marker 304 comprises a light source. Examples of light sources include, but are not limited to, light emitting diodes (LEDs), infrared (IR) LEDs, incandescent lights, or any other suitable type of light source. In this configuration, a pixel 710 corresponds with a light source for a marker 304. In another embodiment, each marker 304 may comprise a detectable feature that is unique to each marker 304. For example, each marker 304 may comprise a unique color that is associated with the marker 304. As another example, each marker 304 may comprise a unique symbol or pattern that is associated with the marker 304. In this configuration, a pixel 710 corresponds with the detectable feature for the marker 304. Continuing with the previous example, the tracking system 100 identifies a first pixel 710A for the first marker 304, a second pixel 710B for the second marker 304, and pixels 710 for any other identified markers 304.

At step 618, the tracking system 100 determines pixel locations 402 within the frame 302 for each of the identified pixels 710. For example, the tracking system 100 may identify a first pixel row and a first pixel column of the frame 302 that corresponds with the first pixel 710A. Similarly, the tracking system 100 may identify a pixel row and a pixel column in the frame 302 for each of the identified pixels 710.

The tracking system 100 generates a homography 118 for the sensor 108 after the tracking system 100 determines (x,y) coordinates 306 in the global plane 104 and pixel locations 402 in the frame 302 for each of the identified markers 304. At step 620, the tracking system 100 generates a homography 118 for the sensor 108 based on the pixel locations 402 of identified markers 304 in the frame 302 of the sensor 108 and the (x,y) coordinate 306 of the identified markers 304 in the global plane 104. In one embodiment, the tracking system 100 correlates the pixel location 402 for each of the identified markers 304 with its corresponding (x,y) coordinate 306. Continuing with the example in FIG. 7, the tracking system 100 associates the first pixel location 402 for the first marker 304A with the second (x,y) coordinate 306B for the first marker 304A. The tracking system 100 also associates the second pixel location 402 for the second marker 304B with the third (x,y) location 306C for the second marker 304B. The tracking system 100 may repeat this process for all of the identified markers 304.

The tracking system 100 then determines a relationship between the pixel locations 402 of identified markers 304 with the frame 302 of the sensor 108 and the (x,y) coordinate 306 of the identified markers 304 in the global plane 104 to generate a homography 118 for the sensor 108. The generated homography 118 allows the tracking system 100 to map pixel locations 402 in a frame 302 from the sensor 108 to (x,y) coordinates 306 in the global plane 104. The generated homography 118 is similar to the homography described in FIGS. 5A and 5B. Once the tracking system 100 generates the homography 118 for the sensor 108, the tracking system 100 stores an association between the sensor 108 and the generated homography 118 in memory (e.g. memory 3804).

The tracking system 100 may repeat the process described above to generate and associate homographies 118 with other sensors 108. The marker grid 702 may be moved or repositioned within the space 108 to generate a homography 118 for another sensor 108. For example, an operator may reposition the marker grid 702 to allow another sensor 108 to view the markers 304 on the marker grid 702. As an example, the tracking system 100 may receive a second frame 302 from a second sensor 108. In this example, the second frame 302 comprises the first marker 304A and the second marker 304B. The tracking system 100 may determine a third pixel location 402 in the second frame 302 for the first marker 304A and a fourth pixel location 402 in the second frame 302 for the second marker 304B. The tracking system 100 may then generate a second homography 118 based on the third pixel location 402 in the second frame 302 for the first marker 304A, the fourth pixel location 402 in the second frame 302 for the second marker 304B, the (x,y) coordinate 306B in the global plane 104 for the first marker 304A, the (x,y) coordinate 306C in the global plane 104 for the second marker 304B, and pixel locations 402 and (x,y) coordinates 306 for other markers 304. The second homography 118 comprises coefficients that translate between pixel locations 402 in the second frame 302 and physical locations (e.g. (x,y) coordinates 306) in the global plane 104. The coefficients of the second homography 118 are different from the coefficients of the homography 118 that is associated with the first sensor 108. In other words, each sensor 108 is uniquely associated with a homography 118 that maps pixel locations 402 from the sensor 108 to physical locations in the global plane 104. This process uniquely associates a homography 118 to a sensor 108 based on the physical location (e.g. (x,y) coordinate 306) of the sensor 108 in the global plane 104.

Shelf Position Calibration

Figure 8:
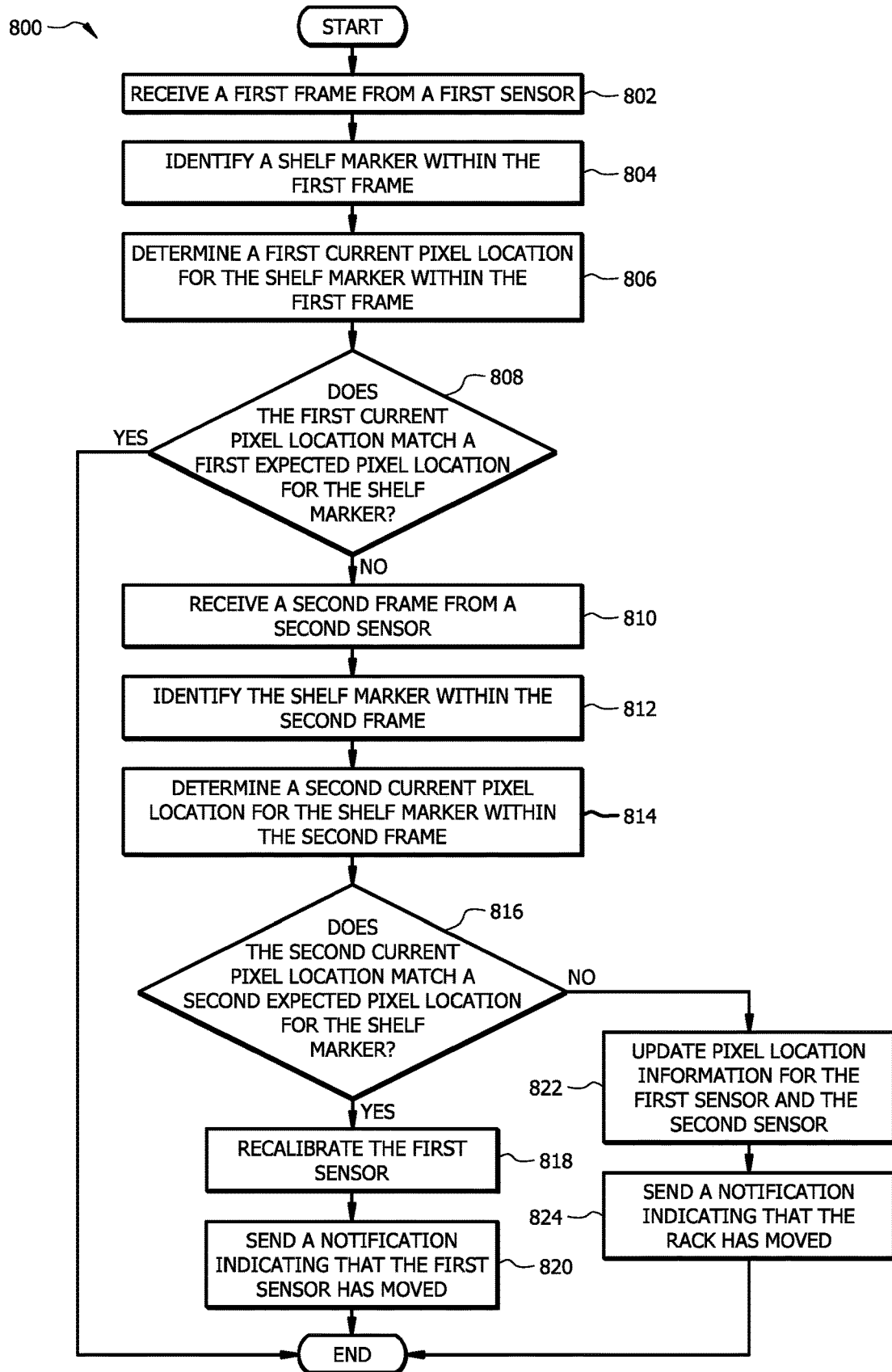
FIG. 8 is a flowchart of an embodiment of a shelf position calibration method for the tracking system.

FIG. 8 is a flowchart of an embodiment of a shelf position calibration method 800 for the tracking system 100. The tracking system 100 may employ method 800 to periodically check whether a rack 112 or sensor 108 has moved within the space 102. For example, a rack 112 may be accidentally bumped or moved by a person which causes the rack's 112 position to move with respect to the global plane 104. As another example, a sensor 108 may come loose from its mounting structure which causes the sensor 108 to sag or move from its original location. Any changes in the position of a rack 112 and/or a sensor 108 after the tracking system 100 has been calibrated will reduce the accuracy and performance of the tracking system 100 when tracking objects within the space 102. The tracking system 100 employs method 800 to detect when either a rack 112 or a sensor 108 has moved and then recalibrates itself based on the new position of the rack 112 or sensor 108.

A sensor 108 may be positioned within the space 102 such that frames 302 captured by the sensor 108 will include one or more shelf markers 906 that are located on a rack 112. A shelf marker 906 is an object that is positioned on a rack 112 that can be used to determine a location (e.g. an (x,y) coordinate 306 and a pixel location 402) for the rack 112. The tracking system 100 is configured to store the pixel locations 402 and the (x,y) coordinates 306 of the shelf markers 906 that are associated with frames 302 from a sensor 108. In one embodiment, the pixel locations 402 and the (x,y) coordinates 306 of the shelf markers 906 may be determined using a process similar to the process described in FIG. 2. In another embodiment, the pixel locations 402 and the (x,y) coordinates 306 of the shelf markers 906 may be provided by an operator as an input to the tracking system 100.

A shelf marker 906 may be an object similar to the marker 304 described in FIGS. 2-7. In some embodiments, each shelf marker 906 on a rack 112 is unique from other shelf markers 906 on the rack 112. This feature allows the tracking system 100 to determine an orientation of the rack 112. Referring to the example in FIG. 9, each shelf marker 906 is a unique shape that identifies a particular portion of the rack 112. In this example, the tracking system 100 may associate a first shelf marker 906A and a second shelf marker 906B with a front of the rack 112. Similarly, the tracking system 100 may also associate a third shelf marker 906C and a fourth shelf marker 906D with a back of the rack 112. In other examples, each shelf marker 906 may have any other uniquely identifiable features (e.g. color or patterns) that can be used to identify a shelf marker 906.

Figure 9:
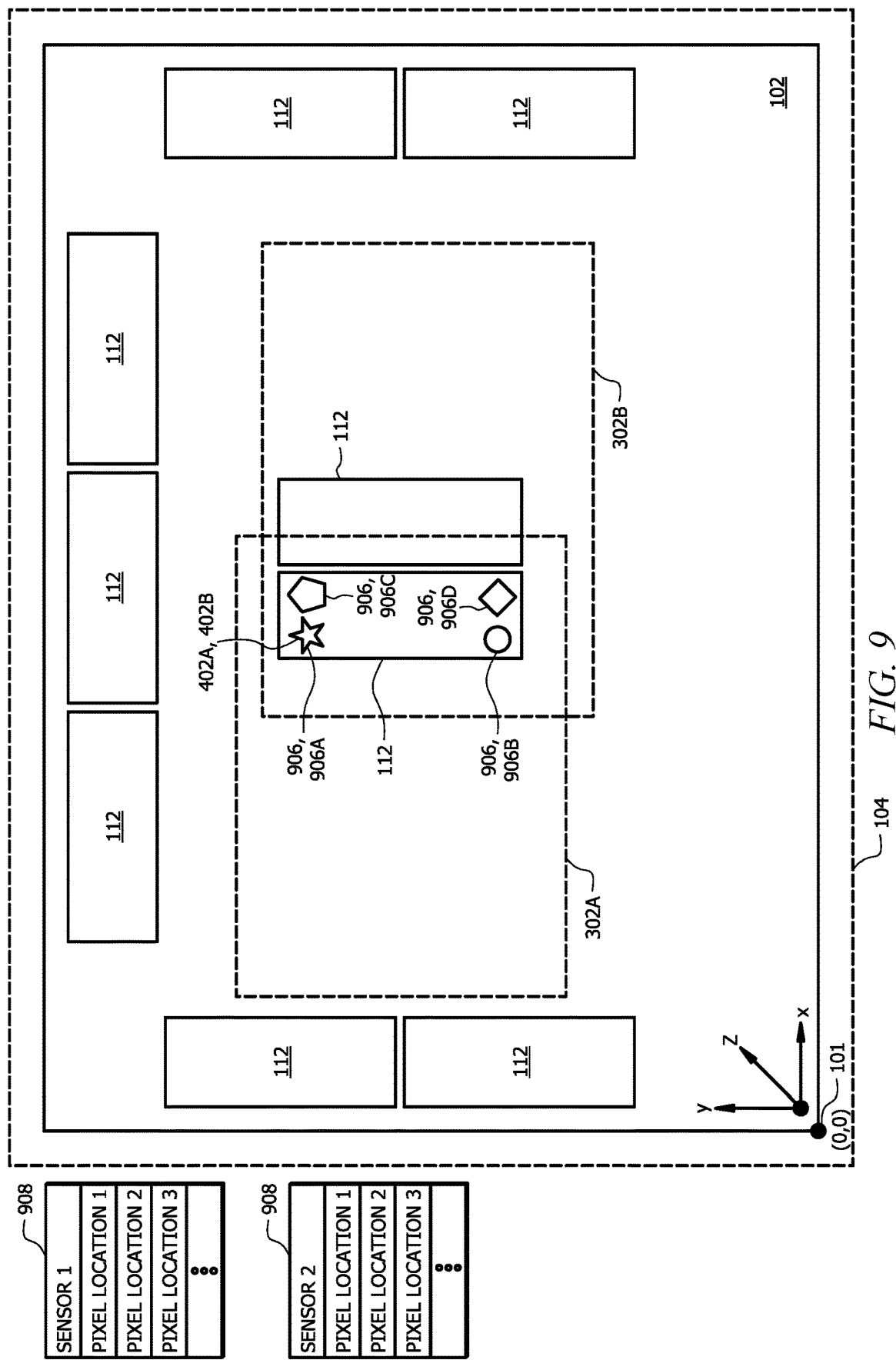
FIG. 9 is an example of a shelf position calibration process for the tracking system.

Returning to FIG. 8 at step 802, the tracking system 100 receives a first frame 302A from a first sensor 108. Referring to FIG. 9 as an example, the first sensor 108 captures the first frame 302A which comprises at least a portion of a rack 112 within the global plane 104 for the space 102.

Returning to FIG. 8 at step 804, the tracking system 100 identifies one or more shelf markers 906 within the first frame 302A. Returning again to the example in FIG. 9, the rack 112 comprises four shelf markers 906. In one embodiment, the tracking system 100 may use object detection to identify shelf markers 906 within the first frame 302A. For example, the tracking system 100 may search the first frame 302A for known features (e.g. shapes, patterns, colors, text, etc.) that correspond with a shelf marker 906. In this example, the tracking system 100 may identify a shape (e.g. a star) in the first frame 302A that corresponds with a first shelf marker 906A. In other embodiments, the tracking system 100 may use any other suitable technique to identify a shelf marker 906 within the first frame 302A. The tracking system 100 may identify any number of shelf markers 906 that are present in the first frame 302A.

Once the tracking system 100 identifies one or more shelf markers 906 that are present in the first frame 302A of the first sensor 108, the tracking system 100 then determines their pixel locations 402 in the first frame 302A so they can be compared to expected pixel locations 402 for the shelf markers 906. Returning to FIG. 8 at step 806, the tracking system 100 determines current pixel locations 402 for the identified shelf markers 906 in the first frame 302A. Returning to the example in FIG. 9, the tracking system 100 determines a first current pixel location 402A for the shelf marker 906 within the first frame 302A. The first current pixel location 402A comprises a first pixel row and first pixel column where the shelf marker 906 is located within the first frame 302A.

Returning to FIG. 8 at step 808, the tracking system 100 determines whether the current pixel locations 402 for the shelf markers 906 match the expected pixel locations 402 for the shelf markers 906 in the first frame 302A. Returning to the example in FIG. 9, the tracking system 100 determines whether the first current pixel location 402A matches a first expected pixel location 402 for the shelf marker 906. As discussed above, when the tracking system 100 is initially calibrated, the tracking system 100 stores pixel location information 908 that comprises expected pixel locations 402 within the first frame 302A of the first sensor 108 for shelf markers 906 of a rack 112. The tracking system 100 uses the expected pixel locations 402 as reference points to determine whether the rack 112 has moved. By comparing the expected pixel location 402 for a shelf marker 906 with its current pixel location 402, the tracking system 100 can determine whether there are any discrepancies that would indicate that the rack 112 has moved.

The tracking system 100 may terminate method 800 in response to determining that the current pixel locations 402 for the shelf markers 906 in the first frame 302A match the expected pixel location 402 for the shelf markers 906. In this case, the tracking system 100 determines that neither the rack 112 nor the first sensor 108 has moved since the current pixel locations 402 match the expected pixel locations 402 for the shelf marker 906.

The tracking system 100 proceeds to step 810 in response to a determination at step 808 that one or more current pixel locations 402 for the shelf markers 906 does not match an expected pixel location 402 for the shelf markers 906. For example, the tracking system 100 may determine that the first current pixel location 402A does not match the first expected pixel location 402 for the shelf marker 906. In this case, the tracking system 100 determines that rack 112 and/or the first sensor 108 has moved since the first current pixel location 402A does not match the first expected pixel location 402 for the shelf marker 906. Here, the tracking system 100 proceeds to step 810 to identify whether the rack 112 has moved or the first sensor 108 has moved.

At step 810, the tracking system 100 receives a second frame 302B from a second sensor 108. The second sensor 108 is adjacent to the first sensor 108 and has at least a partially overlapping field of view with the first sensor 108. The first sensor 108 and the second sensor 108 is positioned such that one or more shelf markers 906 are observable by both the first sensor 108 and the second sensor 108. In this configuration, the tracking system 100 can use a combination of information from the first sensor 108 and the second sensor 108 to determine whether the rack 112 has moved or the first sensor 108 has moved. Returning to the example in FIG. 9, the second frame 304B comprises the first shelf marker 906A, the second shelf marker 906B, the third shelf marker 906C, and the fourth shelf marker 906D of the rack 112.

Returning to FIG. 8 at step 812, the tracking system 100 identifies the shelf markers 906 that are present within the second frame 302B from the second sensor 108. The tracking system 100 may identify shelf markers 906 using a process similar to the process described in step 804. Returning again to the example in FIG. 9, tracking system 100 may search the second frame 302B for known features (e.g. shapes, patterns, colors, text, etc.) that correspond with a shelf marker 906. For example, the tracking system 100 may identify a shape (e.g. a star) in the second frame 302B that corresponds with the first shelf marker 906A.

Once the tracking system 100 identifies one or more shelf markers 906 that are present in the second frame 302B of the second sensor 108, the tracking system 100 then determines their pixel locations 402 in the second frame 302B so they can be compared to expected pixel locations 402 for the shelf markers 906. Returning to FIG. 8 at step 814, the tracking system 100 determines current pixel locations 402 for the identified shelf markers 906 in the second frame 302B. Returning to the example in FIG. 9, the tracking system 100 determines a second current pixel location 402B for the shelf marker 906 within the second frame 302B. The second current pixel location 402B comprises a second pixel row and a second pixel column where the shelf marker 906 is located within the second frame 302B from the second sensor 108.

Returning to FIG. 8 at step 816, the tracking system 100 determines whether the current pixel locations 402 for the shelf markers 906 match the expected pixel locations 402 for the shelf markers 906 in the second frame 302B. Returning to the example in FIG. 9, the tracking system 100 determines whether the second current pixel location 402B matches a second expected pixel location 402 for the shelf marker 906. Similar to as discussed above in step 808, the tracking system 100 stores pixel location information 908 that comprises expected pixel locations 402 within the second frame 302B of the second sensor 108 for shelf markers 906 of a rack 112 when the tracking system 100 is initially calibrated. By comparing the second expected pixel location 402 for the shelf marker 906 to its second current pixel location 402B, the tracking system 100 can determine whether the rack 112 has moved or whether the first sensor 108 has moved.

The tracking system 100 determines that the rack 112 has moved when the current pixel location 402 and the expected pixel location 402 for one or more shelf markers 906 do not match for multiple sensors 108. When a rack 112 moves within the global plane 104, the physical location of the shelf markers 906 moves which causes the pixel locations 402 for the shelf markers 906 to also move with respect to any sensors 108 viewing the shelf markers 906. This means that the tracking system 100 can conclude that the rack 112 has moved when multiple sensors 108 observe a mismatch between current pixel locations 402 and expected pixel locations 402 for one or more shelf markers 906.

The tracking system 100 determines that the first sensor 108 has moved when the current pixel location 402 and the expected pixel location 402 for one or more shelf markers 906 do not match only for the first sensor 108. In this case, the first sensor 108 has moved with respect to the rack 112 and its shelf markers 906 which causes the pixel locations 402 for the shelf markers 906 to move with respect to the first sensor 108. The current pixel locations 402 of the shelf markers 906 will still match the expected pixel locations 402 for the shelf markers 906 for other sensors 108 because the position of these sensors 108 and the rack 112 has not changed.

The tracking system proceeds to step 818 in response to determining that the current pixel location 402 matches the second expected pixel location 402 for the shelf marker 906 in the second frame 302B for the second sensor 108. In this case, the tracking system 100 determines that the first sensor 108 has moved. At step 818, the tracking system 100 recalibrates the first sensor 108. In one embodiment, the tracking system 100 recalibrates the first sensor 108 by generating a new homography 118 for the first sensor 108. The tracking system 100 may generate a new homography 118 for the first sensor 108 using shelf markers 906 and/or other markers 304. The tracking system 100 may generate the new homography 118 for the first sensor 108 using a process similar to the processes described in FIGS. 2 and/or 6.

As an example, the tracking system 100 may use an existing homography 118 that is currently associated with the first sensor 108 to determine physical locations (e.g. (x,y) coordinates 306) for the shelf markers 906. The tracking system 110 may then use the current pixel locations 402 for the shelf markers 906 with their determined (x,y) coordinates 306 to generate a new homography 118 for the first sensor 108. For instance, the tracking system 100 may use an existing homography 118 that is associated with the first sensor 108 to determine a first (x,y) coordinate 306 in the global plane 104 where a first shelf marker 906 is located, a second (x,y) coordinate 306 in the global plane 104 where a second shelf marker 906 is located, and (x,y) coordinates 306 for any other shelf markers 906. The tracking system 100 may apply the existing homography 118 for the first sensor 108 to the current pixel location 402 for the first shelf marker 906 in the first frame 302A to determine the first (x,y) coordinate 306 for the first marker 906 using a process similar to the process described in FIG. 5A. The tracking system 100 may repeat this process for determining (x,y) coordinates 306 for any other identified shelf markers 906. Once the tracking system 100 determines (x,y) coordinates 306 for the shelf markers 906 and the current pixel locations 402 in the first frame 302A for the shelf markers 906, the tracking system 100 may then generate a new homography 118 for the first sensor 108 using this information. For example, the tracking system 100 may generate the new homography 118 based on the current pixel location 402 for the first marker 906A, the current pixel location 402 for the second marker 906B, the first (x,y) coordinate 306 for the first marker 906A, the second (x,y) coordinate 306 for the second marker 906B, and (x,y) coordinates 306 and pixel locations 402 for any other identified shelf markers 906 in the first frame 302A. The tracking system 100 associates the first sensor 108 with the new homography 118. This process updates the homography 118 that is associated with the first sensor 108 based on the current location of the first sensor 108.

In another embodiment, the tracking system 100 may recalibrate the first sensor 108 by updating the stored expected pixel locations for the shelf marker 906 for the first sensor 108. For example, the tracking system 100 may replace the previous expected pixel location 402 for the shelf marker 906 with its current pixel location 402. Updating the expected pixel locations 402 for the shelf markers 906 with respect to the first sensor 108 allows the tracking system 100 to continue to monitor the location of the rack 112 using the first sensor 108. In this case, the tracking system 100 can continue comparing the current pixel locations 402 for the shelf markers 906 in the first frame 302A for the first sensor 108 with the new expected pixel locations 402 in the first frame 302A.

At step 820, the tracking system 100 sends a notification that indicates that the first sensor 108 has moved. Examples of notifications include, but are not limited to, text messages, short message service (SMS) messages, multimedia messaging service (MMS) messages, push notifications, application popup notifications, emails, or any other suitable type of notifications. For example, the tracking system 100 may send a notification indicating that the first sensor 108 has moved to a person associated with the space 102. In response to receiving the notification, the person may inspect and/or move the first sensor 108 back to its original location.

Returning to step 816, the tracking system 100 proceeds to step 822 in response to determining that the current pixel location 402 does not match the expected pixel location 402 for the shelf marker 906 in the second frame 302B. In this case, the tracking system 100 determines that the rack 112 has moved. At step 822, the tracking system 100 updates the expected pixel location information 402 for the first sensor 108 and the second sensor 108. For example, the tracking system 100 may replace the previous expected pixel location 402 for the shelf marker 906 with its current pixel location 402 for both the first sensor 108 and the second sensor 108. Updating the expected pixel locations 402 for the shelf markers 906 with respect to the first sensor 108 and the second sensor 108 allows the tracking system 100 to continue to monitor the location of the rack 112 using the first sensor 108 and the second sensor 108. In this case, the tracking system 100 can continue comparing the current pixel locations 402 for the shelf markers 906 for the first sensor 108 and the second sensor 108 with the new expected pixel locations 402.

At step 824, the tracking system 100 sends a notification that indicates that the rack 112 has moved. For example, the tracking system 100 may send a notification indicating that the rack 112 has moved to a person associated with the space 102. In response to receiving the notification, the person may inspect and/or move the rack 112 back to its original location. The tracking system 100 may update the expected pixel locations 402 for the shelf markers 906 again once the rack 112 is moved back to its original location.

Object Tracking Handoff

Figure 10:
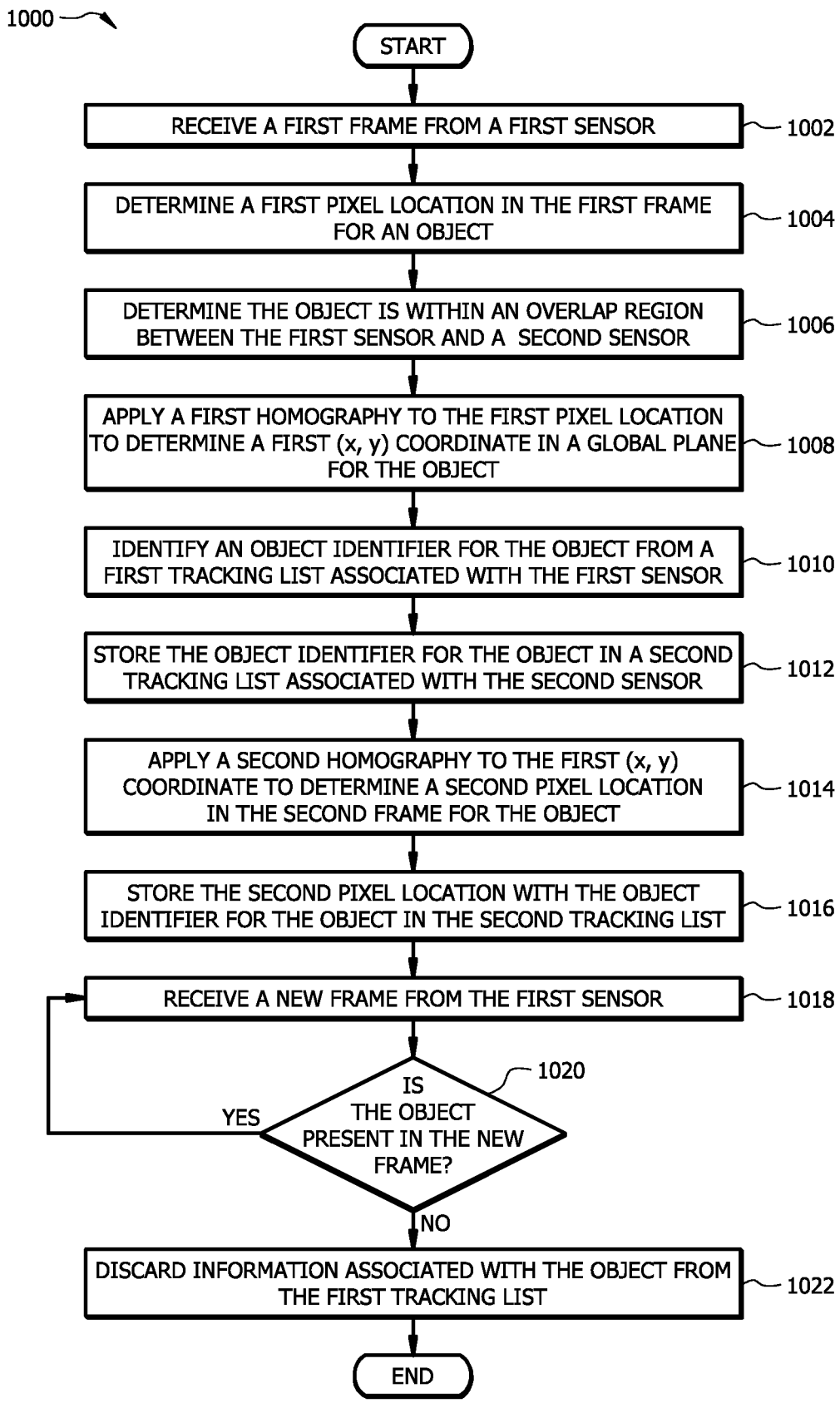
FIG. 10 is a flowchart of an embodiment of a tracking hand off method for the tracking system.

FIG. 10 is a flowchart of an embodiment of a tracking handoff method 1000 for the tracking system 100. The tracking system 100 may employ method 1000 to hand off tracking information for an object (e.g. a person) as it moves between the fields of view of adjacent sensors 108. For example, the tracking system 100 may track the position of people (e.g. shoppers) as they move around within the interior of the space 102. Each sensor 108 has a limited field of view which means that each sensor 108 can only track the position of a person within a portion of the space 102. The tracking system 100 employs a plurality of sensors 108 to track the movement of a person within the entire space 102. Each sensor 108 operates independently from one another which means that the tracking system 100 keeps track of a person as they move from the field of view of one sensor 108 into the field of view of an adjacent sensor 108.

The tracking system 100 is configured such that an object identifier 1118 (e.g. a customer identifier) is assigned to each person as they enter the space 102. The object identifier 1118 may be used to identify a person and other information associated with the person. Examples of object identifiers 1118 include, but are not limited to, names, customer identifiers, alphanumeric codes, phone numbers, email addresses, or any other suitable type of identifier for a person or object. In this configuration, the tracking system 100 tracks a person's movement within the field of view of a first sensor 108 and then hands off tracking information (e.g. an object identifier 1118) for the person as it enters the field of view of a second adjacent sensor 108.

Figure 11:
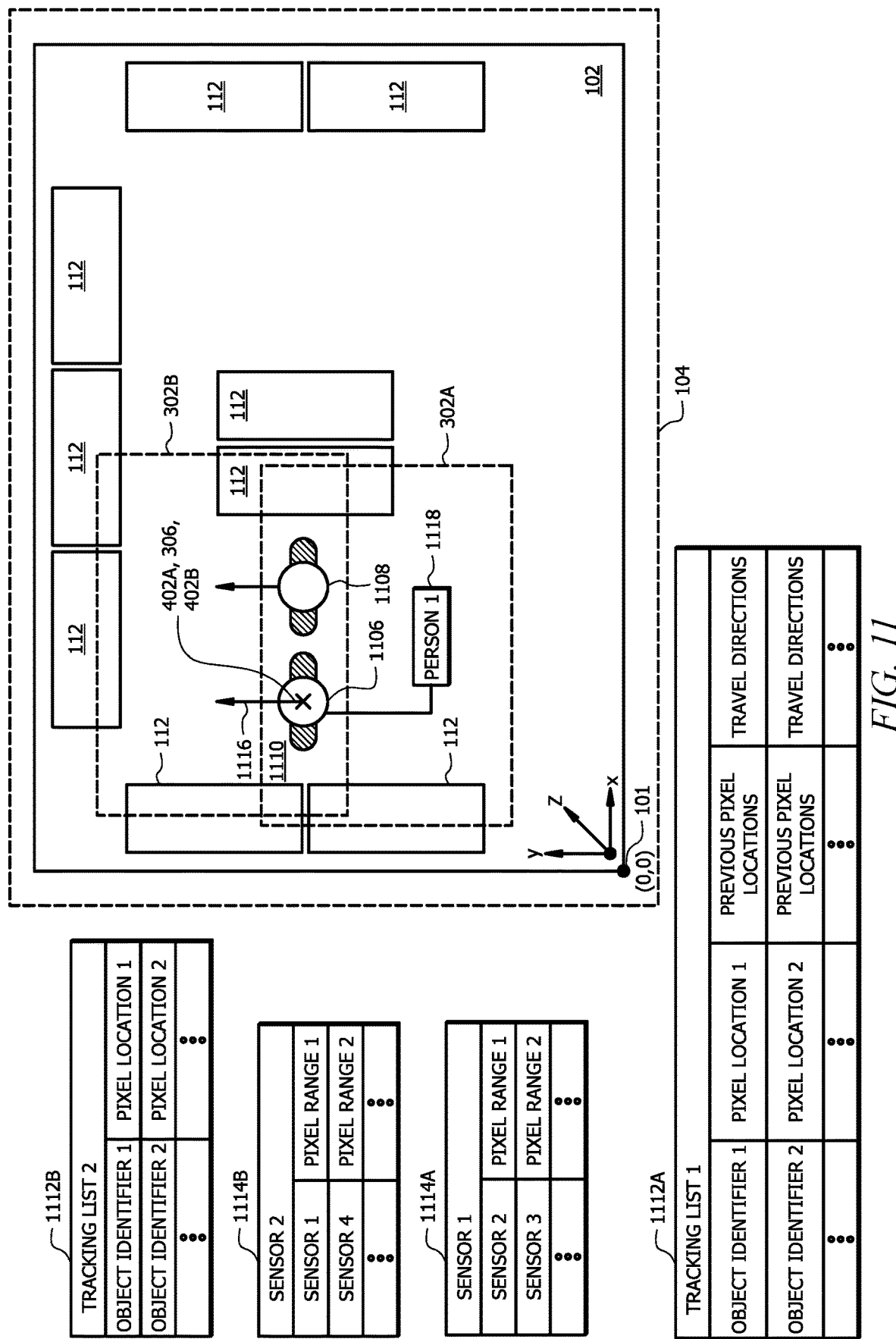
FIG. 11 is an example of a tracking hand off process for the tracking system.

In one embodiment, the tracking system 100 comprises adjacency lists 1114 for each sensor 108 that identifies adjacent sensors 108 and the pixels within the frame 302 of the sensor 108 that overlap with the adjacent sensors 108. Referring to the example in FIG. 11, a first sensor 108 and a second sensor 108 have partially overlapping fields of view. This means that a first frame 302A from the first sensor 108 partially overlaps with a second frame 302B from the second sensor 108. The pixels that overlap between the first frame 302A and the second frame 302B are referred to as an overlap region 1110. In this example, the tracking system 100 comprises a first adjacency list 1114A that identifies pixels in the first frame 302A that correspond with the overlap region 1110 between the first sensor 108 and the second sensor 108. For example, the first adjacency list 1114A may identify a range of pixels in the first frame 302A that correspond with the overlap region 1110. The first adjacency list 114A may further comprise information about other overlap regions between the first sensor 108 and other adjacent sensors 108. For instance, a third sensor 108 may be configured to capture a third frame 302 that partially overlaps with the first frame 302A. In this case, the first adjacency list 1114A will further comprise information that identifies pixels in the first frame 302A that correspond with an overlap region between the first sensor 108 and the third sensor 108. Similarly, the tracking system 100 may further comprise a second adjacency list 1114B that is associated with the second sensor 108. The second adjacency list 1114B identifies pixels in the second frame 302B that correspond with the overlap region 1110 between the first sensor 108 and the second sensor 108. The second adjacency list 1114B may further comprise information about other overlap regions between the second sensor 108 and other adjacent sensors 108. In FIG. 11, the second tracking list 1112B is shown as a separate data structure from the first tracking list 1112A, however, the tracking system 100 may use a single data structure to store tracking list information that is associated with multiple sensors 108.

Once the first person 1106 enters the space 102, the tracking system 100 will track the object identifier 1118 associated with the first person 1106 as well as pixel locations 402 in the sensors 108 where the first person 1106 appears in a tracking list 1112. For example, the tracking system 100 may track the people within the field of view of a first sensor 108 using a first tracking list 1112A, the people within the field of view of a second sensor 108 using a second tracking list 1112B, and so on. In this example, the first tracking list 1112A comprises object identifiers 1118 for people being tracked using the first sensor 108. The first tracking list 1112A further comprises pixel location information that indicates the location of a person within the first frame 302A of the first sensor 108. In some embodiments, the first tracking list 1112A may further comprise any other suitable information associated with a person being tracked by the first sensor 108. For example, the first tracking list 1112A may identify (x,y) coordinates 306 for the person in the global plane 104, previous pixel locations 402 within the first frame 302A for a person, and/or a travel direction 1116 for a person. For instance, the tracking system 100 may determine a travel direction 1116 for the first person 1106 based on their previous pixel locations 402 within the first frame 302A and may store the determined travel direction 1116 in the first tracking list 1112A. In one embodiment, the travel direction 1116 may be represented as a vector with respect to the global plane 104. In other embodiments, the travel direction 1116 may be represented using any other suitable format.

Returning to FIG. 10 at step 1002, the tracking system 100 receives a first frame 302A from a first sensor 108. Referring to FIG. 11 as an example, the first sensor 108 captures an image or frame 302A of a global plane 104 for at least a portion of the space 102. In this example, the first frame 1102 comprises a first object (e.g. a first person 1106) and a second object (e.g. a second person 1108). In this example, the first frame 302A captures the first person 1106 and the second person 1108 as they move within the space 102.

Returning to FIG. 10 at step 1004, the tracking system 100 determines a first pixel location 402A in the first frame 302A for the first person 1106. Here, the tracking system 100 determines the current location for the first person 1106 within the first frame 302A from the first sensor 108. Continuing with the example in FIG. 11, the tracking system 100 identifies the first person 1106 in the first frame 302A and determines a first pixel location 402A that corresponds with the first person 1106. In a given frame 302, the first person 1106 is represented by a collection of pixels within the frame 302. Referring to the example in FIG. 11, the first person 1106 is represented by a collection of pixels that show an overhead view of the first person 1106. The tracking system 100 associates a pixel location 402 with the collection of pixels representing the first person 1106 to identify the current location of the first person 1106 within a frame 302. In one embodiment, the pixel location 402 of the first person 1106 may correspond with the head of the first person 1106. In this example, the pixel location 402 of the first person 1106 may be located at about the center of the collection of pixels that represent the first person 1106. As another example, the tracking system 100 may determine a bounding box 708 that encloses the collection of pixels in the first frame 302A that represent the first person 1106. In this example, the pixel location 402 of the first person 1106 may be located at about the center of the bounding box 708.

As another example, the tracking system 100 may use object detection or contour detection to identify the first person 1106 within the first frame 302A. In this example, the tracking system 100 may identify one or more features for the first person 1106 when they enter the space 102. The tracking system 100 may later compare the features of a person in the first frame 302A to the features associated with the first person 1106 to determine if the person is the first person 1106. In other examples, the tracking system 100 may use any other suitable techniques for identifying the first person 1106 within the first frame 302A. The first pixel location 402A comprises a first pixel row and a first pixel column that corresponds with the current location of the first person 1106 within the first frame 302A.

Returning to FIG. 10 at step 1006, the tracking system 100 determines the object is within the overlap region 1110 between the first sensor 108 and the second sensor 108. Returning to the example in FIG. 11, the tracking system 100 may compare the first pixel location 402A for the first person 1106 to the pixels identified in the first adjacency list 1114A that correspond with the overlap region 1110 to determine whether the first person 1106 is within the overlap region 1110. The tracking system 100 may determine that the first object 1106 is within the overlap region 1110 when the first pixel location 402A for the first object 1106 matches or is within a range of pixels identified in the first adjacency list 1114A that corresponds with the overlap region 1110. For example, the tracking system 100 may compare the pixel column of the pixel location 402A with a range of pixel columns associated with the overlap region 1110 and the pixel row of the pixel location 402A with a range of pixel rows associated with the overlap region 1110 to determine whether the pixel location 402A is within the overlap region 1110. In this example, the pixel location 402A for the first person 1106 is within the overlap region 1110.

At step 1008, the tracking system 100 applies a first homography 118 to the first pixel location 402A to determine a first (x,y) coordinate 306 in the global plane 104 for the first person 1106. The first homography 118 is configured to translate between pixel locations 402 in the first frame 302A and (x,y) coordinates 306 in the global plane 104. The first homography 118 is configured similar to the homography 118 described in FIGS. 2-5B. As an example, the tracking system 100 may identify the first homography 118 that is associated with the first sensor 108 and may use matrix multiplication between the first homography 118 and the first pixel location 402A to determine the first (x,y) coordinate 306 in the global plane 104.

At step 1010, the tracking system 100 identifies an object identifier 1118 for the first person 1106 from the first tracking list 1112A associated with the first sensor 108. For example, the tracking system 100 may identify an object identifier 1118 that is associated with the first person 1106. At step 1012, the tracking system 100 stores the object identifier 1118 for the first person 1106 in a second tracking list 1112B associated with the second sensor 108. Continuing with the previous example, the tracking system 100 may store the object identifier 1118 for the first person 1106 in the second tracking list 1112B. Adding the object identifier 1118 for the first person 1106 to the second tracking list 1112B indicates that the first person 1106 is within the field of view of the second sensor 108 and allows the tracking system 100 to begin tracking the first person 1106 using the second sensor 108.

Once the tracking system 100 determines that the first person 1106 has entered the field of view of the second sensor 108, the tracking system 100 then determines where the first person 1106 is located in the second frame 302B of the second sensor 108 using a homography 118 that is associated with the second sensor 108. This process identifies the location of the first person 1106 with respect to the second sensor 108 so they can be tracked using the second sensor 108. At step 1014, the tracking system 100 applies a homography 118 that is associated with the second sensor 108 to the first (x,y) coordinate 306 to determine a second pixel location 402B in the second frame 302B for the first person 1106. The homography 118 is configured to translate between pixel locations 402 in the second frame 302B and (x,y) coordinates 306 in the global plane 104. The homography 118 is configured similarly to the homography 118 described in FIGS. 2-5B. As an example, the tracking system 100 may identify the homography 118 that is associated with the second sensor 108 and may use matrix multiplication between the inverse of the homography 118 and the first (x,y) coordinate 306 to determine the second pixel location 402B in the second frame 302B.

At step 1016, the tracking system 100 stores the second pixel location 402B with the object identifier 1118 for the first person 1106 in the second tracking list 1112B. In some embodiments, the tracking system 100 may store additional information associated with the first person 1106 in the second tracking list 1112B. For example, the tracking system 100 may be configured to store a travel direction 1116 or any other suitable type of information associated with the first person 1106 in the second tracking list 1112B. After storing the second pixel location 402B in the second tracking list 1112B, the tracking system 100 may begin tracking the movement of the person within the field of view of the second sensor 108.

The tracking system 100 will continue to track the movement of the first person 1106 to determine when they completely leave the field of view of the first sensor 108. At step 1018, the tracking system 100 receives a new frame 302 from the first sensor 108. For example, the tracking system 100 may periodically receive additional frames 302 from the first sensor 108. For instance, the tracking system 100 may receive a new frame 302 from the first sensor 108 every millisecond, every second, every five second, or at any other suitable time interval.

At step 1020, the tracking system 100 determines whether the first person 1106 is present in the new frame 302. If the first person 1106 is present in the new frame 302, then this means that the first person 1106 is still within the field of view of the first sensor 108 and the tracking system 100 should continue to track the movement of the first person 1106 using the first sensor 108. If the first person 1106 is not present in the new frame 302, then this means that the first person 1106 has left the field of view of the first sensor 108 and the tracking system 100 no longer needs to track the movement of the first person 1106 using the first sensor 108. The tracking system 100 may determine whether the first person 1106 is present in the new frame 302 using a process similar to the process described in step 1004. The tracking system 100 returns to step 1018 to receive additional frames 302 from the first sensor 108 in response to determining that the first person 1106 is present in the new frame 1102 from the first sensor 108.

The tracking system 100 proceeds to step 1022 in response to determining that the first person 1106 is not present in the new frame 302. In this case, the first person 1106 has left the field of view for the first sensor 108 and no longer needs to be tracked using the first sensor 108. At step 1022, the tracking system 100 discards information associated with the first person 1106 from the first tracking list 1112A. Once the tracking system 100 determines that the first person has left the field of view of the first sensor 108, then the tracking system 100 can stop tracking the first person 1106 using the first sensor 108 and can free up resources (e.g. memory resources) that were allocated to tracking the first person 1106. The tracking system 100 will continue to track the movement of the first person 1106 using the second sensor 108 until the first person 1106 leaves the field of view of the second sensor 108. For example, the first person 1106 may leave the space 102 or may transition to the field of view of another sensor 108.

Shelf Interaction Detection

Figure 12:
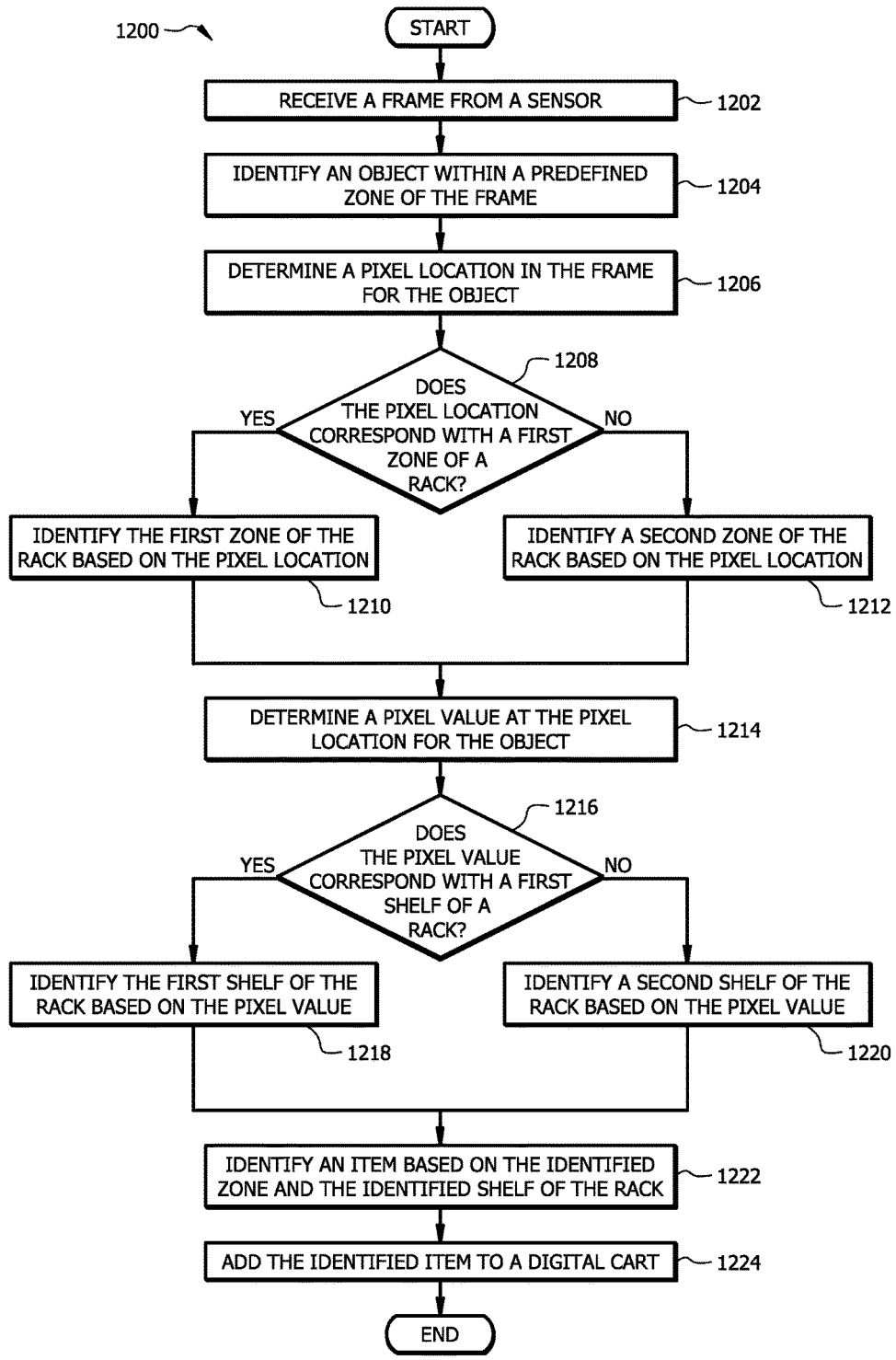
FIG. 12 is a flowchart of an embodiment of a shelf interaction detection method for the tracking system.

FIG. 12 is a flowchart of an embodiment of a shelf interaction detection method 1200 for the tracking system 100. The tracking system 100 may employ method 1200 to determine where a person is interacting with a shelf of a rack 112. In addition to tracking where people are located within the space 102, the tracking system 100 also tracks which items 1306 a person picks up from a rack 112. As a shopper picks up items 1306 from a rack 112, the tracking system 100 identifies and tracks which items 1306 the shopper has picked up, so they can be automatically added to a digital cart 1410 that is associated with the shopper. This process allows items 1306 to be added to the person's digital cart 1410 without having the shopper scan or otherwise identify the item 1306 they picked up. The digital cart 1410 comprises information about items 1306 the shopper has picked up for purchase. In one embodiment, the digital cart 1410 comprises item identifiers and a quantity associated with each item in the digital cart 1410. For example, when the shopper picks up a canned beverage, an item identifier for the beverage is added to their digital cart 1410. The digital cart 1410 will also indicate the number of beverages that the shopper has picked up. Once the shopper leaves the space 102, the shopper will be automatically charged for the items 1306 in their digital cart 1410.

Figure 13:
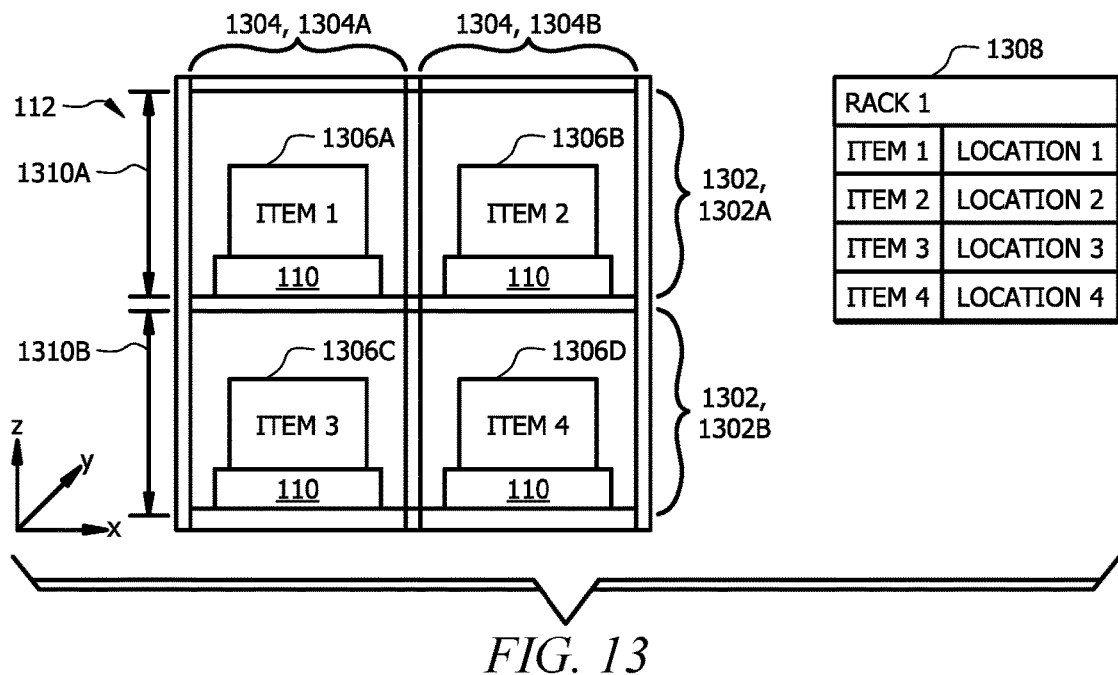
FIG. 13 is a front view of an example of a shelf interaction detection process for the tracking system.

In FIG. 13, a side view of a rack 112 is shown from the perspective of a person standing in front of the rack 112. In this example, the rack 112 may comprise a plurality of shelves 1302 for holding and displaying items 1306. Each shelf 1302 may be partitioned into one or more zones 1304 for holding different items 1306. In FIG. 13, the rack 112 comprises a first shelf 1302A at a first height and a second shelf 1302B at a second height. Each shelf 1302 is partitioned into a first zone 1304A and a second zone 1304B. The rack 112 may be configured to carry a different item 1306 (i.e. items 1306A, 1306B, 1306C, and 1036D) within each zone 1304 on each shelf 1302. In this example, the rack 112 may be configured to carry up to four different types of items 1306. In other examples, the rack 112 may comprise any other suitable number of shelves 1302 and/or zones 1304 for holding items 1306. The tracking system 100 may employ method 1200 to identify which item 1306 a person picks up from a rack 112 based on where the person is interacting with the rack 112.

Figure 14:
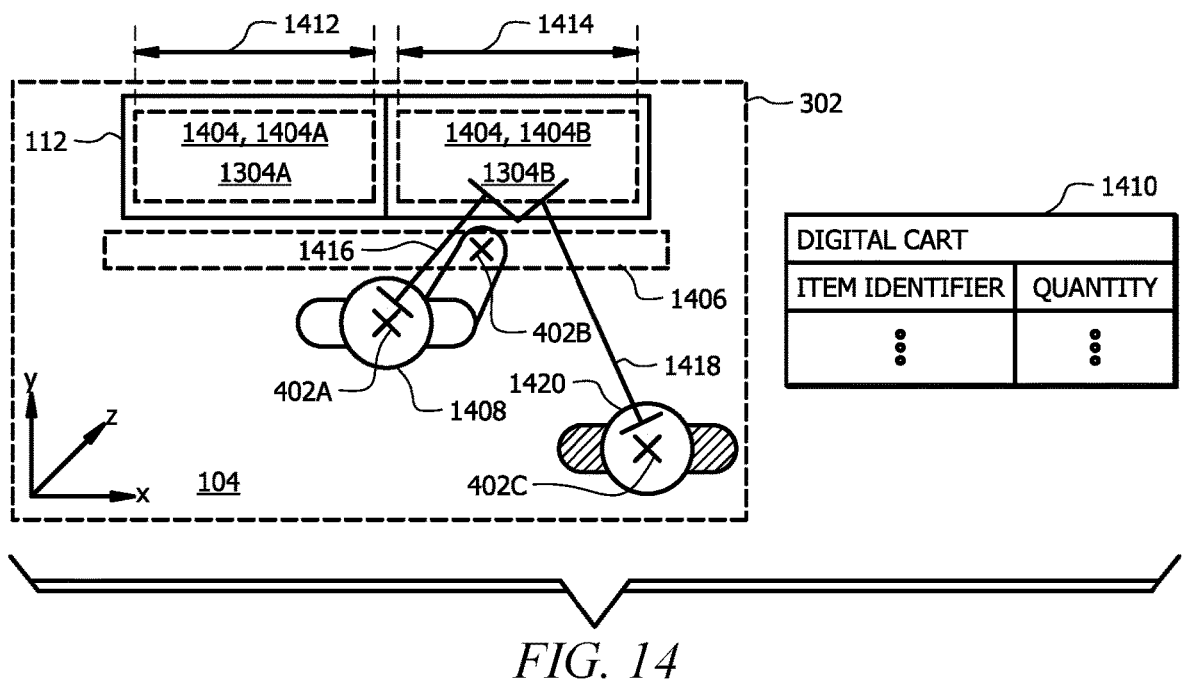
FIG. 14 is an overhead view of an example of a shelf interaction detection process for the tracking system.

Returning to FIG. 12 at step 1202, the tracking system 100 receives a frame 302 from a sensor 108. Referring to FIG. 14 as an example, the sensor 108 captures a frame 302 of at least a portion of the rack 112 within the global plane 104 for the space 102. In FIG. 14, an overhead view of the rack 112 and two people standing in front of the rack 112 is shown from the perspective of the sensor 108. The frame 302 comprises a plurality of pixels that are each associated with a pixel location 402 for the sensor 108. Each pixel location 402 comprises a pixel row, a pixel column, and a pixel value. The pixel row and the pixel column indicate the location of a pixel within the frame 302 of the sensor 108. The pixel value corresponds with a z-coordinate (e.g. a height) in the global plane 104. The z-coordinate corresponds with a distance between sensor 108 and a surface in the global plane 104.

The frame 302 further comprises one or more zones 1404 that are associated with zones 1304 of the rack 112. Each zone 1404 in the frame 302 corresponds with a portion of the rack 112 in the global plane 104. Referring to the example in FIG. 14, the frame 302 comprises a first zone 1404A and a second zone 1404B that are associated with the rack 112. In this example, the first zone 1404A and the second zone 1404B correspond with the first zone 1304A and the second zone 1304B of the rack 112, respectively.

The frame 302 further comprises a predefined zone 1406 that is used as a virtual curtain to detect where a person 1408 is interacting with the rack 112. The predefined zone 1406 is an invisible barrier defined by the tracking system 100 that the person 1408 reaches through to pick up items 1306 from the rack 112. The predefined zone 1406 is located proximate to the one or more zones 1304 of the rack 112. For example, the predefined zone 1406 may be located proximate to the front of the one or more zones 1304 of the rack 112 where the person 1408 would reach to grab for an item 1306 on the rack 112. In some embodiments, the predefined zone 1406 may at least partially overlap with the first zone 1404A and the second zone 1404B.

Returning to FIG. 12 at step 1204, the tracking system 100 identifies an object within a predefined zone 1406 of the frame 1402. For example, the tracking system 100 may detect that the person's 1408 hand enters the predefined zone 1406. In one embodiment, the tracking system 100 may compare the frame 1402 to a previous frame that was captured by the sensor 108 to detect that the person's 1408 hand has entered the predefined zone 1406. In this example, the tracking system 100 may use differences between the frames 302 to detect that the person's 1408 hand enters the predefined zone 1406. In other embodiments, the tracking system 100 may employ any other suitable technique for detecting when the person's 1408 hand has entered the predefined zone 1406.

In one embodiment, the tracking system 100 identifies the rack 112 that is proximate to the person 1408. Returning to the example in FIG. 14, the tracking system 100 may determine a pixel location 402A in the frame 302 for the person 1408. The tracking system 100 may determine a pixel location 402A for the person 1408 using a process similar to the process described in step 1004 of FIG. 10. The tracking system 100 may use a homography 118 associated with the sensor 108 to determine an (x,y) coordinate 306 in the global plane 104 for the person 1408. The homography 118 is configured to translate between pixel locations 402 in the frame 302 and (x,y) coordinates 306 in the global plane 104. The homography 118 is configured similarly to the homography 118 described in FIGS. 2-5B. As an example, the tracking system 100 may identify the homography 118 that is associated with the sensor 108 and may use matrix multiplication between the homography 118 and the pixel location 402A of the person 1408 to determine an (x,y) coordinate 306 in the global plane 104. The tracking system 100 may then identify which rack 112 is closest to the person 1408 based on the person's 1408 (x,y) coordinate 306 in the global plane 104.

The tracking system 100 may identify an item map 1308 corresponding with the rack 112 that is closest to the person 1408. In one embodiment, the tracking system 100 comprises an item map 1308 that associates items 1306 with particular locations on the rack 112. For example, an item map 1308 may comprise a rack identifier and a plurality of item identifiers. Each item identifier is mapped to a particular location on the rack 112. Returning to the example in FIG. 13, a first item 1306A is mapped to a first location that identifies the first zone 1304A and the first shelf 1302A of the rack 112, a second item 1306B is mapped to a second location that identifies the second zone 1304B and the first shelf 1302A of the rack 112, a third item 1306C is mapped to a third location that identifies the first zone 1304A and the second shelf 1302B of the rack 112, and a fourth item 1306D is mapped to a fourth location that identifies the second zone 1304B and the second shelf 1302B of the rack 112.

Returning to FIG. 12 at step 1206, the tracking system 100 determines a pixel location 402B in the frame 302 for the object that entered the predefined zone 1406. Continuing with the previous example, the pixel location 402B comprises a first pixel row, a first pixel column, and a first pixel value for the person's 1408 hand. In this example, the person's 1408 hand is represented by a collection of pixels in the predefined zone 1406. In one embodiment, the pixel location 402 of the person's 1408 hand may be located at about the center of the collection of pixels that represent the person's 1408 hand. In other examples, the tracking system 100 may use any other suitable technique for identifying the person's 1408 hand within the frame 302.

Once the tracking system 100 determines the pixel location 402B of the person's 1408 hand, the tracking system 100 then determines which shelf 1302 and zone 1304 of the rack 112 the person 1408 is reaching for. At step 1208, the tracking system 100 determines whether the pixel location 402B for the object (i.e. the person's 1408 hand) corresponds with a first zone 1304A of the rack 112. The tracking system 100 uses the pixel location 402B of the person's 1408 hand to determine which side of the rack 112 the person 1408 is reaching into. Here, the tracking system 100 checks whether the person is reaching for an item on the left side of the rack 112.

Each zone 1304 of the rack 112 is associated with a plurality of pixels in the frame 302 that can be used to determine where the person 1408 is reaching based on the pixel location 402B of the person's 1408 hand. Continuing with the example in FIG. 14, the first zone 1304A of the rack 112 corresponds with the first zone 1404A which is associated with a first range of pixels 1412 in the frame 302. Similarly, the second zone 1304B of the rack 112 corresponds with the second zone 1404B which is associated with a second range of pixels 1414 in the frame 302. The tracking system 100 may compare the pixel location 402B of the person's 1408 hand to the first range of pixels 1412 to determine whether the pixel location 402B corresponds with the first zone 1304A of the rack 112. In this example, the first range of pixels 1412 corresponds with a range of pixel columns in the frame 302. In other examples, the first range of pixels 1412 may correspond with a range of pixel rows or a combination of pixel row and columns in the frame 302.

In this example, the tracking system 100 compares the first pixel column of the pixel location 402B to the first range of pixels 1412 to determine whether the pixel location 1410 corresponds with the first zone 1304A of the rack 112. In other words, the tracking system 100 compares the first pixel column of the pixel location 402B to the first range of pixels 1412 to determine whether the person 1408 is reaching for an item 1306 on the left side of the rack 112. In FIG. 14, the pixel location 402B for the person's 1408 hand does not correspond with the first zone 1304A of the rack 112. The tracking system 100 proceeds to step 1210 in response to determining that the pixel location 402B for the object corresponds with the first zone 1304A of the rack 112. At step 1210, the tracking system 100 identifies the first zone 1304A of the rack 112 based on the pixel location 402B for the object that entered the predefined zone 1406. In this case, the tracking system 100 determines that the person 1408 is reaching for an item on the left side of the rack 112.

Returning to step 1208, the tracking system 100 proceeds to step 1212 in response to determining that the pixel location 402B for the object that entered the predefined zone 1406 does not correspond with the first zone 1304B of the rack 112. At step 1212, the tracking system 100 identifies the second zone 1304B of the rack 112 based on the pixel location 402B of the object that entered the predefined zone 1406. In this case, the tracking system 100 determines that the person 1408 is reaching for an item on the right side of the rack 112.

In other embodiments, the tracking system 100 may compare the pixel location 402B to other ranges of pixels that are associated with other zones 1304 of the rack 112. For example, the tracking system 100 may compare the first pixel column of the pixel location 402B to the second range of pixels 1414 to determine whether the pixel location 402B corresponds with the second zone 1304B of the rack 112. In other words, the tracking system 100 compares the first pixel column of the pixel location 402B to the second range of pixels 1414 to determine whether the person 1408 is reaching for an item 1306 on the right side of the rack 112.

Once the tracking system 100 determines which zone 1304 of the rack 112 the person 1408 is reaching into, the tracking system 100 then determines which shelf 1302 of the rack 112 the person 1408 is reaching into. At step 1214, the tracking system 100 identifies a pixel value at the pixel location 402B for the object that entered the predefined zone 1406. The pixel value is a numeric value that corresponds with a z-coordinate or height in the global plane 104 that can be used to identify which shelf 1302 the person 1408 was interacting with. The pixel value can be used to determine the height the person's 1408 hand was at when it entered the predefined zone 1406 which can be used to determine which shelf 1302 the person 1408 was reaching into.

At step 1216, the tracking system 100 determines whether the pixel value corresponds with the first shelf 1302A of the rack 112. Returning to the example in FIG. 13, the first shelf 1302A of the rack 112 corresponds with a first range of z-values or heights 1310A and the second shelf 1302B corresponds with a second range of z-values or heights 1310B. The tracking system 100 may compare the pixel value to the first range of z-values 1310A to determine whether the pixel value corresponds with the first shelf 1302A of the rack 112. As an example, the first range of z-values 1310A may be a range between 2 meters and 1 meter with respect to the z-axis in the global plane 104. The second range of z-values 1310B may be a range between 0.9 meters and 0 meters with respect to the z-axis in the global plane 104. The pixel value may have a value that corresponds with 1.5 meters with respect to the z-axis in the global plane 104. In this example, the pixel value is within the first range of z-values 1310A which indicates that the pixel value corresponds with the first shelf 1302A of the rack 112. In other words, the person's 1408 hand was detected at a height that indicates the person 1408 was reaching for the first shelf 1302A of the rack 112. The tracking system 100 proceeds to step 1218 in response to determining that the pixel value corresponds with the first shelf of the rack 112. At step 1218, the tracking system 100 identifies the first shelf 1302A of the rack 112 based on the pixel value.

Returning to step 1216, the tracking system 100 proceeds to step 1220 in response to determining that the pixel value does not correspond with the first shelf 1302A of the rack 112. At step 1220, the tracking system 100 identifies the second shelf 1302B of the rack 112 based on the pixel value. In other embodiments, the tracking system 100 may compare the pixel value to other z-value ranges that are associated with other shelves 1302 of the rack 112. For example, the tracking system 100 may compare the pixel value to the second range of z-values 1310B to determine whether the pixel value corresponds with the second shelf 1302B of the rack 112.

Once the tracking system 100 determines which side of the rack 112 and which shelf 1302 of the rack 112 the person 1408 is reaching into, then the tracking system 100 can identify an item 1306 that corresponds with the identified location on the rack 112. At step 1222, the tracking system 100 identifies an item 1306 based on the identified zone 1304 and the identified shelf 1302 of the rack 112. The tracking system 100 uses the identified zone 1304 and the identified shelf 1302 to identify a corresponding item 1306 in the item map 1308. Returning to the example in FIG. 14, the tracking system 100 may determine that the person 1408 is reaching into the right side (i.e. zone 1404B) of the rack 112 and the first shelf 1302A of the rack 112. In this example, the tracking system 100 determines that the person 1408 is reaching for and picked up item 1306B from the rack 112.

In some instances, multiple people may be near the rack 112 and the tracking system 100 may need to determine which person is interacting with the rack 112 so that it can add a picked-up item 1306 to the appropriate person's digital cart 1410. Returning to the example in FIG. 14, a second person 1420 is also near the rack 112 when the first person 1408 is picking up an item 1306 from the rack 112. In this case, the tracking system 100 should assign any picked-up items to the first person 1408 and not the second person 1420.

In one embodiment, the tracking system 100 determines which person picked up an item 1306 based on their proximity to the item 1306 that was picked up. For example, the tracking system 100 may determine a pixel location 402A in the frame 302 for the first person 1408. The tracking system 100 may also identify a second pixel location 402C for the second person 1420 in the frame 302. The tracking system 100 may then determine a first distance 1416 between the pixel location 402A of the first person 1408 and the location on the rack 112 where the item 1306 was picked up. The tracking system 100 also determines a second distance 1418 between the pixel location 402C of the second person 1420 and the location on the rack 112 where the item 1306 was picked up. The tracking system 100 may then determine that the first person 1408 is closer to the item 1306 than the second person 1420 when the first distance 1416 is less than the second distance 1418. In this example, the tracking system 100 identifies the first person 1408 as the person that most likely picked up the item 1306 based on their proximity to the location on the rack 112 where the item 1306 was picked up. This process allows the tracking system 100 to identify the correct person that picked up the item 1306 from the rack 112 before adding the item 1306 to their digital cart 1410.

Returning to FIG. 12 at step 1224, the tracking system 100 adds the identified item 1306 to a digital cart 1410 associated with the person 1408. In one embodiment, the tracking system 100 uses weight sensors 110 to determine a number of items 1306 that were removed from the rack 112. For example, the tracking system 100 may determine a weight decrease amount on a weight sensor 110 after the person 1408 removes one or more items 1306 from the weight sensor 110. The tracking system 100 may then determine an item quantity based on the weight decrease amount. For example, the tracking system 100 may determine an individual item weight for the items 1306 that are associated with the weight sensor 110. For instance, the weight sensor 110 may be associated with an item 1306 that that has an individual weight of sixteen ounces. When the weight sensor 110 detects a weight decrease of sixty-four ounces, the weight sensor 110 may determine that four of the items 1306 were removed from the weight sensor 110. In other embodiments, the digital cart 1410 may further comprise any other suitable type of information associated with the person 1408 and/or items 1306 that they have picked up.

Item Assignment Using a Local Zone

Figure 15:
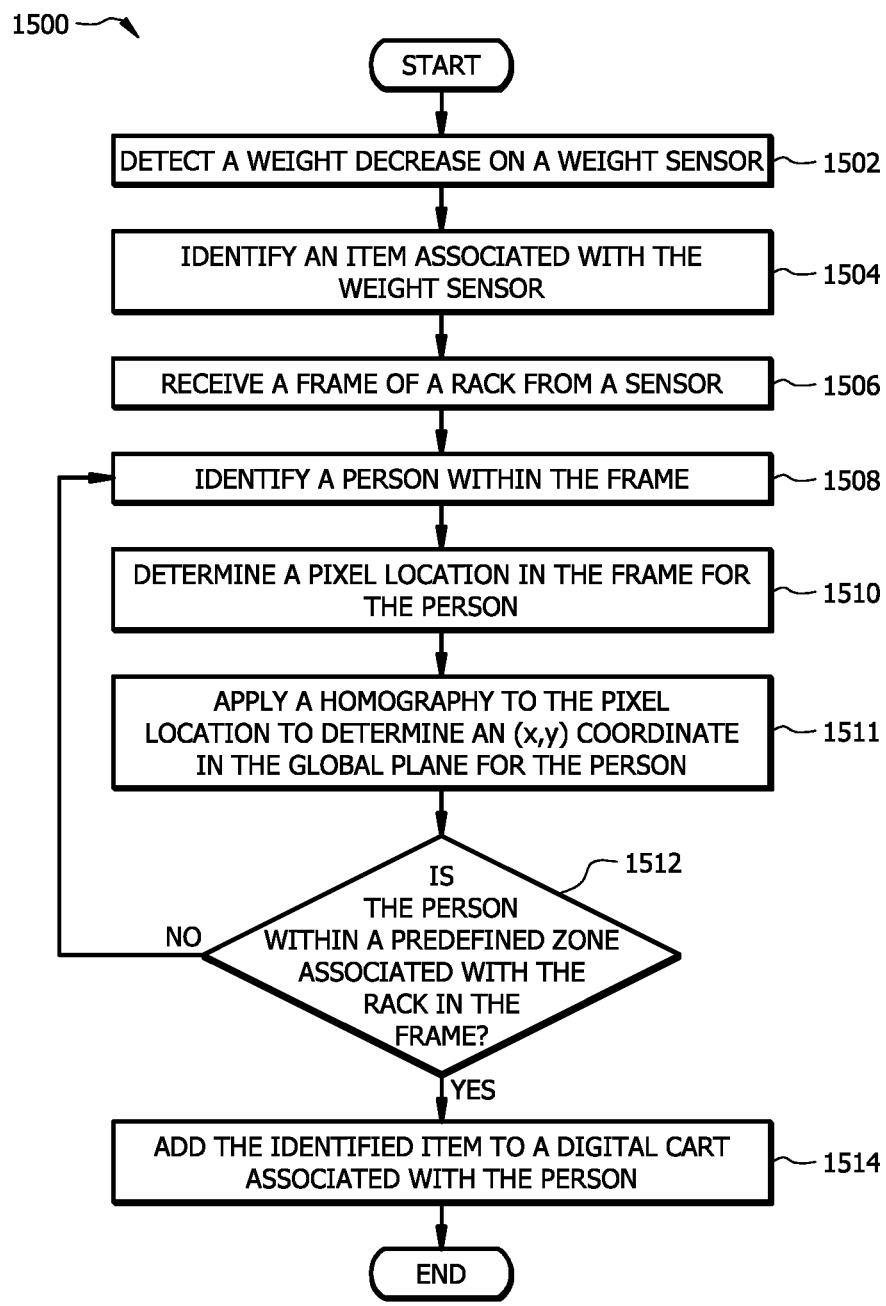
FIG. 15 is a flowchart of an embodiment of an item assigning method for the tracking system.

FIG. 15 is a flowchart of an embodiment of an item assigning method 1500 for the tracking system 100. The tracking system 100 may employ method 1500 to detect when an item 1306 has been picked up from a rack 112 and to determine which person to assign the item to using a predefined zone 1808 that is associated with the rack 112. In a busy environment, such as a store, there may be multiple people standing near a rack 112 when an item is removed from the rack 112. Identifying the correct person that picked up the item 1306 can be challenging. In this case, the tracking system 100 uses a predefined zone 1808 that can be used to reduce the search space when identifying a person that picks up an item 1306 from a rack 112. The predefined zone 1808 is associated with the rack 112 and is used to identify an area where a person can pick up an item 1306 from the rack 112. The predefined zone 1808 allows the tracking system 100 to quickly ignore people are not within an area where a person can pick up an item 1306 from the rack 112, for example behind the rack 112. Once the item 1306 and the person have been identified, the tracking system 100 will add the item to a digital cart 1410 that is associated with the identified person.

Figure 18:
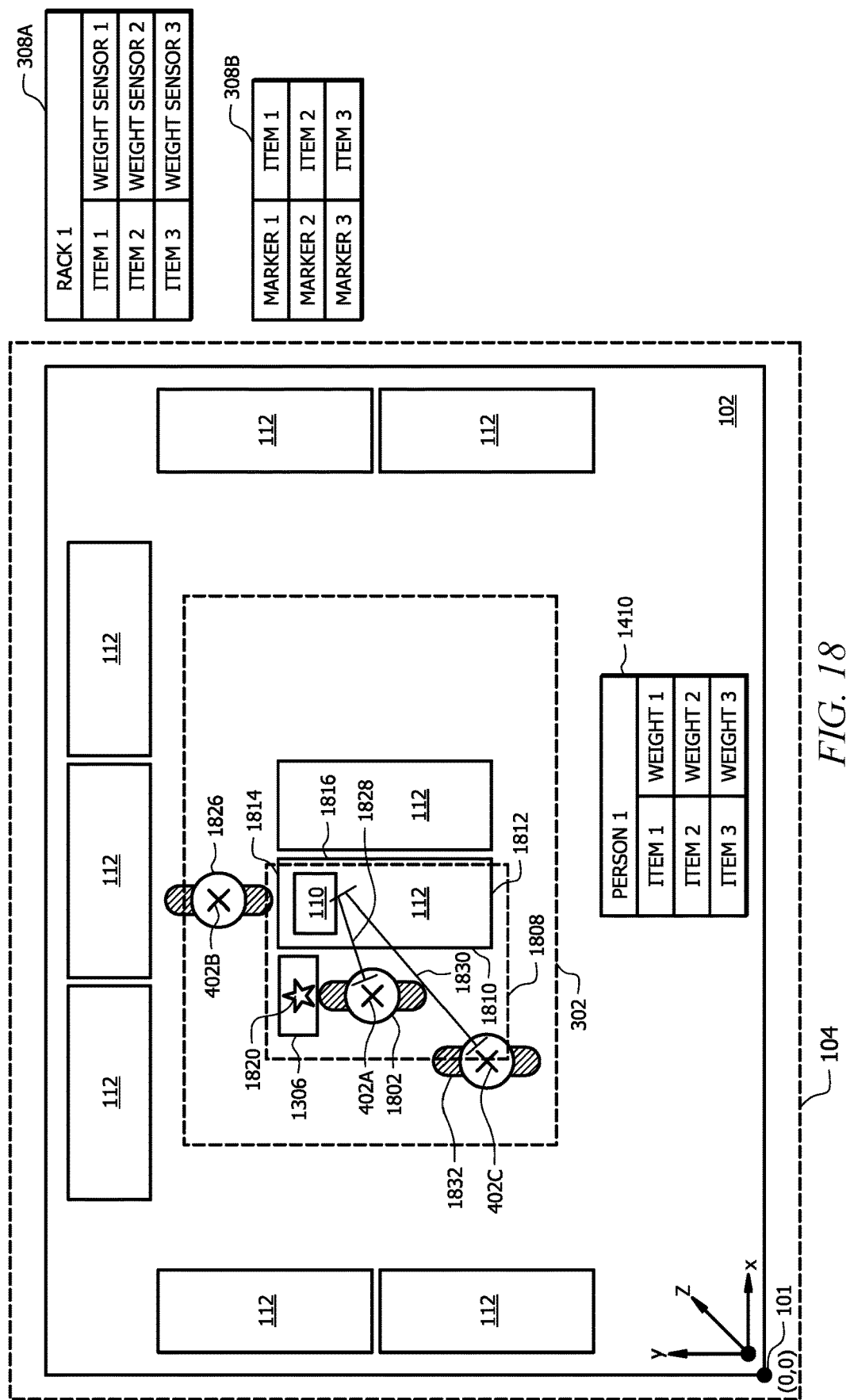
FIG. 18 is an example of an item identification process for the tracking system.

At step 1502, the tracking system 100 detects a weight decrease on a weight sensor 110. Referring to FIG. 18 as an example, the weight sensor 110 is disposed on a rack 112 and is configured to measure a weight for the items 1306 that are placed on the weight sensor 110. In this example, the weight sensor 110 is associated with a particular item 1306. The tracking system 100 detects a weight decrease on the weight sensor 110 when a person 1802 removes one or more items 1306 from the weight sensor 110.

Returning to FIG. 15 at step 1504, the tracking system 100 identifies an item 1306 associated with the weight sensor 110. In one embodiment, the tracking system 100 comprises an item map 1308A that associates items 1306 with particular locations (e.g. zones 1304 and/or shelves 1302) and weight sensors 110 on the rack 112. For example, an item map 1308A may comprise a rack identifier, weight sensor identifiers, and a plurality of item identifiers. Each item identifier is mapped to a particular weight sensor 110 (i.e. weight sensor identifier) on the rack 112. The tracking system 100 determines which weight sensor 110 detected a weight decrease and then identifies the item 1306 or item identifier that corresponds with the weight sensor 110 using the item map 1308A.

At step 1506, the tracking system 100 receives a frame 302 of the rack 112 from a sensor 108. The sensor 108 captures a frame 302 of at least a portion of the rack 112 within the global plane 104 for the space 102. The frame 302 comprises a plurality of pixels that are each associated with a pixel location 402. Each pixel location 402 comprises a pixel row and a pixel column. The pixel row and the pixel column indicate the location of a pixel within the frame 302.

The frame 302 comprises a predefined zone 1808 that is associated with the rack 112. The predefined zone 1808 is used for identifying people that are proximate to the front of the rack 112 and in a suitable position for retrieving items 1306 from the rack 112. For example, the rack 112 comprises a front portion 1810, a first side portion 1812, a second side portion 1814, and a back portion 1814. In this example, a person may be able to retrieve items 1306 from the rack 112 when they are either in front or to the side of the rack 112. A person is unable to retrieve items 1306 from the rack 112 when they are behind the rack 112. In this case, the predefined zone 1808 may overlap with at least a portion of the front portion 1810, the first side portion 1812, and the second side portion 1814 of the rack 112 in the frame 1806. This configuration prevents people that are behind the rack 112 from being considered as a person who picked up an item 1306 from the rack 112. In FIG. 18, the predefined zone 1808 is rectangular. In other examples, the predefined zone 1808 may be semi-circular or in any other suitable shape.

After the tracking system 100 determines that an item 1306 has been picked up from the rack 112, the tracking system 100 then begins to identify people within the frame 302 that may have picked up the item 1306 from the rack 112. At step 1508, the tracking system 100 identifies a person 1802 within the frame 302. The tracking system 100 may identify a person 1802 within the frame 302 using a process similar to the process described in step 1004 of FIG. 10. In other examples, the tracking system 100 may employ any other suitable technique for identifying a person 1802 within the frame 302.

At step 1510, the tracking system 100 determines a pixel location 402A in the frame 302 for the identified person 1802. The tracking system 100 may determine a pixel location 402A for the identified person 1802 using a process similar to the process described in step 1004 of FIG. 10. The pixel location 402A comprises a pixel row and a pixel column that identifies the location of the person 1802 in the frame 302 of the sensor 108.

At step 1511, the tracking system 100 applies a homography 118 to the pixel location 402A of the identified person 1802 to determine an (x,y) coordinate 306 in the global plane 104 for the identified person 1802. The homography 118 is configured to translate between pixel locations 402 in the frame 302 and (x,y) coordinates 306 in the global plane 104. The homography 118 is configured similarly to the homography 118 described in FIGS. 2-5B. As an example, the tracking system 100 may identify the homography 118 that is associated with the sensor 108 and may use matrix multiplication between the homography 118 and the pixel location 402A of the identified person 1802 to determine the (x,y) coordinate 306 in the global plane 104.

At step 1512, the tracking system 100 determines whether the identified person 1802 is within a predefined zone 1808 associated with the rack 112 in the frame 302. Continuing with the example in FIG. 18, the predefined zone 1808 is associated with a range of (x,y) coordinates 306 in the global plane 104. The tracking system 100 may compare the (x,y) coordinate 306 for the identified person 1802 to the range of (x,y) coordinates 306 that are associated with the predefined zone 1808 to determine whether the (x,y) coordinate 306 for the identified person 1802 is within the predefined zone 1808. In other words, the tracking system 100 uses the (x,y) coordinate 306 for the identified person 1802 to determine whether the identified person 1802 is within an area suitable for picking up items 1306 from the rack 112. In this example, the (x,y) coordinate 306 for the person 1802 corresponds with a location in front of the rack 112 and is within the predefined zone 1808 which means that the identified person 1802 is in a suitable area for retrieving items 1306 from the rack 112.

In another embodiment, the predefined zone 1808 is associated with a plurality of pixels (e.g. a range of pixel rows and pixel columns) in the frame 302. The tracking system 100 may compare the pixel location 402A to the pixels associated with the predefined zone 1808 to determine whether the pixel location 402A is within the predefined zone 1808. In other words, the tracking system 100 uses the pixel location 402A of the identified person 1802 to determine whether the identified person 1802 is within an area suitable for picking up items 1306 from the rack 112. In this example, the tracking system 100 may compare the pixel column of the pixel location 402A with a range of pixel columns associated with the predefined zone 1808 and the pixel row of the pixel location 402A with a range of pixel rows associated with the predefined zone 1808 to determine whether the identified person 1802 is within the predefined zone 1808. In this example, the pixel location 402A for the person 1802 is standing in front of the rack 112 and is within the predefined zone 1808 which means that the identified person 1802 is in a suitable area for retrieving items 1306 from the rack 112.

The tracking system 100 proceeds to step 1514 in response to determining that the identified person 1802 is within the predefined zone 1808. Otherwise, the tracking system 100 returns to step 1508 to identify another person within the frame 302. In this case, the tracking system 100 determines the identified person 1802 is not in a suitable area for retrieving items 1306 from the rack 112, for example, the identified person 1802 is standing behind the rack 112.

In some instances, multiple people may be near the rack 112 and the tracking system 100 may need to determine which person is interacting with the rack 112 so that it can add a picked-up item 1306 to the appropriate person's digital cart 1410. Returning to the example in FIG. 18, a second person 1826 is standing next to the side of rack 112 in the frame 302 when the first person 1802 picks up an item 1306 from the rack 112. In this example, the second person 1826 is closer to the rack 112 than the first person 1802, however, the tracking system 100 can ignore the second person 1826 because the pixel location 402B of the second person 1826 is outside of the predetermined zone 1808 that is associated with the rack 112. For example, the tracking system 100 may identify an (x,y) coordinate 306 in the global plane 104 for the second person 1826 and determine that the second person 1826 is outside of the predefined zone 1808 based on their (x,y) coordinate 306. As another example, the tracking system 100 may identify a pixel location 402B within the frame 302 for the second person 1826 and determine that the second person 1826 is outside of the predefined zone 1808 based on their pixel location 402B.

As another example, the frame 302 further comprises a third person 1832 standing near the rack 112. In this case, the tracking system 100 determines which person picked up the item 1306 based on their proximity to the item 1306 that was picked up. For example, the tracking system 100 may determine an (x,y) coordinate 306 in the global plane 104 for the third person 1832. The tracking system 100 may then determine a first distance 1828 between the (x,y) coordinate 306 of the first person 1802 and the location on the rack 112 where the item 1306 was picked up. The tracking system 100 also determines a second distance 1830 between the (x,y) coordinate 306 of the third person 1832 and the location on the rack 112 where the item 1306 was picked up. The tracking system 100 may then determine that the first person 1802 is closer to the item 1306 than the third person 1832 when the first distance 1828 is less than the second distance 1830. In this example, the tracking system 100 identifies the first person 1802 as the person that most likely picked up the item 1306 based on their proximity to the location on the rack 112 where the item 1306 was picked up. This process allows the tracking system 100 to identify the correct person that picked up the item 1306 from the rack 112 before adding the item 1306 to their digital cart 1410.

As another example, the tracking system 100 may determine a pixel location 402C in the frame 302 for a third person 1832. The tracking system 100 may then determine the first distance 1828 between the pixel location 402A of the first person 1802 and the location on the rack 112 where the item 1306 was picked up. The tracking system 100 also determines the second distance 1830 between the pixel location 402C of the third person 1832 and the location on the rack 112 where the item 1306 was picked up.

Returning to FIG. 15 at step 1514, the tracking system 100 adds the item 1306 to a digital cart 1410 that is associated with the identified person 1802. The tracking system 100 may add the item 1306 to the digital cart 1410 using a process similar to the process described in step 1224 of FIG. 12.

Item Identification

Figure 16:
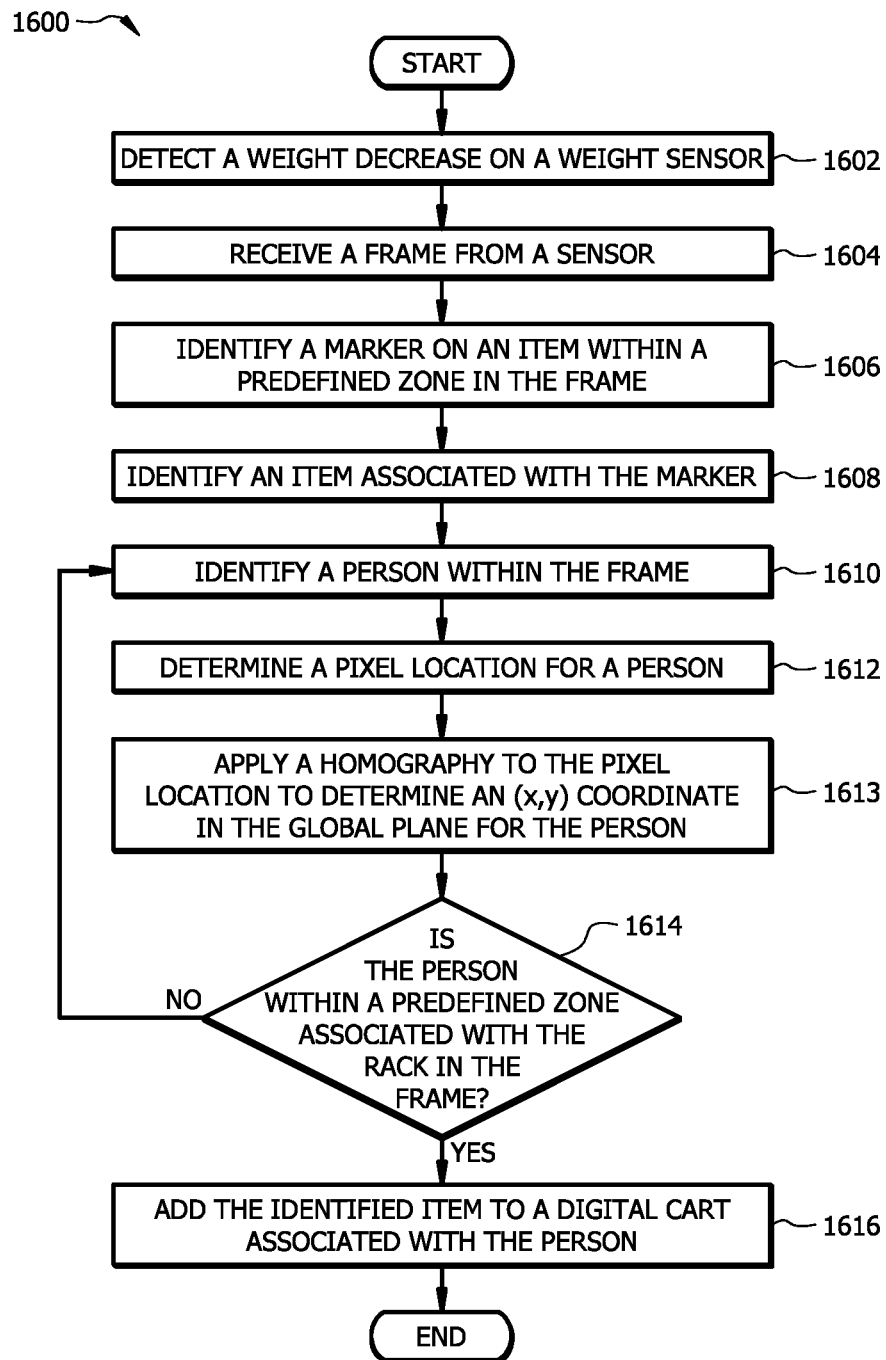
FIG. 16 is a flowchart of an embodiment of an item identification method for the tracking system.

FIG. 16 is a flowchart of an embodiment of an item identification method 1600 for the tracking system 100. The tracking system 100 may employ method 1600 to identify an item 1306 that has a non-uniform weight and to assign the item 1306 to a person's digital cart 1410. For items 1306 with a uniform weight, the tracking system 100 is able to determine the number of items 1306 that are removed from a weight sensor 110 based on a weight difference on the weight sensor 110. However, items 1306 such as fresh food do not have a uniform weight which means that the tracking system 100 is unable to determine how many items 1306 were removed from a shelf 1302 based on weight measurements. In this configuration, the tracking system 100 uses a sensor 108 to identify markers 1820 (e.g. text or symbols) on an item 1306 that has been picked up and to identify a person near the rack 112 where the item 1306 was picked up. For example, a marker 1820 may be located on the packaging of an item 1806 or on a strap for carrying the item 1806. Once the item 1306 and the person have been identified, the tracking system 100 can add the item 1306 to a digital cart 1410 that is associated with the identified person.

At step 1602, the tracking system 100 detects a weight decrease on a weight sensor 110. Returning to the example in FIG. 18, the weight sensor 110 is disposed on a rack 112 and is configured to measure a weight for the items 1306 that are placed on the weight sensor 110. In this example, the weight sensor 110 is associated with a particular item 1306. The tracking system 100 detects a weight decrease on the weight sensor 110 when a person 1802 removes one or more items 1306 from the weight sensor 110.

After the tracking system 100 detects that an item 1306 was removed from a rack 112, the tracking system 100 will use a sensor 108 to identify the item 1306 that was removed and the person who picked up the item 1306. Returning to FIG. 16 at step 1604, the tracking system 100 receives a frame 302 from a sensor 108. The sensor 108 captures a frame 302 of at least a portion of the rack 112 within the global plane 104 for the space 102. In the example shown in FIG. 18, the sensor 108 is configured such that the frame 302 from the sensor 108 captures an overhead view of the rack 112. The frame 302 comprises a plurality of pixels that are each associated with a pixel location 402. Each pixel location 402 comprises a pixel row and a pixel column. The pixel row and the pixel column indicate the location of a pixel within the frame 302.

The frame 302 comprises a predefined zone 1808 that is configured similar to the predefined zone 1808 described in step 1504 of FIG. 15. In one embodiment, the frame 1806 may further comprise a second predefined zone that is configured as a virtual curtain similar to the predefined zone 1406 that is described in FIGS. 12-14. For example, the tracking system 100 may use the second predefined zone to detect that the person's 1802 hand reaches for an item 1306 before detecting the weight decrease on the weight sensor 110. In this example, the second predefined zone is used to alert the tracking system 100 that an item 1306 is about to be picked up from the rack 112 which may be used to trigger the sensor 108 to capture a frame 302 that includes the item 1306 being removed from the rack 112.

At step 1606, the tracking system 100 identifies a marker 1820 on an item 1306 within a predefined zone 1808 in the frame 302. A marker 1820 is an object with unique features that can be detected by a sensor 108. For instance, a marker 1820 may comprise a uniquely identifiable shape, color, symbol, pattern, text, a barcode, a QR code, or any other suitable type of feature. The tracking system 100 may search the frame 302 for known features that correspond with a marker 1820. Referring to the example in FIG. 18, the tracking system 100 may identify a shape (e.g. a star) on the packaging of the item 1806 in the frame 302 that corresponds with a marker 1820. As another example, the tracking system 100 may use character or text recognition to identify alphanumeric text that corresponds with a marker 1820 when the marker 1820 comprises text. In other examples, the tracking system 100 may use any other suitable technique to identify a marker 1820 within the frame 302.

Returning to FIG. 16 at step 1608, the tracking system 100 identifies an item 1306 associated with the marker 1820. In one embodiment, the tracking system 100 comprises an item map 1308B that associates items 1306 with particular markers 1820. For example, an item map 1308B may comprise a plurality of item identifiers that are each mapped to a particular marker 1820 (i.e. marker identifier). The tracking system 100 identifies the item 1306 or item identifier that corresponds with the marker 1820 using the item map 1308B.

In some embodiments, the tracking system 100 may also use information from a weight sensor 110 to identify the item 1306. For example, the tracking system 100 may comprise an item map 1308A that associates items 1306 with particular locations (e.g. zone 1304 and/or shelves 1302) and weight sensors 110 on the rack 112. For example, an item map 1308A may comprise a rack identifier, weight sensor identifiers, and a plurality of item identifiers. Each item identifier is mapped to a particular weight sensor 110 (i.e. weight sensor identifier) on the rack 112. The tracking system 100 determines which weight sensor 110 detected a weight decrease and then identifies the item 1306 or item identifier that corresponds with the weight sensor 110 using the item map 1308A.

After the tracking system 100 identifies the item 1306 that was picked up from the rack 112, the tracking system 100 then determines which person picked up the item 1306 from the rack 112. At step 1610, the tracking system 100 identifies a person 1802 within the frame 302. The tracking system 100 may identify a person 1802 within the frame 302 using a process similar to the process described in step 1004 of FIG. 10. In other examples, the tracking system 100 may employ any other suitable technique for identifying a person 1802 within the frame 302.

At step 1612, the tracking system 100 determines a pixel location 402A for the identified person 1802. The tracking system 100 may determine a pixel location 402A for the identified person 1802 using a process similar to the process described in step 1004 of FIG. 10. The pixel location 402A comprises a pixel row and a pixel column that identifies the location of the person 1802 in the frame 302 of the sensor 108.

At step 1613, the tracking system 100 applies a homography 118 to the pixel location 402A of the identified person 1802 to determine an (x,y) coordinate 306 in the global plane 104 for the identified person 1802. The tracking system 100 may determine the (x,y) coordinate 306 in the global plane 104 for the identified person 1802 using a process similar to the process described in step 1511 of FIG. 15.

At step 1614, the tracking system 100 determines whether the identified person 1802 is within the predefined zone 1808. Here, the tracking system 100 determines whether the identified person 1802 is in a suitable area for retrieving items 1306 from the rack 112. The tracking system 100 may determine whether the identified person 1802 is within the predefined zone 1808 using a process similar to the process described in step 1512 of FIG. 15. The tracking system 100 proceeds to step 1616 in response to determining that the identified person 1802 is within the predefined zone 1808. In this case, the tracking system 100 determines the identified person 1802 is in a suitable area for retrieving items 1306 from the rack 112, for example the identified person 1802 is standing in front of the rack 112. Otherwise, the tracking system 100 returns to step 1610 to identify another person within the frame 302. In this case, the tracking system 100 determines the identified person 1802 is not in a suitable area for retrieving items 1306 from the rack 112, for example the identified person 1802 is standing behind of the rack 112.

In some instances, multiple people may be near the rack 112 and the tracking system 100 may need to determine which person is interacting with the rack 112 so that it can add a picked-up item 1306 to the appropriate person's digital cart 1410. The tracking system 100 may identify which person picked up the item 1306 from the rack 112 using a process similar to the process described in step 1512 of FIG. 15.

At step 1614, the tracking system 100 adds the item 1306 to a digital cart 1410 that is associated with the person 1802. The tracking system 100 may add the item 1306 to the digital cart 1410 using a process similar to the process described in step 1224 of FIG. 12.

Misplaced Item Identification

Figure 17:
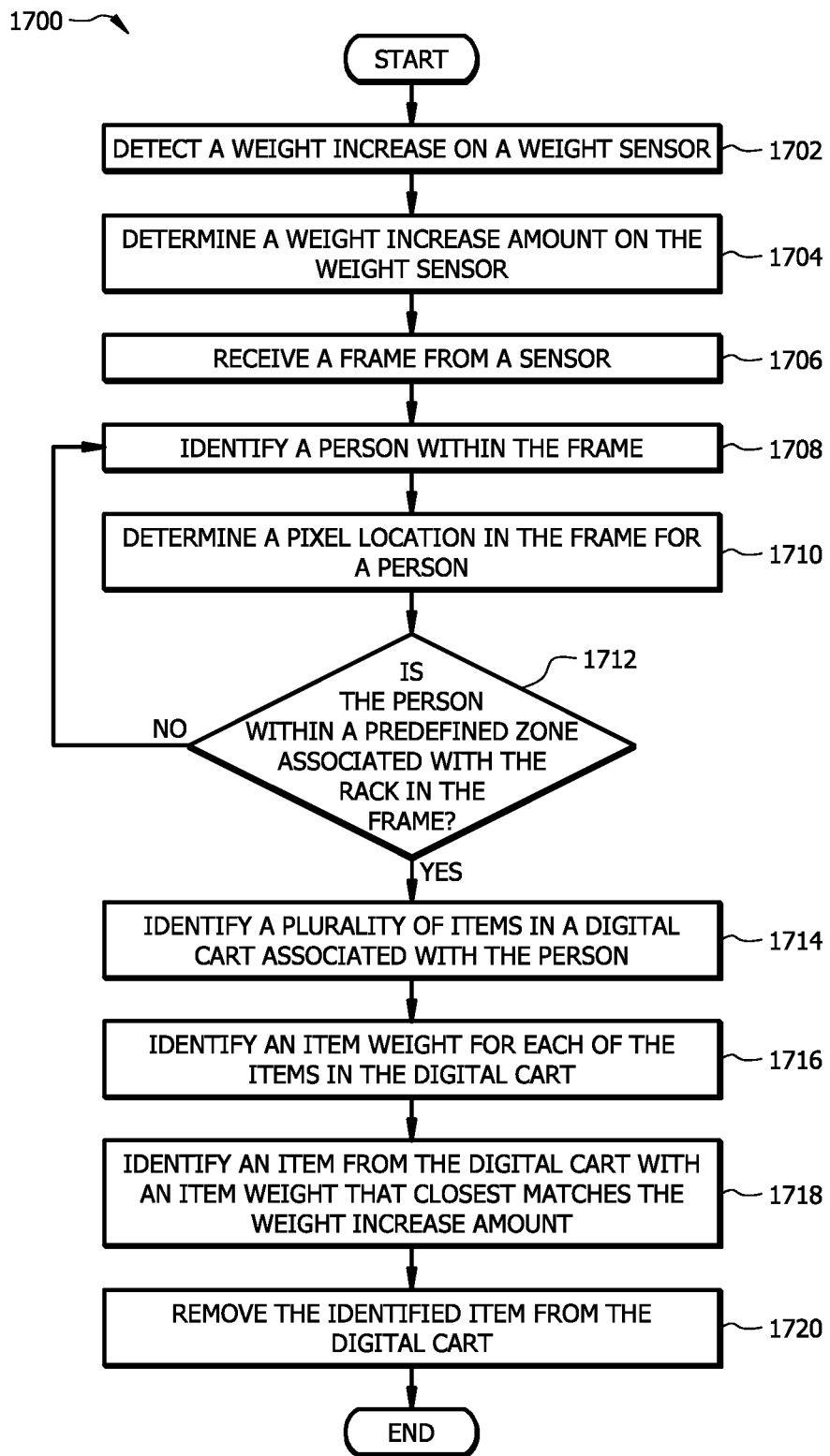
FIG. 17 is a flowchart of an embodiment of a misplaced item identification method for the tracking system.

FIG. 17 is a flowchart of an embodiment of a misplaced item identification method 1700 for the tracking system 100. The tracking system 100 may employ method 1700 to identify items 1306 that have been misplaced on a rack 112. While a person is shopping, the shopper may decide to put down one or more items 1306 that they have previously picked up. In this case, the tracking system 100 should identify which items 1306 were put back on a rack 112 and which shopper put the items 1306 back so that the tracking system 100 can remove the items 1306 from their digital cart 1410. Identifying an item 1306 that was put back on a rack 112 is challenging because the shopper may not put the item 1306 back in its correct location. For example, the shopper may put back an item 1306 in the wrong location on the rack 112 or on the wrong rack 112. In either of these cases, the tracking system 100 has to correctly identify both the person and the item 1306 so that the shopper is not charged for item 1306 when they leave the space 102. In this configuration, the tracking system 100 uses a weight sensor 110 to first determine that an item 1306 was not put back in its correct location. The tracking system 100 then uses a sensor 108 to identify the person that put the item 1306 on the rack 112 and analyzes their digital cart 1410 to determine which item 1306 they most likely put back based on the weights of the items 1306 in their digital cart 1410.

At step 1702, the tracking system 100 detects a weight increase on a weight sensor 110. Returning to the example in FIG. 18, a first person 1802 places one or more items 1306 back on a weight sensor 110 on the rack 112. The weight sensor 110 is configured to measure a weight for the items 1306 that are placed on the weight sensor 110. The tracking system 100 detects a weight increase on the weight sensor 110 when a person 1802 adds one or more items 1306 to the weight sensor 110.

At step 1704, the tracking system 100 determines a weight increase amount on the weight sensor 110 in response to detecting the weight increase on the weight sensor 110. The weight increase amount corresponds with a magnitude of the weight change detected by the weight sensor 110. Here, the tracking system 100 determines how much of a weight increase was experienced by the weight sensor 110 after one or more items 1306 were placed on the weight sensor 110.

In one embodiment, the tracking system 100 determines that the item 1306 placed on the weight sensor 110 is a misplaced item 1306 based on the weight increase amount. For example, the weight sensor 110 may be associated with an item 1306 that has a known individual item weight. This means that the weight sensor 110 is only expected to experience weight changes that are multiples of the known item weight. In this configuration, the tracking system 100 may determine that the returned item 1306 is a misplaced item 1306 when the weight increase amount does not match the individual item weight or multiples of the individual item weight for the item 1306 associated with the weight sensor 110. As an example, the weight sensor 110 may be associated with an item 1306 that has an individual weight of ten ounces. If the weight sensor 110 detects a weight increase of twenty-five ounces, the tracking system 100 can determine that the item 1306 placed weight sensor 114 is not an item 1306 that is associated with the weight sensor 110 because the weight increase amount does not match the individual item weight or multiples of the individual item weight for the item 1306 that is associated with the weight sensor 110.

After the tracking system 100 detects that an item 1306 has been placed back on the rack 112, the tracking system 100 will use a sensor 108 to identify the person that put the item 1306 back on the rack 112. At step 1706, the tracking system 100 receives a frame 302 from a sensor 108. The sensor 108 captures a frame 302 of at least a portion of the rack 112 within the global plane 104 for the space 102. In the example shown in FIG. 18, the sensor 108 is configured such that the frame 302 from the sensor 108 captures an overhead view of the rack 112. The frame 302 comprises a plurality of pixels that are each associated with a pixel location 402. Each pixel location 402 comprises a pixel row and a pixel column. The pixel row and the pixel column indicate the location of a pixel within the frame 302. In some embodiments, the frame 302 further comprises a predefined zone 1808 that is configured similar to the predefined zone 1808 described in step 1504 of FIG. 15.

At step 1708, the tracking system 100 identifies a person 1802 within the frame 302. The tracking system 100 may identify a person 1802 within the frame 302 using a process similar to the process described in step 1004 of FIG. 10. In other examples, the tracking system 100 may employ any other suitable technique for identifying a person 1802 within the frame 302.

At step 1710, the tracking system 100 determines a pixel location 402A in the frame 302 for the identified person 1802. The tracking system 100 may determine a pixel location 402A for the identified person 1802 using a process similar to the process described in step 1004 of FIG. 10. The pixel location 402A comprises a pixel row and a pixel column that identifies the location of the person 1802 in the frame 302 of the sensor 108.

At step 1712, the tracking system 100 determines whether the identified person 1802 is within a predefined zone 1808 of the frame 302. Here, the tracking system 100 determines whether the identified person 1802 is in a suitable area for putting items 1306 back on the rack 112. The tracking system 100 may determine whether the identified person 1802 is within the predefined zone 1808 using a process similar to the process described in step 1512 of FIG. 15. The tracking system 100 proceeds to step 1714 in response to determining that the identified person 1802 is within the predefined zone 1808. In this case, the tracking system 100 determines the identified person 1802 is in a suitable area for putting items 1306 back on the rack 112, for example the identified person 1802 is standing in front of the rack 112. Otherwise, the tracking system 100 returns to step 1708 to identify another person within the frame 302. In this case, the tracking system 100 determines the identified person is not in a suitable area for retrieving items 1306 from the rack 112, for example the person is standing behind of the rack 112.

In some instances, multiple people may be near the rack 112 and the tracking system 100 may need to determine which person is interacting with the rack 112 so that it can remove the returned item 1306 from the appropriate person's digital cart 1410. The tracking system 100 may determine which person put back the item 1306 on the rack 112 using a process similar to the process described in step 1512 of FIG. 15. After the tracking system 100 identifies which person put back the item 1306 on the rack 112, the tracking system 100 then determines which item 1306 from the identified person's digital cart 1410 has a weight that closest matches the item 1306 that was put back on the rack 112. At step 1714, the tracking system 100 identifies a plurality of items 1306 in a digital cart 1410 that is associated with the person 1802. Here, the tracking system 100 identifies the digital cart 1410 that is associated with the identified person 1802. For example, the digital cart 1410 may be linked with the identified person's 1802 object identifier 1118. In one embodiment, the digital cart 1410 comprises item identifiers that are each associated with an individual item weight. At step 1716, the tracking system 100 identifies an item weight for each of the items 1306 in the digital cart 1410. In one embodiment, the tracking system 100 may comprise a set of item weights stored in memory and may look up the item weight for each item 1306 using the item identifiers that are associated with the item's 1306 in the digital cart 1410.

At step 1718, the tracking system 100 identifies an item 1306 from the digital cart 1410 with an item weight that closest matches the weight increase amount. For example, the tracking system 100 may compare the weight increase amount measured by the weight sensor 110 to the item weights associated with each of the items 1306 in the digital cart 1410. The tracking system 100 may then identify which item 1306 corresponds with an item weight that closest matches the weight increase amount.

In some cases, the tracking system 100 is unable to identify an item 1306 in the identified person's digital cart 1410 that a weight that matches the measured weight increase amount on the weight sensor 110. In this case, the tracking system 100 may determine a probability that an item 1306 was put down for each of the items 1306 in the digital cart 1410. The probability may be based on the individual item weight and the weight increase amount. For example, an item 1306 with an individual weight that is closer to the weight increase amount will be associated with a higher probability than an item 1306 with an individual weight that is further away from the weight increase amount.

In some instances, the probabilities are a function of the distance between a person and the rack 112. In this case, the probabilities associated with items 1306 in a person's digital cart 1410 depend on how close the person is to the rack 112 where the item 1306 was put back. For example, the probabilities associated with the items 1306 in the digital cart 1410 may be inversely proportional to the distance between the person and the rack 112. In other words, the probabilities associated with the items in a person's digital cart 1410 decay as the person moves further away from the rack 112. The tracking system 100 may identify the item 1306 that has the highest probability of being the item 1306 that was put down.

In some cases, the tracking system 100 may consider items 1306 that are in multiple people's digital carts 1410 when there are multiple people within the predefined zone 1808 that is associated with the rack 112. For example, the tracking system 100 may determine a second person is within the predefined zone 1808 that is associated with the rack 112. In this example, the tracking system 100 identifies items 1306 from each person's digital cart 1410 that may correspond with the item 1306 that was put back on the rack 112 and selects the item 1306 with an item weight that closest matches the item 1306 that was put back on the rack 112. For instance, the tracking system 100 identifies item weights for items 1306 in a second digital cart 1410 that is associated with the second person. The tracking system 100 identifies an item 1306 from the second digital cart 1410 with an item weight that closest matches the weight increase amount. The tracking system 100 determines a first weight difference between a first identified item 1306 from digital cart 1410 of the first person 1802 and the weight increase amount and a second weight difference between a second identified item 1306 from the second digital cart 1410 of the second person. In this example, the tracking system 100 may determine that the first weight difference is less than the second weight difference, which indicates that the item 1306 identified in the first person's digital cart 1410 closest matches the weight increase amount, and then removes the first identified item 1306 from their digital cart 1410.

After the tracking system 100 identifies the item 1306 that most likely put back on the rack 112 and the person that put the item 1306 back, the tracking system 100 removes the item 1306 from their digital cart 1410. At step 1720, the tracking system 100 removes the identified item 1306 from the identified person's digital cart 1410. Here, the tracking system 100 discards information associated with the identified item 1306 from the digital cart 1410. This process ensures that the shopper will not be charged for item 1306 that they put back on a rack 112 regardless of whether they put the item 1306 back in its correct location.

Auto-Exclusion Zones

In order to track the movement of people in the space 102, the tracking system 100 should generally be able to distinguish between the people (i.e., the target objects) and other objects (i.e., non-target objects), such as the racks 112, displays, and any other non-human objects in the space 102. Otherwise, the tracking system 100 may waste memory and processing resources detecting and attempting to track these non-target objects. As described elsewhere in this disclosure (e.g., in FIGS. 24-26 and corresponding description below), in some cases, people may be tracked may be performed by detecting one or more contours in a set of image frames (e.g., a video) and monitoring movements of the contour between frames. A contour is generally a curve associated with an edge of a representation of a person in an image. While the tracking system 100 may detect contours in order to track people, in some instances, it may be difficult to distinguish between contours that correspond to people (e.g., or other target objects) and contours associated with non-target objects, such as racks 112, signs, product displays, and the like.

Even if sensors 108 are calibrated at installation to account for the presence of non-target objects, in many cases, it may be challenging to reliably and efficiently recalibrate the sensors 108 to account for changes in positions of non-target objects that should not be tracked in the space 102. For example, if a rack 112, sign, product display, or other furniture or object in space 102 is added, removed, or moved (e.g., all activities which may occur frequently and which may occur without warning and/or unintentionally), one or more of the sensors 108 may require recalibration or adjustment. Without this recalibration or adjustment, it is difficult or impossible to reliably track people in the space 102. Prior to this disclosure, there was a lack of tools for efficiently recalibrating and/or adjusting sensors, such as sensors 108, in a manner that would provide reliable tracking.

This disclosure encompasses the recognition not only of the previously unrecognized problems described above (e.g., with respect to tracking people in space 102, which may change over time) but also provides unique solutions to these problems. As described in this disclosure, during an initial time period before people are tracked, pixel regions from each sensor 108 may be determined that should be excluded during subsequent tracking. For example, during the initial time period, the space 102 may not include any people such that contours detected by each sensor 108 correspond only to non-target objects in the space for which tracking is not desired. Thus, pixel regions, or "auto-exclusion zones," corresponding to portions of each image generated by sensors 108 that are not used for object detection and tracking (e.g., the pixel coordinates of contours that should not be tracked). For instance, the auto-exclusion zones may correspond to contours detected in images that are associated with non-target objects, contours that are spuriously detected at the edges of a sensor's field-of-view, and the like). Auto-exclusion zones can be determined automatically at any desired or appropriate time interval to improve the usability and performance of the tracking system 100.

After the auto-exclusion zones are determined, the tracking system 100 may proceed to track people in the space 102. The auto-exclusion zones are used to limit the pixel regions used by each sensor 108 for tracking people. For example, pixels corresponding to auto-exclusion zones may be ignored by the tracking system 100 during tracking. In some cases, a detected person (or other target object) may be near or partially overlapping with one or more auto-exclusion zones. In these cases, the tracking system 100 may determine, based on the extent to which a potential target object's position overlaps with the auto-exclusion zone, whether the target object will be tracked. This may reduce or eliminate false positive detection of non-target objects during person tracking in the space 102, while also improving the efficiency of the tracking system 100 by reducing wasted processing resources that would otherwise be expended attempting to track non-target objects. In some embodiments, a map of the space 102 may be generated that presents the physical regions that are excluded during tracking (i.e., a map that presents a representation of the auto-exclusion zone(s) in the physical coordinates of the space). Such a map, for example, may facilitate trouble-shooting of the tracking system by allowing an administrator to visually confirm that people can be tracked in appropriate portions of the space 102.

Figure 19:
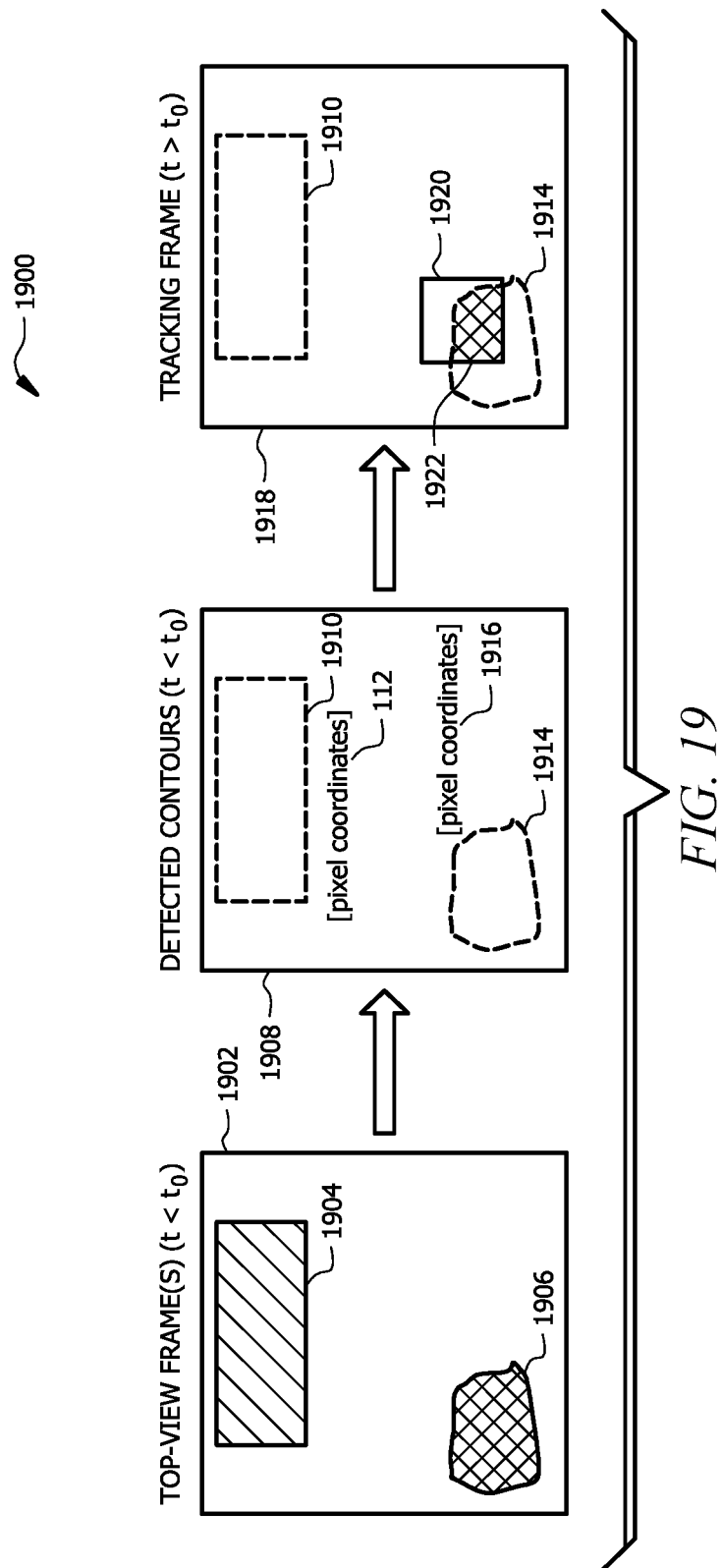
FIG. 19 is a diagram illustrating the determination and use of auto-exclusion zones by the tracking system.

FIG. 19 illustrates the determination of auto-exclusion zones 1910, 1914 and the subsequent use of these auto-exclusion zones 1910, 1914 for improved tracking of people (e.g., or other target objects) in the space 102. In general, during an initial time period ($t<t_0$), top-view image frames are received by the client(s) 105 and/or server 106 from sensors 108 and used to determine auto-exclusion zones 1910, 1914. For instance, the initial time period at $t<t_0$ may correspond to a time when no people are in the space 102. For example, if the space 102 is open to the public during a portion of the day, the initial time period may be before the space 102 is opened to the public. In some embodiments, the server 106 and/or client 105 may provide, for example, an alert or transmit a signal indicating that the space 102 should be emptied of people (e.g., or other target objects to be tracked) in order for auto-exclusion zones 1910, 1914 to be identified. In some embodiments, a user may input a command (e.g., via any appropriate interface coupled to the server 106 and/or client(s) 105) to initiate the determination of auto-exclusion zones 1910, 1914 immediately or at one or more desired times in the future (e.g., based on a schedule).

An example top-view image frame 1902 used for determining auto-exclusion zones 1910, 1914 is shown in FIG. 19. Image frame 1902 includes a representation of a first object 1904 (e.g., a rack 112) and a representation of a second object 1906. For instance, the first object 1904 may be a rack 112, and the second object 1906 may be a product display or any other non-target object in the space 102. In some embodiments, the second object 1906 may not correspond to an actual object in the space but may instead be detected anomalously because of lighting in the space 102 and/or a sensor error. Each sensor 108 generally generates at least one frame 1902 during the initial time period, and these frame(s) 1902 is/are used to determine corresponding auto-exclusion zones 1910, 1914 for the sensor 108. For instance, the sensor client 105 may receive the top-view image 1902, and detect contours (i.e., the dashed lines around zones 1910, 1914) corresponding to the auto-exclusion zones 1910, 1914 as illustrated in view 1908. The contours of auto-exclusion zones 1910, 1914 generally correspond to curves that extend along a boundary (e.g., the edge) of objects 1904, 1906 in image 1902. The view 1908 generally corresponds to a presentation of image 1902 in which the detected contours corresponding to auto-exclusion zones 1910, 1914 are presented but the corresponding objects 1904, 1906, respectively, are not shown. For an image frame 1902 that includes color and depth data, contours for auto-exclusion zones 1910, 1914 may be determined at a given depth (e.g., a distance away from sensor 108) based on the color data in the image 1902. For example, a steep gradient of a color value may correspond to an edge of an object and is used to determine, or detect, a contour. For example, contours for the auto-exclusion zones 1910, 1914 may be determined using any suitable contour or edge detection method such as Canny edge detection, threshold-based detection, or the like.

The client 105 determines pixel coordinates 1912 and 1916 corresponding to the locations of the auto-exclusions zones 1910 and 1914, respectively. The pixel coordinates 1912, 1916 generally correspond to the locations (e.g., row and column numbers) in the image frame 1902 that should be excluded during tracking. In general, objects associated with the pixel coordinates 1912, 1916 are not tracked by the tracking system 100. Moreover, certain objects which are detected outside of the auto-exclusion zones 1910, 1914 may not be tracked under certain conditions. For instance, if the position of the object (e.g., the position associated with region 1920, discussed below with respect to view 1914) overlaps at least a threshold amount with an auto-exclusion zone 1910, 1914, the object may not be tracked. This prevents the tracking system 100 (i.e., or the local client 105 associated with a sensor 108 or a subset of sensors 108) from attempting to unnecessarily track non-target objects. In some cases, auto-exclusion zones 1910, 1914 correspond to non-target (e.g., inanimate) objects in the field-of-view of a sensor 108 (e.g., a rack 112, which is associated with contour 1910). However, auto-exclusion zones 1910, 1914 may also or alternatively correspond to other aberrant features or contours detected by a sensor 108 (e.g., caused by sensor errors, inconsistent lighting, or the like).

Following the determination of pixel coordinates 1912, 1916 to exclude during tracking, objects may be tracked during a subsequent time period corresponding to t>$t_0$. An example image frame 1918 generated during tracking is shown in FIG. 19. In frame 1918, region 1920 is detected as possibly corresponding to what may or may not be a target object. For example, region 1920 may correspond to a pixel mask or bounding box generated based on a contour detected in frame 1902. For example, a pixel mask may be generated to fill in the area inside the contour or a bounding box may be generated to encompass the contour. For example, a pixel mask may include the pixel coordinates within the corresponding contour. For instance, the pixel coordinates 1912 of auto-exclusion zone 1910 may effectively correspond to a mask that overlays or "fills in" the auto-exclusion zone 1910. Following the detection of region 1920, the client 105 determines whether the region 1920 corresponds to a target object which should tracked or is sufficiently overlapping with auto-exclusion zone 1914 to consider region 1920 as being associated with a non-target object. For example, the client 105 may determine whether at least a threshold percentage of the pixel coordinates 1916 overlap with (e.g., are the same as) pixel coordinates of region 1920. The overlapping region 1922 of these pixel coordinates is illustrated in frame 1918. For example, the threshold percentage may be about 50% or more. In some embodiments, the threshold percentage may be as small as about 10%. In response to determining that at least the threshold percentage of pixel coordinates overlap, the client 105 generally does not determine a pixel position for tracking the object associated with region 1920. However, if overlap 1922 correspond to less than the threshold percentage, an object associated with region 1920 is tracked, as described further below (e.g., with respect to FIGS. 24-26).

As described above, sensors 108 may be arranged such that adjacent sensors 108 have overlapping fields-of-view. For instance, fields-of-view of adjacent sensors 108 may overlap between about 10% to 30%. As such, the same object may be detected by two different sensors 108 and either included or excluded from tracking in the image frames received from each sensor 108 based on the unique auto-exclusion zones determined for each sensor 108. This may facilitate more reliable tracking than was previously possible, even when one sensor 108 may have a large auto-exclusion zone (i.e., where a large proportion of pixel coordinates in image frames generated by the sensor 108 are excluded from tracking). Accordingly, if one sensor 108 malfunctions, adjacent sensors 108 may still provide adequate tracking in the space 102.

Figure 20:
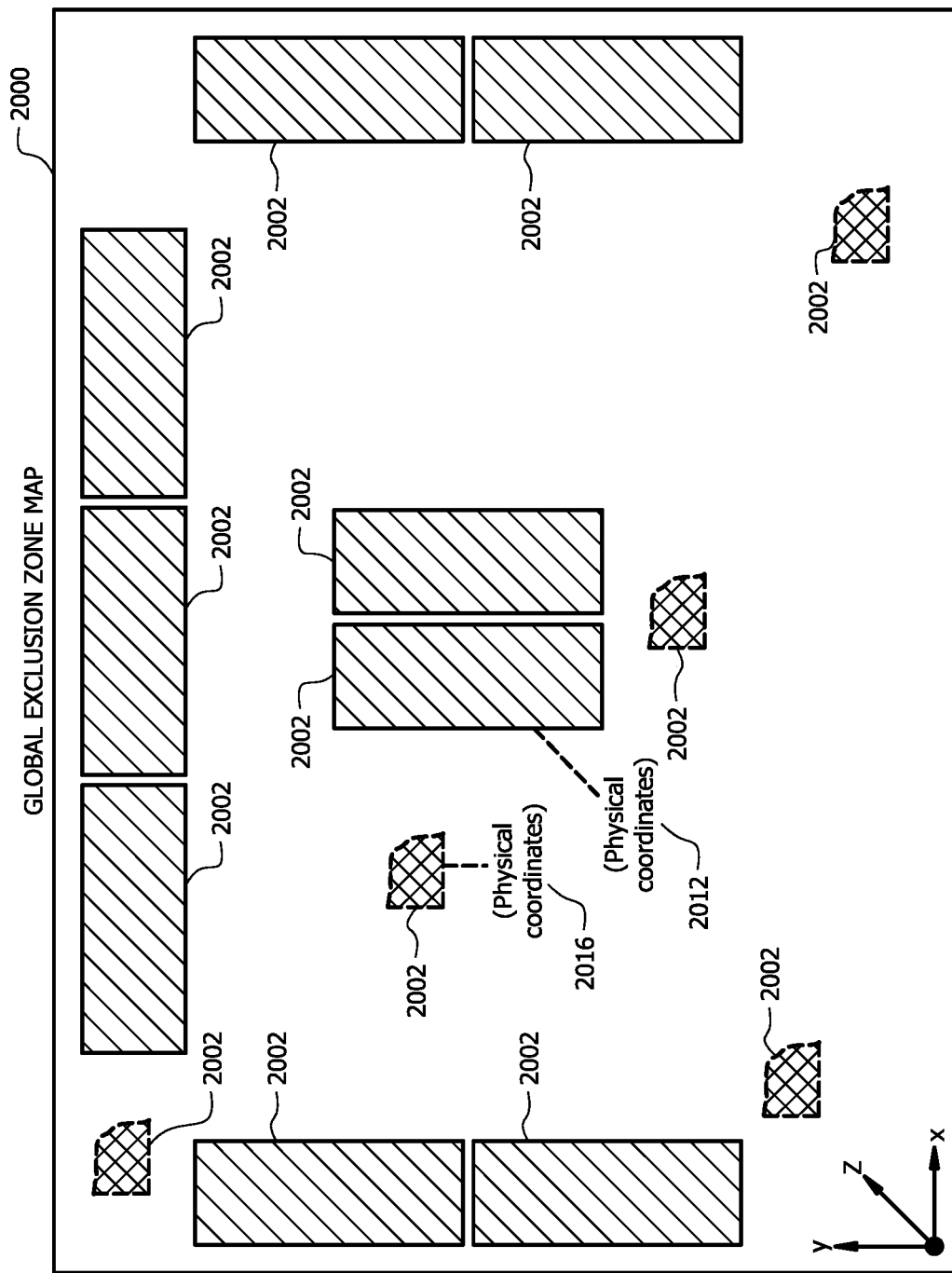
FIG. 20 is an example auto-exclusion zone map generated by the tracking system.

If region 1920 corresponds to a target object (i.e., a person to track in the space 102), the tracking system 100 proceeds to track the region 1920. Example methods of tracking are described in greater detail below with respect to FIGS. 24-26. In some embodiments, the server 106 uses the pixel coordinates 1912, 1916 to determine corresponding physical coordinates (e.g., coordinates 2012, 2016 illustrated in FIG. 20, described below). For instance, the client 105 may determine pixel coordinates 1912, 1916 corresponding to the local auto-exclusion zones 1910, 1914 of a sensor 108 and transmit these coordinates 1912, 1916 to the server 106. As shown in FIG. 20, the server 106 may use the pixel coordinates 1912, 1916 received from the sensor 108 to determine corresponding physical coordinates 2010, 2016. For instance, a homography generated for each sensor 108 (see FIGS. 2-7 and the corresponding description above), which associates pixel coordinates (e.g., coordinates 1912, 1916) in an image generated by a given sensor 108 to corresponding physical coordinates (e.g., coordinates 2012, 2016) in the space 102, may be employed to convert the excluded pixel coordinates 1912, 1916 (of FIG. 19) to excluded physical coordinates 2012, 2016 in the space 102. These excluded coordinates 2010, 2016 may be used along with other coordinates from other sensors 108 to generate the global auto-exclusion zone map 2000 of the space 102 which is illustrated in FIG. 20. This map 2000, for example, may facilitate trouble-shooting of the tracking system 100 by facilitating quantification, identification, and/or verification of physical regions 2002 of space 102 where objects may (and may not) be tracked. This may allow an administrator or other individual to visually confirm that objects can be tracked in appropriate portions of the space 102). If regions 2002 correspond to known high-traffic zones of the space 102, system maintenance may be appropriate (e.g., which may involve replacing, adjusting, and/or adding additional sensors 108).

Figure 21:
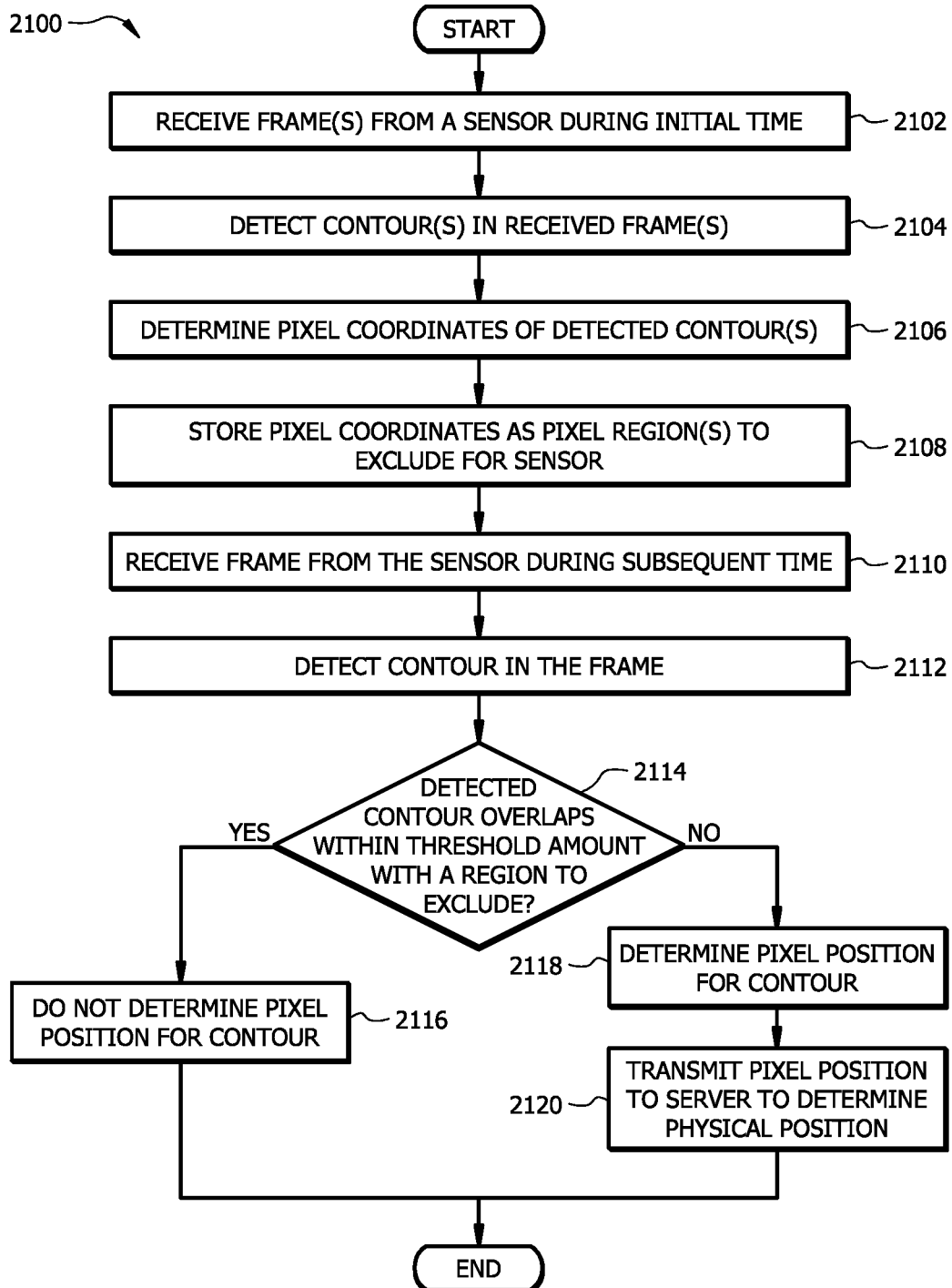
FIG. 21 is a flowchart illustrating an example method of generating and using auto-exclusion zones for object tracking using the tracking system.

FIG. 21 is a flowchart illustrating an example method 2100 for generating and using auto-exclusion zones (e.g., zones 1910, 1914 of FIG. 19). Method 2100 may begin at step 2102 where one or more image frames 1902 are received during an initial time period. As described above, the initial time period may correspond to an interval of time when no person is moving throughout the space 102, or when no person is within the field-of-view of one or more sensors 108 from which the image frame(s) 1902 is/are received. In a typical embodiment, one or more image frames 1902 are generally received from each sensor 108 of the tracking system 100, such that local regions (e.g., auto-exclusion zones 1910, 1914) to exclude for each sensor 108 may be determined. In some embodiments, a single image frame 1902 is received from each sensor 108 to detect auto-exclusion zones 1910, 1914. However, in other embodiments, multiple image frames 1902 are received from each sensor 108. Using multiple image frames 1902 to identify auto-exclusions zones 1910, 1914 for each sensor 108 may improve the detection of any spurious contours or other aberrations that correspond to pixel coordinates (e.g., coordinates 1912, 1916 of FIG. 19) which should be ignored or excluded during tracking.

Figure 22:
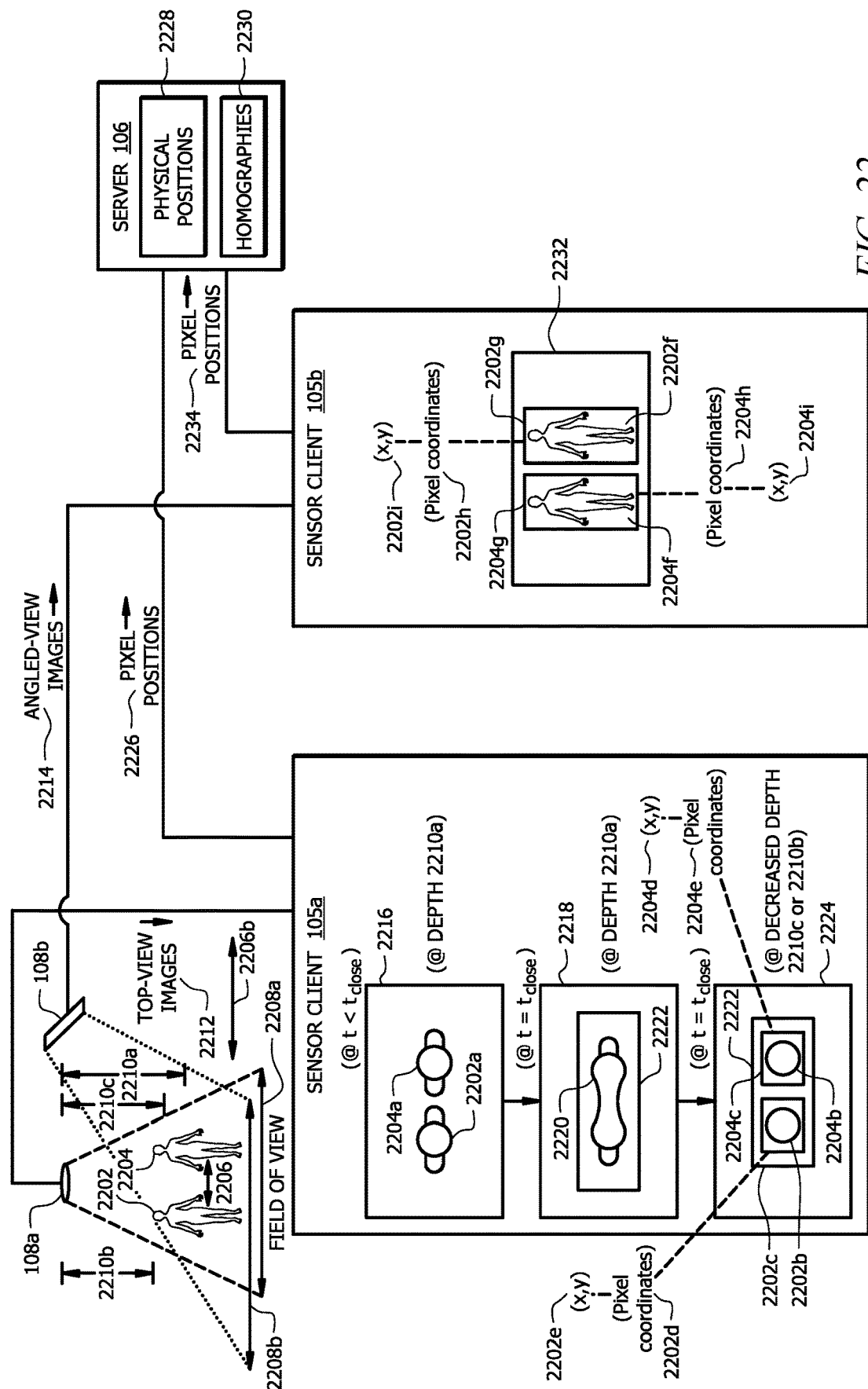
FIG. 22 is a diagram illustrating the detection of closely spaced objects using the tracking system.

At step 2104, contours (e.g., dashed contour lines corresponding to auto-exclusion zones 1910, 1914 of FIG. 19) are detected in the one or more image frames 1902 received at step 2102. Any appropriate contour detection algorithm may be used including but not limited to those based on Canny edge detection, threshold-based detection, and the like. In some embodiments, the unique contour detection approaches described in this disclosure may be used (e.g., to distinguish closely spaced contours in the field-of-view, as described below, for example, with respect to FIGS. 22 and 23). At step 2106, pixel coordinates (e.g., coordinates 1912, 1916 of FIG. 19) are determined for the detected contours (from step 2104). The coordinates may be determined, for example, based on a pixel mask that overlays the detected contours. A pixel mask may for example, correspond to pixels within the contours. In some embodiments, pixel coordinates correspond to the pixel coordinates within a bounding box determined for the contour (e.g., as illustrated in FIG. 22, described below). For instance, the bounding box may be a rectangular box with an area that encompasses the detected contour. At step 2108, the pixel coordinates are stored. For instance, the client 105 may store the pixel coordinates corresponding to auto-exclusion zones 1910, 1914 in memory (e.g., memory 3804 of FIG. 38, described below). As described above, the pixel coordinates may also or alternatively be transmitted to the server 106 (e.g., to generate a map 2000 of the space, as illustrated in the example of FIG. 20).

At step 2110, the client 105 receives an image frame 1918 during a subsequent time during which tracking is performed (i.e., after the pixel coordinates corresponding to auto-exclusion zones are stored at step 2108). The frame is received from sensor 108 and includes a representation of an object in the space 102. At step 2112, a contour is detected in the frame received at step 2110. For example, the contour may correspond to a curve along the edge of object represented in the frame 1902. The pixel coordinates determined at step 2106 may be excluded (or not used) during contour detection. For instance, image data may be ignored and/or removed (e.g., given a value of zero, or the color equivalent) at the pixel coordinates determined at step 2106, such that no contours are detected at these coordinates. In some cases, a contour may be detected outside of these coordinates. In some cases, a contour may be detected that is partially outside of these coordinates but overlaps partially with the coordinates (e.g., as illustrated in image 1918 of FIG. 19).

At step 2114, the client 105 generally determines whether the detected contour has a pixel position that sufficiently overlaps with pixel coordinates of the auto-exclusion zones 1910, 1914 determined at step 2106. If the coordinates sufficiently overlap, the contour or region 1920 (i.e., and the associated object) is not tracked in the frame. For instance, as described above, the client 105 may determine whether the detected contour or region 1920 overlaps at least a threshold percentage (e.g., of 50%) with a region associated with the pixel coordinates (e.g., see overlapping region 1922 of FIG. 19). If the criteria of step 2114 are satisfied, the client 105 generally, at step 2116, does not determine a pixel position for the contour detected at step 2112. As such, no pixel position is reported to the server 106, thereby reducing or eliminating the waste of processing resources associated with attempting to track an object when it is not a target object for which tracking is desired.

Otherwise, if the criteria of step 2114 are satisfied, the client 105 determines a pixel position for the contour or region 1920 at step 2118. Determining a pixel position from a contour may involve, for example, (i) determining a region 1920 (e.g., a pixel mask or bounding box) associated with the contour and (ii) determining a centroid or other characteristic position of the region as the pixel position. At step 2120, the determined pixel position is transmitted to the server 106 to facilitate global tracking, for example, using predetermined homographies, as described elsewhere in this disclosure (e.g., with respect to FIGS. 24-26). For example, the server 106 may receive the determined pixel position, access a homography associating pixel coordinates in images generated by the sensor 108 from which the frame at step 2110 was received to physical coordinates in the space 102, and apply the homography to the pixel coordinates to generate corresponding physical coordinates for the tracked object associated with the contour detected at step 2112.

Modifications, additions, or omissions may be made to method 2100 depicted in FIG. 21. Method 2100 may include more, fewer, or other steps. For example, steps may be performed in parallel or in any suitable order. While at times discussed as tracking system 100, client(s) 105, server 106, or components of any of thereof performing steps, any suitable system or components of the system may perform one or more steps of the method.

Contour-Based Detection of Closely Spaced People

In some cases, two people are near each other, making it difficult or impossible to reliably detect and/or track each person (or other target objects) using conventional tools. In some cases, the people may be initially detected and tracked using depth images at an approximate waist depth (i.e., a depth corresponding to the waist height of an average person being tracked). Tracking at an approximate waist depth may be more effective at capturing all people regardless of their height or mode of movement. For instance, by detecting and tacking people at an approximate waist depth, the tracking system 100 is highly likely to detect tall and short individuals and individuals who may be using alternative methods of movement (e.g., wheelchairs, and the like). However, if two people with a similar height are standing near each other, it may be difficult to distinguish between the two people in the top-view images at the approximate waist depth. Rather than detecting two separate people, the tracking system 100 may initially detect the people as a single larger object.

This disclosure encompasses the recognition that at a decreased depth (i.e., a depth nearer the heads of the people), the people may be more readily distinguished. This is because the people's heads are more likely to be imaged at the decreased depth, and their heads are smaller and less likely to be detected as a single merged region (or contour, as described in greater detail below). As another example, if two people enter the space 102 standing close to one another (e.g., holding hands), they may appear to be a single larger object. Since the tracking system 100 may initially detect the two people as one person, it may be difficult to properly identify these people if these people separate while in the space 102. As yet another example, if two people who briefly stand close together are momentarily "lost" or detected as only a single, larger object, it may be difficult to correctly identify the people after they separate from one another.

As described elsewhere in this disclosure (e.g., with respect to FIGS. 19-21 and 24-26), people (e.g., the people in the example scenarios described above) may be tracked by detecting contours in top-view image frames generated by sensors 108 and tracking the positions of these contours. However, when two people are closely spaced, a single merged contour (see merged contour 2220 of FIG. 22 described below) may be detected in a top-view image of the people. This single contour generally cannot be used to track each person individually, resulting in considerable downstream errors during tracking. For example, even if two people separate after having been closely spaced, it may be difficult or impossible using previous tools to determine which person was which, and the identity of each person may be unknown after the two people separate. Prior to this disclosure, there was a lack of reliable tools for detecting people (e.g., and other target objects) under the example scenarios described above and under other similar circumstances.

The systems and methods described in this disclosure provide improvements to previous technology by facilitating the improved detection of closely spaced people. For example, the systems and methods described in this disclosure may facilitate the detection of individual people when contours associated with these people would otherwise be merged, resulting in the detection of a single person using conventional detection strategies. In some embodiments, improved contour detection is achieved by detecting contours at different depths (e.g., at least two depths) to identify separate contours at a second depth within a larger merged contour detected at a first depth used for tracking. For example, if two people are standing near each other such that contours are merged to form a single contour, separate contours associated with heads of the two closely spaced people may be detected at a depth associated with the persons' heads. In some embodiments, a unique statistical approach may be used to differentiate between the two people by selecting bounding regions for the detected contours with a low similarity value. In some embodiments, certain criteria are satisfied to ensure that the detected contours correspond to separate people, thereby providing more reliable person (e.g., or other target object) detection than was previously possible. For example, two contours detected at an approximate head depth may be required to be within a threshold size range in order for the contours to be used for subsequent tracking. In some embodiments, an artificial neural network may be employed to detect separate people that are closely spaced by analyzing top-view images at different depths.

FIG. 22 is a diagram illustrating the detection of two closely spaced people 2202, 2204 based on top-view depth images 2212 and angled-view images 2214 received from sensors 108a,b using the tracking system 100. In one embodiment, sensors 108a,b may each be one of sensors 108 of tracking system 100 described above with respect to FIG. 1. In another embodiment, sensors 108a,b may each be one of sensors 108 of a separate virtual store system (e.g., layout cameras and/or rack cameras) as described in U.S. patent application Ser. No. 16/664,470 entitled, "Customer-Based Video Feed" which is incorporated by reference herein. In this embodiment, the sensors 108 of the tracking system 100 may be mapped to the sensors 108 of the virtual store system using a homography. Moreover, this embodiment can retrieve identifiers and the relative position of each person from the sensors 108 of the virtual store system using the homography between tracking system 100 and the virtual store system. Generally, sensor 108a is an overhead sensor configured to generate top-view depth images 2212 (e.g., color and/or depth images) of at least a portion of the space 102. Sensor 108a may be mounted, for example, in a ceiling of the space 102. Sensor 108a may generate image data corresponding to a plurality of depths which include but are not necessarily limited to the depths 2210a-c illustrated in FIG. 22. Depths 2210a-c are generally distances measured from the sensor 108a. Each depth 2210a-c may be associated with a corresponding height (e.g., from the floor of the space 102 in which people 2202, 2204 are detected and/or tracked). Sensor 108a observes a field-of-view 2208a. Top-view images 2212 generated by sensor 108a may be transmitted to the sensor client 105a. The sensor client 105a is communicatively coupled (e.g., via wired connection or wirelessly) to the sensor 108a and the server 106. Server 106 is described above with respect to FIG. 1.

In this example, sensor 108b is an angled-view sensor, which is configured to generate angled-view images 2214 (e.g., color and/or depth images) of at least a portion of the space 102. Sensor 108b has a field of view 2208b, which overlaps with at least a portion of the field-of-view 2208a of sensor 108a. The angled-view images 2214 generated by the angled-view sensor 108b are transmitted to sensor client 105b. Sensor client 105b may be a client 105 described above with respect to FIG. 1. In the example of FIG. 22, sensors 108a,b are coupled to different sensor clients 105a,b. However, it should be understood that the same sensor client 105 may be used for both sensors 108a,b (e.g., such that clients 105a,b are the same client 105). In some cases, the use of different sensor clients 105a,b for sensors 108a,b may provide improved performance because image data may still be obtained for the area shared by fields-of-view 2208a,b even if one of the clients 105a,b were to fail.

In the example scenario illustrated in FIG. 22, people 2202, 2204 are located sufficiently close together such that conventional object detection tools fail to detect the individual people 2202, 2204 (e.g., such that people 2202, 2204 would not have been detected as separate objects). This situation may correspond, for example, to the distance 2206a between people 2202, 2204 being less than a threshold distance 2206b (e.g., of about 6 inches). The threshold distance 2206b can generally be any appropriate distance determined for the system 100. For example, the threshold distance 2206b may be determined based on several characteristics of the system 2200 and the people 2202, 2204 being detected. For example, the threshold distance 2206b may be based on one or more of the distance of the sensor 108a from the people 2202, 2204, the size of the people 2202, 2204, the size of the field-of-view 2208a, the sensitivity of the sensor 108a, and the like. Accordingly, the threshold distance 2206b may range from just over zero inches to over six inches depending on these and other characteristics of the tracking system 100. People 2202, 2204 may be any target object an individual may desire to detect and/or track based on data (i.e., top-view images 2212 and/or angled-view images 2214) from sensors 108a,b.

The sensor client 105a detects contours in top-view images 2212 received from sensor 108a. Typically, the sensor client 105a detects contours at an initial depth 2210a.

The initial depth 2210a may be associated with, for example, a predetermined height (e.g., from the ground) which has been established to detect and/or track people 2202, 2204 through the space 102. For example, for tracking humans, the initial depth 2210a may be associated with an average shoulder or waist height of people expected to be moving in the space 102 (e.g., a depth which is likely to capture a representation for both tall and short people traversing the space 102). The sensor client 105a may use the top-view images 2212 generated by sensor 108a to identify the top-view image 2212 corresponding to when a first contour 2202a associated with the first person 2202 merges with a second contour 2204a associated with the second person 2204. View 2216 illustrates contours 2202a, 2204a at a time prior to when these contours 2202a, 2204a merge (i.e., prior to a time ($t_{close}$) when the first and second people 2202, 2204 are within the threshold distance 2206b of each other). View 2216 corresponds to a view of the contours detected in a top-view image 2212 received from sensor 108a (e.g., with other objects in the image not shown).

A subsequent view 2218 corresponds to the image 2212 at or near $t_{close}$ when the people 2202, 2204 are closely spaced and the first and second contours 2202a, 2204a merge to form merged contour 2220. The sensor client 105a may determine a region 2222 which corresponds to a "size" of the merged contour 2220 in image coordinates (e.g., a number of pixels associated with contour 2220). For example, region 2222 may correspond to a pixel mask or a bounding box determined for contour 2220. Example approaches to determining pixel masks and bounding boxes are described above with respect to step 2104 of FIG. 21. For example, region 2222 may be a bounding box determined for the contour 2220 using a non-maximum suppression object-detection algorithm. For instance, the sensor client 105a may determine a plurality of bounding boxes associated with the contour 2220. For each bounding box, the client 105a may calculate a score. The score, for example, may represent an extent to which that bounding box is similar to the other bounding boxes. The sensor client 105a may identify a subset of the bounding boxes with a score that is greater than a threshold value (e.g., 80% or more), and determine region 2222 based on this identified subset. For example, region 2222 may be the bounding box with the highest score or a bounding comprising regions shared by bounding boxes with a score that is above the threshold value.

In order to detect the individual people 2202 and 2204, the sensor client 105a may access images 2212 at a decreased depth (i.e., at one or both of depths 2212b and 2212c) and use this data to detect separate contours 2202b, 2204b, illustrated in view 2224. In other words, the sensor client 105a may analyze the images 2212 at a depth nearer the heads of people 2202, 2204 in the images 2212 in order to detect the separate people 2202, 2204. In some embodiments, the decreased depth may correspond to an average or predetermined head height of persons expected to be detected by the tracking system 100 in the space 102. In some cases, contours 2202b, 2204b may be detected at the decreased depth for both people 2202, 2204.

However, in other cases, the sensor client 105a may not detect both heads at the decreased depth. For example, if a child and an adult are closely spaced, only the adult's head may be detected at the decreased depth (e.g., at depth 2210b). In this scenario, the sensor client 105a may proceed to a slightly increased depth (e.g., to depth 2210c) to detect the head of the child. For instance, in such scenarios, the sensor client 105a iteratively increases the depth from the decreased depth towards the initial depth 2210a in order to detect two distinct contours 2202b, 2204b (e.g., for both the adult and the child in the example described above). For instance, the depth may first be decreased to depth 2210b and then increased to depth 2210c if both contours 2202b and 2204b are not detected at depth 2210b. This iterative process is described in greater detail below with respect to method 2300 of FIG. 23.

As described elsewhere in this disclosure, in some cases, the tracking system 100 may maintain a record of features, or descriptors, associated with each tracked person (see, e.g., FIG. 30, described below). As such, the sensor client 105a may access this record to determine unique depths that are associated with the people 2202, 2204, which are likely associated with merged contour 2220. For instance, depth 2210b may be associated with a known head height of person 2202, and depth 2212c may be associated with a known head height of person 2204.

Once contours 2202b and 2204b are detected, the sensor client determines a region 2202c associated with pixel coordinates 2202d of contour 2202b and a region 2204c associated with pixel coordinates 2204d of contour 2204b. For example, as described above with respect to region 2222, regions 2202c and 2204c may correspond to pixel masks or bounding boxes generated based on the corresponding contours 2202b, 2204b, respectively. For example, pixel masks may be generated to "fill in" the area inside the contours 2202b, 2204b or bounding boxes may be generated which encompass the contours 2202b, 2204b. The pixel coordinates 2202d, 2204d generally correspond to the set of positions (e.g., rows and columns) of pixels within regions 2202c, 2204c.

In some embodiments, a unique approach is employed to more reliably distinguish between closely spaced people 2202 and 2204 and determine associated regions 2202c and 2204c. In these embodiments, the regions 2202c and 2204c are determined using a unique method referred to in this disclosure as "non-minimum suppression." Non-minimum suppression may involve, for example, determining bounding boxes associated with the contour 2202b, 2204b (e.g., using any appropriate object detection algorithm as appreciated by a person of skilled in the relevant art). For each bounding box, a score may be calculated. As described above with respect to non-maximum suppression, the score may represent an extent to which the bounding box is similar to the other bounding boxes. However, rather than identifying bounding boxes with high scores (e.g., as with non-maximum suppression), a subset of the bounding boxes is identified with scores that are less than a threshold value (e.g., of about 20%). This subset may be used to determine regions 2202c, 2204c. For example, regions 2202c, 2204c may include regions shared by each bounding box of the identified subsets. In other words, bounding boxes that are not below the minimum score are "suppressed" and not used to identify regions 2202b, 2204b.

Prior to assigning a position or identity to the contours 2202b, 2204b and/or the associated regions 2202c, 2204c, the sensor client 105a may first check whether criteria are satisfied for distinguishing the region 2202c from region 2204c. The criteria are generally designed to ensure that the contours 2202b, 2204b (and/or the associated regions 2202c, 2204c) are appropriately sized, shaped, and positioned to be associated with the heads of the corresponding people 2202, 2204. These criteria may include one or more requirements. For example, one requirement may be that the regions 2202c, 2204c overlap by less than or equal to a threshold amount (e.g., of about 50%, e.g., of about 10%). Generally, the separate heads of different people 2202, 2204 should not overlap in a top-view image 2212. Another requirement may be that the regions 2202c, 2204c are within (e.g., bounded by, e.g., encompassed by) the merged-contour region 2222. This requirement, for example, ensures that the head contours 2202b, 2204b are appropriately positioned above the merged contour 2220 to correspond to heads of people 2202, 2204. If the contours 2202b, 2204b detected at the decreased depth are not within the merged contour 2220, then these contours 2202b, 2204b are likely not associated with heads of the people 2202, 2204 associated with the merged contour 2220.

Generally, if the criteria are satisfied, the sensor client 105a associates region 2202c with a first pixel position 2202e of person 2202 and associates region 2204c with a second pixel position 2204e of person 2204. Each of the first and second pixel positions 2202e, 2204e generally corresponds to a single pixel position (e.g., row and column) associated with the location of the corresponding contour 2202b, 2204b in the image 2212. The first and second pixel positions 2202e, 2204e are included in the pixel positions 2226 which may be transmitted to the server 106 to determine corresponding physical (e.g., global) positions 2228, for example, based on homographies 2230 (e.g., using a previously determined homography for sensor 108a associating pixel coordinates in images 2212 generated by sensor 108a to physical coordinates in the space 102).

As described above, sensor 108b is positioned and configured to generate angled-view images 2214 of at least a portion of the field of-of-view 2208a of sensor 108a. The sensor client 105b receives the angled-view images 2214 from the second sensor 108b. Because of its different (e.g., angled) view of people 2202, 2204 in the space 102, an angled-view image 2214 obtained at $t_{close}$ may be sufficient to distinguish between the people 2202, 2204. A view 2232 of contours 2202d, 2204d detected at $t_{close}$ is shown in FIG. 22. The sensor client 105b detects a contour 2202f corresponding to the first person 2202 and determines a corresponding region 2202g associated with pixel coordinates 2202h of contour 2202f. The sensor client 105b detects a contour 2204f corresponding to the second person 2204 and determines a corresponding region 2204g associated with pixel coordinates 2204h of contour 2204f. Since contours 2202f, 2204f do not merge and regions 2202g, 2204g are sufficiently separated (e.g., they do not overlap and/or are at least a minimum pixel distance apart), the sensor client 105b may associate region 2202g with a first pixel position 2202i of the first person 2202 and region 2204g with a second pixel position 2204i of the second person 2204. Each of the first and second pixel positions 2202i, 2204i generally corresponds to a single pixel position (e.g., row and column) associated with the location of the corresponding contour 2202f, 2204f in the image 2214. Pixel positions 2202i, 2204i may be included in pixel positions 2234 which may be transmitted to server 106 to determine physical positions 2228 of the people 2202, 2204 (e.g., using a previously determined homography for sensor 108b associating pixel coordinates of images 2214 generated by sensor 108b to physical coordinates in the space 102).

In an example operation of the tracking system 100, sensor 108a is configured to generate top-view color-depth images of at least a portion of the space 102. When people 2202 and 2204 are within a threshold distance of each another, the sensor client 105a identifies an image frame (e.g., associated with view 2218) corresponding to a time stamp (e.g., $t_{close}$) where contours 2202a, 2204a associated with the first and second person 2202, 2204, respectively, are merged and form contour 2220. In order to detect each person 2202 and 2204 in the identified image frame (e.g., associated with view 2218), the client 105a may first attempt to detect separate contours for each person 2202, 2204 at a first decreased depth 2210b. As described above, depth 2210b may be a predetermined height associated with an expected head height of people moving through the space 102. In some embodiments, depth 2210b may be a depth previously determined based on a measured height of person 2202 and/or a measured height of person 2204. For example, depth 2210b may be based on an average height of the two people 2202, 2204. As another example, depth 2210b may be a depth corresponding to a predetermined head height of person 2202 (as illustrated in the example of FIG. 22). If two contours 2202b, 2204b are detected at depth 2210b, these contours may be used to determine pixel positions 2202e, 2204e of people 2202 and 2204, as described above.

If only one contour 2202b is detected at depth 2210b (e.g., if only one person 2202, 2204 is tall enough to be detected at depth 2210b), the region associated with this contour 2202b may be used to determine the pixel position 2202e of the corresponding person, and the next person may be detected at an increased depth 2210c. Depth 2210c is generally greater than 2210b but less than depth 2210a. In the illustrative example of FIG. 22, depth 2210c corresponds to a predetermined head height of person 2204. If contour 2204b is detected for person 2204 at depth 2210c, a pixel position 2204e is determined based on pixel coordinates 2204d associated with the contour 2204b (e.g., following a determination that the criteria described above are satisfied). If a contour 2204b is not detected at depth 2210c, the client 105a may attempt to detect contours at progressively increased depths until a contour is detected or a maximum depth (e.g., the initial depth 2210a) is reached. For example, the sensor client 105a may continue to search for the contour 2204b at increased depths (i.e., depths between depth 2210c and the initial depth 2210a). If the maximum depth (e.g., depth 2210a) is reached without the contour 2204b being detected, the client 105a generally determines that the separate people 2202, 2204 cannot be detected.

Figure 23:
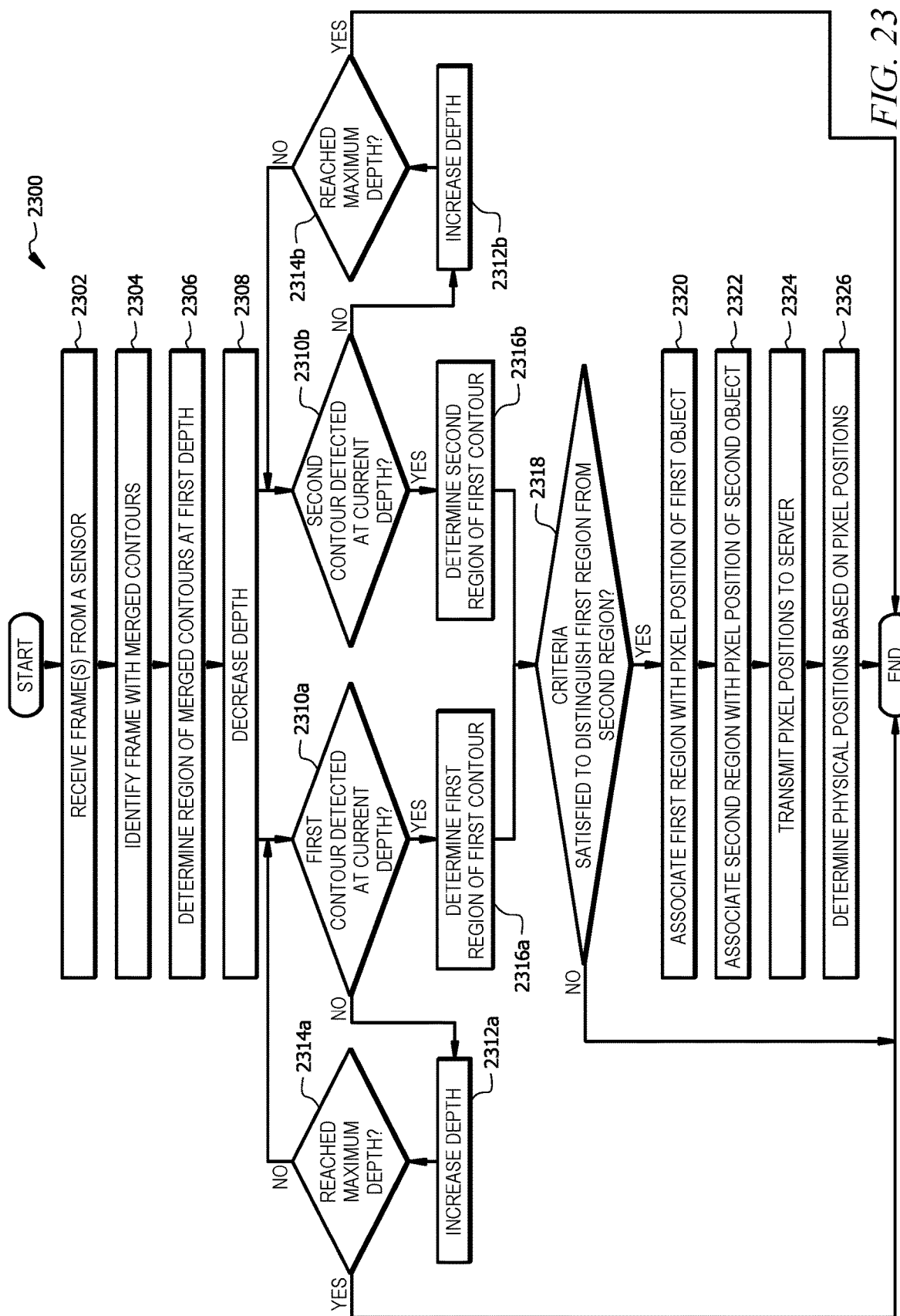
FIG. 23 is a flowchart illustrating an example method of detecting closely spaced objects using the tracking system.

FIG. 23 is a flowchart illustrating a method 2300 of operating the tracking system 100 to detect closely spaced people 2202, 2204. Method 2300 may begin at step 2302 where the sensor client 105a receives one or more frames of top-view depth images 2212 generated by sensor 108a. At step 2304, the sensor client 105a identifies a frame in which a first contour 2202a associated with the first person 2202 is merged with a second contour 2204a associated with the second person 2204. Generally, the merged first and second contours (i.e., merged contour 2220) is determined at the first depth 2212a in the depth images 2212 received at step 2302. The first depth 2212a may correspond to a waist or should depth of persons expected to be tracked in the space 102. The detection of merged contour 2220 corresponds to the first person 2202 being located in the space within a threshold distance 2206b from the second person 2204, as described above.

At step 2306, the sensor client 105a determines a merged-contour region 2222. Region 2222 is associated with pixel coordinates of the merged contour 2220. For instance, region 2222 may correspond to coordinates of a pixel mask that overlays the detected contour. As another example, region 2222 may correspond to pixel coordinates of a bounding box determined for the contour (e.g., using any appropriate object detection algorithm). In some embodiments, a method involving non-maximum suppression is used to detect region 2222. In some embodiments, region 2222 is determined using an artificial neural network. For example, an artificial neural network may be trained to detect contours at various depths in top-view images generated by sensor 108a.

At step 2308, the depth at which contours are detected in the identified image frame from step 2304 is decreased (e.g., to depth 2210b illustrated in FIG. 22). At step 2310a, the sensor client 105a determines whether a first contour (e.g., contour 2202b) is detected at the current depth. If the contour 2202b is not detected, the sensor client 105a proceeds, at step 2312a, to an increased depth (e.g., to depth 2210c). If the increased depth corresponds to having reached a maximum depth (e.g., to reaching the initial depth 2210a), the process ends because the first contour 2202b was not detected. If the maximum depth has not been reached, the sensor client 105a returns to step 2310a and determines if the first contour 2202b is detected at the newly increased current depth. If the first contour 2202b is detected at step 2310a, the sensor client 105a, at step 2316a, determines a first region 2202c associated with pixel coordinates 2202d of the detected contour 2202b. In some embodiments, region 2202c may be determined using a method of non-minimal suppression, as described above. In some embodiments, region 2202c may be determined using an artificial neural network.

The same or a similar approach—illustrated in steps 2210b, 2212b, 2214b, and 2216b—may be used to determine a second region 2204c associated with pixel coordinates 2204d of the contour 2204b. For example, at step 2310b, the sensor client 105a determines whether a second contour 2204b is detected at the current depth. If the contour 2204b is not detected, the sensor client 105a proceeds, at step 2312b, to an increased depth (e.g., to depth 2210c). If the increased depth corresponds to having reached a maximum depth (e.g., to reaching the initial depth 2210a), the process ends because the second contour 2204b was not detected. If the maximum depth has not been reached, the sensor client 105a returns to step 2310b and determines if the second contour 2204b is detected at the newly increased current depth. If the second contour 2204b is detected at step 2210a, the sensor client 105a, at step 2316a, determines a second region 2204c associated with pixel coordinates 2204d of the detected contour 2204b. In some embodiments, region 2204c may be determined using a method of non-minimal suppression or an artificial neural network, as described above.

At step 2318, the sensor client 105a determines whether criteria are satisfied for distinguishing the first and second regions determined in steps 2316a and 2316b, respectively. For example, the criteria may include one or more requirements. For example, one requirement may be that the regions 2202c, 2204c overlap by less than or equal to a threshold amount (e.g., of about 10%). Another requirement may be that the regions 2202c, 2204c are within (e.g., bounded by, e.g., encompassed by) the merged-contour region 2222 (determined at step 2306). If the criteria are not satisfied, method 2300 generally ends.

Otherwise, if the criteria are satisfied at step 2318, the method 2300 proceeds to steps 2320 and 2322 where the sensor client 105a associates the first region 2202b with a first pixel position 2202e of the first person 2202 (step 2320) and associates the second region 2204b with a first pixel position 2202e of the first person 2204 (step 2322). Associating the regions 2202c, 2204c to pixel positions 2202e, 2204e may correspond to storing in a memory pixel coordinates 2202d, 2204d of the regions 2202c, 2204c and/or an average pixel position corresponding to each of the regions 2202c, 2204c along with an object identifier for the people 2202, 2204.

At step 2324, the sensor client 105a may transmit the first and second pixel positions (e.g., as pixel positions 2226) to the server 106. At step 2326, the server 106 may apply a homography (e.g., of homographies 2230) for the sensor 2202 to the pixel positions to determine corresponding physical (e.g., global) positions 2228 for the first and second people 2202, 2204. Examples of generating and using homographies 2230 are described in greater detail above with respect to FIGS. 2-7.

Modifications, additions, or omissions may be made to method 2300 depicted in FIG. 23. Method 2300 may include more, fewer, or other steps. For example, steps may be performed in parallel or in any suitable order. While at times discussed as system 2200, sensor client 22105a, master server 2208, or components of any of thereof performing steps, any suitable system or components of the system may perform one or more steps of the method.

Multi-Sensor Image Tracking on a Local and Global Planes

As described elsewhere in this disclosure (e.g., with respect to FIGS. 19-23 above), tracking people (e.g., or other target objects) in space 102 using multiple sensors 108 presents several previously unrecognized challenges. This disclosure encompasses not only the recognition of these challenges but also unique solutions to these challenges. For instance, systems and methods are described in this disclosure that track people both locally (e.g., by tracking pixel positions in images received from each sensor 108) and globally (e.g., by tracking physical positions on a global plane corresponding to the physical coordinates in the space 102). Person tracking may be more reliable when performed both locally and globally. For example, if a person is "lost" locally (e.g., if a sensor 108 fails to capture a frame and a person is not detected by the sensor 108), the person may still be tracked globally based on an image from a nearby sensor 108 (e.g., the angled-view sensor 108b described with respect to FIG. 22 above), an estimated local position of the person determined using a local tracking algorithm, and/or an estimated global position determined using a global tracking algorithm.

As another example, if people appear to merge (e.g., if detected contours merge into a single merged contour, as illustrated in view 2216 of FIG. 22 above) at one sensor 108, an adjacent sensor 108 may still provide a view in which the people are separate entities (e.g., as illustrated in view 2232 of FIG. 22 above). Thus, information from an adjacent sensor 108 may be given priority for person tracking. In some embodiments, if a person tracked via a sensor 108 is lost in the local view, estimated pixel positions may be determined using a tracking algorithm and reported to the server 106 for global tracking, at least until the tracking algorithm determines that the estimated positions are below a threshold confidence level.

Figure 24A:
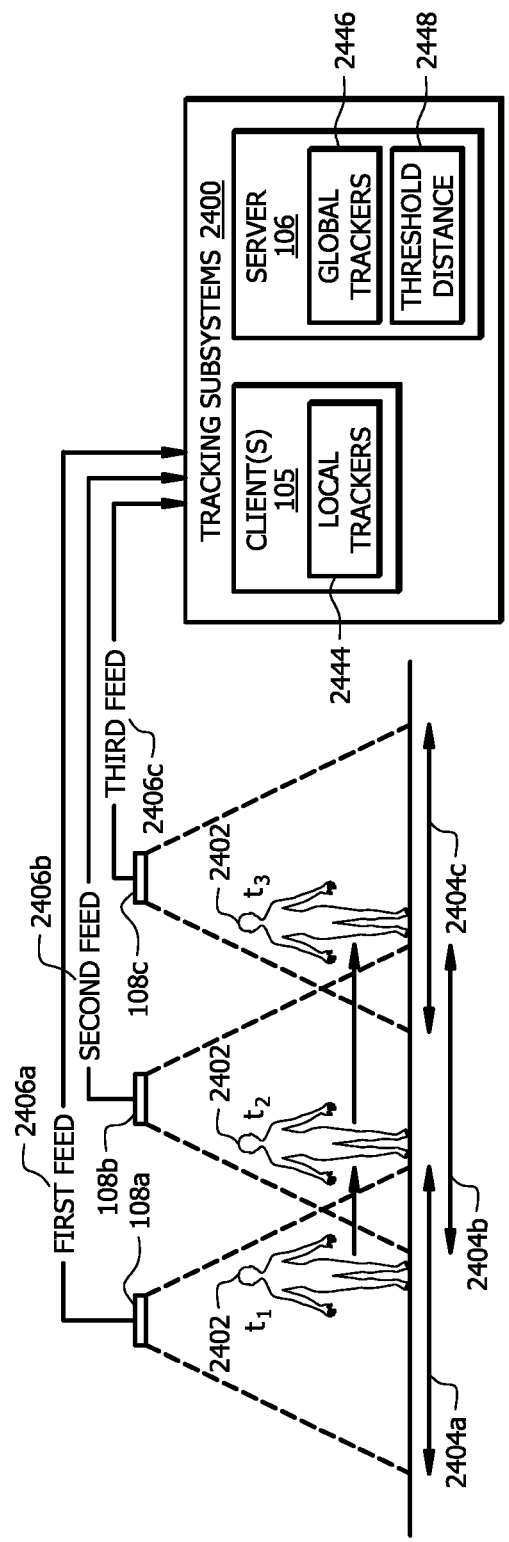
FIGS. 24A-C are diagrams illustrating the tracking of a person in local image frames and in the global plane of space 102 using the tracking system.
Figure 24B:
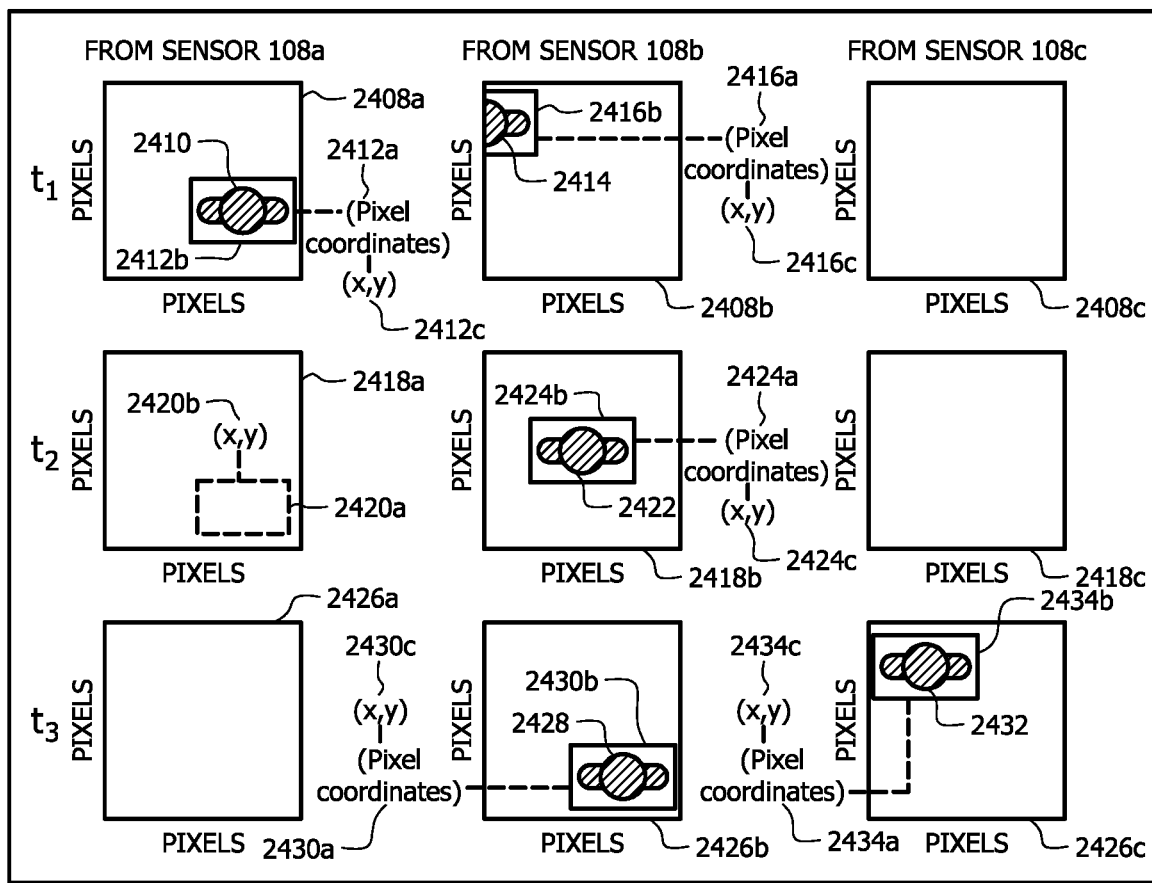
Figure 24C:
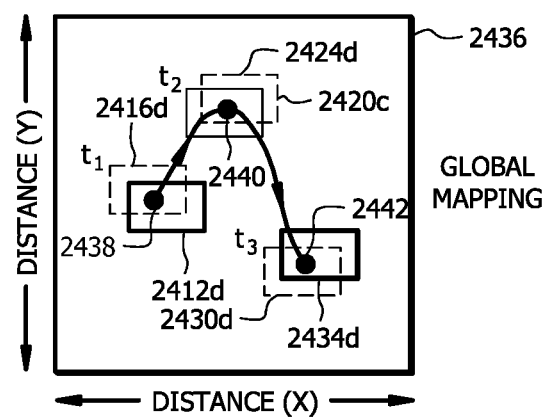

FIGS. 24A-C illustrate the use of a tracking subsystem 2400 to track a person 2402 through the space 102. FIG. 24A illustrates a portion of the tracking system 100 of FIG. 1 when used to track the position of person 2402 based on image data generated by sensors 108a-c. The position of person 2402 is illustrated at three different time points: $t_1$, $t_2$, and $t_3$. Each of the sensors 108a-c is a sensor 108 of FIG. 1, described above. Each sensor 108a-c has a corresponding field-of-view 2404a-c, which corresponds to the portion of the space 102 viewed by the sensor 108a-c. As shown in FIG. 24A, each field-of-view 2404a-c overlaps with that of the adjacent sensor(s) 108a-c. For example, the adjacent fields-of-view 2404a-c may overlap by between about 10% and 30%. Sensors 108a-c generally generate top-view images and transmit corresponding top-view image feeds 2406a-c to a tracking subsystem 2400.

The tracking subsystem 2400 includes the client(s) 105 and server 106 of FIG. 1. The tracking system 2400 generally receives top-view image feeds 2406a-c generated by sensors 108a-c, respectively, and uses the received images (see FIG. 24B) to track a physical (e.g., global) position of the person 2402 in the space 102 (see FIG. 24C). Each sensor 108a-c may be coupled to a corresponding sensor client 105 of the tracking subsystem 2400. As such, the tracking subsystem 2400 may include local particle filter trackers 2444 for tracking pixel positions of person 2402 in images generated by sensors 108a-b, global particle filter trackers 2446 for tracking physical positions of person 2402 in the space 102.

FIG. 24B shows example top-view images 2408a-c, 2418a-c, and 2426a-c generated by each of the sensors 108a-c at times $t_1$, $t_2$, and $t_3$. Certain of the top-view images include representations of the person 2402 (i.e., if the person 2402 was in the field-of-view 2404a-c of the sensor 108a-c at the time the image 2408a-c, 2418a-c, and 2426a-c was obtained). For example, at time $t_1$, images 2408a-c are generated by sensors 108a-c, respectively, and provided to the tracking subsystem 2400. The tracking subsystem 2400 detects a contour 2410 associated with person 2402 in image 2408a. For example, the contour 2410 may correspond to a curve outlining the border of a representation of the person 2402 in image 2408a (e.g., detected based on color (e.g., RGB) image data at a predefined depth in image 2408a, as described above with respect to FIG. 19). The tracking subsystem 2400 determines pixel coordinates 2412a, which are illustrated in this example by the bounding box 2412b in image 2408a. Pixel position 2412c is determined based on the coordinates 2412a. The pixel position 2412c generally refers to the location (i.e., row and column) of the person 2402 in the image 2408a. Since the object 2402 is also within the field-of-view 2404b of the second sensor 108b at $t_1$ (see FIG. 24A), the tracking system also detects a contour 2414 in image 2408b and determines corresponding pixel coordinates 2416a (i.e., associated with bounding box 2416b) for the object 2402. Pixel position 2416c is determined based on the coordinates 2416a. The pixel position 2416c generally refers to the pixel location (i.e., row and column) of the person 2402 in the image 2408b. At time $t_1$, the object 2402 is not in the field-of-view 2404c of the third sensor 108c (see FIG. 24A). Accordingly, the tracking subsystem 2400 does not determine pixel coordinates for the object 2402 based on the image 2408c received from the third sensor 108c.

Turning now to FIG. 24C, the tracking subsystem 2400 (e.g., the server 106 of the tacking subsystem 2400) may determine a first global position 2438 based on the determined pixel positions 2412c and 2416c (e.g., corresponding to pixel coordinates 2412a, 2416a and bounding boxes 2412b, 2416b, described above). The first global position 2438 corresponds to the position of the person 2402 in the space 102, as determined by the tracking subsystem 2400. In other words, the tracking subsystem 2400 uses the pixel positions 2412c, 2416c determined via the two sensors 108a,b to determine a single physical position 2438 for the person 2402 in the space 102. For example, a first physical position 2412d may be determined from the pixel position 2412c associated with bounding box 2412b using a first homography associating pixel coordinates in the top-view images generated by the first sensor 108a to physical coordinates in the space 102. A second physical position 2416d may similarly be determined using the pixel position 2416c associated with bounding box 2416b using a second homography associating pixel coordinates in the top-view images generated by the second sensor 108b to physical coordinates in the space 102. In some cases, the tracking subsystem 2400 may compare the distance between first and second physical positions 2412d and 2416d to a threshold distance 2448 to determine whether the positions 2412d, 2416d correspond to the same person or different people (see, e.g., step 2620 of FIG. 26, described below). The first global position 2438 may be determined as an average of the first and second physical positions 2410d, 2414d. In some embodiments, the global position is determined by clustering the first and second physical positions 2410d, 2414d (e.g., using any appropriate clustering algorithm). The first global position 2438 may correspond to (x,y) coordinates of the position of the person 2402 in the space 102.

Returning to FIG. 24A, at time $t_2$, the object 2402 is within fields-of-view 2404a and 2404b corresponding to sensors 108a,b. As shown in FIG. 24B, a contour 2422 is detected in image 2418b and corresponding pixel coordinates 2424a, which are illustrated by bounding box 2424b, are determined. Pixel position 2424c is determined based on the coordinates 2424a. The pixel position 2424c generally refers to the location (i.e., row and column) of the person 2402 in the image 2418b. However, in this example, the tracking subsystem 2400 fails to detect, in image 2418a from sensor 108a, a contour associated with object 2402. This may be because the object 2402 was at the edge of the field-of-view 2404a, because of a lost image frame from feed 2406a, because the position of the person 2402 in the field-of-view 2404a corresponds to an auto-exclusion zone for sensor 108a (see FIGS. 19-21 and corresponding description above), or because of any other malfunction of sensor 108a and/or the tracking subsystem 2400. In this case, the tracking subsystem 2400 may locally (e.g., at the particular client 105 which is coupled to sensor 108a) estimate pixel coordinates 2420a and/or corresponding pixel position 2420b for object 2402. For example, a local particle filter tracker 2444 for object 2402 in images generated by sensor 108a may be used to determine the estimated pixel position 2420b.

Figure 25A:
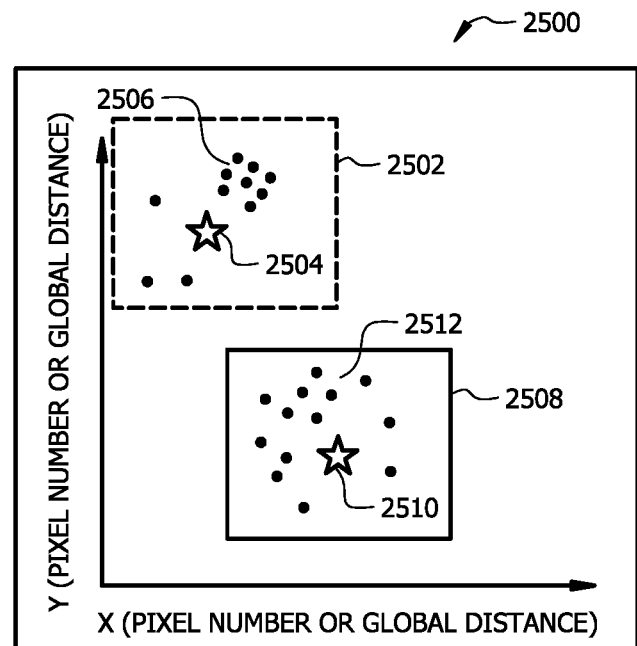
FIGS. 25A-B illustrate the implementation of a particle filter tracker by the tracking system.

FIGS. 25A,B illustrate the operation of an example particle filter tracker 2444, 2446 (e.g., for determining estimated pixel position 2420a). FIG. 25A illustrates a region 2500 in pixel coordinates or physical coordinates of space 102. For example, region 2500 may correspond to a pixel region in an image or to a region in physical space. In a first zone 2502, an object (e.g., person 2402) is detected at position 2504. The particle filter determines several estimated subsequent positions 2506 for the object. The estimated subsequent positions 2506 are illustrated as the dots or "particles" in FIG. 25A and are generally determined based on a history of previous positions of the object. Similarly, another zone 2508 shows a position 2510 for another object (or the same object at a different time) along with estimated subsequent positions 2512 of the "particles" for this object.

Figure 25B:
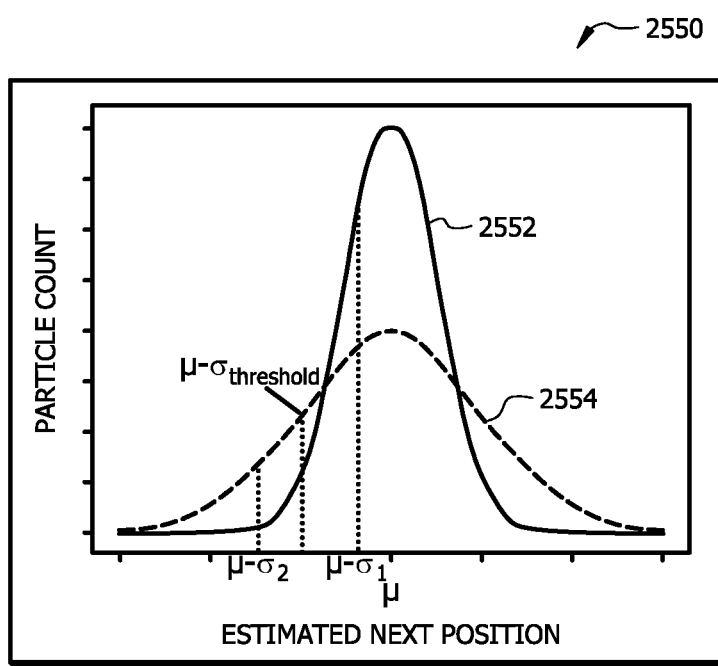

For the object at position 2504, the estimated subsequent positions 2506 are primarily clustered in a similar area above and to the right of position 2504, indicating that the particle filter tracker 2444, 2446 may provide a relatively good estimate of a subsequent position. Meanwhile, the estimated subsequent positions 2512 are relatively randomly distributed around position 2510 for the object, indicating that the particle filter tracker 2444, 2446 may provide a relatively poor estimate of a subsequent position. FIG. 25B shows a distribution plot 2550 of the particles illustrated in FIG. 25A, which may be used to quantify the quality of an estimated position based on a standard deviation value ($\sigma$).

In FIG. 25B, curve 2552 corresponds to the position distribution of anticipated positions 2506, and curve 2554 corresponds to the position distribution of the anticipated positions 2512. Curve 2554 has a relatively narrow distribution such that the anticipated positions 2506 are primarily near the mean position ($\mu$). For example, the narrow distribution corresponds to the particles primarily having a similar position, which in this case is above and to right of position 2504. In contrast, curve 2554 has a broader distribution, where the particles are more randomly distributed around the mean position ($\mu$). Accordingly, the standard deviation of curve 2552 ($\sigma_1$) is smaller than the standard deviation curve 2554 ($\sigma_2$). Generally, a standard deviation (e.g., either $\sigma_1$ or $\sigma_2$) may be used as a measure of an extent to which an estimated pixel position generated by the particle filter tracker 2444, 2446 is likely to be correct. If the standard deviation is less than a threshold standard deviation ($\sigma_{threshold}$), as is the case with curve 2552 and $\sigma_1$, the estimated position generated by a particle filter tracker 2444, 2446 may be used for object tracking. Otherwise, the estimated position generally is not used for object tracking.

Referring again to FIG. 24C, the tracking subsystem 2400 (e.g., the server 106 of tracking subsystem 2400) may determine a second global position 2440 for the object 2402 in the space 102 based on the estimated pixel position 2420b associated with estimated bounding box 2420a in frame 2418a and the pixel position 2424c associated with bounding box 2424b from frame 2418b. For example, a first physical position 2420c may be determined using a first homography associating pixel coordinates in the top-view images generated by the first sensor 108a to physical coordinates in the space 102. A second physical position 2424d may be determined using a second homography associating pixel coordinates in the top-view images generated by the second sensor 108b to physical coordinates in the space 102. The tracking subsystem 2400 (i.e., server 106 of the tracking subsystem 2400) may determine the second global position 2440 based on the first and second physical positions 2420c, 2424d, as described above with respect to time $t_1$. The second global position 2440 may correspond to (x,y) coordinates of the person 2402 in the space 102.

Turning back to FIG. 24A, at time $t_3$, the object 2402 is within the field-of-view 2404b of sensor 108b and the field-of-view 2404c of sensor 108c. Accordingly, these images 2426b,c may be used to track person 2402. FIG. 24B shows that a contour 2428 and corresponding pixel coordinates 2430a, pixel region 2430b, and pixel position 2430c are determined in frame 2426b from sensor 108b, while a contour 2432 and corresponding pixel coordinates 2434a, pixel region 2434b, and pixel position 2434c are detected in frame 2426c from sensor 108c. As shown in FIG. 24C and as described in greater detail above for times $t_1$ and $t_2$, the tracking subsystem 2400 may determine a third global position 2442 for the object 2402 in the space based on the pixel position 2430c associated with bounding box 2430b in frame 2426b and the pixel position 2434c associated with bounding box 2434b from frame 2426c. For example, a first physical position 2430d may be determined using a second homography associating pixel coordinates in the top-view images generated by the second sensor 108b to physical coordinates in the space 102. A second physical position 2434d may be determined using a third homography associating pixel coordinates in the top-view images generated by the third sensor 108c to physical coordinates in the space 102. The tracking subsystem 2400 may determine the global position 2442 based on the first and second physical positions 2430d, 2434d, as described above with respect to times $t_1$ and $t_2$.

Figure 26:
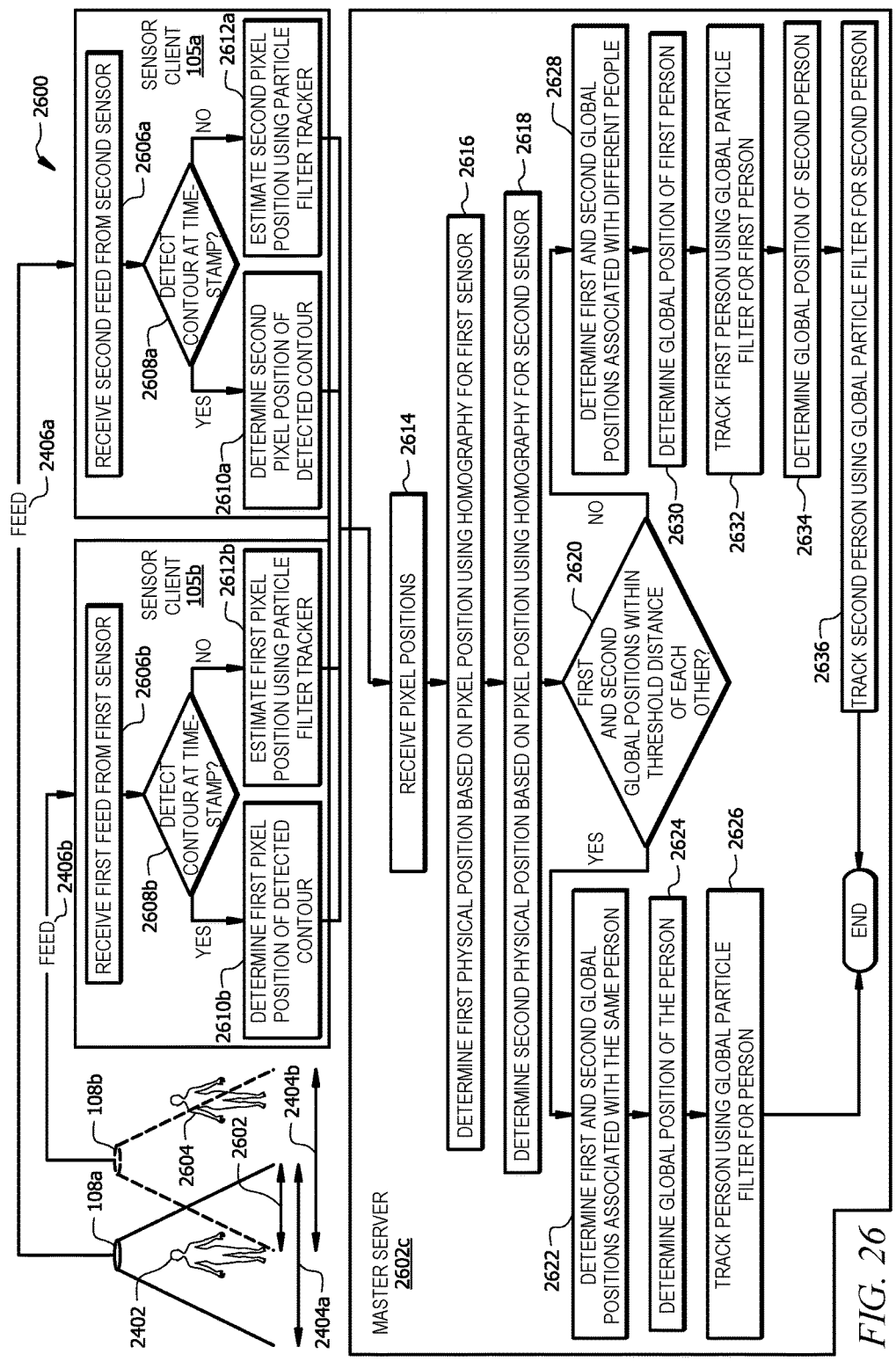
FIG. 26 is a flow diagram illustrating an example method of local and global object tracking using the tracking system.

FIG. 26 is a flow diagram illustrating the tracking of person 2402 in space the 102 based on top-view images (e.g., images 2408a-c, 2418a0c, 2426a-c from feeds 2406a, b, generated by sensors 108a,b, described above. Field-of-view 2404a of sensor 108a and field-of-view 2404b of sensors 108b generally overlap by a distance 2602. In one embodiment, distance 2602 may be about 10% to 30% of the fields-of-view 2404a,b. In this example, the tracking subsystem 2400 includes the first sensor client 105a, the second sensor client 105b, and the server 106. Each of the first and second sensor clients 105a,b may be a client 105 described above with respect to FIG. 1. The first sensor client 105a is coupled to the first sensor 108a and configured to track, based on the first feed 2406a, a first pixel position 2112c of the person 2402. The second sensor client 105b is coupled to the second sensor 108b and configured to track, based on the second feed 2406b, a second pixel position 2416c of the same person 2402.

The server 106 generally receives pixel positions from clients 105a,b and tracks the global position of the person 2402 in the space 102. In some embodiments, the server 106 employs a global particle filter tracker 2446 to track a global physical position of the person 2402 and one or more other people 2604 in the space 102). Tracking people both locally (i.e., at the "pixel level" using clients 105a,b) and globally (i.e., based on physical positions in the space 102) improves tracking by reducing and/or eliminating noise and/or other tracking errors which may result from relying on either local tracking by the clients 105a,b or global tracking by the server 106 alone.

FIG. 26 illustrates a method 2600 implemented by sensor clients 105a,b and server 106. Sensor client 105a receives the first data feed 2406a from sensor 108a at step 2606a. The feed may include top-view images (e.g., images 2408a-c, 2418a-c, 2426a-c of FIG. 24). The images may be color images, depth images, or color-depth images. In an image from the feed 2406a (e.g., corresponding to a certain timestamp), the sensor client 105a determines whether a contour is detected at step 2608a. If a contour is detected at the timestamp, the sensor client 105a determines a first pixel position 2412c for the contour at step 2610a. For instance, the first pixel position 2412c may correspond to pixel coordinates associated with a bounding box 2412b determined for the contour (e.g., using any appropriate object detection algorithm). As another example, the sensor client 105a may generate a pixel mask that overlays the detected contour and determine pixel coordinates of the pixel mask, as described above with respect to step 2104 of FIG. 21.

If a contour is not detected at step 2608a, a first particle filter tracker 2444 may be used to estimate a pixel position (e.g., estimated position 2420b), based on a history of previous positions of the contour 2410, at step 2612a. For example, the first particle filter tracker 2444 may generate a probability-weighted estimate of a subsequent first pixel position corresponding to the timestamp (e.g., as described above with respect to FIGS. 25A,B). Generally, if the confidence level (e.g., based on a standard deviation) of the estimated pixel position 2420b is below a threshold value (e.g., see FIG. 25B and related description above), no pixel position is determined for the timestamp by the sensor client 105a, and no pixel position is reported to server 106 for the timestamp. This prevents the waste of processing resources which would otherwise be expended by the server 106 in processing unreliable pixel position data. As described below, the server 106 can often still track person 2402, even when no pixel position is provided for a given timestamp, using the global particle filter tracker 2446 (see steps 2626, 2632, and 2636 below).

The second sensor client 105*b* receives the second data feed 2406*b* from sensor 108*b* at step 2606*b*. The same or similar steps to those described above for sensor client 105*a* are used to determine a second pixel position 2416*c* for a detected contour 2414 or estimate a pixel position based on a second particle filter tracker 2444. At step 2608*b*, the sensor client 105*b* determines whether a contour 2414 is detected in an image from feed 2406*b* at a given timestamp. If a contour 2414 is detected at the timestamp, the sensor client 105*b* determines a first pixel position 2416*c* for the contour 2414 at step 2610*b* (e.g., using any of the approaches described above with respect to step 2610*a*). If a contour 2414 is not detected, a second particle filter tracker 2444 may be used to estimate a pixel position at step 2612*b* (e.g., as described above with respect to step 2612*a*). If the confidence level of the estimated pixel position is below a threshold value (e.g., based on a standard deviation value for the tracker 2444), no pixel position is determined for the timestamp by the sensor client 105*b*, and no pixel position is reported for the timestamp to the server 106.

While steps 2606*a,b*-2612*a,b* are described as being performed by sensor client 105*a* and 105*b*, it should be understood that in some embodiments, a single sensor client 105 may receive the first and second image feeds 2406*a,b* from sensors 108*a,b* and perform the steps described above. Using separate sensor clients 105*a,b* for separate sensors 108*a,b* or sets of sensors 108 may provide redundancy in case of client 105 malfunctions (e.g., such that even if one sensor client 105 fails, feeds from other sensors may be processed by other still-functioning clients 105).

At step 2614, the server 106 receives the pixel positions 2412*c*, 2416*c* determined by the sensor clients 105*a,b*. At step 2616, the server 106 may determine a first physical position 2412*d* based on the first pixel position 2412*c* determined at step 2610*a* or estimated at step 2612*a* by the first sensor client 105*a*. For example, the first physical position 2412*d* may be determined using a first homography associating pixel coordinates in the top-view images generated by the first sensor 108*a* to physical coordinates in the space 102. At step 2618, the server 106 may determine a second physical position 2416*d* based on the second pixel position 2416*c* determined at step 2610*b* or estimated at step 2612*b* by the first sensor client 105*b*. For instance, the second physical position 2416*d* may be determined using a second homography associating pixel coordinates in the top-view images generated by the second sensor 108*b* to physical coordinates in the space 102.

At step 2620 the server 106 determines whether the first and second positions 2412*d*, 2416*d* (from steps 2616 and 2618) are within a threshold distance 2448 (e.g., of about six inches) of each other. In general, the threshold distance 2448 may be determined based on one or more characteristics of the system tracking system 100 and/or the person 2402 or another target object being tracked. For example, the threshold distance 2448 may be based on one or more of the distance of the sensors 108*a-b* from the object, the size of the object, the fields-of-view 2404*a-b*, the sensitivity of the sensors 108*a-b*, and the like. Accordingly, the threshold distance 2448 may range from just over zero inches to greater than six inches depending on these and other characteristics of the tracking system 100.

If the positions 2412*d*, 2416*d* are within the threshold distance 2448 of each other at step 2620, the server 106 determines that the positions 2412*d*, 2416*d* correspond to the same person 2402 at step 2622. In other words, the server 106 determines that the person detected by the first sensor 108*a* is the same person detected by the second sensor 108*b*. This may occur, at a given timestamp, because of the overlap 2604 between field-of-view 2404*a* and field-of-view 2404*b* of sensors 108*a* and 108*b*, as illustrated in FIG. 26.

At step 2624, the server 106 determines a global position 2438 (i.e., a physical position in the space 102) for the object based on the first and second physical positions from steps 2616 and 2618. For instance, the server 106 may calculate an average of the first and second physical positions 2412*d*, 2416*d*. In some embodiments, the global position 2438 is determined by clustering the first and second physical positions 2412*d*, 2416*d* (e.g., using any appropriate clustering algorithm). At step 2626, a global particle filter tracker 2446 is used to track the global (e.g., physical) position 2438 of the person 2402. An example of a particle filter tracker is described above with respect to FIGS. 25A,B. For instance, the global particle filter tracker 2446 may generate probability-weighted estimates of subsequent global positions at subsequent times. If a global position 2438 cannot be determined at a subsequent timestamp (e.g., because pixel positions are not available from the sensor clients 105*a,b*), the particle filter tracker 2446 may be used to estimate the position.

If at step 2620 the first and second physical positions 2412*d*, 2416*d* are not within the threshold distance 2448 from each other, the server 106 generally determines that the positions correspond to different objects 2402, 2604 at step 2628. In other words, the server 106 may determine that the physical positions determined at steps 2616 and 2618 are sufficiently different, or far apart, for them to correspond to the first person 2402 and a different second person 2604 in the space 102.

At step 2630, the server 106 determines a global position for the first object 2402 based on the first physical position 2412*c* from step 2616. Generally, in the case of having only one physical position 2412*c* on which to base the global position, the global position is the first physical position 2412*c*. If other physical positions are associated with the first object (e.g., based on data from other sensors 108, which for clarity are not shown in FIG. 26), the global position of the first person 2402 may be an average of the positions or determined based on the positions using any appropriate clustering algorithm, as described above. At step 2632, a global particle filter tracker 2446 may be used to track the first global position of the first person 2402, as is also described above.

At step 2634, the server 106 determines a global position for the second person 2404 based on the second physical position 2416*c* from step 2618. Generally, in the case of having only one physical position 2416*c* on which to base the global position, the global position is the second physical position 2416*c*. If other physical positions are associated with the second object (e.g., based on data from other sensors 108, which not shown in FIG. 26 for clarity), the global position of the second person 2604 may be an average of the positions or determined based on the positions using any appropriate clustering algorithm. At step 2636, a global particle filter tracker 2446 is used to track the second global position of the second object, as described above.

Modifications, additions, or omissions may be made to the method 2600 described above with respect to FIG. 26. The method may include more, fewer, or other steps. For example, steps may be performed in parallel or in any suitable order. While at times discussed as a tracking subsystem 2400, sensor clients 105a,b, server 106, or components of any thereof performing steps, any suitable system or components of the system may perform one or more steps of the method 2600.

Candidate Lists

When the tracking system 100 is tracking people in the space 102, it may be challenging to reliably identify people under certain circumstances such as when they pass into or near an auto-exclusion zone (see FIGS. 19-21 and corresponding description above), when they stand near another person (see FIGS. 22-23 and corresponding description above), and/or when one or more of the sensors 108, client(s) 105, and/or server 106 malfunction. For instance, after a first person becomes close to or even comes into contact with (e.g., "collides" with) a second person, it may difficult to determine which person is which (e.g., as described above with respect to FIG. 22). Conventional tracking systems may use physics-based tracking algorithms in an attempt to determine which person is which based on estimated trajectories of the people (e.g., estimated as though the people are marbles colliding and changing trajectories according to a conservation of momentum, or the like). However, the identities of people may be more difficult to track reliably, because movements may be random. As described above, the tracking system 100 may employ particle filter tracking for improved tracking of people in the space 102 (see e.g., FIGS. 24-26 and the corresponding description above). However, even with these advancements, the identities of people being tracked may be difficult to determine at certain times. This disclosure particularly encompasses the recognition that positions of people who are shopping in a store (i.e., moving about a space, selecting items, and picking up the items) are difficult or impossible to track using previously available technology because movement of these people is random and does not follow a readily defined pattern or model (e.g., such as the physics-based models of previous approaches). Accordingly, there is a lack of tools for reliably and efficiently tracking people (e.g., or other target objects).

This disclosure provides a solution to the problems of previous technology, including those described above, by maintaining a record, which is referred to in this disclosure as a "candidate list," of possible person identities, or identifiers (i.e., the usernames, account numbers, etc. of the people being tracked), during tracking. A candidate list is generated and updated during tracking to establish the possible identities of each tracked person. Generally, for each possible identity or identifier of a tracked person, the candidate list also includes a probability that the identity, or identifier, is believed to be correct. The candidate list is updated following interactions (e.g., collisions) between people and in response to other uncertainty events (e.g., a loss of sensor data, imaging errors, intentional trickery, etc.).

In some cases, the candidate list may be used to determine when a person should be re-identified (e.g., using methods described in greater detail below with respect to FIGS. 29-32). Generally, re-identification is appropriate when the candidate list of a tracked person indicates that the person's identity is not sufficiently well known (e.g., based on the probabilities stored in the candidate list being less than a threshold value). In some embodiments, the candidate list is used to determine when a person is likely to have exited the space 102 (i.e., with at least a threshold confidence level), and an exit notification is only sent to the person after there is high confidence level that the person has exited (see, e.g., view 2730 of FIG. 27, described below). In general, processing resources may be conserved by only performing potentially complex person re-identification tasks when a candidate list indicates that a person's identity is no longer known according to pre-established criteria.

Figure 27:
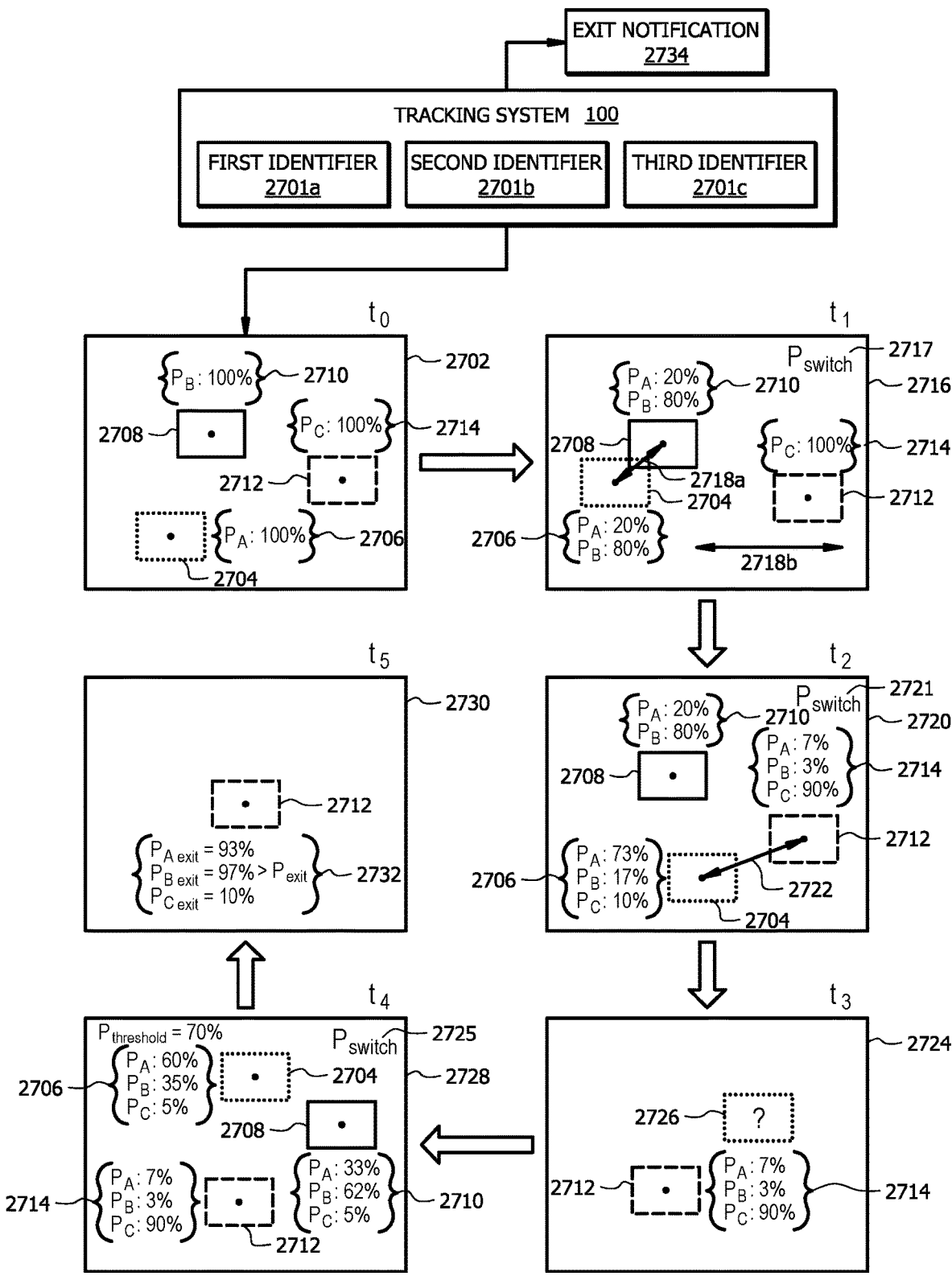
FIG. 27 is a diagram illustrating the use of candidate lists for object identification during object tracking by the tracking system.

FIG. 27 is a flow diagram illustrating how identifiers 2701a-c associated with tracked people (e.g., or any other target object) may be updated during tracking over a period of time from an initial time $t_0$ to a final time $t_5$ by tracking system 100. People may be tracked using tracking system 100 based on data from sensors 108, as described above. FIG. 27 depicts a plurality of views 2702, 2716, 2720, 2724, 2728, 2730 at different time points during tracking. In some embodiments, views 2702, 2716, 2720, 2724, 2728, 2730 correspond to a local frame view (e.g., as described above with respect to FIG. 22) from a sensor 108 with coordinates in units of pixels (e.g., or any other appropriate unit for the data type generated by the sensor 108). In other embodiments, views 2702, 2716, 2720, 2724, 2728, 2730 correspond to global views of the space 102 determined based on data from multiple sensors 108 with coordinates corresponding to physical positions in the space (e.g., as determined using the homographies described in greater detail above with respect to FIGS. 2-7). For clarity and conciseness, the example of FIG. 27 is described below in terms of global views of the space 102 (i.e., a view corresponding to the physical coordinates of the space 102).

The tracked object regions 2704, 2708, 2712 correspond to regions of the space 102 associated with the positions of corresponding people (e.g., or any other target object) moving through the space 102. For example, each tracked object region 2704, 2708, 2712 may correspond to a different person moving about in the space 102. Examples of determining the regions 2704, 2708, 2712 are described above, for example, with respect to FIGS. 21, 22, and 24. As one example, the tracked object regions 2704, 2708, 2712 may be bounding boxes identified for corresponding objects in the space 102. As another example, tracked object regions 2704, 2708, 2712 may correspond to pixel masks determined for contours associated with the corresponding objects in the space 102 (see, e.g., step 2104 of FIG. 21 for a more detailed description of the determination of a pixel mask). Generally, people may be tracked in the space 102 and regions 2704, 2708, 2712 may be determined using any appropriate tracking and identification method.

View 2702 at initial time $t_0$ includes a first tracked object region 2704, a second tracked object region 2708, and a third tracked object region 2712. The view 2702 may correspond to a representation of the space 102 from a top view with only the tracked object regions 2704, 2708, 2712 shown (i.e., with other objects in the space 102 omitted). At time $t_0$, the identities of all of the people are generally known (e.g., because the people have recently entered the space 102 and/or because the people have not yet been near each other). The first tracked object region 2704 is associated with a first candidate list 2706, which includes a probability ($P_A$=100%) that the region 2704 (or the corresponding person being tracked) is associated with a first identifier 2701a. The second tracked object region 2708 is associated with a second candidate list 2710, which includes a probability ($P_B$=100%) that the region 2708 (or the corresponding person being tracked) is associated with a second identifier 2701b. The third tracked object region 2712 is associated with a third candidate list 2714, which includes a probability ($P_C$=100%) that the region 2712 (or the corresponding person being tracked) is associated with a third identifier 2701c. Accordingly, at time $t_1$, the candidate lists 2706, 2710, 2714 indicate that the identity of each of the tracked object regions 2704, 2708, 2712 is known with all probabilities having a value of one hundred percent.

View 2716 shows positions of the tracked objects 2704, 2708, 2712 at a first time $t_1$, which is after the initial time $t_0$. At time $t_1$, the tracking system detects an event which may cause the identities of the tracked object regions 2704, 2708 to be less certain. In this example, the tracking system 100 detects that the distance 2718a between the first object region 274 and the second object region 2708 is less than or equal to a threshold distance 2718b. Because the tracked object regions were near each other (i.e., within the threshold distance 2718b), there is a non-zero probability that the regions may be misidentified during subsequent times. The threshold distance 2718b may be any appropriate distance, as described above with respect to FIG. 22. For example, the tracking system 100 may determine that the first object region 2704 is within the threshold distance 2718b of the second object region 2708 by determining first coordinates of the first object region 2704, determining second coordinates of the second object region 2708, calculating a distance 2718a, and comparing distance 2718a to the threshold distance 2718b. In some embodiments, the first and second coordinates correspond to pixel coordinates in an image capturing the first and second people, and the distance 2718a corresponds to a number of pixels between these pixel coordinates. For example, as illustrated in view 2716 of FIG. 27, the distance 2718a may correspond to the pixel distance between centroids of the tracked object regions 2704, 2708. In other embodiments, the first and second coordinates correspond to physical, or global, coordinates in the space 102, and the distance 2718a corresponds to a physical distance (e.g., in units of length, such as inches). For example, physical coordinates may be determined using the homographies described in greater detail above with respect to FIGS. 2-7.

After detecting that the identities of regions 2704, 2708 are less certain (i.e., that the first object region 2704 is within the threshold distance 2718b of the second object region 2708), the tracking system 100 determines a probability 2717 that the first tracked object region 2704 switched identifiers 2701a-c with the second tracked object region 2708. For example, when two contours become close in an image, there is a chance that the identities of the contours may be incorrect during subsequent tracking (e.g., because the tracking system 100 may assign the wrong identifier 2701a-c to the contours between frames). The probability 2717 that the identifiers 2701a-c switched may be determined, for example, by accessing a predefined probability value (e.g., of 50%). In other cases, the probability 2717 may be based on the distance 2718a between the object regions 2704, 2708. For example, as the distance 2718 decreases, the probability 2717 that the identifiers 2701a-c switched may increase. In the example of FIG. 27, the determined probability 2717 is 20%, because the object regions 2704, 2708 are relatively far apart but there is some overlap between the regions 2704, 2708.

In some embodiments, the tracking system 100 may determine a relative orientation between the first object region 2704 and the second object region 2708, and the probability 2717 that the object regions 2704, 2708 switched identifiers 2701a-c may be based on this relative orientation. The relative orientation may correspond to an angle between a direction a person associated with the first region 2704 is facing and a direction a person associated with the second region 2708 is facing. For example, if the angle between the directions faced by people associated with first and second regions 2704, 2708 is near 180° (i.e., such that the people are facing in opposite directions), the probability 2717 that identifiers 2701a-c switched may be decreased because this case may correspond to one person accidentally backing into the other person.

Based on the determined probability 2717 that the tracked object regions 2704, 2708 switched identifiers 2701a-c (e.g., 20% in this example), the tracking system 100 updates the first candidate list 2706 for the first object region 2704. The updated first candidate list 2706 includes a probability ($P_A$=80%) that the first region 2704 is associated with the first identifier 2701a and a probability ($P_B$=20%) that the first region 2704 is associated with the second identifier 2701b. The second candidate list 2710 for the second object region 2708 is similarly updated based on the probability 2717 that the first object region 2704 switched identifiers 2701a-c with the second object region 2708. The updated second candidate list 2710 includes a probability ($P_A$=20%) that the second region 2708 is associated with the first identifier 2701a and a probability ($P_B$=80%) that the second region 2708 is associated with the second identifier 2701b.

View 2720 shows the object regions 2704, 2708, 2712 at a second time point $t_2$, which follows time $t_1$. At time $t_2$, a first person corresponding to the first tracked region 2704 stands close to a third person corresponding to the third tracked region 2712. In this example case, the tracking system 100 detects that the distance 2722 between the first object region 2704 and the third object region 2712 is less than or equal to the threshold distance 2718b (i.e., the same threshold distance 2718b described above with respect to view 2716). After detecting that the first object region 2704 is within the threshold distance 2718b of the third object region 2712, the tracking system 100 determines a probability 2721 that the first tracked object region 2704 switched identifiers 2701a-c with the third tracked object region 2712. As described above, the probability 2721 that the identifiers 2701a-c switched may be determined, for example, by accessing a predefined probability value (e.g., of 50%). In some cases, the probability 2721 may be based on the distance 2722 between the object regions 2704, 2712. For example, since the distance 2722 is greater than distance 2718a (from view 2716, described above), the probability 2721 that the identifiers 2701a-c switched may be greater at time $t_1$ than at time $t_2$. In the example of view 2720 of FIG. 27, the determined probability 2721 is 10% (which is smaller than the switching probability 2717 of 20% determined at time $t_1$).

Based on the determined probability 2721 that the tracked object regions 2704, 2712 switched identifiers 2701a-c (e.g., of 10% in this example), the tracking system 100 updates the first candidate list 2706 for the first object region 2704. The updated first candidate list 2706 includes a probability ($P_A$=73%) that the first object region 2704 is associated with the first identifier 2701a, a probability ($P_B$=17%) that the first object region 2704 is associated with the second identifier 2701b, and a probability ($P_C$=10%) that the first object region 2704 is associated with the third identifier 2701c. The third candidate list 2714 for the third object region 2712 is similarly updated based on the probability 2721 that the first object region 2704 switched identifiers 2701a-c with the third object region 2712. The updated third candidate list 2714 includes a probability ($P_A$=7%) that the third object region 2712 is associated with the first identifier 2701a, a probability ($P_B$=3%) that the third object region 2712 is associated with the second identifier 2701b, and a probability ($P_C$=90%) that the third object region 2712 is associated with the third identifier 2701c. Accordingly, even though the third object region 2712 never interacted with (e.g., came within the threshold distance 2718b of) the second object region 2708, there is still a non-zero probability ($P_B=3\%$) that the third object region 2712 is associated with the second identifier 2701b, which was originally assigned (at time $t_0$) to the second object region 2708. In other words, the uncertainty in object identity that was detected at time $t_1$ is propagated to the third object region 2712 via the interaction with region 2704 at time $t_2$. This unique "propagation effect" facilitates improved object identification and can be used to narrow the search space (e.g., the number of possible identifiers 2701a-c that may be associated with a tracked object region 2704, 2708, 2712) when object re-identification is needed (as described in greater detail below and with respect to FIGS. 29-32).

View 2724 shows third object region 2712 and an unidentified object region 2726 at a third time point $t_3$, which follows time $t_2$. At time $t_3$, the first and second people associated with regions 2704, 2708 come into contact (e.g., or "collide") or are otherwise so close to one another that the tracking system 100 cannot distinguish between the people. For example, contours detected for determining the first object region 2704 and the second object region 2708 may have merged resulting in the single unidentified object region 2726. Accordingly, the position of object region 2726 may correspond to the position of one or both of object regions 2704 and 2708. At time $t_3$, the tracking system 100 may determine that the first and second object regions 2704, 2708 are no longer detected because a first contour associated with the first object region 2704 is merged with a second contour associated with the second object region 2708.

The tracking system 100 may wait until a subsequent time $t_4$ (shown in view 2728) when the first and second object regions 2704, 2708 are again detected before the candidate lists 2706, 2710 are updated. Time $t_4$ generally corresponds to a time when the first and second people associated with regions 2704, 2708 have separated from each other such that each person can be tracked in the space 102. Following a merging event such as is illustrated in view 2724, the probability 2725 that regions 2704 and 2708 have switched identifiers 2701a-c may be 50%. At time $t_4$, updated candidate list 2706 includes an updated probability ($P_A=60\%$) that the first object region 2704 is associated with the first identifier 2701a, an updated probability ($P_B=35\%$) that the first object region 2704 is associated with the second identifier 2701b, and an updated probability ($P_C=5\%$) that the first object region 2704 is associated with the third identifier 2701c. Updated candidate list 2710 includes an updated probability ($P_A=33\%$) that the second object region 2708 is associated with the first identifier 2701a, an updated probability ($P_B=62\%$) that the second object region 2708 is associated with the second identifier 2701b, and an updated probability ($P_C=5\%$) that the second object region 2708 is associated with the third identifier 2701c. Candidate list 2714 is unchanged.

Still referring to view 2728, the tracking system 100 may determine that a highest value probability of a candidate list is less than a threshold value (e.g., $P_{threshold}=70\%$). In response to determining that the highest probability of the first candidate list 2706 is less than the threshold value, the corresponding object region 2704 may be re-identified (e.g., using any method of re-identification described in this disclosure, for example, with respect to FIGS. 29-32). For instance, the first object region 2704 may be re-identified because the highest probability ($P_A=60\%$) is less than the threshold probability ($P_{threshold}=70\%$). The tracking system 100 may extract features, or descriptors, associated with observable characteristics of the first person (or corresponding contour) associated with the first object region 2704. The observable characteristics may be a height of the object (e.g., determined from depth data received from a sensor), a color associated with an area inside the contour (e.g., based on color image data from a sensor 108), a width of the object, an aspect ratio (e.g., width/length) of the object, a volume of the object (e.g., based on depth data from sensor 108), or the like. Examples of other descriptors are described in greater detail below with respect to FIG. 30. As described in greater detail below, a texture feature (e.g., determined using a local binary pattern histogram (LBPH) algorithm) may be calculated for the person. Alternatively or additionally, an artificial neural network may be used to associate the person with the correct identifier 2701a-c (e.g., as described in greater detail below with respect to FIG. 29-32).

Using the candidate lists 2706, 2710, 2714 may facilitate more efficient re-identification than was previously possible because, rather than checking all possible identifiers 2701a-c (e.g., and other identifiers of people in space 102 not illustrated in FIG. 27) for a region 2704, 2708, 2712 that has an uncertain identity, the tracking system 100 may identify a subset of all the other identifiers 2701a-c that are most likely to be associated with the unknown region 2704, 2708, 2712 and only compare descriptors of the unknown region 2704, 2708, 2712 to descriptors associated with the subset of identifiers 2701a-c. In other words, if the identity of a tracked person is not certain, the tracking system 100 may only check to see if the person is one of the few people indicated in the person's candidate list, rather than comparing the unknown person to all of the people in the space 102. For example, only identifiers 2701a-c associated with a non-zero probability, or a probability greater than a threshold value, in the candidate list 2706 are likely to be associated with the correct identifier 2701a-c of the first region 2704. In some embodiments, the subset may include identifiers 2701a-c from the first candidate list 2706 with probabilities that are greater than a threshold probability value (e.g., of 10%). Thus, the tracking system 100 may compare descriptors of the person associated with region 2704 to predetermined descriptors associated with the subset. As described in greater detail below with respect to FIGS. 29-32, the predetermined features (or descriptors) may be determined when a person enters the space 102 and associated with the known identifier 2701a-c of the person during the entrance time period (i.e., before any events may cause the identity of the person to be uncertain. In the example of FIG. 27, the object region 2708 may also be re-identified at or after time $t_4$ because the highest probability $P_B=62\%$ is less than the example threshold probability of 70%.

View 2730 corresponds to a time $t_5$ at which only the person associated with object region 2712 remains within the space 102. View 2730 illustrates how the candidate lists 2706, 2710, 2714 can be used to ensure that people only receive an exit notification 2734 when the system 100 is certain the person has exited the space 102. In these embodiments, the tracking system 100 may be configured to transmit an exit notification 2734 to devices associated with these people when the probability that a person has exited the space 102 is greater than an exit threshold (e.g., $P_{exit}=95\%$ or greater).

An exit notification 2734 is generally sent to the device of a person and includes an acknowledgement that the tracking system 100 has determined that the person has exited the space 102. For example, if the space 102 is a store, the exit notification 2734 provides a confirmation to the person that the tracking system 100 knows the person has exited the store and is, thus, no longer shopping. This may provide assurance to the person that the tracking system 100 is operating properly and is no longer assigning items to the person or incorrectly charging the person for items that he/she did not intend to purchase.

As people exit the space 102, the tracking system 100 may maintain a record 2732 of exit probabilities to determine when an exit notification 2734 should be sent. In the example of FIG. 27, at time $t_5$ (shown in view 2730), the record 2732 includes an exit probability ($P_{A,exit}$=93%) that a first person associated with the first object region 2704 has exited the space 102. Since $P_{A,exit}$ is less than the example threshold exit probability of 95%, an exit notification 2734 would not be sent to the first person (e.g., to his/her device). Thus, even though the first object region 2704 is no longer detected in the space 102, an exit notification 2734 is not sent, because there is still a chance that the first person is still in the space 102 (i.e., because of identity uncertainties that are captured and recorded via the candidate lists 2706, 2710, 2714). This prevents a person from receiving an exit notification 2734 before he/she has exited the space 102. The record 2732 includes an exit probability ($P_{B,exit}$=97%) that the second person associated with the second object region 2708 has exited the space 102. Since $P_{B,exit}$ is greater than the threshold exit probability of 95%, an exit notification 2734 is sent to the second person (e.g., to his/her device). The record 2732 also includes an exit probability ($P_{C,exit}$=10%) that the third person associated with the third object region 2712 has exited the space 102. Since $P_{C,exit}$ is less than the threshold exit probability of 95%, an exit notification 2734 is not sent to the third person (e.g., to his/her device).

Figure 28:
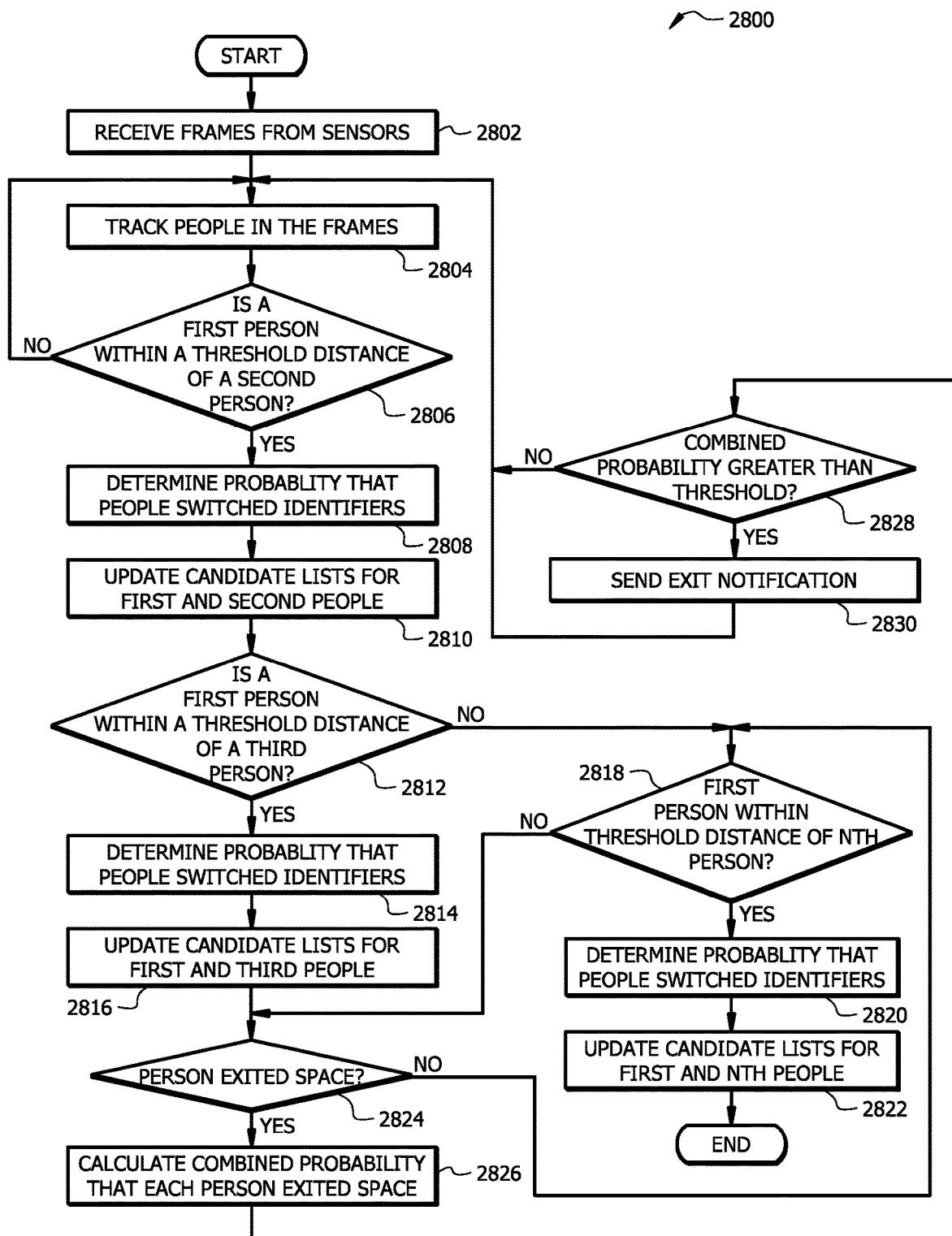
FIG. 28 is a flowchart illustrating an example method of maintaining candidate lists during object tracking by the tracking system.

FIG. 28 is a flowchart of a method 2800 for creating and/or maintaining candidate lists 2706, 2710, 2714 by tracking system 100. Method 2800 generally facilitates improved identification of tracked people (e.g., or other target objects) by maintaining candidate lists 2706, 2710, 2714 which, for a given tracked person, or corresponding tracked object region (e.g., region 2704, 2708, 2712), include possible identifiers 2701a-c for the object and a corresponding probability that each identifier 2701a-c is correct for the person. By maintaining candidate lists 2706, 2710, 2714 for tracked people, the people may be more effectively and efficiently identified during tracking. For example, costly person re-identification (e.g., in terms of system resources expended) may only be used when a candidate list indicates that a person's identity is sufficiently uncertain.

Method 2800 may begin at step 2802 where image frames are received from one or more sensors 108. At step 2804, the tracking system 100 uses the received frames to track objects in the space 102. In some embodiments, tracking is performed using one or more of the unique tools described in this disclosure (e.g., with respect to FIGS. 24-26). However, in general, any appropriate method of sensor-based object tracking may be employed.

At step 2806, the tracking system 100 determines whether a first person is within a threshold distance 2718b of a second person. This case may correspond to the conditions shown in view 2716 of FIG. 27, described above, where first object region 2704 is distance 2718a away from second object region 2708. As described above, the distance 2718a may correspond to a pixel distance measured in a frame or a physical distance in the space 102 (e.g., determined using a homography associating pixel coordinates to physical coordinates in the space 102). If the first and second people are not within the threshold distance 2718b of each other, the system 100 continues tracking objects in the space 102 (i.e., by returning to step 2804).

However, if the first and second people are within the threshold distance 2718b of each other, method 2800 proceeds to step 2808, where the probability 2717 that the first and second people switched identifiers 2701a-c is determined. As described above, the probability 2717 that the identifiers 2701a-c switched may be determined, for example, by accessing a predefined probability value (e.g., of 50%). In some embodiments, the probability 2717 is based on the distance 2718a between the people (or corresponding object regions 2704, 2708), as described above. In some embodiments, as described above, the tracking system 100 determines a relative orientation between the first person and the second person, and the probability 2717 that the people (or corresponding object regions 2704, 2708) switched identifiers 2701a-c is determined, at least in part, based on this relative orientation.

At step 2810, the candidate lists 2706, 2710 for the first and second people (or corresponding object regions 2704, 2708) are updated based on the probability 2717 determined at step 2808. For instance, as described above, the updated first candidate list 2706 may include a probability that the first object is associated with the first identifier 2701a and a probability that the first object is associated with the second identifier 2701b. The second candidate list 2710 for the second person is similarly updated based on the probability 2717 that the first object switched identifiers 2701a-c with the second object (determined at step 2808). The updated second candidate list 2710 may include a probability that the second person is associated with the first identifier 2701a and a probability that the second person is associated with the second identifier 2701b.

At step 2812, the tracking system 100 determines whether the first person (or corresponding region 2704) is within a threshold distance 2718b of a third object (or corresponding region 2712). This case may correspond, for example, to the conditions shown in view 2720 of FIG. 27, described above, where first object region 2704 is distance 2722 away from third object region 2712. As described above, the threshold distance 2718b may correspond to a pixel distance measured in a frame or a physical distance in the space 102 (e.g., determined using an appropriate homography associating pixel coordinates to physical coordinates in the space 102).

If the first and third people (or corresponding regions 2704 and 2712) are within the threshold distance 2718b of each other, method 2800 proceeds to step 2814, where the probability 2721 that the first and third people (or corresponding regions 2704 and 2712) switched identifiers 2701a-c is determined. As described above, this probability 2721 that the identifiers 2701a-c switched may be determined, for example, by accessing a predefined probability value (e.g., of 50%). The probability 2721 may also or alternatively be based on the distance 2722 between the objects 2727 and/or a relative orientation of the first and third people, as described above. At step 2816, the candidate lists 2706, 2714 for the first and third people (or corresponding regions 2704, 2712) are updated based on the probability 2721 determined at step 2808. For instance, as described above, the updated first candidate list 2706 may include a probability that the first person is associated with the first identifier 2701a, a probability that the first person is associated with the second identifier 2701b, and a probability that the first object is associated with the third identifier 2701c. The third candidate list 2714 for the third person is similarly updated based on the probability 2721 that the first person switched identifiers with the third person (i.e., determined at step 2814). The updated third candidate list 2714 may include, for example, a probability that the third object is associated with the first identifier 2701*a*, a probability that the third object is associated with the second identifier 2701*b*, and a probability that the third object is associated with the third identifier 2701*c*. Accordingly, if the steps of method 2800 proceed in the example order illustrated in FIG. 28, the candidate list 2714 of the third person includes a non-zero probability that the third object is associated with the second identifier 2701*b*, which was originally associated with the second person.

If, at step 2812, the first and third people (or corresponding regions 2704 and 2712) are not within the threshold distance 2718*b* of each other, the system 100 generally continues tracking people in the space 102. For example, the system 100 may proceed to step 2818 to determine whether the first person is within a threshold distance of an $n^{th}$ person (i.e., some other person in the space 102). At step 2820, the system 100 determines the probability that the first and $n^{th}$ people switched identifiers 2701*a-c*, as described above, for example, with respect to steps 2808 and 2814. At step 2822, the candidate lists for the first and $n^{th}$ people are updated based on the probability determined at step 2820, as described above, for example, with respect to steps 2810 and 2816 before method 2800 ends. If, at step 2818, the first person is not within the threshold distance of the $n^{th}$ person, the method 2800 proceeds to step 2824.

At step 2824, the tracking system 100 determines if a person has exited the space 102. For instance, as described above, the tracking system 100 may determine that a contour associated with a tracked person is no longer detected for at least a threshold time period (e.g., of about 30 seconds or more). The system 100 may additionally determine that a person exited the space 102 when a person is no longer detected and a last determined position of the person was at or near an exit position (e.g., near a door leading to a known exit from the space 102). If a person has not exited the space 102, the tracking system 100 continues to track people (e.g., by returning to step 2802).

If a person has exited the space 102, the tracking system 100 calculates or updates record 2732 of probabilities that the tracked objects have exited the space 102 at step 2826. As described above, each exit probability of record 2732 generally corresponds to a probability that a person associated with each identifier 2701*a-c* has exited the space 102. At step 2828, the tracking system 100 determines if a combined exit probability in the record 2732 is greater than a threshold value (e.g., of 95% or greater). If a combined exit probability is not greater than the threshold, the tracking system 100 continues to track objects (e.g., by continuing to step 2818).

If an exit probability from record 2732 is greater than the threshold, a corresponding exit notification 2734 may be sent to the person linked to the identifier 2701*a-c* associated with the probability at step 2830, as described above with respect to view 2730 of FIG. 27. This may prevent or reduce instances where an exit notification 2734 is sent prematurely while an object is still in the space 102. For example, it may be beneficial to delay sending an exit notification 2734 until there is a high certainty that the associated person is no longer in the space 102. In some cases, several tracked people must exit the space 102 before an exit probability in record 2732 for a given identifier 2701*a-c* is sufficiently large for an exit notification 2734 to be sent to the person (e.g., to a device associated with the person).

Modifications, additions, or omissions may be made to method 2800 depicted in FIG. 28. Method 2800 may include more, fewer, or other steps. For example, steps may be performed in parallel or in any suitable order. While at times discussed as tracking system 100 or components thereof performing steps, any suitable system or components of the system may perform one or more steps of the method 2800.

Person Re-Identification

As described above, in some cases, the identity of a tracked person can become unknown (e.g., when the people become closely spaced or "collide", or when the candidate list of a person indicates the person's identity is not known, as described above with respect to FIGS. 27-28), and the person may need to be re-identified. This disclosure contemplates a unique approach to efficiently and reliably re-identifying people by the tracking system 100. For example, rather than relying entirely on resource-expensive machine learning-based approaches to re-identify people, a more efficient and specially structured approach may be used where "lower-cost" descriptors related to observable characteristics (e.g., height, color, width, volume, etc.) of people are used first for person re-identification. "Higher-cost" descriptors (e.g., determined using artificial neural network models) are only used when the lower-cost methods cannot provide reliable results. For instance, in some embodiments, a person may first be re-identified based on his/her height, hair color, and/or shoe color. However, if these descriptors are not sufficient for reliably re-identifying the person (e.g., because other people being tracked have similar characteristics), progressively higher-level approaches may be used (e.g., involving artificial neural networks that are trained to recognize people) which may be more effective at person identification but which generally involve the use of more processing resources.

As an example, each person's height may be used initially for re-identification. However, if another person in the space 102 has a similar height, a height descriptor may not be sufficient for re-identifying the people (e.g., because it is not possible to distinguish between people with similar heights based on height alone), and a higher-level approach may be used (e.g., using a texture operator or an artificial neural network to characterize the person). In some embodiments, if the other person with a similar height has never interacted with the person being re-identified (e.g., as recorded in each person's candidate list—see FIG. 27 and corresponding description above), height may still be an appropriate feature for re-identifying the person (e.g., because the other person with a similar height is not associated with a candidate identity of the person being re-identified).

Figure 29:
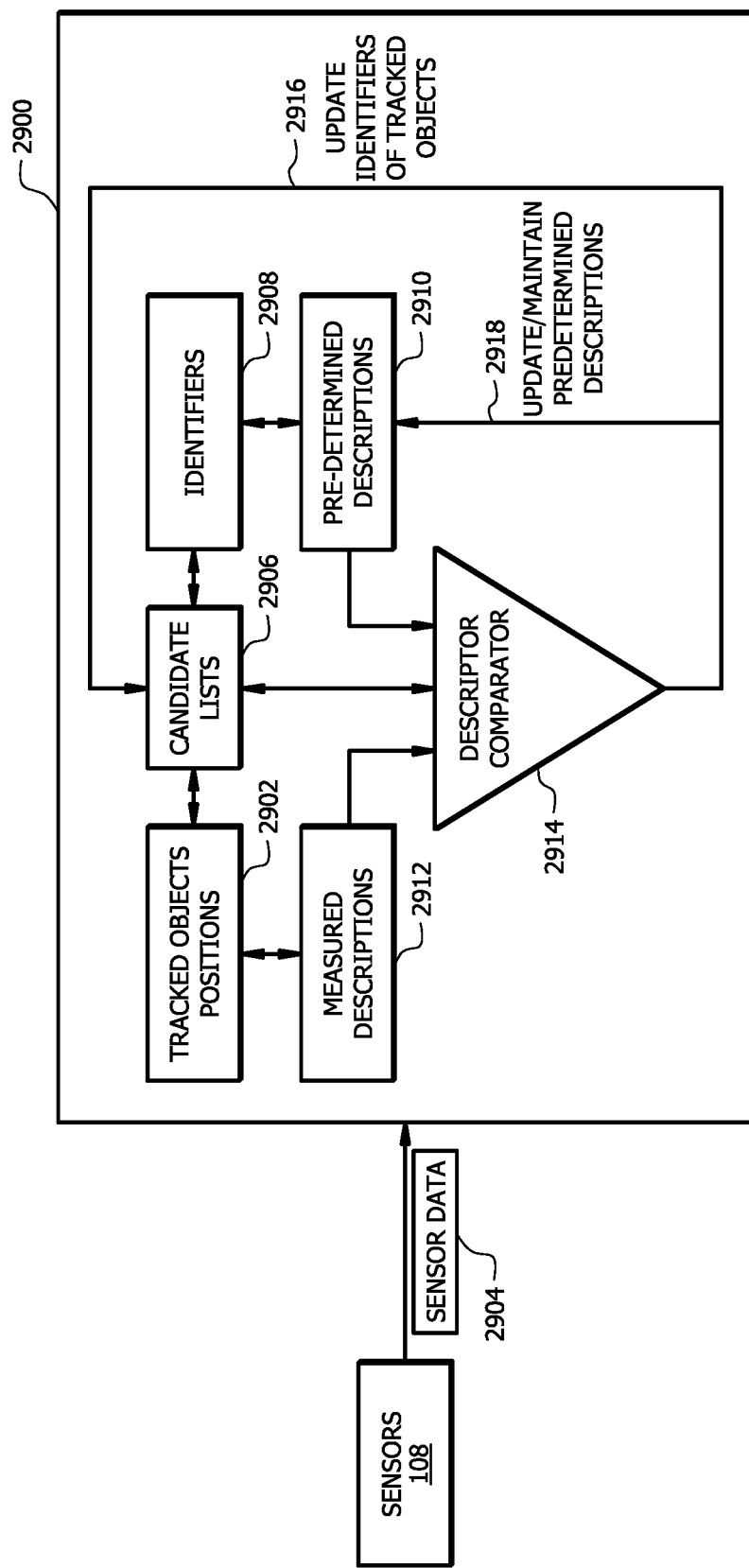
FIG. 29 is a diagram illustrating an example tracking subsystem for use in the tracking system.

FIG. 29 illustrates a tracking subsystem 2900 configured to track people (e.g., and/or other target objects) based on sensor data 2904 received from one or more sensors 108. In general, the tracking subsystem 2900 may include one or both of the server 106 and the client(s) 105 of FIG. 1, described above. Tracking subsystem 2900 may be implemented using the device 3800 described below with respect to FIG. 38. Tracking subsystem 2900 may track object positions 2902, over a period of time using sensor data 2904 (e.g., top-view images) generated by at least one of sensors 108. Object positions 2902 may correspond to local pixel positions (e.g., pixel positions 2226, 2234 of FIG. 22) determined at a single sensor 108 and/or global positions corresponding to physical positions (e.g., positions 2228 of FIG. 22) in the space 102 (e.g., using the homographies described above with respect to FIGS. 2-7). In some cases, object positions 2902 may correspond to regions detected in an image, or in the space 102, that are associated with the location of a corresponding person (e.g., regions 2704, 2708, 2712 of FIG. 27, described above). People may be tracked and corresponding positions 2902 may be determined, for example, based on pixel coordinates of contours detected in top-view images generated by sensor(s) 108. Examples of contour-based detection and tracking are described above, for example, with respect to FIGS. 24 and 27. However, in general, any appropriate method of sensor-based tracking may be used to determine positions 2902.

For each object position 2902, the subsystem 2900 maintains a corresponding candidate list 2906 (e.g., as described above with respect to FIG. 27). The candidate lists 2906 are generally used to maintain a record of the most likely identities of each person being tracked (i.e., associated with positions 2902). Each candidate list 2906 includes probabilities which are associated with identifiers 2908 of people that have entered the space 102. The identifiers 2908 may be any appropriate representation (e.g., an alphanumeric string, or the like) for identifying a person (e.g., a username, name, account number, or the like associated with the person being tracked). In some embodiments, the identifiers 2908 may be anonymized (e.g., using hashing or any other appropriate anonymization technique).

Each of the identifiers 2908 is associated with one or more predetermined descriptors 2910. The predetermined descriptors 2910 generally correspond to information about the tracked people that can be used to re-identify the people when necessary (e.g., based on the candidate lists 2906). The predetermined descriptors 2910 may include values associated with observable and/or calculated characteristics of the people associated with the identifiers 2908. For instance, the descriptors 2910 may include heights, hair colors, clothing colors, and the like. As described in greater detail below, the predetermined descriptors 2910 are generally determined by the tracking subsystem 2900 during an initial time period (e.g., when a person associated with a given tracked position 2902 enters the space) and are used to re-identify people associated with tracked positions 2902 when necessary (e.g., based on candidate lists 2906).

When re-identification is needed (or periodically during tracking) for a given person at position 2902, the tracking subsystem 2900 may determine measured descriptors 2912 for the person associated with the position 2902. FIG. 30 illustrates the determination of descriptors 2910, 2912 based on a top-view depth image 3002 received from a sensor 108. A representation 2904a of a person corresponding to the tracked object position 2902 is observable in the image 3002. The tracking subsystem 2900 may detect a contour 3004b associated with the representation 3004a. The contour 3004b may correspond to a boundary of the representation 3004a (e.g., determined at a given depth in image 3002). Tracking subsystem 2900 generally determines descriptors 2910, 2912 based on the representation 3004a and/or the contour 3004b. In some cases, the representation 3004b appears within a predefined region-of-interest 3006 of the image 3002 in order for descriptors 2910, 2912 to be determined by the tracking subsystem 2900. This may facilitate more reliable descriptor 2910, 2912 determination, for example, because descriptors 2910, 2912 may be more reproducible and/or reliable when the person being imaged is located in the portion of the sensor's field-of-view that corresponds to this region-of-interest 3006. For example, descriptors 2910, 2912 may have more consistent values when the person is imaged within the region-of-interest 3006.

Descriptors 2910, 2912 determined in this manner may include, for example, observable descriptors 3008 and calculated descriptors 3010. For example, the observable descriptors 3008 may correspond to characteristics of the representation 3004a and/or contour 3004b which can be extracted from the image 3002 and which correspond to observable features of the person. Examples of observable descriptors 3008 include a height descriptor 3012 (e.g., a measure of the height in pixels or units of length) of the person based on representation 3004a and/or contour 3004b), a shape descriptor 3014 (e.g., width, length, aspect ratio, etc.) of the representation 3004a and/or contour 3004b, a volume descriptor 3016 of the representation 3004a and/or contour 3004b, a color descriptor 3018 of representation 3004a (e.g., a color of the person's hair, clothing, shoes, etc.), an attribute descriptor 3020 associated with the appearance of the representation 3004a and/or contour 3004b (e.g., an attribute such as "wearing a hat," "carrying a child," "pushing a stroller or cart,"), and the like.

In contrast to the observable descriptors 3008, the calculated descriptors 3010 generally include values (e.g., scalar or vector values) which are calculated using the representation 3004a and/or contour 3004b and which do not necessarily correspond to an observable characteristic of the person. For example, the calculated descriptors 3010 may include image-based descriptors 3022 and model-based descriptors 3024. Image-based descriptors 3022 may, for example, include any descriptor values (i.e., scalar and/or vector values) calculated from image 3002. For example, a texture operator such as a local binary pattern histogram (LBPH) algorithm may be used to calculate a vector associated with the representation 3004a. This vector may be stored as a predetermined descriptor 2910 and measured at subsequent times as a descriptor 2912 for re-identification. Since the output of a texture operator, such as the LBPH algorithm may be large (i.e., in terms of the amount of memory required to store the output), it may be beneficial to select a subset of the output that is most useful for distinguishing people. Accordingly, in some cases, the tracking subsystem 2900 may select a portion of the initial data vector to include in the descriptor 2910, 2912. For example, a principal component analysis may be used to select and retain a portion of the initial data vector that is most useful for effective person re-identification.

In contrast to the image-based descriptors 3022, model-based descriptors 3024 are generally determined using a predefined model, such as an artificial neural network. For example, a model-based descriptor 3024 may be the output (e.g., a scalar value or vector) output by an artificial neural network trained to recognize people based on their corresponding representation 3004a and/or contour 3004b in top-view image 3002. For example, a Siamese neural network may be trained to associate representations 3004a and/or contours 3004b in top-view images 3002 with corresponding identifiers 2908 and subsequently employed for re-identification 2929.

Returning to FIG. 29, the descriptor comparator 2914 of the tracking subsystem 2900 may be used to compare the measured descriptor 2912 to corresponding predetermined descriptors 2910 in order to determine the correct identity of a person being tracked. For example, the measured descriptor 2912 may be compared to a corresponding predetermined descriptor 2910 in order to determine the correct identifier 2908 for the person at position 2902. For instance, if the measured descriptor 2912 is a height descriptor 3012, it may be compared to predetermined height descriptors 2910 for identifiers 2908, or a subset of the identifiers 2908 determined using the candidate list 2906. Comparing the descriptors 2910, 2912 may involve calculating a difference between scalar descriptor values (e.g., a difference in heights 3012, volumes 3018, etc.), determining whether a value of a measured descriptor 2912 is within a threshold range of the corresponding predetermined descriptor 2910 (e.g., determining if a color value 3018 of the measured descriptor 2912 is within a threshold range of the color value 3018 of the predetermined descriptor 2910), determining a cosine similarity value between vectors of the measured descriptor 2912 and the corresponding predetermined descriptor 2910 (e.g., determining a cosine similarity value between a measured vector calculated using a texture operator or neural network and a predetermined vector calculated in the same manner). In some embodiments, only a subset of the predetermined descriptors 2910 are compared to the measured descriptor 2912. The subset may be selected using the candidate list 2906 for the person at position 2902 that is being re-identified. For example, the person's candidate list 2906 may indicate that only a subset (e.g., two, three, or so) of a larger number of identifiers 2908 are likely to be associated with the tracked object position 2902 that requires re-identification.

When the correct identifier 2908 is determined by the descriptor comparator 2914, the comparator 2914 may update the candidate list 2906 for the person being re-identified at position 2902 (e.g., by sending update 2916). In some cases, a descriptor 2912 may be measured for an object that does not require re-identification (e.g., a person for which the candidate list 2906 indicates there is 100% probability that the person corresponds to a single identifier 2908). In these cases, measured identifiers 2912 may be used to update and/or maintain the predetermined descriptors 2910 for the person's known identifier 2908 (e.g., by sending update 2918). For instance, a predetermined descriptor 2910 may need to be updated if a person associated with the position 2902 has a change of appearance while moving through the space 102 (e.g., by adding or removing an article of clothing, by assuming a different posture, etc.).

Figure 31A:
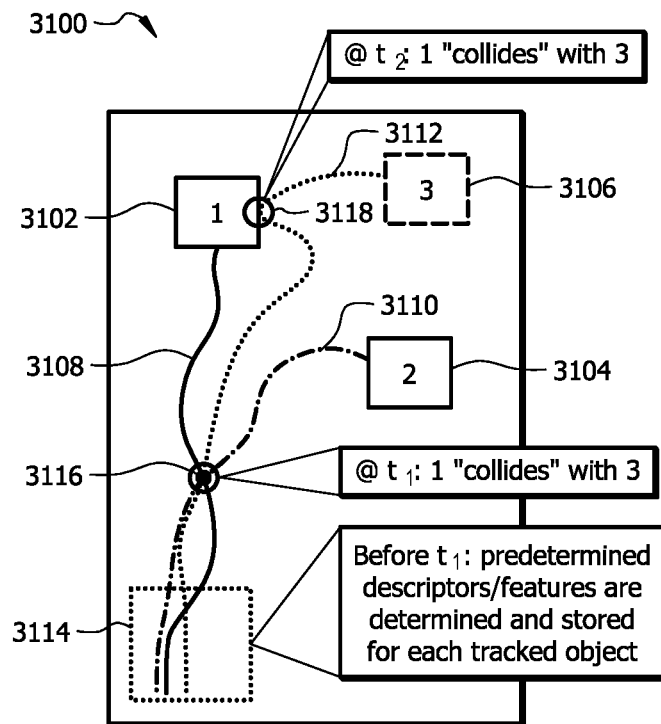
FIGS. 31A-C are diagrams illustrating the use of descriptors for re-identification during object tracking by the tracking system.

FIG. 31A illustrates positions over a period of time of tracked people 3102, 3104, 3106, during an example operation of tracking system 2900. The first person 3102 has a corresponding trajectory 3108 represented by the solid line in FIG. 31A. Trajectory 3108 corresponds to the history of positions of person 3102 in the space 102 during the period of time. Similarly, the second person 3104 has a corresponding trajectory 3110 represented by the dashed-dotted line in FIG. 31A. Trajectory 3110 corresponds to the history of positions of person 3104 in the space 102 during the period of time. The third person 3106 has a corresponding trajectory 3112 represented by the dotted line in FIG. 31A. Trajectory 3112 corresponds to the history of positions of person 3112 in the space 102 during the period of time.

When each of the people 3102, 3104, 3106 first enter the space 102 (e.g., when they are within region 3114), predetermined descriptors 2910 are generally determined for the people 3102, 3104, 3106 and associated with the identifiers 2908 of the people 3102, 3104, 3106. The predetermined descriptors 2910 are generally accessed when the identity of one or more of the people 3102, 3104, 3106 is not sufficiently certain (e.g., based on the corresponding candidate list 2906 and/or in response to a "collision event," as described below) in order to re-identify the person 3102, 3104, 3106. For example, re-identification may be needed following a "collision event" between two or more of the people 3102, 3104, 3106. A collision event typically corresponds to an image frame in which contours associated with different people merge to form a single contour (e.g., the detection of merged contour 2220 shown in FIG. 22 may correspond to detecting a collision event). In some embodiments, a collision event corresponds to a person being located within a threshold distance of another person (see, e.g., distance 2718a and 2722 in FIG. 27 and the corresponding description above). More generally, a collision event may correspond to any event that results in a person's candidate list 2906 indicating that re-identification is needed (e.g., based on probabilities stored in the candidate list 2906—see FIGS. 27-28 and the corresponding description above).

Figure 30:
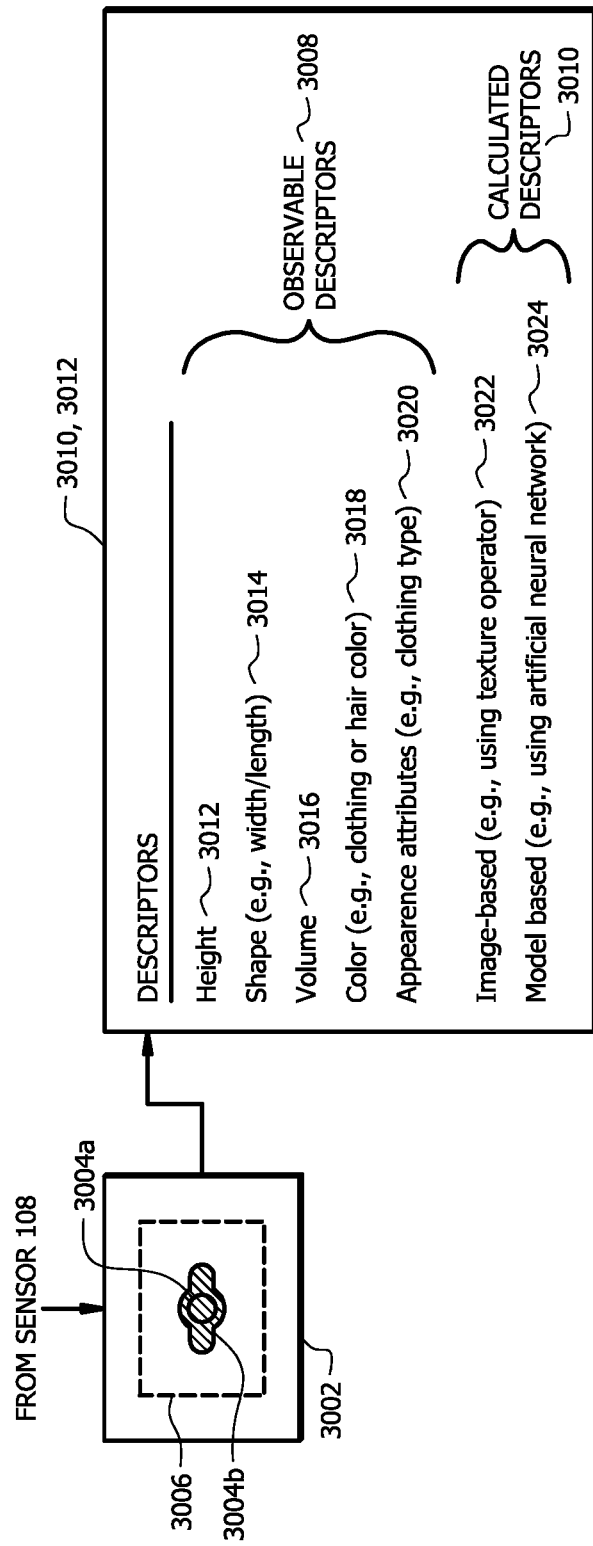
FIG. 30 is a diagram illustrating the determination of descriptors based on object features using the tracking system.

In the example of FIG. 31A, when the people 3102, 3104, 3106 are within region 3114, the tracking subsystem 2900 may determine a first height descriptor 3012 associated with a first height of the first person 3102, a first contour descriptor 3014 associated with a shape of the first person 3102, a first anchor descriptor 3024 corresponding to a first vector generated by an artificial neural network for the first person 3102, and/or any other descriptors 2910 described with respect to FIG. 30 above. Each of these descriptors is stored for use as a predetermined descriptor 2910 for re-identifying the first person 3102. These predetermined descriptors 2910 are associated with the first identifier (i.e., of identifiers 2908) of the first person 3102. When the identity of the first person 3102 is certain (e.g., prior to the first collision event at position 3116), each of the descriptors 2910 described above may be determined again to update the predetermined descriptors 2910. For example, if person 3102 moves to a position in the space 102 that allows the person 3102 to be within a desired region-of-interest (e.g., region-of-interest 3006 of FIG. 30), new descriptors 2912 may be determined. The tracking subsystem 2900 may use these new descriptors 2912 to update the previously determined descriptors 2910 (e.g., see update 2918 of FIG. 29). By intermittently updating the predetermined descriptors 2910, changes in the appearance of people being tracked can be accounted for (e.g., if a person puts on or removes an article of clothing, assumes a different posture, etc.).

At a first timestamp associated with a time $t_1$, the tracking subsystem 2900 detects a collision event between the first person 3102 and third person 3106 at position 3116 illustrated in FIG. 31A. For example, the collision event may correspond to a first tracked position of the first person 3102 being within a threshold distance of a second tracked position of the third person 3106 at the first timestamp. In some embodiments, the collision event corresponds to a first contour associated with the first person 3102 merging with a third contour associated with the third person 3106 at the first timestamp. More generally, the collision event may be associated with any occurrence which causes a highest value probability of a candidate list associated with the first person 3102 and/or the third person 3106 to fall below a threshold value (e.g., as described above with respect to view 2728 of FIG. 27). In other words, any event causing the identity of person 3102 to become uncertain may be considered a collision event.

After the collision event is detected, the tracking subsystem 2900 receives a top-view image (e.g., top-view image 3002 of FIG. 30) from sensor 108. The tracking subsystem 2900 determines, based on the top-view image, a first descriptor for the first person 3102. As described above, the first descriptor includes at least one value associated with an observable, or calculated, characteristic of the first person 3104 (e.g., of representation 3004a and/or contour 3004b of FIG. 30). In some embodiments, the first descriptor may be a "lower-cost" descriptor that requires relatively few processing resources to determine, as described above. For example, the tracking subsystem 2900 may be able to determine a lower-cost descriptor more efficiently than it can determine a higher-cost descriptor (e.g., a model-based descriptor 3024 described above with respect to FIG. 30). For instance, a first number of processing cores used to determine the first descriptor may be less than a second number of processing cores used to determine a model-based descriptor 3024 (e.g., using an artificial neural network). Thus, it may be beneficial to re-identify a person, whenever possible, using a lower-cost descriptor whenever possible.

However, in some cases, the first descriptor may not be sufficient for re-identifying the first person 3102. For example, if the first person 3102 and the third person 3106 correspond to people with similar heights, a height descriptor 3012 generally cannot be used to distinguish between the people 3102, 3106. Accordingly, before the first descriptor 2912 is used to re-identify the first person 3102, the tracking subsystem 2900 may determine whether certain criteria are satisfied for distinguishing the first person 3102 from the third person 3106 based on the first descriptor 2912. In some embodiments, the criteria are not satisfied when a difference, determined during a time interval associated with the collision event (e.g., at a time at or near time $t_1$), between the descriptor 2912 of the first person 3102 and a corresponding descriptor 2912 of the third person 3106 is less than a minimum value.

Figure 31B:
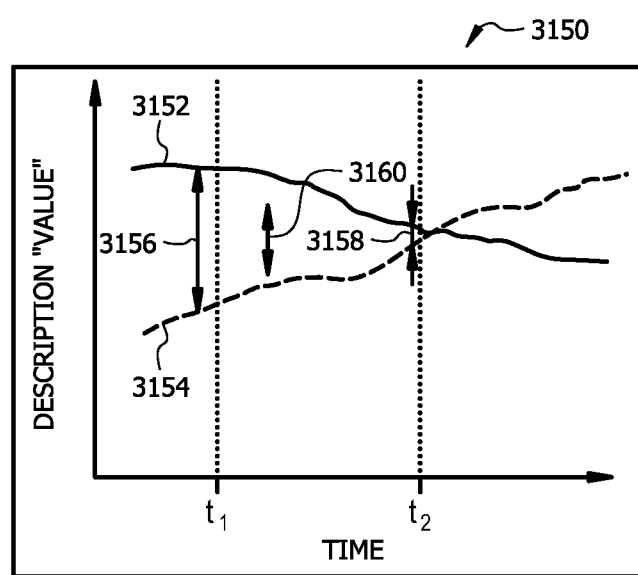

FIG. 31B illustrates the evaluation of these criteria based on the history of descriptor values for people 3102 and 3106 over time. Plot 3150, shown in FIG. 31B, shows a first descriptor value 3152 for the first person 3102 over time and a second descriptor value 3154 for the third person 3106 over time. In general, descriptor values may fluctuate over time because of changes in the environment, the orientation of people relative to sensors 108, sensor variability, changes in appearance, etc. The descriptor values 3152, 3154 may be associated with a shape descriptor 3014, a volume 3016, a contour-based descriptor 3022, or the like, as described above with respect to FIG. 30. At time $t_1$, the descriptor values 3152, 3154 have a relatively large difference 3156 that is greater than the threshold difference 3160, illustrated in FIG. 31B. Accordingly, in this example, at or near (e.g., within a brief time interval of a few seconds or minutes following $t_1$), the criteria are satisfied and the descriptor 2912 associated with descriptor values 3152, 3154 can generally be used to re-identify the first and third people 3102, 3106.

When the criteria are satisfied for distinguishing the first person 3102 from the third person 3106 based on the first descriptor 2912 (as is the case at $t_1$), the descriptor comparator 2914 may compare the first descriptor 2912 for the first person 3102 to each of the corresponding predetermined descriptors 2910 (i.e., for all identifiers 2908). However, in some embodiments, comparator 2914 may compare the first descriptor 2912 for the first person 3102 to predetermined descriptors 2910 for only a select subset of the identifiers 2908. The subset may be selected using the candidate list 2906 for the person that is being re-identified (see, e.g., step 3208 of method 3200 described below with respect to FIG. 32). For example, the person's candidate list 2906 may indicate that only a subset (e.g., two, three, or so) of a larger number of identifiers 2908 are likely to be associated with the tracked object position 2902 that requires re-identification. Based on this comparison, the tracking subsystem 2900 may identify the predetermined descriptor 2910 that is most similar to the first descriptor 2912. For example, the tracking subsystem 2900 may determine that a first identifier 2908 corresponds to the first person 3102 by, for each member of the set (or the determined subset) of the predetermined descriptors 2910, calculating an absolute value of a difference in a value of the first descriptor 2912 and a value of the predetermined descriptor 2910. The first identifier 2908 may be selected as the identifier 2908 associated with the smallest absolute value.

Referring again to FIG. 31A, at time $t_2$, a second collision event occurs at position 3118 between people 3102, 3106. Turning back to FIG. 31B, the descriptor values 3152, 3154 have a relatively small difference 3158 at time $t_2$ (e.g., compared to difference 3156 at time $t_1$), which is less than the threshold value 3160. Thus, at time $t_2$, the descriptor 2912 associated with descriptor values 3152, 3154 generally cannot be used to re-identify the first and third people 3102, 3106, and the criteria for using the first descriptor 2912 are not satisfied. Instead, a different, and likely a "higher-cost" descriptor 2912 (e.g., a model-based descriptor 3024) should be used to re-identify the first and third people 3102, 3106 at time $t_2$.

For example, when the criteria are not satisfied for distinguishing the first person 3102 from the third person 3106 based on the first descriptor 2912 (as is the case in this example at time $t_2$), the tracking subsystem 2900 determines a new descriptor 2912 for the first person 3102. The new descriptor 2912 is typically a value or vector generated by an artificial neural network configured to identify people in top-view images (e.g., a model-based descriptor 3024 of FIG. 30). The tracking subsystem 2900 may determine, based on the new descriptor 2912, that a first identifier 2908 from the predetermined identifiers 2908 (or a subset determined based on the candidate list 2906, as described above) corresponds to the first person 3102. For example, the tracking subsystem 2900 may determine that the first identifier 2908 corresponds to the first person 3102 by, for each member of the set (or subset) of predetermined identifiers 2908, calculating an absolute value of a difference in a value of the first identifier 2908 and a value of the predetermined descriptors 2910. The first identifier 2908 may be selected as the identifier 2908 associated with the smallest absolute value.

Figure 31C:
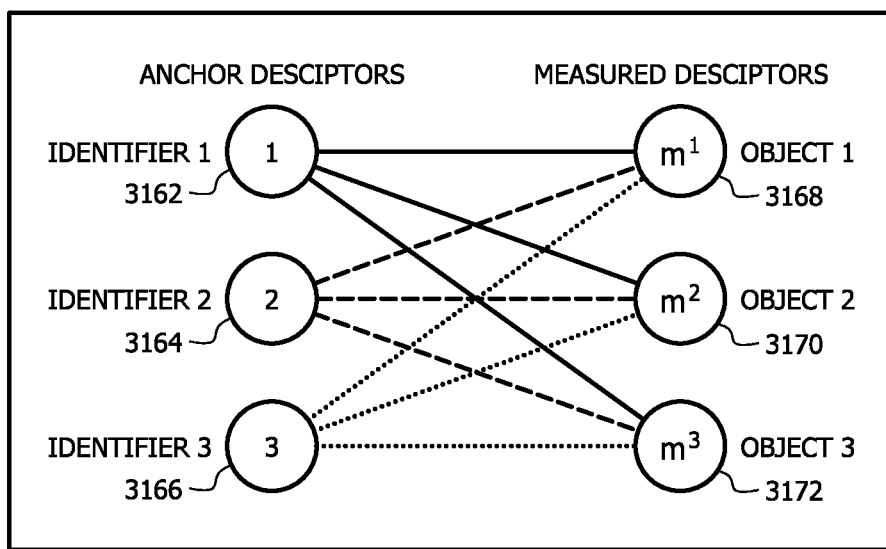

In cases where the second descriptor 2912 cannot be used to reliably re-identify the first person 3102 using the approach described above, the tracking subsystem 2900 may determine a measured descriptor 2912 for all of the "candidate identifiers" of the first person 3102. The candidate identifiers generally refer to the identifiers 2908 of people (e.g., or other tracked objects) that are known to be associated with identifiers 2908 appearing in the candidate list 2906 of the first person 3102 (e.g., as described above with respect to FIGS. 27 and 28). For instance, the candidate identifiers may be identifiers 2908 of tracked people (i.e., at tracked object positions 2902) that appear in the candidate list 2906 of the person being re-identified. FIG. 31C illustrates how predetermined descriptors 3162, 3164, 3166 for a first, second, and third identifier 2908 may be compared to each of the measured descriptors 3168, 3170, 3172 for people 3102, 3104, 3106. The comparison may involve calculating a cosine similarity value between vectors associated with the descriptors. Based on the results of the comparison, each person 3102, 3104, 3106 is assigned the identifier 2908 corresponding to the best-matching predetermined descriptor 3162, 3164, 3166. A best matching descriptor may correspond to a highest cosine similarity value (i.e., nearest to one).

Figure 32:
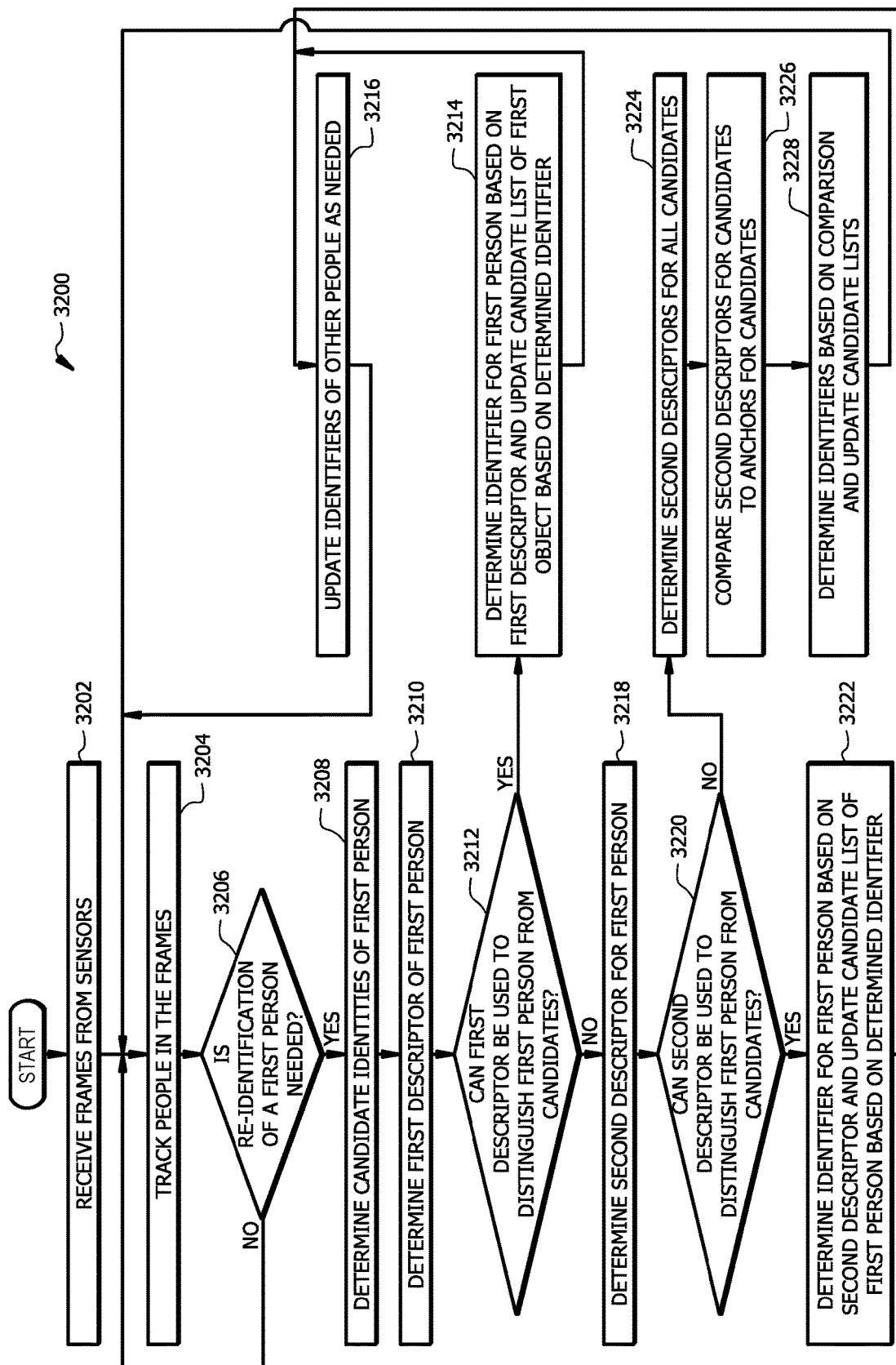
FIG. 32 is a flowchart illustrating an example method of object re-identification during object tracking using the tracking system.

FIG. 32 illustrates a method 3200 for re-identifying tracked people using tracking subsystem 2900 illustrated in FIG. 29 and described above. The method 3200 may begin at step 3202 where the tracking subsystem 2900 receives top-view image frames from one or more sensors 108. At step 3204, the tracking subsystem 2900 tracks a first person 3102 and one or more other people (e.g., people 3104, 3106) in the space 102 using at least a portion of the top-view images generated by the sensors 108. For instance, tracking may be performed as described above with respect to FIGS. 24-26, or using any appropriate object tracking algorithm. The tracking subsystem 2900 may periodically determine updated predetermined descriptors associated with the identifiers 2908 (e.g., as described with respect to update 2918 of FIG. 29). In some embodiments, the tracking subsystem 2900, in response to determining the updated descriptors, determines that one or more of the updated predetermined descriptors is different by at least a threshold amount from a corresponding previously predetermined descriptor 2910. In this case, the tracking subsystem 2900 may save both the updated descriptor and the corresponding previously predetermined descriptor 2910. This may allow for improved re-identification when characteristics of the people being tracked may change intermittently during tracking.

At step 3206, the tracking subsystem 2900 determines whether re-identification of the first tracked person 3102 is needed. This may be based on a determination that contours have merged in an image frame (e.g., as illustrated by merged contour 2220 of FIG. 22) or on a determination that a first person 3102 and a second person 3104 are within a threshold distance (e.g., distance 2918*b* of FIG. 29) of each other, as described above. In some embodiments, a candidate list 2906 may be used to determine that re-identification of the first person 3102 is required. For instance, if a highest probability from the candidate list 2906 associated with the tracked person 3102 is less than a threshold value (e.g., 70%), re-identification may be needed (see also FIGS. 27-28 and the corresponding description above). If re-identification is not needed, the tracking subsystem 2900 generally continues to track people in the space (e.g., by returning to step 3204).

If the tracking subsystem 2900 determines at step 3206 that re-identification of the first tracked person 3102 is needed, the tracking subsystem 2900 may determine candidate identifiers for the first tracked person 3102 at step 3208. The candidate identifiers generally include a subset of all of the identifiers 2908 associated with tracked people in the space 102, and the candidate identifiers may be determined based on the candidate list 2906 for the first tracked person 3102. In other words, the candidate identifiers are a subset of the identifiers 2906 which are most likely to include the correct identifier 2908 for the first tracked person 3102 based on a history of movements of the first tracked person 3102 and interactions of the first tracked person 3102 with the one or more other tracked people 3104, 3106 in the space 102 (e.g., based on the candidate list 2906 that is updated in response to these movements and interactions).

At step 3210, the tracking subsystem 2900 determines a first descriptor 2912 for the first tracked person 3102. For example, the tracking subsystem 2900 may receive, from a first sensor 108, a first top-view image of the first person 3102 (e.g., such as image 3002 of FIG. 30). For instance, as illustrated in the example of FIG. 30, in some embodiments, the image 3002 used to determine the descriptor 2912 includes the representation 3004*a* of the object within a region-of-interest 3006 within the full frame of the image 3002. This may provide for more reliable descriptor 2912 determination. In some embodiments, the image data 2904 include depth data (i.e., image data at different depths). In such embodiments, the tracking subsystem 2900 may determine the descriptor 2912 based on a depth region-of-interest, where the depth region-of-interest corresponds to depths in the image associated with the head of person 3102. In these embodiments, descriptors 2912 may be determined that are associated with characteristics or features of the head of the person 3102.

At step 3212, the tracking subsystem 2900 may determine whether the first descriptor 2912 can be used to distinguish the first person 3102 from the candidate identifiers (e.g., one or both of people 3104, 3106) by, for example, determining whether certain criteria are satisfied for distinguishing the first person 3102 from the candidates based on the first descriptor 2912. In some embodiments, the criteria are not satisfied when a difference, determined during a time interval associated with the collision event, between the first descriptor 2912 and corresponding descriptors 2910 of the candidates is less than a minimum value, as described in greater detail above with respect to FIGS. 31A,B.

If the first descriptor can be used to distinguish the first person 3102 from the candidates (e.g., as was the case at time $t_1$ in the example of FIG. 31A,B), the method 3200 proceeds to step 3214 at which point the tracking subsystem 2900 determines an updated identifier for the first person 3102 based on the first descriptor 2912. For example, the tracking subsystem 2900 may compare (e.g., using comparator 2914) the first descriptor 2912 to the set of predetermined descriptors 2910 that are associated with the candidate objects determined for the first person 3102 at step 3208. In some embodiments, the first descriptor 2912 is a data vector associated with characteristics of the first person in the image (e.g., a vector determined using a texture operator such as the LBPH algorithm), and each of the predetermined descriptors 2910 includes a corresponding predetermined data vector (e.g., determined for each tracked pers 3102, 3104, 3106 upon entering the space 102). In such embodiments, the tracking subsystem 2900 compares the first descriptor 2912 to each of the predetermined descriptors 2910 associated with the candidate objects by calculating a cosine similarity value between the first data vector and each of the predetermined data vectors. The tracking subsystem 2900 determines the updated identifier as the identifier 2908 of the candidate object with the cosine similarity value nearest one (i.e., the vector that is most "similar" to the vector of the first descriptor 2912).

At step 3216, the identifiers 2908 of the other tracked people 3104, 3106 may be updated as appropriate by updating other people's candidate lists 2906. For example, if the first tracked person 3102 was found to be associated with an identifier 2908 that was previously associated with the second tracked person 3104. Steps 3208 to 3214 may be repeated for the second person 3104 to determine the correct identifier 2908 for the second person 3104. In some embodiments, when the identifier 2908 for the first person 3102 is updated, the identifiers 2908 for people (e.g., one or both of people 3104 and 3106) that are associated with the first person's candidate list 2906 are also updated at step 3216. As an example, the candidate list 2906 of the first person 3102 may have a non-zero probability that the first person 3102 is associated with a second identifier 2908 originally linked to the second person 3104 and a third probability that the first person 3102 is associated with a third identifier 2908 originally linked to the third person 3106. In this case, after the identifier 2908 of the first person 3102 is updated, the identifiers 2908 of the second and third people 3104, 3106 may also be updated according to steps 3208-3214.

If, at step 3212, the first descriptor 2912 cannot be used to distinguish the first person 3102 from the candidates (e.g., as was the case at time $t_2$ in the example of FIG. 31A,B), the method 3200 proceeds to step 3218 to determine a second descriptor 2912 for the first person 3102. As described above, the second descriptor 2912 may be a "higher-level" descriptor such as a model-based descriptor 3024 of FIG. 30). For example, the second descriptor 2912 may be less efficient (e.g., in terms of processing resources required) to determine than the first descriptor 2912. However, the second descriptor 2912 may be more effective and reliable, in some cases, for distinguishing between tracked people.

At step 3220, the tracking system 2900 determines whether the second descriptor 2912 can be used to distinguish the first person 3102 from the candidates (from step 3218) using the same or a similar approach to that described above with respect to step 3212. For example, the tracking subsystem 2900 may determine if the cosine similarity values between the second descriptor 2912 and the predetermined descriptors 2910 are greater than a threshold cosine similarity value (e.g., of 0.5). If the cosine similarity value is greater than the threshold, the second descriptor 2912 generally can be used.

If the second descriptor 2912 can be used to distinguish the first person 3102 from the candidates, the tracking subsystem 2900 proceeds to step 3222, and the tracking subsystem 2900 determines the identifier 2908 for the first person 3102 based on the second descriptor 2912 and updates the candidate list 2906 for the first person 3102 accordingly. The identifier 2908 for the first person 3102 may be determined as described above with respect to step 3214 (e.g., by calculating a cosine similarity value between a vector corresponding to the first descriptor 2912 and previously determined vectors associated with the predetermined descriptors 2910). The tracking subsystem 2900 then proceeds to step 3216 described above to update identifiers 2908 (i.e., via candidate lists 2906) of other tracked people 3104, 3106 as appropriate.

Otherwise, if the second descriptor 2912 cannot be used to distinguish the first person 3102 from the candidates, the tracking subsystem 2900 proceeds to step 3224, and the tracking subsystem 2900 determines a descriptor 2912 for all of the first person 3102 and all of the candidates. In other words, a measured descriptor 2912 is determined for all people associated with the identifiers 2908 appearing in the candidate list 2906 of the first person 3102 (e.g., as described above with respect to FIG. 31C). At step 3226, the tracking subsystem 2900 compares the second descriptor 2912 to predetermined descriptors 2910 associated with all people related to the candidate list 2906 of the first person 3102. For instance, the tracking subsystem 2900 may determine a second cosine similarity value between a second data vector determined using an artificial neural network and each corresponding vector from the predetermined descriptor values 2910 for the candidates (e.g., as illustrated in FIG. 31C, described above). The tracking subsystem 2900 then proceeds to step 3228 to determine and update the identifiers 2908 of all candidates based on the comparison at step 3226 before continuing to track people 3102, 3104, 3106 in the space 102 (e.g., by returning to step 3204).

Modifications, additions, or omissions may be made to method 3200 depicted in FIG. 32. Method 3200 may include more, fewer, or other steps. For example, steps may be performed in parallel or in any suitable order. While at times discussed as tracking system 2900 (e.g., by server 106 and/or client(s) 105) or components thereof performing steps, any suitable system or components of the system may perform one or more steps of the method 3200.

Action Detection for Assigning Items to the Correct Person

As described above with respect to FIGS. 12-15 when a weight event is detected at a rack 112, the item associated with the activated weight sensor 110 may be assigned to the person nearest the rack 112. However, in some cases, two or more people may be near the rack 112 and it may not be clear who picked up the item. Accordingly, further action may be required to properly assign the item to the correct person.

In some embodiments, a cascade of algorithms (e.g., from more simple approaches based on relatively straightforwardly determined image features to more complex strategies involving artificial neural networks) may be employed to assign an item to the correct person. The cascade may be triggered, for example, by (i) the proximity of two or more people to the rack 112, (ii) a hand crossing into the zone (or a "virtual curtain") adjacent to the rack (e.g., see zone 3324 of FIG. 33B and corresponding description below) and/or, (iii) a weight signal indicating an item was removed from the rack 112. When it is initially uncertain who picked up an item, a unique contour-based approach may be used to assign an item to the correct person. For instance, if two people may be reaching into a rack 112 to pick up an item, a contour may be "dilated" from a head height to a lower height in order to determine which person's arm reached into the rack 112 to pick up the item. However, if the results of this efficient contour-based approach do not satisfy certain confidence criteria, a more computationally expensive approach (e.g., involving neural network-based pose estimation) may be used. In some embodiments, the tracking system 100, upon detecting that more than one person may have picked up an item, may store a set of buffer frames that are most likely to contain useful information for effectively assigning the item to the correct person. For instance, the stored buffer frames may correspond to brief time intervals when a portion of a person enters the zone adjacent to a rack 112 (e.g., zone 3324 of FIG. 33B, described above) and/or when the person exits this zone.

However, in some cases, it may still be difficult or impossible to assign an item to a person even using more advance artificial neural network-based pose estimation techniques. In these cases, the tracking system 100 may store further buffer frames in order to track the item through the space 102 after it exits the rack 112. When the item comes to a stopped position (e.g., with a sufficiently low velocity), the tracking system 100 determines which person is closer to the stopped item, and the item is generally assigned to the nearest person. This process may be repeated until the item is confidently assigned to the correct person.

Figure 33A:
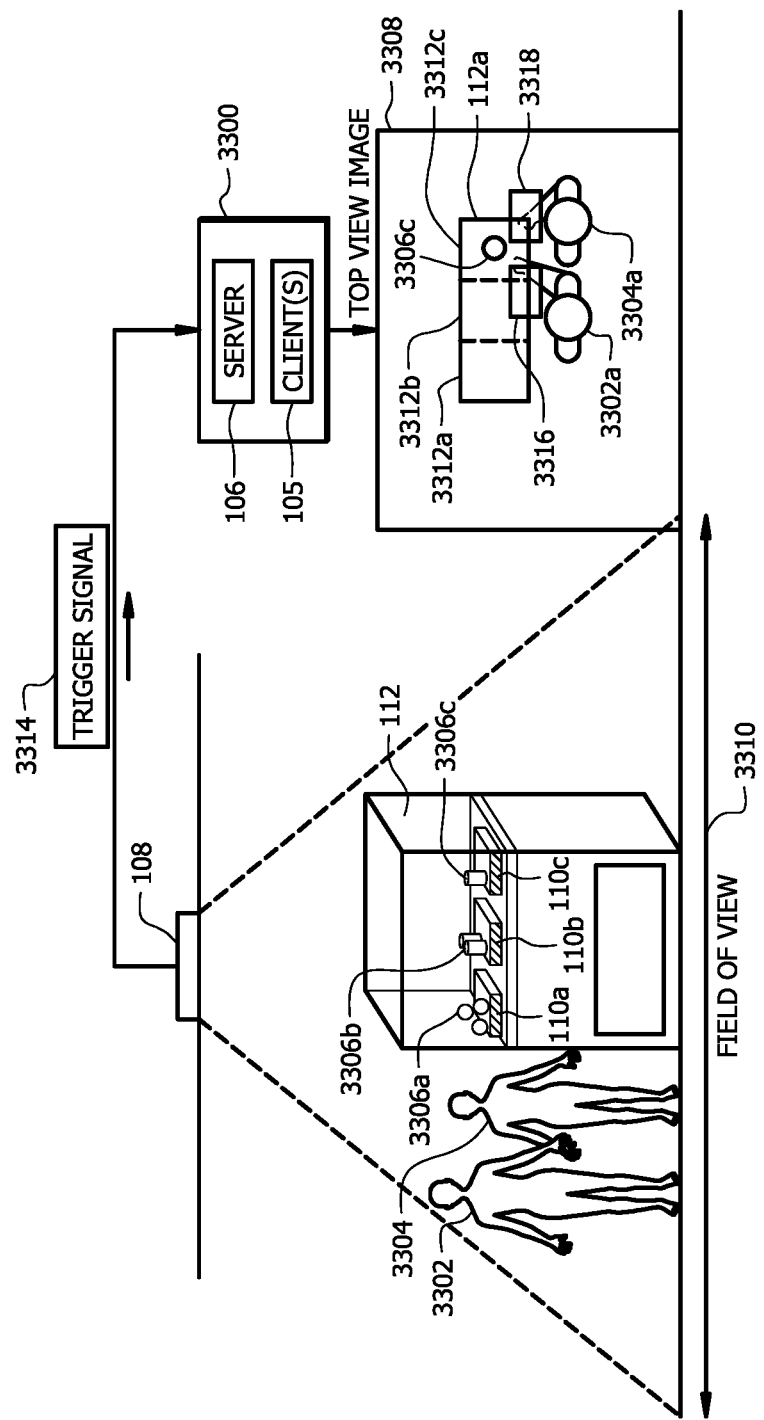
FIGS. 33A-C are diagrams illustrating the assignment of an item to a person using the tracking system.

FIG. 33A illustrates an example scenario in which a first person 3302 and a second person 3304 are near a rack 112 storing items 3306a-c. Each item 3306a-c is stored on corresponding weight sensors 110a-c. A sensor 108, which is communicatively coupled to the tracking subsystem 3300 (i.e., to the server 106 and/or client(s) 105), generates a top-view depth image 3308 for a field-of-view 3310 which includes the rack 112 and people 3302, 3304. The top-view depth image 3308 includes a representation 112a of the rack 112 and representations 3302a, 3304a of the first and second people 3302, 3304, respectively. The rack 112 (e.g., or its representation 112a) may be divided into three zones 3312a-c which correspond to the locations of weight sensors 110a-c and the associated items 3306a-c, respectively.

In this example scenario, one of the people 3302, 3304 picks up an item 3306c from weight sensor 110c, and tracking subsystem 3300 receives a trigger signal 3314 indicating an item 3306c has been removed from the rack 112. The tracking subsystem 3300 includes the client(s) 105 and server 106 described above with respect to FIG. 1. The trigger signal 3314 may indicate the change in weight caused by the item 3306*c* being removed from sensor 110*c*. After receiving the signal 3314, the server 106 accesses the top-view image 3308, which may correspond to a time at, just prior to, and/or just following the time the trigger signal 3314 was received. In some embodiments, the trigger signal 3314 may also or alternatively be associated with the tracking system 100 detecting a person 3302, 3304 entering a zone adjacent to the rack (e.g., as described with respect to the "virtual curtain" of FIGS. 12-15 above and/or zone 3324 described in greater detail below) to determine to which person 3302, 3304 the item 3306*c* should be assigned. Since representations 3302*a* and 3304*a* indicate that both people 3302, 3304 are near the rack 112, further analysis is required to assign item 3306*c* to the correct person 3302, 3304. Initially, the tracking system 100 may determine if an arm of either person 3302 or 3304 may be reaching toward zone 3312*c* to pick up item 3306*c*. However, as shown in regions 3316 and 3318 in image 3308, a portion of both representations 3302*a*, 3304*a* appears to possibly be reaching toward the item 3306*c* in zone 3312*c*. Thus, further analysis is required to determine whether the first person 3302 or the second person 3304 picked up item 3306*c*.

Figure 33B:
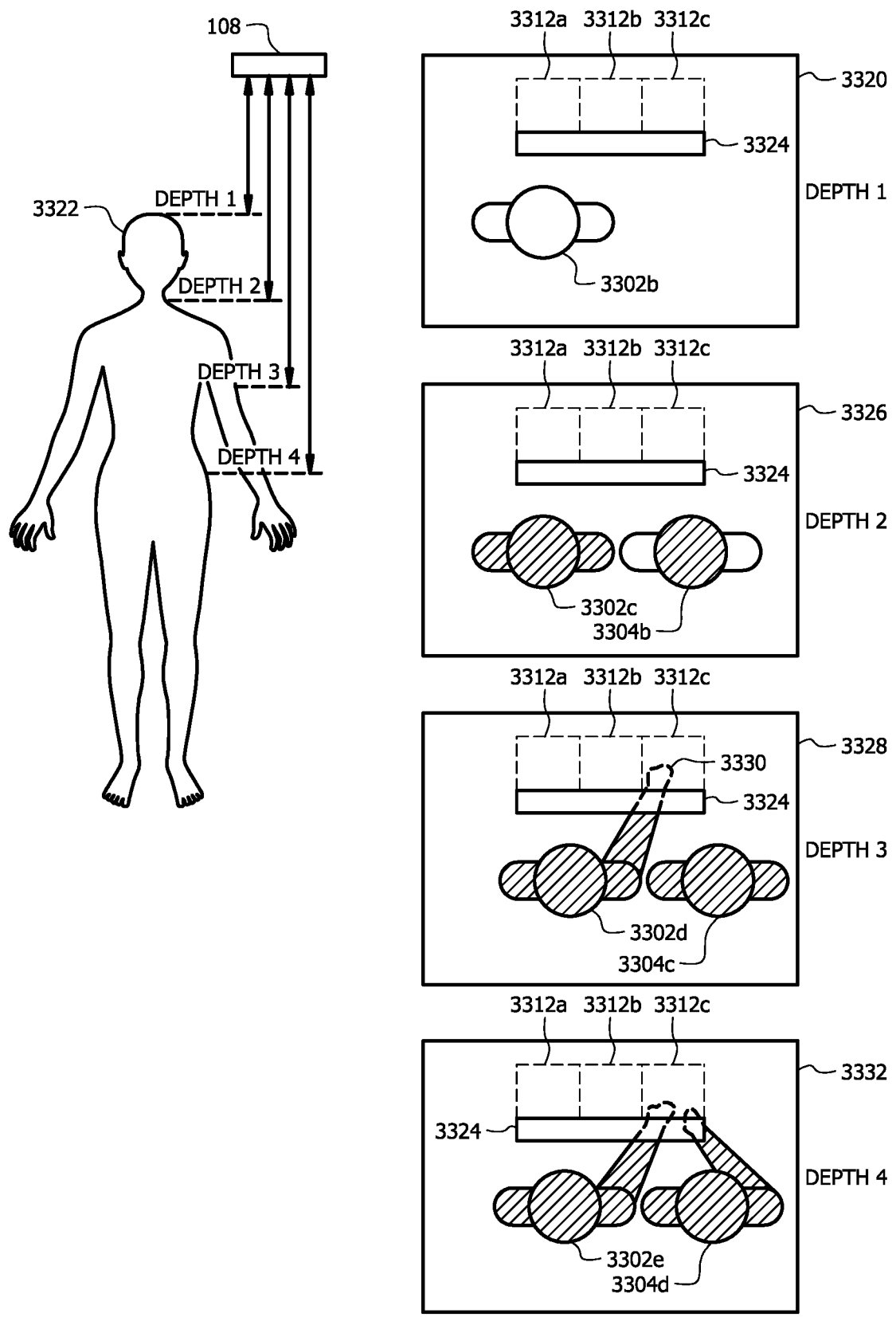

Following the initial inability to confidently assign item 3306*c* to the correct person 3302, 3304, the tracking system 100 may use a contour-dilation approach to determine whether person 3302 or 3304 picked up item 3306*c*. FIG. 33B illustrates an implementation of a contour-dilation approach to assigning item 3306*c* to the correct person 3302 or 3304. In general, contour dilation involves iterative dilation of a first contour associated with the first person 3302 and a second contour associated with the second person 3304 from a first smaller depth to a second larger depth. The dilated contour that crosses into the zone 3324 adjacent to the rack 112 first may correspond to the person 3302, 3304 that picked up the item 3306*c*. Dilated contours may need to satisfy certain criteria to ensure that the results of the contour-dilation approach should be used for item assignment. For example, the criteria may include a requirement that a portion of a contour entering the zone 3324 adjacent to the rack 112 is associated with either the first person 3302 or the second person 3304 within a maximum number of iterative dilations, as is described in greater detail with respect to the contour-detection views 3320, 3326, 3328, and 3332 shown in FIG. 33B. If these criteria are not satisfied, another method should be used to determine which person 3302 or 3304 picked up item 3306*c*.

FIG. 33B shows a view 3320, which includes a contour 3302*b* detected at a first depth in the top-view image 3308. The first depth may correspond to an approximate head height of a typical person 3322 expected to be tracked in the space 102, as illustrated in FIG. 33B. Contour 3302*b* does not enter or contact the zone 3324 which corresponds to the location of a space adjacent to the front of the rack 112 (e.g., as described with respect to the "virtual curtain" of FIGS. 12-15 above). Therefore, the tracking system 100 proceeds to a second depth in image 3308 and detects contours 3302*c* and 3304*b* shown in view 3326. The second depth is greater than the first depth of view 3320. Since neither of the contours 3302*c* or 3304*b* enter zone 3324, the tracking system 100 proceeds to a third depth in the image 3308 and detects contours 3302*d* and 3304*c*, as shown in view 3328. The third depth is greater than the second depth, as illustrated with respect to person 3322 in FIG. 33B.

In view 3328, contour 3302*d* appears to enter or touch the edge of zone 3324. Accordingly, the tracking system 100 may determine that the first person 3302, who is associated with contour 3302*d*, should be assigned the item 3306*c*. In some embodiments, after initially assigning the item 3306*c* to person 3302, the tracking system 100 may project an "arm segment" 3330 to determine whether the arm segment 3330 enters the appropriate zone 3312*c* that is associated with item 3306*c*. The arm segment 3330 generally corresponds to the expected position of the person's extended arm in the space occluded from view by the rack 112. If the location of the projected arm segment 3330 does not correspond with an expected location of item 3306*c* (e.g., a location within zone 3312*c*), the item is not assigned to (or is unassigned from) the first person 3302.

Another view 3332 at a further increased fourth depth shows a contour 3302*e* and contour 3304*d*. Each of these contours 3302*e* and 3304*d* appear to enter or touch the edge of zone 3324. However, since the dilated contours associated with the first person 3302 (reflected in contours 3302*b-e*) entered or touched zone 3324 within fewer iterations (or at a smaller depth) than did the dilated contours associated with the second person 3304 (reflected in contours 3304*b-d*), the item 3306*c* is generally assigned to the first person 3302. In general, in order for the item 3306*c* to be assigned to one of the people 3302, 3304 using contour dilation, a contour may need to enter zone 3324 within a maximum number of dilations (e.g., or before a maximum depth is reached). For example, if the item 3306*c* was not assigned by the fourth depth, the tracking system 100 may have ended the contour-dilation method and moved on to another approach to assigning the item 3306*c*, as described below.

In some embodiments the contour-dilation approach illustrated in FIG. 33B fails to correctly assign item 3306*c* to the correct person 3302, 3304. For example, the criteria described above may not be satisfied (e.g., a maximum depth or number of iterations may be exceeded) or dilated contours associated with the different people 3302 or 3304 may merge, rendering the results of contour-dilation unusable. In such cases, the tracking system 100 may employ another strategy to determine which person 3302, 3304*c* picked up item 3306*c*. For example, the tracking system 100 may use a pose estimation algorithm to determine a pose of each person 3302, 3304.

Figure 33C:
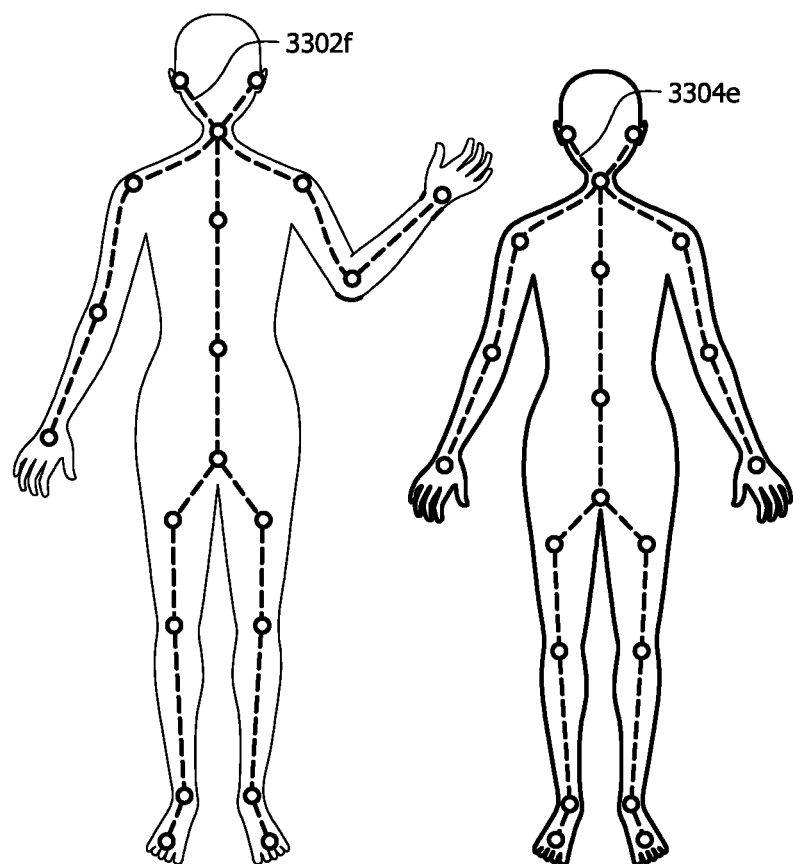

FIG. 33C illustrates an example output of a pose-estimation algorithm which includes a first "skeleton" 3302*f* for the first person 3302 and a second "skeleton" 3304*e* for the second person 3304. In this example, the first skeleton 3302*f* may be assigned a "reaching pose" because an arm of the skeleton appears to be reaching outward. This reaching pose may indicate that the person 3302 is reaching to pick up item 3306*c*. In contrast, the second skeleton 3304*e* does not appear to be reaching to pick up item 3306*c*. Since only the first skeleton 3302*f* appears to be reaching for the item 3306*c*, the tracking system 100 may assign the item 3306*c* to the first person 3302. If the results of pose estimation were uncertain (e.g., if both or neither of the skeletons 3302*f*, 3304*e* appeared to be reaching for item 3306*c*), a different method of item assignment may be implemented by the tracking system 100 (e.g., by tracking the item 3306*c* through the space 102, as described below with respect to FIGS. 36-37).

Figure 34:
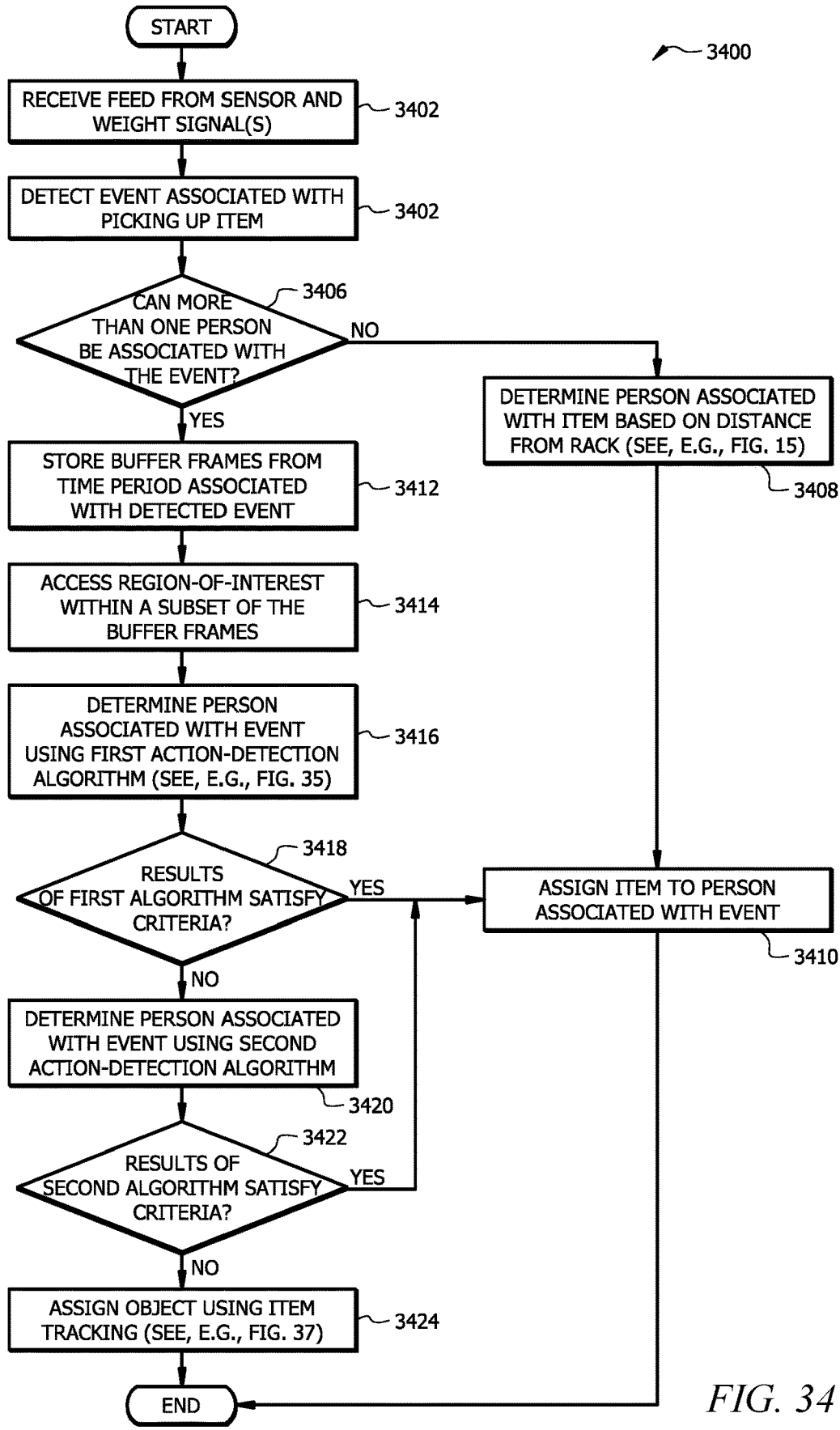
FIG. 34 is a flowchart of an example method for assigning an item to a person using the tracking system.

FIG. 34 illustrates a method 3400 for assigning an item 3306*c* to a person 3302 or 3304 using the tracking system 100. The method 3400 may begin at step 3402 where the tracking system 100 receives an image feed comprising frames of top-view images generated by the sensor 108 and weight measurements from weight sensors 110*a-c*.

At step 3404, the tracking system 100 detects an event associated with picking up an item 33106*c*. In general, the event may be based on a portion of a person 3302, 3304 entering the zone adjacent to the rack 112 (e.g., zone 3324 of FIG. 33B) and/or a change of weight associated with the item 33106c being removed from the corresponding weight sensor 110c.

At step 3406, in response to detecting the event at step 3404, the tracking system 100 determines whether more than one person 3302, 3304 may be associated with the detected event (e.g., as in the example scenario illustrated in FIG. 33A, described above). For example, this determination may be based on distances between the people and the rack 112, an inter-person distance between the people, a relative orientation between the people and the rack 112 (e.g., a person 3302, 3304 not facing the rack 112 may not be a candidate for picking up the item 33106c). If only one person 3302, 3304 may be associated with the event, that person 3302, 3304 is associated with the item 3306c at step 3408. For example, the item 3306c may be assigned to the nearest person 3302, 3304, as described with respect to FIGS. 12-14 above.

At step 3410, the item 3306c is assigned to the person 3302, 3304 determined to be associated with the event detected at step 3404. For example, the item 3306c may be added to a digital cart associated with the person 3302, 3304. Generally, if the action (i.e., picking up the item 3306c) was determined to have been performed by the first person 3302, the action (and the associated item 3306c) is assigned to the first person 3302, and, if the action was determined to have been performed by the second person 3304, the action (and associated item 3306c) is assigned to the second person 3304.

Otherwise, if, at step 3406, more than one person 3302, 3304 may be associated with the detected event, a select set of buffer frames of top-view images generated by sensor 108 may be stored at step 3412. In some embodiments, the stored buffer frames may include only three or fewer frames of top-view images following a triggering event. The triggering event may be associated with the person 3302, 3304 entering the zone adjacent to the rack 112 (e.g., zone 3324 of FIG. 33B), the portion of the person 3302, 3304 exiting the zone adjacent to the rack 112 (e.g., zone 3324 of FIG. 33B), and/or a change in weight determined by a weight sensor 110a-c. In some embodiments, the buffer frames may include image frames from the time a change in weight was reported by a weight sensor 110 until the person 3302, 3304 exits the zone adjacent to the rack 112 (e.g., zone 3324 of FIG. 33B). The buffer frames generally include a subset of all possible frames available from the sensor 108. As such, by storing, and subsequently analyzing, only these stored buffer frames (or a portion of the stored buffer frames), the tracking system 100 may assign actions (e.g., and an associated item 106a-c) to a correct person 3302, 3304 more efficiently (e.g., in terms of the use of memory and processing resources) than was possible using previous technology.

At step 3414, a region-of-interest from the images may be accessed. For example, following storing the buffer frames, the tracking system 100 may determine a region-of-interest of the top-view images to retain. For example, the tracking system 100 may only store a region near the center of each view (e.g., region 3006 illustrated in FIG. 30 and described above).

At step 3416, the tracking system 100 determines, using at least one of the buffer frames stored at step 3412 and a first action-detection algorithm, whether an action associated with the detected event was performed by the first person 3302 or the second person 3304. The first action-detection algorithm is generally configured to detect the action based on characteristics of one or more contours in the stored buffer frames. As an example, the first action-detection algorithm may be the contour-dilation algorithm described above with respect to FIG. 33B. An example implementation of a contour-based action-detection method is also described in greater detail below with respect to method 3500 illustrated in FIG. 35. In some embodiments, the tracking system 100 may determine a subset of the buffer frames to use with the first action-detection algorithm. For example, the subset may correspond to when the person 3302, 3304 enters the zone adjacent to the rack 112 (e.g., zone 3324 illustrated in FIG. 33B).

At step 3418, the tracking system 100 determines whether results of the first action-detection algorithm satisfy criteria indicating that the first algorithm is appropriate for determining which person 3302, 3304 is associated with the event (i.e., picking up item 3306c, in this example). For example, for the contour-dilation approach described above with respect to FIG. 33B and below with respect to FIG. 35, the criteria may be a requirement to identify the person 3302, 3304 associated with the event within a threshold number of dilations (e.g., before reaching a maximum depth). Whether the criteria are satisfied at step 3416 may be based at least in part on the number of iterations required to implement the first action-detection algorithm. If the criteria are satisfied at step 3418, the tracking system 100 proceeds to step 3410 and assigns the item 3306c to the person 3302, 3304 associated with the event determined at step 3416.

However, if the criteria are not satisfied at step 3418, the tracking system 100 proceeds to step 3420 and uses a different action-detection algorithm to determine whether the action associated with the event detected at step 3404 was performed by the first person 3302 or the second person 3304. This may be performed by applying a second action-detection algorithm to at least one of the buffer frames selected at step 3412. The second action-detection algorithm may be configured to detect the action using an artificial neural network. For example, the second algorithm may be a pose estimation algorithm used to determine whether a pose of the first person 3302 or second person 3304 corresponds to the action (e.g., as described above with respect to FIG. 33C). In some embodiments, the tracking system 100 may determine a second subset of the buffer frames to use with the second action detection algorithm. For example, the subset may correspond to the time when the weight change is reported by the weight sensor 110. The pose of each person 3302, 3304 at the time of the weight change may provide a good indication of which person 3302, 3304 picked up the item 3306c.

At step 3422, the tracking system 100 may determine whether the second algorithm satisfies criteria indicating that the second algorithm is appropriate for determining which person 3302, 3304 is associated with the event (i.e., with picking up item 3306c). For example, if the poses (e.g., determined from skeletons 3302f and 3304e of FIG. 33C, described above) of each person 3302, 3304 still suggest that either person 3302, 3304 could have picked up the item 3306c, the criteria may not be satisfied, and the tracking system 100 proceeds to step 3424 to assign the object using another approach (e.g., by tracking the movement of the item 3306a-c through the space 102, as described in greater detail below with respect to FIGS. 36 and 37).

Modifications, additions, or omissions may be made to method 3400 depicted in FIG. 34. Method 3400 may include more, fewer, or other steps. For example, steps may be performed in parallel or in any suitable order. While at times discussed as tracking system 100 or components thereof performing steps, any suitable system or components of the system may perform one or more steps of the method 3400.

Figure 35:
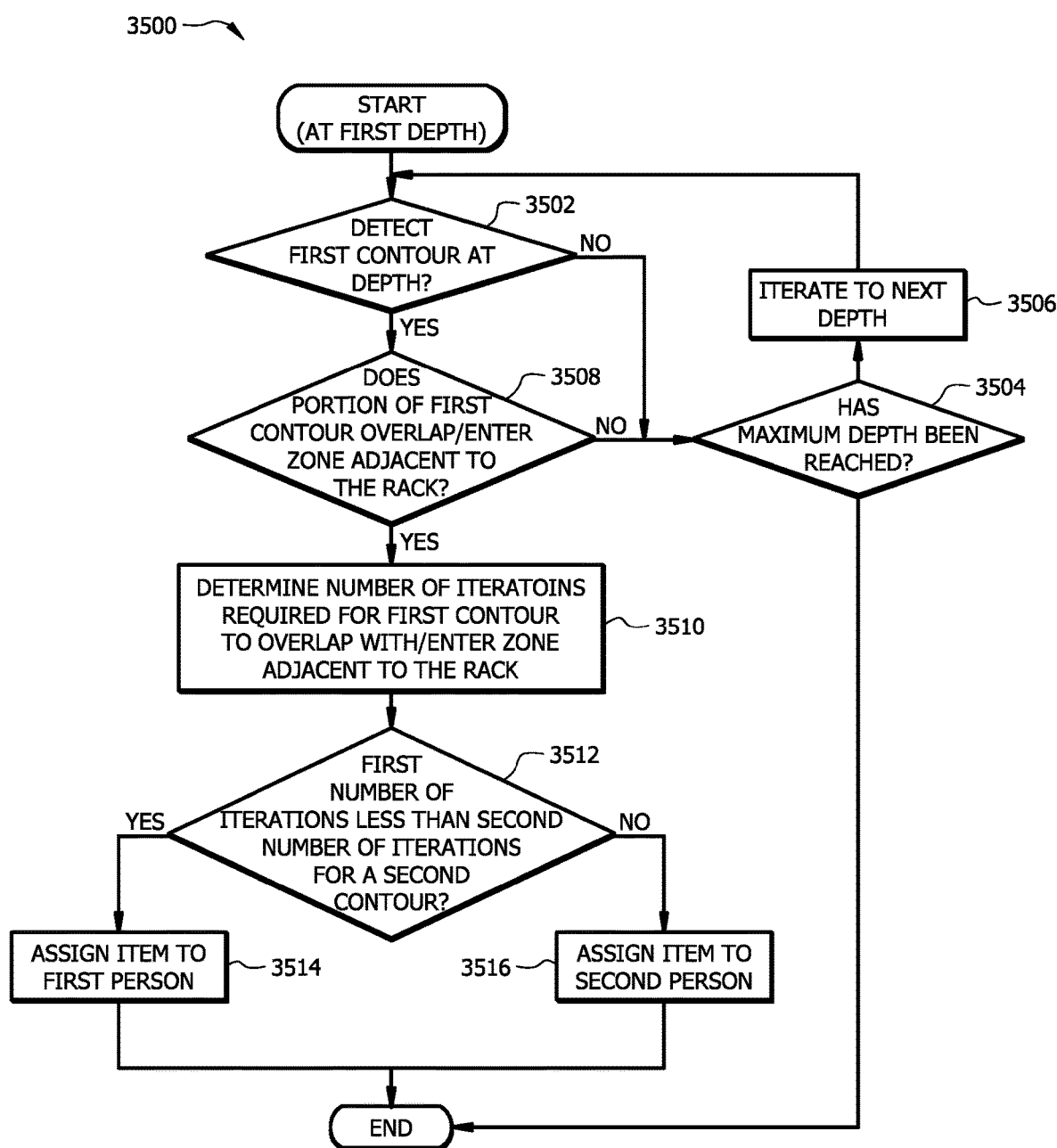
FIG. 35 is a flowchart of an example method of contour dilation-based item assignment using the tracking system.

As described above, the first action-detection algorithm of step 3416 may involve iterative contour dilation to determine which person 3302, 3304 is reaching to pick up an item 3306a-c from rack 112. FIG. 35 illustrates an example method 3500 of contour dilation-based item assignment. The method 3500 may begin from step 3416 of FIG. 34, described above, and proceed to step 3502. At step 3502, the tracking system 100 determines whether a contour is detected at a first depth (e.g., the first depth of FIG. 33B described above). For example, in the example illustrated in FIG. 33B, contour 3302b is detected at the first depth. If a contour is not detected, the tracking system 100 proceeds to step 3504 to determine if the maximum depth (e.g., the fourth depth of FIG. 33B) has been reached. If the maximum depth has not been reached, the tracking system 100 iterates (i.e., moves) to the next depth in the image at step 3506. Otherwise, if the maximum depth has been reached, method 3500 ends.

If at step 3502, a contour is detected, the tracking system proceeds to step 3508 and determines whether a portion of the detected contour overlaps, enters, or otherwise contacts the zone adjacent to the rack 112 (e.g., zone 3324 illustrated in FIG. 33B). In some embodiments, the tracking system 100 determines if a projected arm segment (e.g., arm segment 3330 of FIG. 33B) of a contour extends into an appropriate zone 3312a-c of the rack 112. If no portion of the contour extends into the zone adjacent to the rack 112, the tracking system 100 determines whether the maximum depth has been reached at step 3504. If the maximum depth has not been reached, the tracking system 100 iterates to the next larger depth and returns to step 3502.

At step 3510, the tracking system 100 determines the number of iterations (i.e., the number of times step 3506 was performed) before the contour was determined to have entered the zone adjacent to the rack 112 at step 3508. At step 3512, this number of iterations is compared to the number of iterations for a second (i.e., different) detected contour. For example, steps 3502 to 35010 may be repeated to determine the number of iterations (at step 3506) for the second contour to enter the zone adjacent to the rack 112. If the number of iterations is less than that of the second contour, the item is assigned to the first person 3302 at step 3514. Otherwise, the item may be assigned to the second person 3304 at step 3516. For example, as described above with respect to FIG. 33B, the first dilated contours 3302b-e entered the zone 3324 adjacent to the rack 112 within fewer iterations than did the second dilated contours 3304b. In this example, the item is assigned to the person 3302 associated with the first contour 3302b-d.

In some embodiments, a dilated contour (i.e., the contour generated via two or more passes through step 3506) must satisfy certain criteria in order for it to be used for assigning an item. For instance, a contour may need to enter the zone adjacent to the rack within a maximum number of dilations (e.g., or before a maximum depth is reached), as described above. As another example, a dilated contour may need to include less than a threshold number of pixels. If a contour is too large it may be a "merged contour" that is associated with two closely spaced people (see FIG. 22 and the corresponding description above).

Modifications, additions, or omissions may be made to method 3500 depicted in FIG. 35. Method 3500 may include more, fewer, or other steps. For example, steps may be performed in parallel or in any suitable order. While at times discussed as tracking system 100 or components thereof performing steps, any suitable system or components of the system may perform one or more steps of the method 3500.

Item Tracking-Based Item Assignment

As described above, in some cases, an item 3306a-c cannot be assigned to the correct person even using a higher-level algorithm such as the artificial neural network-based pose estimation described above with respect to FIGS. 33C and 34. In these cases, the position of the item 3306c after it exits the rack 112 may be tracked in order to assign the item 3306c to the correct person 3302, 3304. In some embodiments, the tracking system 100 does this by tracking the item 3306c after it exits the rack 112, identifying a position where the item stops moving, and determining which person 3302, 3304 is nearest to the stopped item 3306c. The nearest person 3302, 3304 is generally assigned the item 3306c.

Figure 36A:
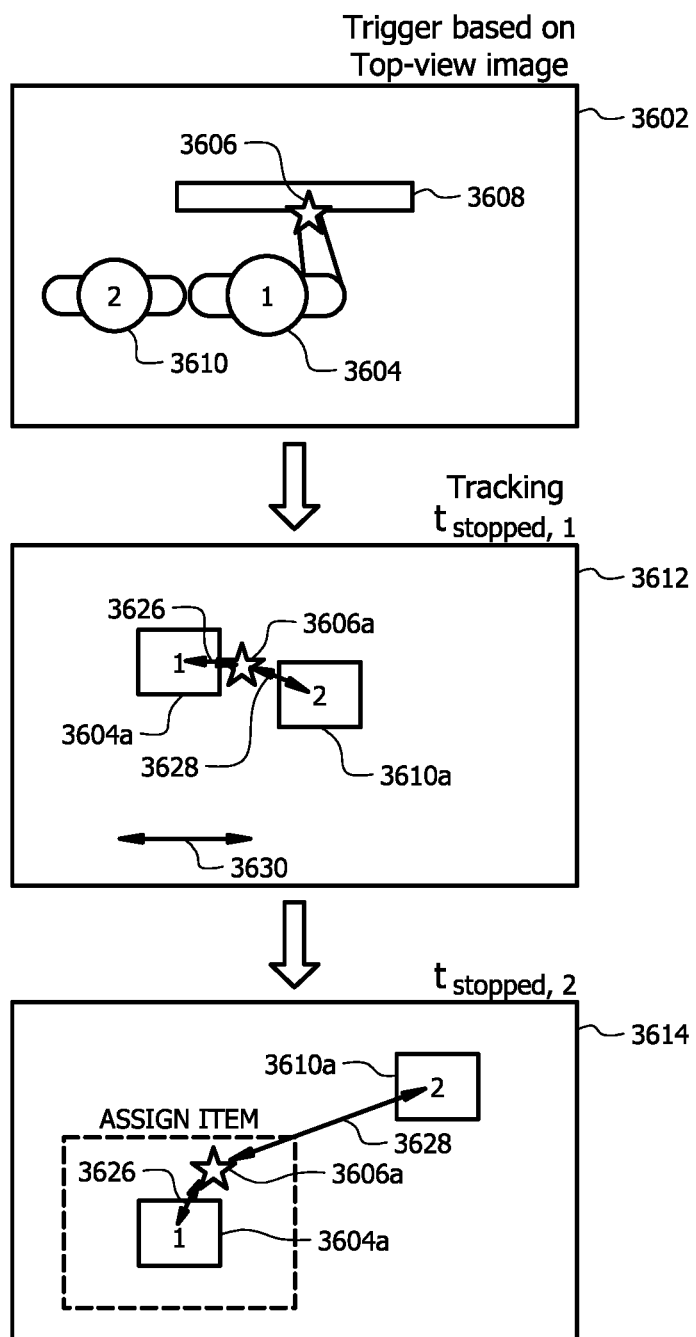
FIGS. 36A-B are diagrams illustrating item tracking-based item assignment using the tracking system.
Figure 36B:
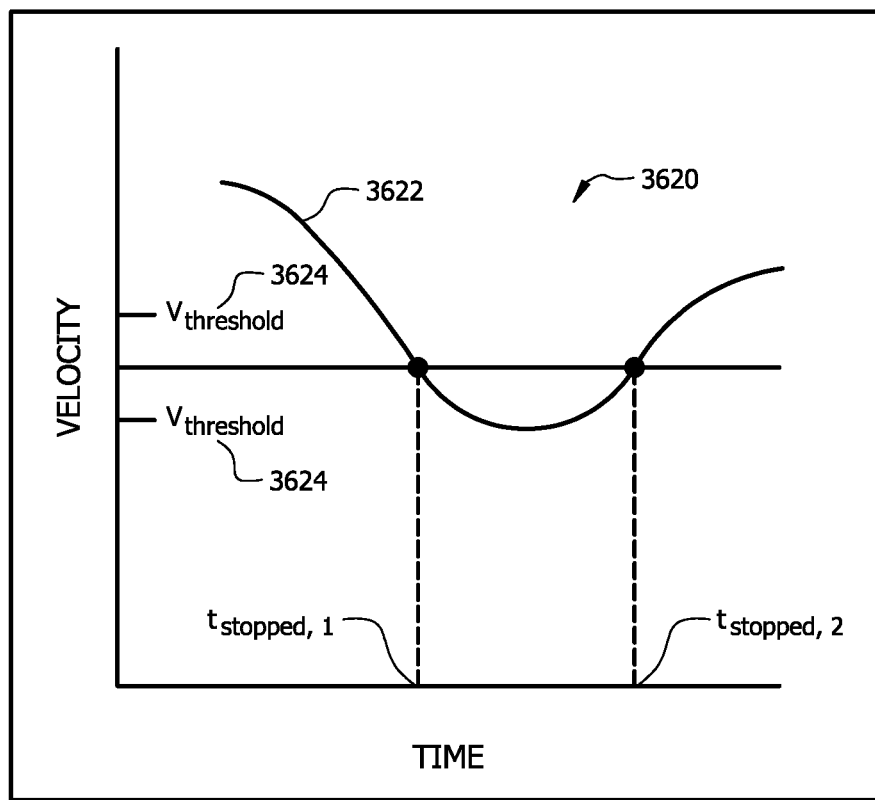

FIGS. 36A,B illustrate this item tracking-based approach to item assignment. FIG. 36A shows a top-view image 3602 generated by a sensor 108. FIG. 36B shows a plot 3620 of the item's velocity 3622 over time. As shown in FIG. 36A, image 3602 includes a representation of a person 3604 holding an item 3606 which has just exited a zone 3608 adjacent to a rack 112. Since a representation of a second person 3610 may also have been associated with picking up the item 3606, item-based tracking is required to properly assign the item 3606 to the correct person 3604, 3610 (e.g., as described above with respect people 3302, 3304 and item 3306c for FIGS. 33-35). Tracking system 100 may (i) track the position of the item 3606 over time after the item 3606 exits the rack 112, as illustrated in tracking views 3610 and 3616, and (ii) determine the velocity of the item 3606, as shown in curve 3622 of plot 3620 in FIG. 36B. The velocity 3622 shown in FIG. 36B is zero at the inflection points corresponding to a first stopped time ($t_{stopped,1}$) and a second stopped time a ($t_{stopped,2}$). More generally, the time when the item 3606 is stopped may correspond to a time when the velocity 3622 is less than a threshold velocity 3624.

Tracking view 3612 of FIG. 36A shows the position 3604a of the first person 3604, a position 3606a of item 3606, and a position 3610a of the second person 3610 at the first stopped time. At the first stopped time a ($t_{stopped,1}$) the positions 3604a, 3610a are both near the position 3606a of the item 3606. Accordingly, the tracking system 100 may not be able to confidently assign item 3606 to the correct person 3604 or 3610. Thus, the tracking system 100 continues to track the item 3606. Tracking view 3614 shows the position 3604a of the first person 3604, the position 3606a of the item 3606, and the position 3610a of the second person 3610 at the second stopped time a ($t_{stopped,2}$). Since only the position 3604a of the first person 3604 is near the position 3606a of the item 3606, the item 3606 is assigned to the first person 3604.

More specifically, the tracking system 100 may determine, at each stopped time, a first distance 3626 between the stopped item 3606 and the first person 3604 and a second distance 3628 between the stopped item 3606 and the second person 3610. Using these distances 3626, 3628, the tracking system 100 determines whether the stopped position of the item 3606 in the first frame is nearer the first person 3604 or nearer the second person 3610 and whether the distance 3626, 3628 is less than a threshold distance 3630. At the first stopped time of view 3612, both distances 3626, 3628 are less than the threshold distance 3630. Thus, the tracking system 100 cannot reliably determine which person 3604, 3610 should be assigned the item 3606. In contrast, at the second stopped time of view 3614, only the first distance 3626 is less than the threshold distance 3630. Therefore, the tracking system may assign the item 3606 to the first person 3604 at the second stopped time.

Figure 37:
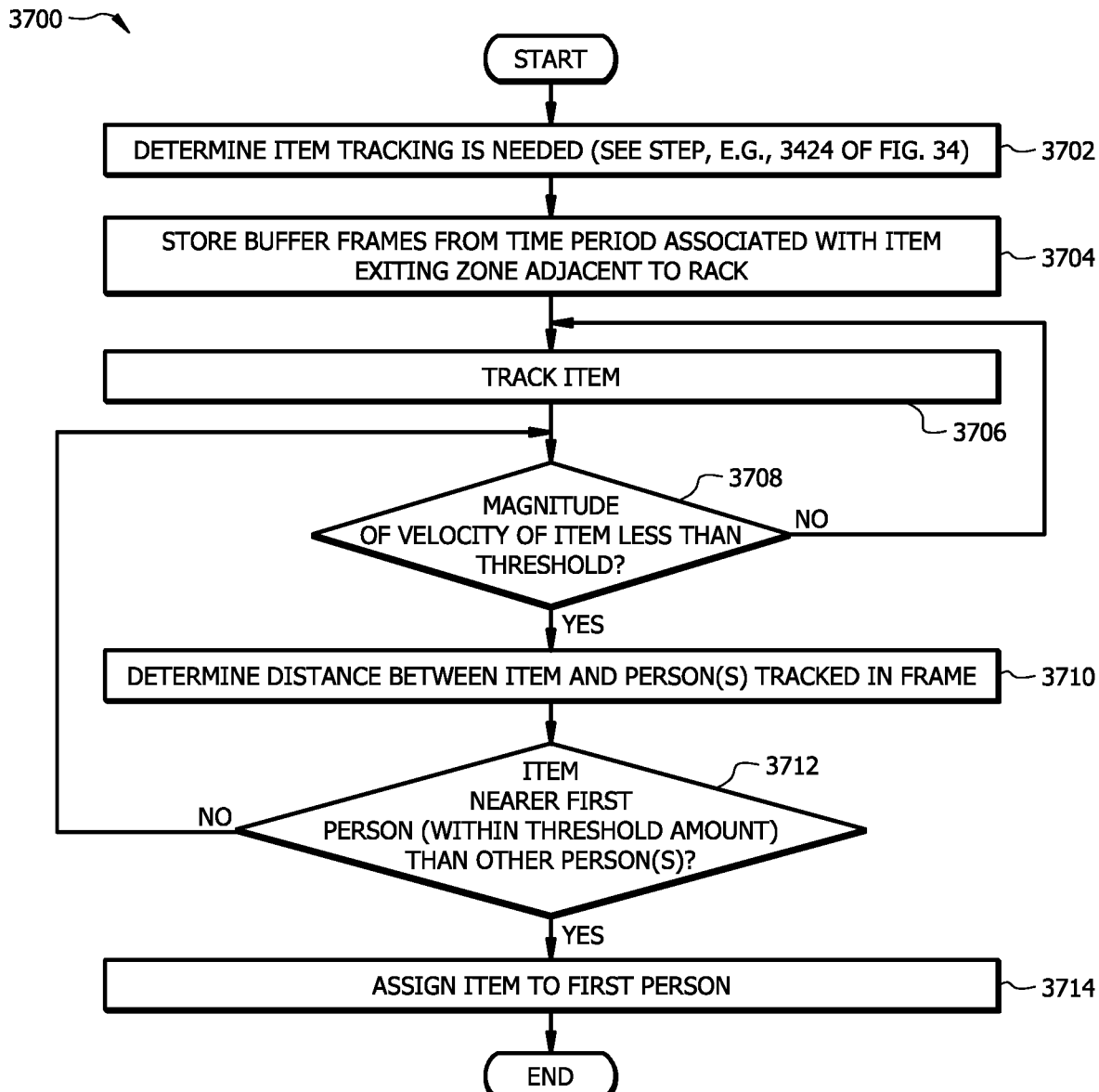
FIG. 37 is a flowchart of an example method of item tracking-based item assignment using the tracking system.

FIG. 37 illustrates an example method 3700 of assigning an item 3606 to a person 3604 or 3610 based on item tracking using tracking system 100. Method 3700 may begin at step 3424 of method 3400 illustrated in FIG. 34 and described above and proceed to step 3702. At step 3702, the tracking system 100 may determine that item tracking is needed (e.g., because the action-detection based approaches described above with respect to FIGS. 33-35 were unsuccessful). At step 3504, the tracking system 100 stores and/or accesses buffer frames of top-view images generated by sensor 108. The buffer frames generally include frames from a time period following a portion of the person 3604 or 3610 exiting the zone 3608 adjacent to the rack 11236.

At step 3706, the tracking system 100 tracks, in the stored frames, a position of the item 3606. The position may be a local pixel position associated with the sensor 108 (e.g., determined by client 105) or a global physical position in the space 102 (e.g., determined by server 106 using an appropriate homography). In some embodiments, the item 3606 may include a visually observable tag that can be viewed by the sensor 108 and detected and tracked by the tracking system 100 using the tag. In some embodiments, the item 3606 may be detected by the tracking system 100 using a machine learning algorithm. To facilitate detection of many item types under a broad range of conditions (e.g., different orientations relative to the sensor 108, different lighting conditions, etc.), the machine learning algorithm may be trained using synthetic data (e.g., artificial image data that can be used to train the algorithm).

At step 3708, the tracking system 100 determines whether a velocity 3622 of the item 3606 is less than a threshold velocity 3624. For example, the velocity 3622 may be calculated, based on the tracked position of the item 3606. For instance, the distance moved between frames may be used to calculate a velocity 3622 of the item 3606. A particle filter tracker (e.g., as described above with respect to FIGS. 24-26) may be used to calculate item velocity 3622 based on estimated future positions of the item. If the item velocity 3622 is below the threshold 3624, the tracking system 100 identifies, a frame in which the velocity 3622 of the item 3606 is less than the threshold velocity 3624 and proceeds to step 3710. Otherwise, the tracking system 100 continues to track the item 3606 at step 3706.

At step 3710, the tracking system 100 determines, in the identified frame, a first distance 3626 between the stopped item 3606 and a first person 3604 and a second distance 3628 between the stopped item 3606 and a second person 3610. Using these distances 3626, 3628, the tracking system 100 determines, at step 3712, whether the stopped position of the item 3606 in the first frame is nearer the first person 3604 or nearer the second person 3610 and whether the distance 3626, 3628 is less than a threshold distance 3630. In general, in order for the item 3606 to be assigned to the first person 3604, the item 3606 should be within the threshold distance 3630 from the first person 3604, indicating the person is likely holding the item 3606, and closer to the first person 3604 than to the second person 3610. For example, at step 3712, the tracking system 100 may determine that the stopped position is a first distance 3626 away from the first person 3604 and a second distance 3628 away from the second person 3610. The tracking system 100 may determine an absolute value of a difference between the first distance 3626 and the second distance 3628 and may compare the absolute value to a threshold distance 3630. If the absolute value is less than the threshold distance 3630, the tracking system returns to step 3706 and continues tracking the item 3606. Otherwise, the tracking system 100 is greater than the threshold distance 3630 and the item 3606 is sufficiently close to the first person 3604, the tracking system proceeds to step 3714 and assigns the item 3606 to the first person 3604. Modifications, additions, or omissions may be made to method 3700 depicted in FIG. 37. Method 3700 may include more, fewer, or other steps. For example, steps may be performed in parallel or in any suitable order. While at times discussed as tracking system 100 or components thereof performing steps, any suitable system or components of the system may perform one or more steps of the method 3700.

Hardware Configuration

Figure 38:
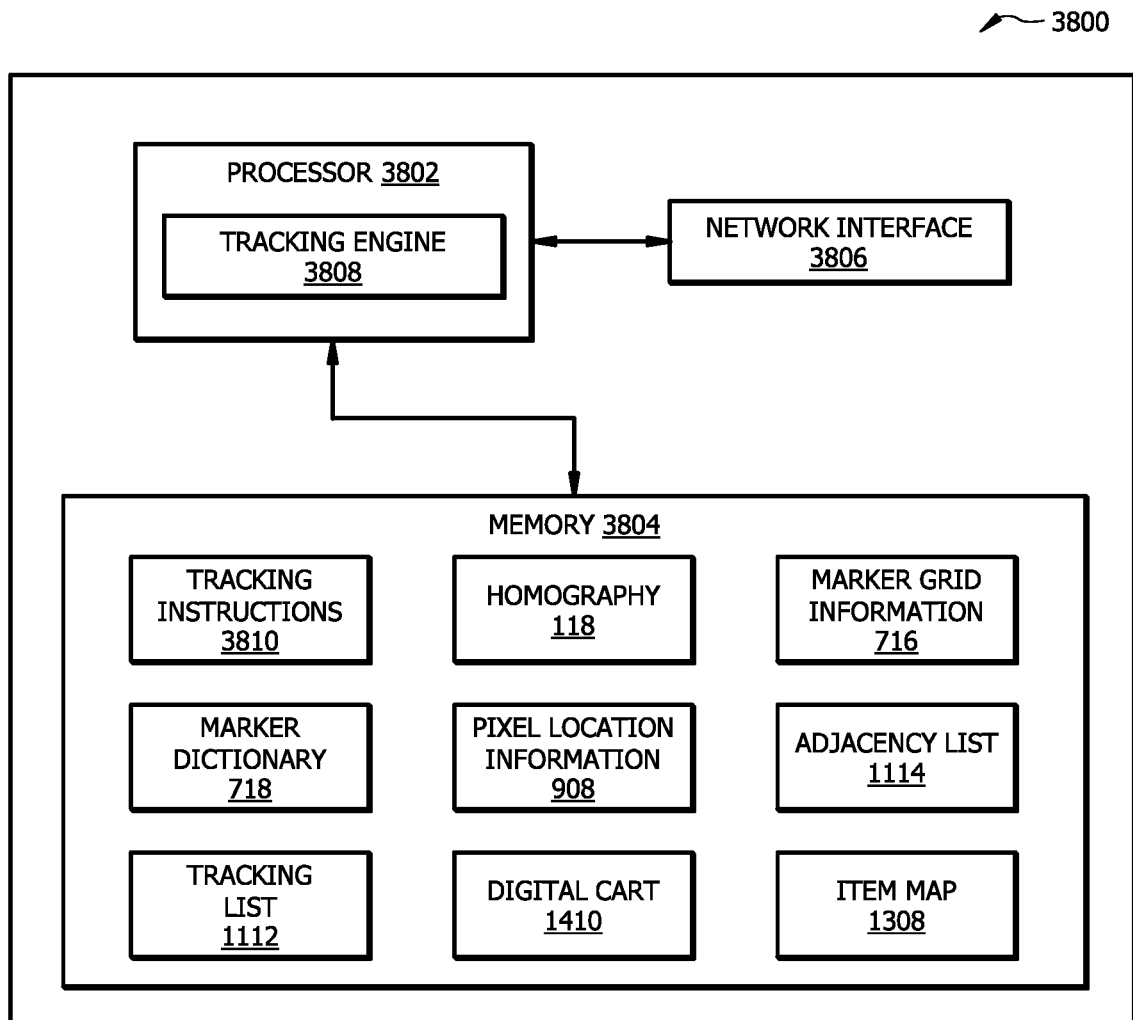
FIG. 38 is an embodiment of a device configured to track objects within a space.

FIG. 38 is an embodiment of a device 3800 (e.g. a server 106 or a client 105) configured to track objects and people within a space 102. The device 3800 comprises a processor 3802, a memory 3804, and a network interface 3806. The device 3800 may be configured as shown or in any other suitable configuration.

The processor 3802 comprises one or more processors operably coupled to the memory 3804. The processor 3802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 3802 may be a programmable logic device, a microcontroller, a microprocessor, or any suitable combination of the preceding. The processor 3802 is communicatively coupled to and in signal communication with the memory 3804. The one or more processors are configured to process data and may be implemented in hardware or software. For example, the processor 3802 may be 8-bit, 16-bit, 32-bit, 64-bit or of any other suitable architecture. The processor 3802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a tracking engine 3808. In this way, processor 3802 may be a special purpose computer designed to implement the functions disclosed herein. In an embodiment, the tracking engine 3808 is implemented using logic units, FPGAs, ASICs, DSPs, or any other suitable hardware. The tracking engine 3808 is configured operate as described in FIGS. 1-18. For example, the tracking engine 3808 may be configured to perform the steps of methods 200, 600, 800, 1000, 1200, 1500, 1600, 1700, 5900, 6000, 6500, 6800, 7000, 7200, and 7400, as described in FIGS. 2, 6, 8, 10, 12, 15, 16, 17, 59, 60, 65, 68, 70, 72, and 74, respectively.

The memory 3804 comprises one or more disks, tape drives, or solid-state drives, and may be used as an over-flow data storage device, to store programs when such programs are selected for execution, and to store instructions and data that are read during program execution. The memory 3804 may be volatile or non-volatile and may comprise read-only memory (ROM), random-access memory (RAM), ternary content-addressable memory (TCAM), dynamic random-access memory (DRAM), and static random-access memory (SRAM).

The memory 3804 is operable to store tracking instructions 3810, homographies 118, marker grid information 716, marker dictionaries 718, pixel location information 908, adjacency lists 1114, tracking lists 1112, digital carts 1410, item maps 1308, disparity mappings 7308, and/or any other data or instructions. The tracking instructions 3810 may comprise any suitable set of instructions, logic, rules, or code operable to execute the tracking engine 3808.

The homographies 118 are configured as described in FIGS. 2-5B. The marker grid information 716 is configured as described in FIGS. 6-7. The marker dictionaries 718 are configured as described in FIGS. 6-7. The pixel location information 908 is configured as described in FIGS. 8-9. The adjacency lists 1114 are configured as described in FIGS. 10-11. The tracking lists 1112 are configured as described in FIGS. 10-11. The digital carts 1410 are configured as described in FIGS. 12-18. The item maps 1308 are configured as described in FIGS. 12-18. The disparity mappings 7308 are configured as described in FIGS. 72 and 73.

The network interface 3806 is configured to enable wired and/or wireless communications. The network interface 3806 is configured to communicate data between the device 3800 and other, systems, or domain. For example, the network interface 3806 may comprise a WIFI interface, a LAN interface, a WAN interface, a modem, a switch, or a router. The processor 3802 is configured to send and receive data using the network interface 3806. The network interface 3806 may be configured to use any suitable type of communication protocol as would be appreciated by one of ordinary skill in the art.

Item Assignment Based on Angled-View Images

As described above, an item may be assigned to an appropriate person based on proximity to a rack 112 and activation of a weight sensor 110 on which the item is known to be placed (see, e.g., FIGS. 12-15 and the corresponding description above). In cases where two or more people may be near the rack 112 and it may not be clear who picked up the item, further action may be taken to properly assign the item to the correct person, as described with respect to FIGS. 33A-37. For example, in some embodiments, a cascade of algorithms may be employed to assign an item to the correct person. In some cases, the assignment of an item to the appropriate person may still be difficult using the approaches described above. In such cases, the tracking system 100 may store further buffer frames in order to track the item through the space 102 after it exits the rack 112, as described above with respect to FIGS. 36A-B and 37. When the item comes to a stopped position (e.g., with a sufficiently low velocity), the tracking system 100 may determine which person is closer to the stopped item, and the item may be assigned to the nearest person. This process may be repeated until the item is assigned with confidence to the correct person.

To handle instances where a weight sensor 110 is not present, reduce reliance on item tracking-based approaches to item assignment, and decrease the consumption of processing resources associated with continued item tracking and identification, a new approach, which is described further below with respect to FIGS. 39-44, may be used in which angled-view images of a portion of a rack 112 are captured and used to efficiently and reliably assign items to the appropriate person.

Figure 39:
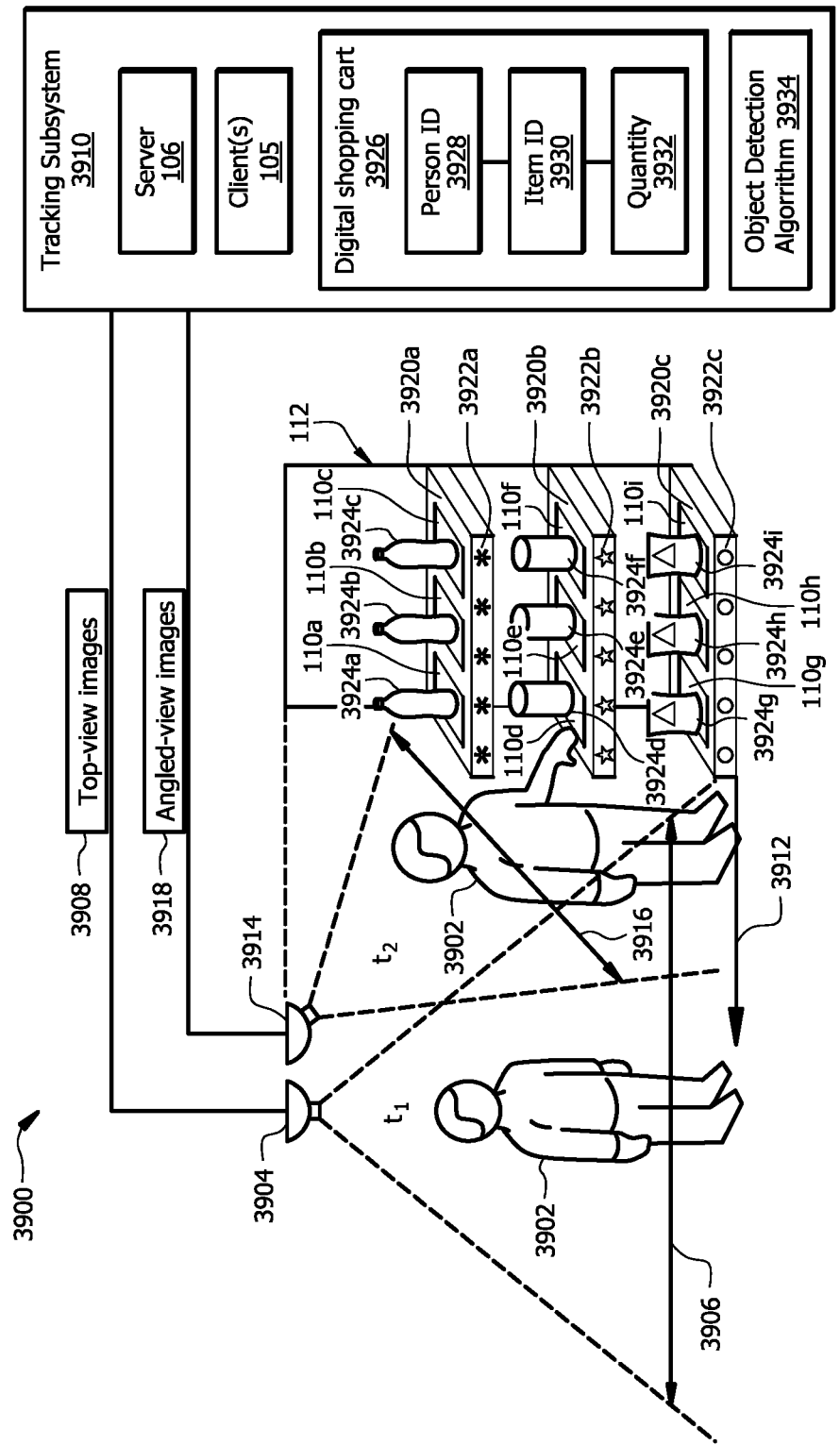
FIG. 39 is an example of using an angled-view sensor to assign a selected item to a person moving about the space.

FIG. 39 illustrates an example scenario 3900 in which angled-view images 3918 captured by an angled-view sensor 3914 are used to assign a selected item 3924a-i to a person 3902 moving about the space 102 of FIG. 1. The angled-view images 3918 are provided to a tracking subsystem 3910 (e.g., the server 106 and/or client(s) 105 described above) and used to detect an interaction between the person 3902 and the rack 112, identify an item 3924a-i interacted with by the person 3902, and determine whether the interaction corresponds to the person 3902 taking the item 3924a-i from the rack 112 or placing the item 3924a-i on the rack 112. This information is used to appropriately assign items 3924a-i to the person 3902, for example, by updating the digital shopping cart 3926 associated an identifier 3928 of the person 3902 (e.g., a user ID, account number, name, or the like) to an identifier 3930 of the selected item 3924a-i (e.g., a product number, product name, or the like). The digital shopping cart 3926 may be the same or similar to the digital shopping carts (e.g., digital cart 1410) described above with respect to FIGS. 12-18.

In one embodiment, the identifier 3928 of the person 3902 may be a local identifier that is assigned by a sensor 108. In this case, the tracking system 100 may use a global identifier that is associated with the person 3902. The tracking system 100 is configured to store associations between local identifiers from different sensors 108 and global identifiers for a person. For example, the tracking system 100 may be configured to receive a local identifier for a person and identifiers for items the person is removing from a rack 112. The tracking system 100 uses a mapping (e.g. a look-up table) to identify a global identifier for a person based on their local identifier from a sensor 108. After identifying the global identifier for the person, the tracking system 100 may update the digital cart 1410 that is associated with the person by adding or removing items from their digital cart 1410.

In the example scenario of FIG. 39, the person 3902 is approaching the rack 112 at an initial time, $t_1$, and is near the rack 112 at a subsequent time, $t_2$. The rack 112 stores items 3924a-i. A top-view sensor 3904, which is communicatively coupled to the tracking subsystem 3910 (i.e., to the server 106 and/or client(s) 105 described in greater detail with respect to FIG. 1 above), generates top-view images 3908 for a field-of-view 3906. The top-view images 3908 may be any type of image (e.g., a color image, depth image, and/or the like). The field-of-view 3906 of the top-view sensor 3904 may include the rack 112 and/or a region adjacent to the rack 112. The top-view sensor 3904 may be a sensor 108 described above with respect to FIG. 1. A top-view image 3908 captured at time $t_1$ includes a representation of the person 3902 and, optionally, the rack 112 (e.g., depending on the extent of the field-of-view 3906). The tracking subsystem 3910 is configured to determine, based on the top-view image 3906, whether the person 3902 is within a threshold distance 3912 of the rack 112 (e.g., by determining a physical position of the person 3902 using a homography 118, as described with respect to FIGS. 2-7 and determining if this physical position is within the threshold distance 3912 of a predefined position of the rack 112).

If the person 3902 is determined to be within the threshold distance 3912 of the rack 112, the tracking subsystem 3910 may begin receiving angled-view images 3918 captured by the angled-view sensor 3914. For example, after the person 3902 is determined to be within the threshold distance 3912 of the rack 112, the tracking subsystem 3910 may instruct the angled-view sensor 3914 to begin capturing angled-view images 3918. As such, the top-view images 3908 may be used to determine when a proximity trigger (e.g., the proximity trigger 4002 of FIG. 40) causes the start of angled-view image 3918 acquisition and/or processing. The angled-view sensor 3914 generates angled-view images 3918 for a field-of-view 3916. The field-of-view 3916 generally includes at least a portion of the rack 112 (e.g., the field-of-view 3916 may include a view into the shelves 3920a-c of the rack 112 on which items 3924a-i are placed). The angled-view sensor 3914 may include one or more sensors, such as a color camera, a depth camera, an infrared sensor, and/or the like. The angled-view sensor 3914 may be a sensor 108 described with respect to FIG. 1, or a sensor 108b described with respect to FIG. 22.

An angled-view image 3918 captured at time $t_2$ includes a representation of the person 3902 and the portion of the rack 112 included in the field-of-view 3916 of the angled-view sensor 3914. As described in greater detail below with respect to FIGS. 40-44, the tracking subsystem 3910 is configured to determine whether the person 3902 interacts with the rack 112 and/or one or more items 3924a-i stored on the rack 112 (see, e.g., the item localization and event trigger instructions 4004 of FIG. 40 and the corresponding description below), identify item(s) 3924a-i interacted with by the person 3902 (see, e.g., the item identification instructions 4012 of FIG. 40 and the corresponding description below), and determine whether the identified item(s) 3924a-i was/were removed from or placed on the rack 112 (see, e.g., the activity recognition instructions 4016 of FIG. 40 and the corresponding description below). This information is used to appropriately assign selected items 3924a-i to the person 3902, for example, by updating the digital shopping cart 3926 associated with the person 3902.

In some embodiments, one or more of the shelves 3920a-c of the rack 112 includes a visible marker 3922a-c (e.g., a series of visible shapes or any other marker at a predefined location on the shelf 3920a-c). The tracking subsystem 3910 may detect the markers 3922a-c in angled-view image 3918 of the shelves 3920a-c and determine the pixel positions of the shelves 3920a-c in the images 3918 based on these markers 3922a-c. In some cases, pixel positions of the shelves 3920a-c in the images 3918 are predefined (e.g., without using markers 3922a-c). For example, the tracking subsystem 3910 may determine a predefined shelf position in the images 3918 for one or more of the shelves 3920a-c. This information may facilitate improved detection of an interaction between a person 3902 and a given shelf 3920a-c, as described further below with respect to FIGS. 40-44.

In some embodiments, the rack 112 includes one or more weight sensors 110a-i. However, efficient and reliable assignment of item(s) 3924a-i to a person 3902 can be achieved without weight sensors 110a-i. As such, in some embodiments, the rack 112 does not include weight sensors 110a-i. In embodiments in which the rack 112 includes one or more weight sensors 110a-i, each weight sensor 110a-i may store items 3924a-i of the same type. For instance, a first weight sensor 110a may be associated with items 3924a of a first type (e.g., a particular brand and size of product), a second weight sensor 110b may be associated with items 3924b of a second type, and so on (see FIG. 13). Changes in weight measured by weight sensors 110a-i may provide further insight into when the person 3902 interacts with the rack 112 (e.g., based on a time when a change of weight is detected by a weight sensor 110a-i) and which item(s) 3924a-i the person 3902 interacts with on the rack 112 (e.g., based on knowledge of which item 3924a-i should be stored on each weight sensor 110a-i—see, e.g., FIG. 13). Since items 3924a-i may be moved from their predefined locations over time (e.g., as people interact with the items 3924a-i), it may be beneficial to supplement item assignment determinations that are based, at least in part, on weight sensor 110a-i measurements (see, e.g., FIGS. 12-17 and 33A-37 and corresponding description above) with the image-based item assignment determinations described with respect to FIGS. 40-44 below.

Figure 40:
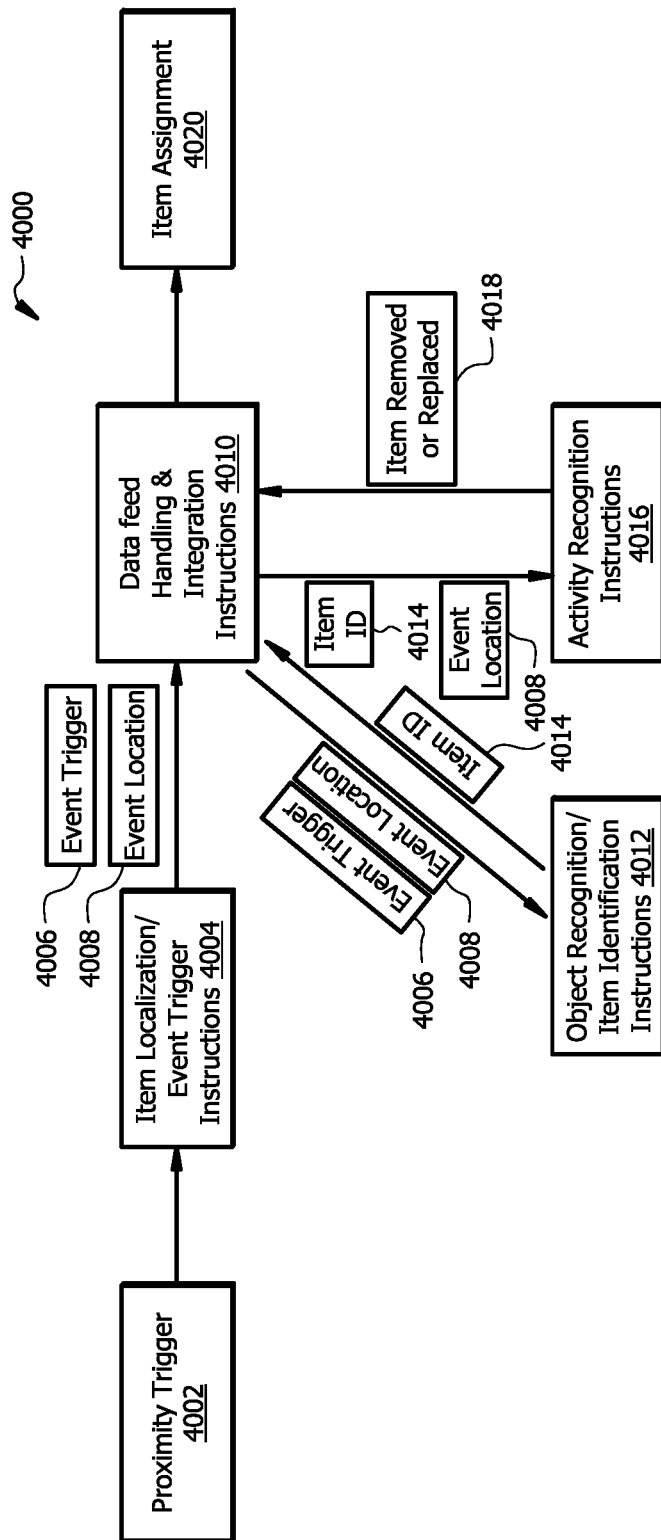
FIG. 40 is a flow diagram of an embodiment of a triggering event based item assignment process.

FIG. 40 is a flow diagram 4000 illustrating an example operation of the tracking subsystem 3910 of FIG. 1. The tracking subsystem 3910 may execute the instructions 4004, 4010, 4012, and 4016 described in FIG. 2 (e.g., using one or more processors as described with respect to the device of FIG. 38. The various instructions 4004, 4010, 4012, and 4016 generally include any code, logic, and/or rules for implementing the corresponding functions described below with respect to FIG. 40.

An example operation of the tracking subsystem 3910 may begin with the receipt of a proximity trigger 4002. The proximity trigger 4002 may be initiated based on a proximity of the person 3902 to the rack 112. For example, top-view images 3908 captured by the top-view sensor 3904 shown in FIG. 1 may be used to initiate proximity trigger 4002. In particular, the tracking subsystem 3910 may detect, based on one or more top-view images 3908 that the person 3902 is within the threshold distance 3912 of the rack 112. In some embodiments, the proximity trigger 4002 may be determined based on angled-view images 3918 received from the angled-view sensor 3914. For example, the proximity trigger 4002 may be initiated upon determining, based on one or more angled-view images 3918, that the person 3902 is within the threshold distance 3912 of the rack 112 or that the person 3902 has entered the field-of-view 3916 of the angled-view sensor 3914. In some cases, it may be beneficial to initiate the proximity trigger 4002 based on top-view images 3908 (e.g., which may already be collected by the system 100 of FIG. 1 to perform person tracking) and begin collecting and analyzing angled-view images 3918 following the proximity trigger 4002 in order to perform the item assignment tasks described further below. This may improve overall efficiency by reserving the processing resources associated with collecting, processing, and analyzing angled-view images 3918 until an item assignment is likely to be needed after receipt of the proximity trigger 4002.

a. Event Trigger and Item Localization

Following the proximity trigger 4002, the tracking subsystem 3910 may begin to implement the item localization/event trigger instructions 4004. The item localization/event trigger instructions 4004 generally facilitate the detection of an event associated with an item 3924a-i being interacted with by the person 3902 (e.g., detecting vibrations on the rack 112 using an accelerometer, detecting weight changes on weight sensor 110, detecting an item 3924a-i being removed from or placed on a shelf 3920a-c of the rack 112, etc.) and/or the identification of an approximate location 4008 of the interaction (e.g., the wrist positions 4102 and/or aggregated wrist position 4106 illustrated in FIG. 41, described below).

The item localization/event trigger instructions 4004 may cause the tracking subsystem 3910 to begin receiving angled-view images 3918 of the rack 112 (e.g., if such images 3918 are not already being received). The tracking subsystem 3910 may identify a portion of the angled-view images 3918 to analyze in order to determine whether a shelf-interaction event has occurred (e.g., to determine whether the person 3902 likely interacted with an item 3924a-i stored on the rack 112. This portion of the angled-view images 3918 may include image frames from a time-frame associated with a possible person-shelf, or person-item, interaction. The portion of the angled-view images 3918 may be identified based on a signal from a weight sensor 110a-i indicating a change in weight. For instance, a decrease in weight may indicate an item 3924a-i may have been removed from the rack 112 and an increase in weight may indicate an item 3924a-i was placed on the rack 112.

The time at which a change in weight occurs may be used to determine the timeframe associated with the interaction. Detection of a change of weight is described in greater detail above with respect to FIGS. 12-17 and 33A-37 (e.g., see step 1502 of FIG. 15 and corresponding description above). The tracking subsystem 3910 may also or alternatively identify the portion of the angled-view images 3918 to use for item assignment by detecting the person 3902 entering a zone adjacent to the rack 112 (e.g., as described with respect to the "virtual curtain" of FIGS. 12-15 above and/or zone 3324 described in greater detail above with respect to FIG. 33).

Figure 41:
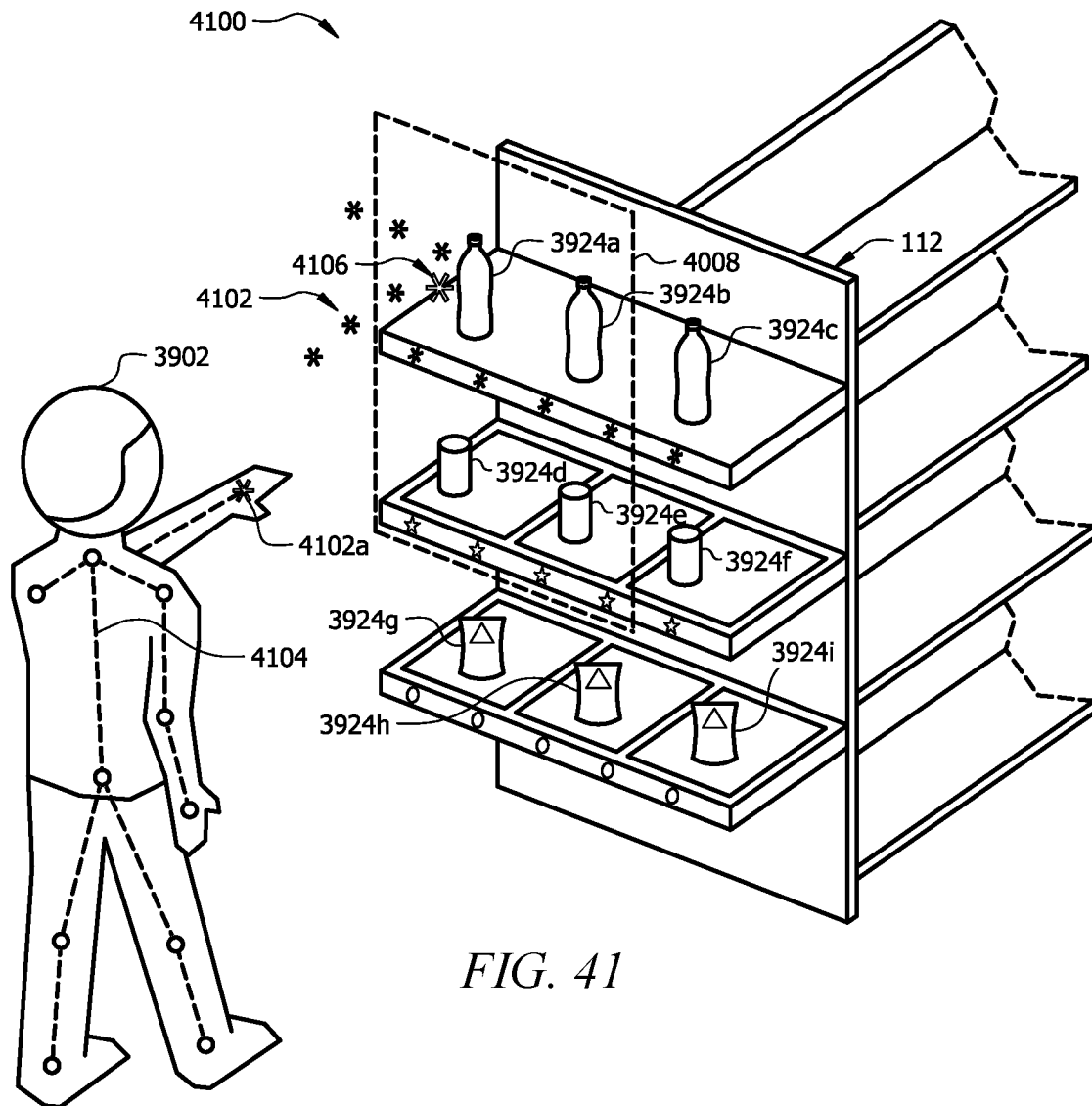
FIGS. 41 and 42 are an example of performing object-based detection based on a wrist-area region-of-interest.

An example depiction of an angled-view image 3918 from one of the identified frames is illustrated in FIG. 41 as image 4100. Image 4100 includes the person 3902 and at least a portion of the rack 112. The tracking subsystem 3910 uses pose estimation (e.g., as described with respect to FIGS. 33C and 34) to determine pixel positions 4102 of, in one embodiment, a wrist of the person 3902 in each image 3918 from the identified frames. In other embodiments, the pixel positions of other relevant parts of the body of a person 3902 (e.g., fingers, hand, elbow, forearm, etc.) may be used by the tracking subsystem 3910 in conjunction with pose estimation to perform the operations described below. For example, a skeleton 4104 may be determined using a pose estimation algorithm (e.g., as described with respect to the determination of skeletons 3302e and 3302f shown in FIG. 33C). A first wrist position 4102a on the skeleton 4104 is shown at the position of the person's wrist in image 4100 of FIG. 41. FIG. 41 also shows a set of wrist pixel positions 4102 determined during the remainder of the identified frames (e.g., during the rest of the timeframe determined to be associated with the shelf interaction).

The tracking subsystem 3910 may then determine an aggregated wrist position 4106 based on the set of pixel positions 4102. For example, the aggregated wrist position 4106 may correspond to a maximum depth into the rack 112 to which the person 3902 reached to possibly interact with an item 3924a-i. This maximum depth may be determined, at last in part, based on the angle, or orientation, of the angled-view camera 3914 relative to the rack 112. For instance, in the example of FIG. 41 where the angled-view sensor 3914 provides a view over the right shoulder of the person 3902 relative to the rack 112, the aggregated wrist position 4106 may be determined as the right-most wrist position 4102. If an angled-view sensor 394 provides a different view, a different approach may be used to determine the aggregated wrist position 4106 as appropriate. If the angled-view sensor 3914 provides depth information (e.g., if the angled view sensor 3914 includes a depth sensor), this depth information may be used to determine the aggregated wrist position 4106.

Referring to FIGS. 40 and 41, the aggregated wrist position 4106 may be used to determine if an event trigger 4006 should be initiated. For example, the tracking subsystem 3910 may determine whether the aggregated wrist position 4106 corresponds to a position on a shelf 3920a-c of the rack 112. This may be achieved by comparing the aggregated wrist position 4106 to a set of one or more predefined shelf positions (e.g., determined based at least in part on the shelf markers 3922a-c, described above). Based on this comparison, the tracking subsystem 3910 may determine whether the aggregated wrist position 4106 is within a threshold distance of at least one of the shelves 3920a-c of the rack 112 or to a predefined location of the item 3924a-i on the shelf 3920a-c. If the aggregated wrist position 4106 is within a threshold distance of a shelf 3920a-c (e.g., or of a predefined position of an item 3924a-i stored on a shelf 3920a-c), the event trigger 4006 of FIG. 40 may be initiated (e.g., provided for data handling and integration, as illustrated in FIG. 40). Thus, the event trigger 4006 indicates that a shelf-interaction event has likely occurred, such that further tasks of item identification and/or action type identification are appropriate.

The item localization/event trigger instructions 4004 may further determine an event location 4008. The event location 4008 may include an image region that is associated with the detected shelf 3920a-c interaction, as illustrated by the dashed-line region in FIG. 41. For example, the event location 4008 may include the aggregated wrist position 4106 and a region of the image 4100 surrounding the aggregated wrist position 4106. As described further below, the tracking subsystem 3910 may use the event location 4008 to facilitate improved item identification (e.g., using the item identification instructions 4012) and/or improved activity recognition (e.g., using the activity recognition instructions 4016), as described further below. Although event location 4008 illustrated in FIG. 41 is illustrated as a rectangle, it should be understood that any appropriate size and/or shape of event location 4008 may be used in accordance with the size and/or shape of the particular body part of the person 3902 whose pixel positions are used by tracking subsystem 3910.

As an example, the tracking subsystem 3910 may determine at least one image 3918 associated with the person 3902 removing an item 3924a-i from the rack 112. The tracking subsystem 3910 may determine a region-of-interest (e.g., region-of interest 4202 described with respect to FIG. 42 below) within this image 4100 based on the aggregated wrist location 4106 and/or the event location 4008 and use an object recognition algorithm to identify the item 3924a-i within the region-of-interest (see, e.g., descriptions of the implementation of the item identification instructions 4012 and FIGS. 42 and 44 below). Although region-of-interest 4202 illustrated in FIG. 41 is illustrated as a circle, it should be understood that any appropriate size and/or shape of region-of-interest 4202 may be used in accordance with the size and/or shape of the particular body part of the person 3902 whose pixel positions are used by tracking subsystem 3910.

As another example, the tracking subsystem 3910 may determine, based on the aggregated wrist position 4106 and/or the event location region 4008, candidate items that may have been removed from the rack by the person 4008. For example, the candidate items may include a subset of all the items 3924a-i stored on the shelves 3920a-c of the rack 112 that have predefined locations (e.g., see FIG. 13) that are within the region defined by the event location 4008 and/or are within a threshold distance from the aggregated wrist position 4106. Identification of these candidate items may narrow the search space for identifying the item 3924a-i with which the person 3902 interacted, thereby improving overall efficiency.

Referring again to FIG. 40, further use of the event trigger 4006 and/or event location 4008 for item assignment may be coordinated using the data feed handling and integration instructions 4010. The data feed handling and integration instructions 4010 generally include code, logic, and/or rules for communicating the event trigger 4006 and/or event location 4008 for use by the item identification instructions 4012 and/or activity recognition instructions 4016, as illustrated in FIG. 40. Data feed handling and integration instructions 4010 may help ensure that the correct information is appropriately routed to perform further functions of the tracking subsystem 3910 (e.g., tasks performed by the other instructions 4012 and 4016).

As is described further below, the data feed handling and integration instructions 4010 also integrate the information received from each of the item localization/event trigger instructions 4004, the item identification instructions 4012, and the activity recognition instructions 4016 to determine an appropriate item assignment 4020. The item assignment 4020 generally refers to an indication of an item 3924a-i interacted with by the person 3920 (e.g., based on the item identifier 3912 determined by the item identification instructions 4012) and an indication of whether the item 3924a-i was removed from the rack 112 or placed on the rack 112 (e.g., based on the item removed or replaced 4018 determined by the activity recognition instructions 4016). The item assignment 4020 is used to appropriately update the person's digital shopping cart 3926 by appropriately adding or removing items 3924a-i. For example, the digital shopping cart 3926 may be updated to include the appropriate quantity 3932 for the item identifier 3930 of the item 3924a-i.

b. Object Detection Based on Wrist-Area Region-of-Interest

Figure 42:
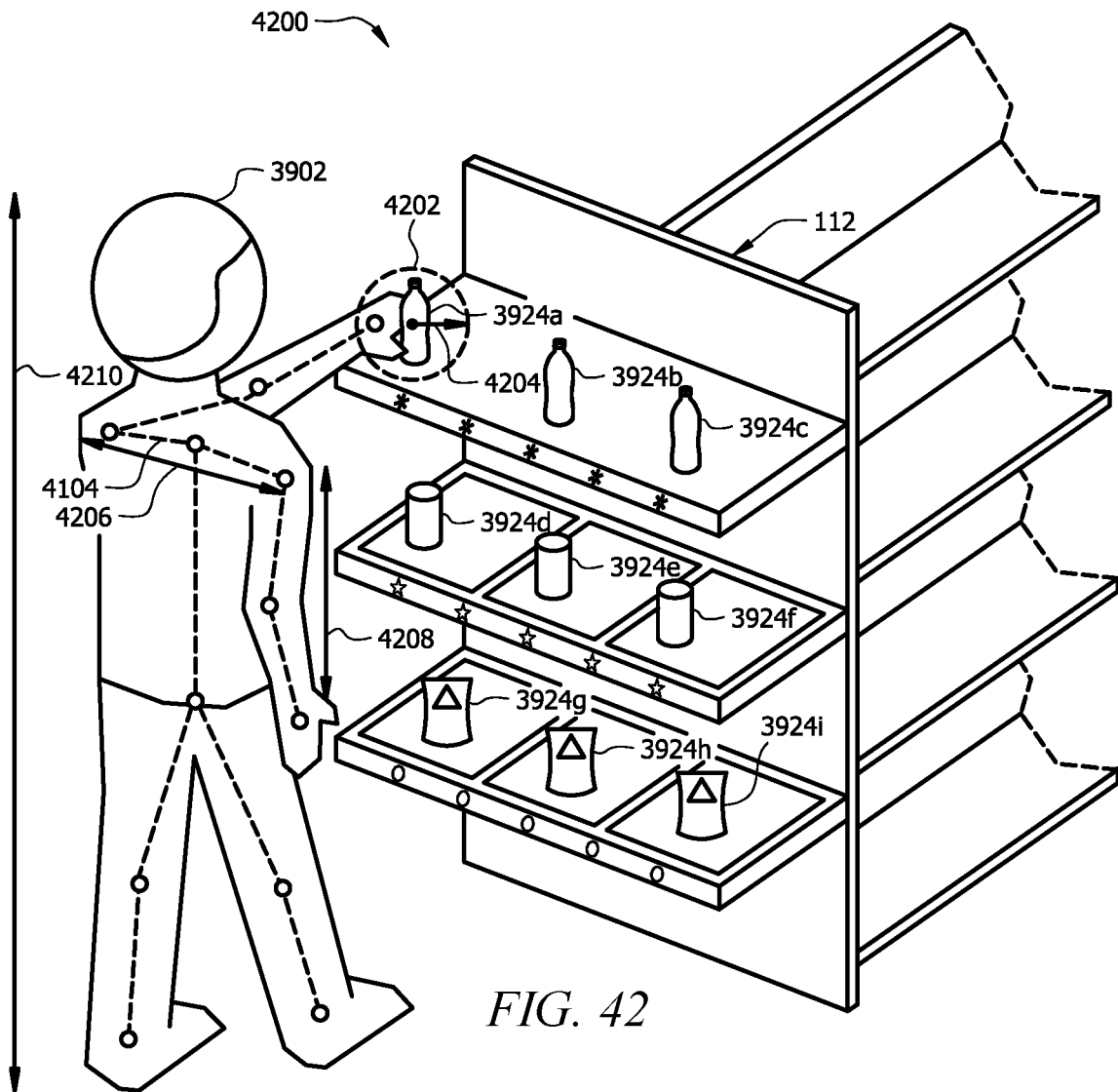

Still referring to FIG. 40, the item identification instructions 4012 may receive the event trigger 4006 and/or event location 4008. Following receipt of the event trigger 4006, the tracking subsystem 3910 may determine one or more images 3918 (e.g., of the overall feed of angled-view images 3918) that are associated with the event trigger 4006. These images 3918 may be all or a portion of the images 3918 in which wrist positions 4102 (or other body parts, as appropriate) were determined, as described above with respect to FIG. 41. FIG. 42 illustrates an example representation 4200 of an identified event-related image 3918 in which the person 3902 is interacting with a first item 3924a on the top shelf 3920a of the rack 112. In at least this image 4200, the tracking subsystem 3910 uses pose estimation to determine the wrist position 4102 (e.g., a pixel position of the wrist) of the person 3902. This wrist position 4202 may already have been determined by the item localization/event trigger instructions 4004 and included in the event location 4008 information, or the tracking subsystem 3910 may determine this wrist position 4102 (e.g., by determining the skeleton 4104, as described with respect to FIG. 41 above).

Following determination of the wrist position 4102, the tracking subsystem 3910 then determines, in the image 4100, a region-of-interest 4202 within the image 4200 based on the wrist position 4102. The region-of-interest 4202 illustrated in FIG. 42 is a circular region-of-interest. However, the region-of-interest 4202 can be any shape (e.g., a square, rectangle, or the like). The region-of-interest 4202 includes a subset of the entire image 4200, such that item identification may be performed more efficiently in the region-of-interest 4202 than would be possible using the entire image 4200. The region-of-interest 4202 has a size 4204 that is sufficient to capture a substantial portion of the item 3924a to identify the item 3924a using an image recognition algorithm. For the example region-of-interest 4202 of FIG. 42, the size 4204 of the region-of-interest corresponds to a radius. For a region-of-interest 4202 with a different shape, a different size 4204 parameter may characterize the region-of-interest 4202 (e.g., a width for a square, a length and width for a rectangle, etc.). The size 4204 of the region-of-interest 4202 may be a predetermined value (e.g., corresponding to a predefined number of pixels in the image 4200 or a predefined physical length in the space 102 of FIG. 1). In some embodiments, the region-of-interest 4202 has a size that is based on features of the person 3902, such as the shoulder width 4206 of the person 3902, the arm length 4208 of the person 3902, the height 4210 of the person 3902, and/or value derived from one or more of these or other features. As an example, the size 4204 of the region-of-interest 4202 may be proportional to a ratio of the shoulder width 4206 of the person 3902 to the arm length 4208 of the person 3902.

The tracking subsystem 3910 may identify the item 3924a by determining an item identifier 4014 (e.g., the identifier 3930 of FIG. 39) for the item 3924a located within the region-of-interest 4202. Generally, the image of the item 3924a within the region-of-interest 4202 may be compared to images of candidate items. The candidate items may include all items offered for sale in the space 102, items 3924a-i stored on the rack 112, or a subset of the items 3924a-i that are stored on the rack 112, as described further below. In some cases, for each candidate item, a probability is determined that the candidate item is the item 3924a. The probability may be determined, at least in part, based on a comparison of a predefined position associated with the candidate items (e.g., the predefined location of items 3924a-i on the rack 112—see FIG. 13) to the wrist position 4102 and/or the aggregated wrist position 4106. In some embodiments, the probability for each candidate item may be determined using an object detection algorithm 3934. The object detection algorithm 3934 may employ a neural network or a method of machine learning (e.g. a machine learning model). The object detection algorithm 3934 may be trained using the range of items 3924a-i expected to be stored on the rack 112. For example, the object detection algorithm 3934 may be trained using previously obtained images of products offered for sale on the rack 112. Generally, an item identifier 4014 for the candidate item with the largest probability value (e.g., and that is at least a threshold value) is assigned to the item 3924a. In some embodiments, the tracking subsystem 3910 may identify the item 3924a using feature-based techniques, contrastive loss-based neural networks, or any other suitable type of technique for identifying the item 3924a.

Since decreasing the number of candidate items can facilitate more rapid item identification, the event location 4008 or other item position information may be used to narrow the search space for correctly identifying the item 3924a. For example, prior to identifying the item 3924a with which the person 3902 interacted, the tracking subsystem 3910 may determine candidate items that are known to be located near the region-of-interest 4202, near the aggregated wrist position 4106 described above with respect to FIG. 41, and/or within the region defined by the event location 4008 (see example dashed-line region in FIG. 41). The candidate items include at least the item 3924a and may also include and one or more other items 3924b-i stored on the rack 112. For example, the other candidate items may have known positions (see FIG. 13) at adjacent positions in the rack 112 to the item 3924a. For example, the candidate items may include items with predefined locations at the position of item 3924a, and the adjacent positions of items 3924b,d,e.

c. Detection of Object Removal and Replacement

After the tracking subsystem 3910 has determined that the person 3902 has interacted with the item 3924a, further actions may be needed to determine whether the item 3924a was removed from the rack 112 or placed on the rack 112. For instance, the tracking subsystem 3910 may not have reliable information about whether the item 3924a was taken from the rack 112 or placed on the rack 112. In cases where the item 3924a was on a weight sensor 110a, a change of weight associated with the interaction detected by the tracking subsystem 3910 may be used to determine whether the item 3924a was removed or placed on the rack 112. For example, a decrease in weight at the weight sensor 3910a may indicate the item 3924a was removed from the rack, while an increase in weight may indicate the item 3924a was placed on the rack 112. In cases where there is no weight sensor 3910a or when a weight change is insufficient to provide reliable information about whether the item 3924a was removed from or placed on the rack 112 (e.g., if the magnitude of the change of weight does not correspond to an expected weight change for the item 3924a), the tracking subsystem 3910 may track the item 3924a through the space 102 after it exits the rack 112 (see FIGS. 36A-B and 37). However, as described above, it may be advantageous to avoid unnecessary further item tracking in order to more efficiently use the processing and imaging resources of the tracking subsystem 3910. The activity recognition instructions 4016, described below, facilitate the reliable determination of whether the item 3924a was removed from or placed on the rack 112 without requiring weight sensors 110a-i or subsequent person tracking and item re-evaluation as the person 3902 continues to move about the space 102 (see FIGS. 36A-B and 37). The activity recognition instructions 4016 also facilitate more rapid identification of whether the item 3924a was removed from or placed on the rack 112 than may have been possible previously, thereby reducing delays in item assignment which may otherwise result in a relatively poor user experience.

Referring again to FIG. 40, the activity recognition instructions 4016 may receive the item identifier 4014 and the event location 4008 and use this information, at least in part, to determine whether the item 3924a was removed from or placed on the rack 112. For example, the tracking subsystem 3910 may identify a time interval associated with the interaction between the person 3902 and the item 3924a. For example, the tracking subsystem 3910 may identify a first image 3918 (e.g., image 4302a of FIG. 43) corresponding to a first time before the person 3902 interacted with the item 3924a and a second image (e.g., image 4302b of FIG. 43) corresponding to a second time after the person 3902 interacted with the item 3924a (see example of FIG. 43, described below). Based on a comparison of the first image 3918 to the second image 3918, the tracking subsystem 3910 determines an indication 4018 of whether the item 3924a was removed from the rack 112 or the item 3924a was placed on the rack 112.

The data feed handling and integration instructions may use the indication 4018 of whether the item 3924a was removed or replaced on the rack 112 to determine the item assignment 4020. For example, if it is determined that the item 3924a was removed from the rack 112, the item 3924a may be assigned to the person 3902 (e.g., to the digital shopping cart 3926 of the person 3902). Otherwise, if it is determined that the item was placed on the rack 112, the item 3924a may be unassigned from the person 3902. For instance, if the item 3924a was already present in the person's digital shopping cart 3926, then the item 3924a may be removed from the digital shopping cart 3926.

Detection of Object Removal and Replacement from a Shelf

Figure 43:
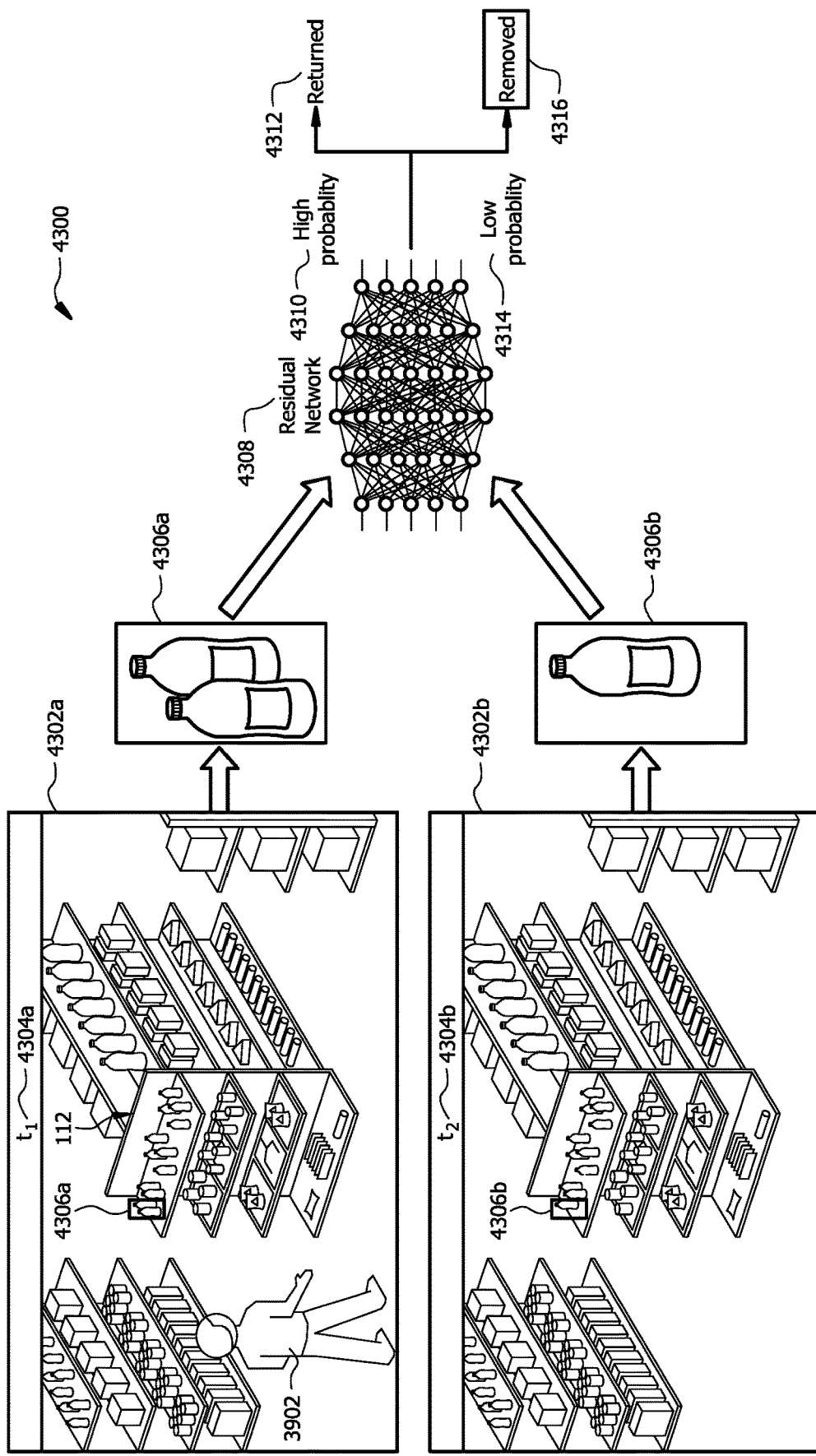
FIG. 43 is a flow diagram of an embodiment of a process for determining whether an item is being replaced or removed from a rack.

FIG. 43 is an example flow diagram 4300 illustrating an example approach employed by the tracking subsystem 3910 to determine whether the item 3924a was placed on the rack 112 or removed from the rack 112 using the activity recognition instructions 4016. As described above, the tracking subsystem 3910 may determine a first image 4302a corresponding to a first time 4304a before the person 3902 interacted with the item 3924a. For example, the tracking subsystem 3910 may identify an interaction time associated with the person 3902 interacting with the rack 112, the shelf 3920a, and/or the item 3924a. For instance, this interaction time may be determined as a time at which the item 3924a was identified (e.g., in the region-of-interest 4202 illustrated in FIG. 42, described above). The first time 4304a may be a time that is before this interaction time. For instance, the first time 4304a may be the interaction time minus a predefined time interval (e.g., of several to tens of seconds). The first image 4302a is an angled-view image 3918 at or near the first time 4304a (e.g., with a timestamp corresponding approximately to the first time 4304a).

The tracking subsystem 3910 also determines a second image 4302b corresponding to a second time 4304b after the person 3902 interacted with the item 3924a. For example, the tracking subsystem 3910 may determine the second time 4304b based on the interaction time associated with the person 3902 interacting with the rack 112, the shelf 3920a, and/or the item 3924a, described above. The second time 4304b may be a time that is after the interaction time. For example, the second time 4304b may be the interaction time plus a predefined time interval (e.g., of several to tens of seconds). The second image 4302b is an angled-view image 3918 at or near the second time 4304b (e.g., with a timestamp corresponding approximately to the second time 4304b).

The tracking subsystem 3910 then compares the first and second images 4302a,b to determine whether the item 3924a was added to or removed from the rack 112. The tracking subsystem 3910 may first determine a portion 4306a of the first image 4302a and a portion 4306b of the second image 4302b that each correspond to a region around the item 3924a in the corresponding image 4302a,b. For example, the portions 4306a,b may each correspond to a region-of-interest (e.g., region-of-interest 4202 of FIG. 42) associated with the interaction between the person 3902 and the object 3924a. While the portions 4306a,b of images 4302a,b are shown as a rectangular region in the image, the portions 4306a,b may generally be any appropriate shape (e.g., a circle as in the region-of-interest 4202 shown in FIG. 42, a square, or the like). Comparing image portion 4306a to image portion 4306b is generally less computationally expensive and may be more reliable than comparing the entire images 4304a,b.

The tracking subsystem 3910 provides the portion 4306a of the first image 4302a and the portion 4306b of the second image 4302b to a neural network 4308 trained to determine a probability 4310, 4314 corresponding to whether the item 3924a has been added or removed from the rack 112 based on a comparison of the two input images 4306a,b. For example, the neural network 4308 may be a residual neural network. The neural network 4308 may be trained using previously obtained images of the item 3924a and/or similar items. If a high probability 4310 is determined (e.g., a probability 4310 that is greater than or equal to a threshold value), the tracking subsystem 3910 generally determines that the item 3924a was returned 4312, or added to, the rack 112. If a low probability 4314 is determined (e.g., a probability 4314 that is less than the threshold value), the tracking subsystem 3910 generally determines that the item 3924a was removed 4316 from the rack 112. In the example of FIG. 43, the item 3924a was removed. The returned 4312 or removed 4316 determination is provided as the indication 4018 shown in FIG. 40 to the data feed handling and integration instructions 4010 to complete the item assignment 4020, as described above.

Example Method of Item Assignment

Figure 44:
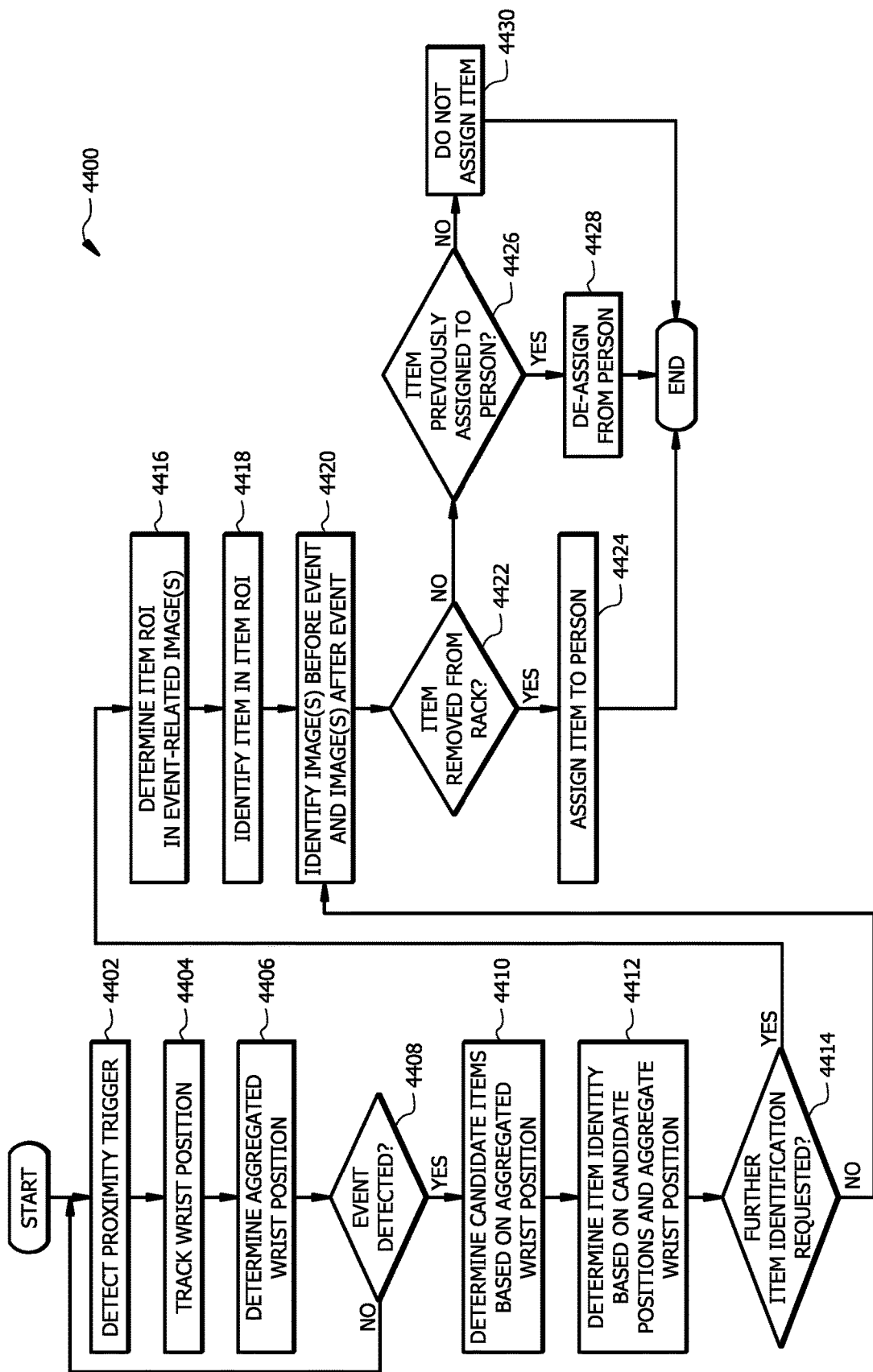
FIG. 44 is an embodiment of an item assignment method for the tracking system.

FIG. 44 illustrates a method 4400 of operating the tracking subsystem 3910 to perform functions of the item localization/event trigger instructions 4004, item identification instructions 4012, activity recognition instructions 4016, and the data feed handling and integration instructions 4010, described above. The method 4400 may begin at step 4402 where a proximity trigger 4002 is detected. As described above with respect to FIG. 40, the proximity trigger 4002 may be initiated based on the proximity of the person 3902 to the rack 3912. For example, the tracking subsystem 3910 may detect, based on one or more top-view images 3908 that the person 3902 is within a threshold distance 3912 of the rack 112. In some embodiments, the proximity trigger 4002 may be determined based on angled-view images 3918 received from the angled-view sensor 3914. For example, the proximity trigger 4002 may be initiated upon determining, based on one or more angled-view images 3918, that the person 3902 is within the threshold distance 3912 of the rack 112 or that the person 3902 has entered the field-of-view 3916 of the angled-view sensor 3914.

At step 4404, the wrist position 4102 (e.g., a pixel position corresponding to the location of the wrist of the person 3902 in images 3918) of the person 3902 is tracked. For example, the tracking subsystem 3910 may perform pose estimation (e.g., as described with respect to FIGS. 33C, 34, 40, 41, and 42) to determine pixel positions 4102 of a wrist of the person 3902 in each image 3918. For example, a skeleton 4104 may be determined using a pose estimation algorithm (e.g., as described with respect to the determination of skeletons 3302e and 3302f shown in FIG. 33C and skeleton 4104 of FIGS. 41 and 42). Example wrist positions 4102 are shown in FIG. 41.

At step 4406, an aggregated wrist position 4106 is determined. The aggregated wrist position 4106 may be determined based on the set of wrist positions 4102 determined at step 4404. For example, the aggregated wrist position 4106 may correspond to a maximum depth into the rack 112 to which the person 3902 reached to interact with an item 3924a-i. This maximum depth may be determined, at last in part, based on the angle of the angled-view camera 3914 relative to the rack 112. For instance, in the example of FIG. 41 where the angled-view sensor 3914 provides a view over the right shoulder of the person 3902 relative to the rack 112, the aggregated wrist position 4106 may be determined as the right-most wrist position 4102. If an angled-view sensor 3914 provides a different view, a different approach may be used to determine the aggregated wrist position 4106, as appropriate. If the angled-view sensor 3914 provides depth information (e.g., if the angled view sensor 3914 includes a depth sensor), this depth information may be used to determine the aggregated wrist position 4106.

At step 4408, the tracking subsystem 3910 determines if an event (e.g., a person-rack interaction event) is detected. For example, the tracking subsystem 3910 may determine whether the aggregated wrist position 4106 is within a threshold distance of a predefined location of an item 3924a-i. If the aggregated wrist position 4106 is within the threshold distance of a predefined position of an item 3924a-i, an event may be detected. In some embodiments, the tracking subsystem 3910 may determine if an event is detected based on a change of weight indicated by a weight sensor 3910a-i. If a change of weight is detected, an event may be detected. If an event is not detected, the tracking subsystem 3910 may return to wait for another proximity trigger 4002 to be detected at step 4402. If an event is detected, the tracking subsystem 3910 generally proceeds to step 4410.

At step 4410, candidate items 3924a-i may be determined based on the aggregated wrist position 4106. For example, the candidate items may include a subset of all the items 3924a-i stored on the shelves 3920a-c of the rack 112 that have predefined locations (e.g., see FIG. 13) that are within the region defined by the event location 4008 and/or are within a threshold distance from the aggregated wrist position 4106. Identification of these candidate items may narrow the search space for identifying the item 3924a-i with which the person 3902 interacted at steps 4412 and/or 4418 (described below), thereby improving overall efficiency of item 3924a-i assignment.

At step 4412, the tracking subsystem 3910 may determine the identity of the interacted with item 3924a-i (e.g., item 3924a of the examples of images FIGS. 41 and 42) based on the aggregated wrist position 4106. For example, the tracking subsystem 3910 may determine that the interacted-with item 3924a-i is the item 3924a-i with a predefined location on the rack 112 that is nearest the aggregated wrist position 4106. In some cases, the tracking subsystem 3910 may determine a probability that the person interacted with each of the candidate items determined at step 4410. For example, a probability may be determined for each candidate item, where the probability for a given candidate item is increased when the distance between the aggregated wrist position 4106 and the predefined position of the candidate item is decreased.

At step 4414, the tracking subsystem 3910 determines if further item 3924a-i identification is appropriate. For example, the tracking subsystem 3910 may determine whether the identification at previous step 4412 satisfies certain reliability criteria. For instance, if the highest probability determined for candidate items is less than a threshold value, the tracking subsystem 3910 may determine that further identification is needed. As another example, if multiple candidate items were likely interacted with by the person 3902 (e.g., if probabilities for multiple candidate items were greater than a threshold value), then further identification may need to be performed. If a change in weight was received when the person 3902 interacted with an item 3924a-i, the tracking subsystem 3910 may compare a predefined weight for each candidate item to the change in weight. If the change in weight matches one of the predefined weights, then no further identification may be needed. However, if the change in weight does not match one of the predefined weights of the candidate items, then further identification may be needed. If further identification is needed, the tracking subsystem 3910 proceeds to step 4416. However, if no further identification is needed, the tracking subsystem 3910 may proceed to step 4420.

At steps 4416 and 4418, the tracking subsystem 3910 performs object recognition-based item identification. For example, at step 4416, the tracking subsystem 3910 may determine a region-of-interest 4202 associated with the person-rack interaction. As described above, the region-of-interest 4202 includes a subset of an image 3918, such that object recognition may be performed more efficiently within this subset of the entire image 3918. As described above, the region-of-interest 4202 has a size 4204 that is sufficient to capture a substantial portion of the item 3924a-i to identify the item 3924a-i using an image recognition algorithm at step 4418. The size 4204 of the region-of-interest 4202 may be a predetermined value (e.g., corresponding to a predefined number of pixels in the image 3918 or a predefined physical length in the space 102). In some embodiments, the region-of-interest 4202 has a size that is based on features of the person 3902, such as the shoulder width 4206 of the person 3902, the arm length 4208 of the person 3902, the height 4210 of the person 3902, and/or value derived from one or more of these or other features.

At step 4418, the tracking subsystem 3910 identifies the item 3924a-i within the region-of-interest 4202 using an object recognition algorithm. For example, the image of the item 3924a-i within the region-of-interest 4202 may be compared to images of candidate items determined at step 4410. In some cases, for each candidate item, a probability is determined that the candidate item is the item 3924a-i. The probability for each candidate item may be determined using an object detection algorithm 3934. The object detection algorithm 3934 may employ a neural network or a method of machine learning (e.g. a machine learning model). The object detection algorithm 3934 may be trained using the range of items 3924a-i expected to be presented on the rack 112. For example, the object detection algorithm 3934 may be trained using previously obtained images of products offered for sale on the rack 112. Generally, an item identifier 4014 for the candidate item with the largest probability value (e.g., that is at least a threshold value) is assigned to the item 3924a-i.

At steps 4420 4422, the tracking subsystem 3910 may determine whether the identified item 3924a-i was removed from or placed on the rack 112. For example, at step 4420, the tracking subsystem 3910 may determine a first image 4302a before the interaction between the person 3902 and the item 3924a-i and a second image 4302b after the interaction between the person 3902 and the item 3924a-i. At step 4422, the tracking subsystem 3910 determines if the item 3924a-i was removed from or placed on the rack 112. This determination may be based on a comparison of the first and second images 4302a,b, as described above with respect to FIGS. 40 and 43. If a change in weight was received from a weight sensor 110a-i for the person-item interaction (e.g., if the rack includes a weight sensor 110a-i for one or more of the items 3924a-i), the change in weight may be used, at least in part, to determine if the item 3924a-i was removed from or placed on the rack 112. For example, if the weight on a sensor 110a-i decreases, then the tracking subsystem 3910 may determine that the item 3924a-i was removed from the rack 112. If the item 3924a-i was removed from the rack 112, the tracking subsystem 3910 proceeds to step 4424. Otherwise, if the item 3924a-i was placed on the rack 112, the tracking subsystem 3910 proceeds to step 4426.

At step 4424, the tracking subsystem 3910 assigns the item 3924a-i to the person 3902. For example, the digital shopping cart 3926 may be updated to include the appropriate quantity 3932 of the item 3924a-i with the item identifier 3930 determined at step 4412 or 4418. At step 4426, the tracking subsystem 3910 determines if the item 3924a-i was already assigned to the person 3902 (e.g., if the digital shopping cart 3926 includes an entry for the item identifier 3930 determined at step 4412 or 4418). If the item 3924a-i was already assigned to the person 3902, then the tracking subsystem 3910 proceeds to step 4428 to unassigned the item 3924a-i from the person 3902. For example, the tracking subsystem 3910 may remove a unit of the item 3924a-i from the digital shopping cart 3926 of the person 3902 (e.g., by decreasing the quantity 3932 in the digital shopping cart 3926). If the item 3924a-i was not already assigned, the tracking subsystem 3910 proceeds to step 4420 and does not assign the item 3924a-i to the person 3902 (e.g., because the person 3902 may have touched and/or moved the item 3924a-i on the rack 112 without necessarily picking up the item 3924a-i).

Self-Serve Beverage Assignment

In some cases, the space 102 (see FIG. 1) may include one or more self-serve beverage machines, which are configured to be operated by a person to dispense a beverage into a cup. Examples of beverage machines include coffee machines, soda fountains, and the like. While the various systems, devices, and processes described above generally facilitate the reliable assignment of items selected from a rack 112 or other location in the space 102 to the correct person, further actions and/or determinations may be needed to appropriately assign self-serve beverages to the correct person. Previous technology generally relies on a cashier identifying a beverage and/or a person self-identifying a selected beverage. Thus, previous technology generally lacks the ability to automatically assign a self-serve beverage to a person who wishes to purchase the beverage.

Figure 45:
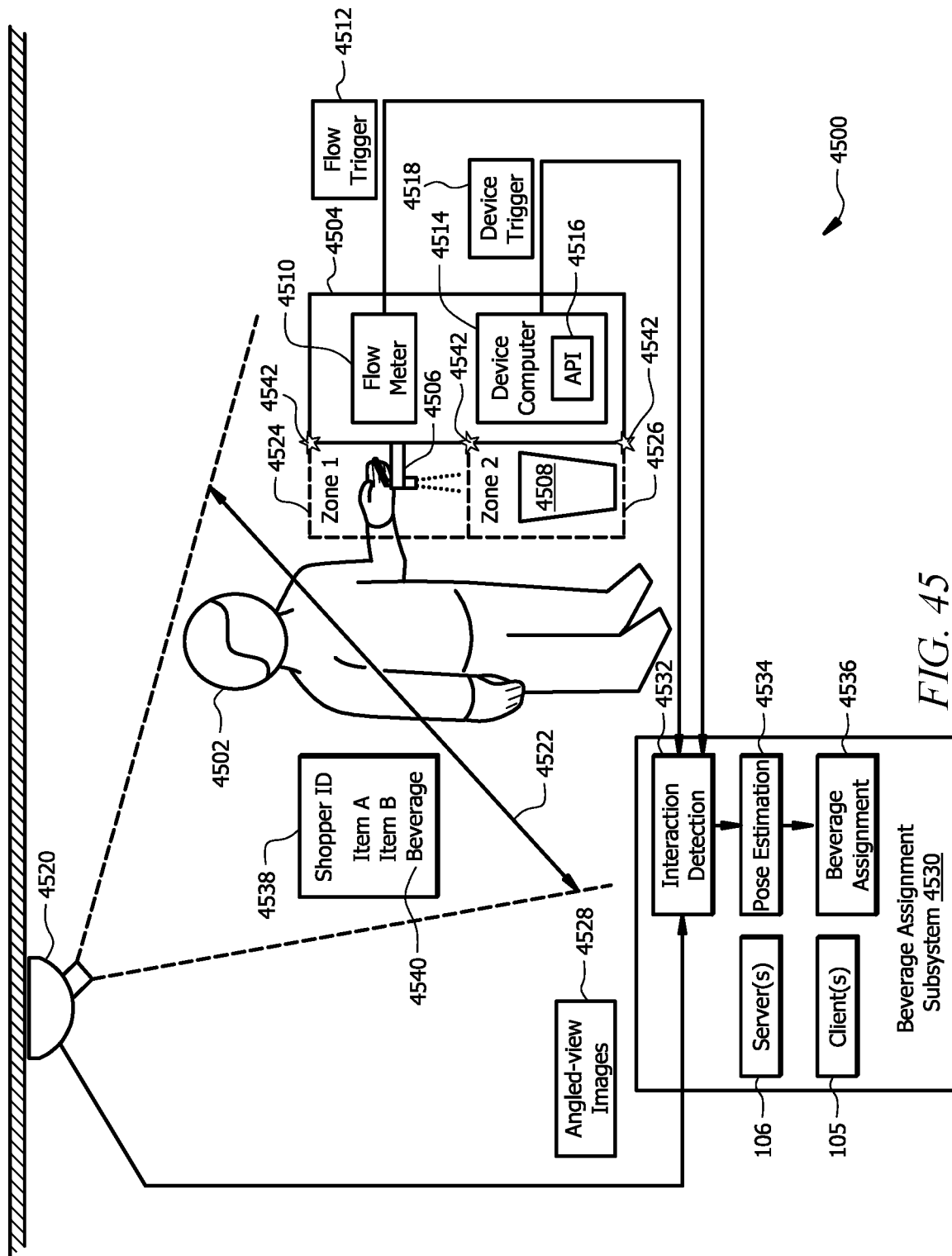
FIG. 45 is a schematic diagram of an embodiment of a self-serve beverage assignment system.

This disclosure overcomes these and other technical problems of previous technology by facilitating the identification of self-serve beverages and the assignment of self-serve beverages to the correct person using captured video/images of interactions between people and self-serve beverage machines. This allows the automatic assignment of self-serve beverages to a person's digital shopping cart without human intervention. Thus, a person may be assigned and ultimately charged for a beverage without ever interacting with a cashier, a self-checkout device, or other application. An example of a system 4500 for detecting and assigning beverages is illustrated in FIG. 45. In some cases, beverage assignment may be performed primarily using image analysis, as illustrated in the example method of FIG. 46. In other embodiments, the beverage machine or an associated sensor may provide an indication of a type and/or quantity of a beverage that is dispensed, and this information may be used in combination with image analysis to efficiently and reliably assign self-serve beverages to the correct people, as described in the example method of FIG. 47.

FIG. 45 illustrates an example system 4500 for self-serve beverage assignment. The system 4500 includes a beverage machine 4504, an angled-view sensor 4520, and a beverage assignment subsystem 4530. The beverage assignment system 4500 generally facilitates the automatic assignment of a beverage 4540 to a person 4506 (e.g., by including an identifier of the beverage 4540 in a digital shopping cart 4538 associated with the person 4502). The beverage assignment system 4500 may be included in the system 100, described above, or used to assign beverages to people moving about the space 102, described above (see FIG. 1).

The beverage machine 4504 is generally any device operable to dispense a beverage 4540 to a person 4502. For example, the beverage machine 4504 may be a coffee pot resting on a hot plate, a manual coffee dispenser (as illustrated in the example of FIG. 45), an automatic coffee machine, a soda fountain, or the like. A beverage machine 4504 may include one or more receptacles (not pictured for clarity and conciseness) that hold a prepared beverage 4540 (e.g., coffee) and a mechanism 4504 which can be operated to release the prepared beverage 4540 into a cup 4508. In the example, of FIG. 45, the dispensing mechanism 4506 is a spout (e.g., a manually actuated valve that controls the release of the beverage 4540). In some embodiments, a beverage machine 4504 includes a flow meter 4510, which is configured to detect a flow of beverage 4540 (e.g., out of the dispensing mechanism 4506) and provide a flow trigger 4512 to the beverage assignment subsystem 4530, described further below. For example, a conventional coffee dispenser may be retrofitted with a flow meter 4510, such that an electronic flow trigger 4510 can facilitate the detection of interactions with the beverage machine 4504. As described further below, the flow trigger may include information about the time a beverage 4540 is dispensed along with the amount and/or type of beverage 4540 dispensed. The flow trigger 4512 may be used to select images 4528 from appropriate times for assigning the beverage to the correct person 4502.

In some cases, a beverage machine 4504 may be configured to prepare a beverage 4540 based on a user's selection. For instance, such a beverage machine 4504 may include a user interface (e.g., buttons, a touchscreen, and/or the like) for selecting a beverage type and size along with one or more receptacles that hold beverage precursors (e.g., water, coffee beans, liquid and/or powdered creamer, sweetener(s), flavoring syrup(s), and the like). Such a beverage machine 4504 may include a device computer 4514, which may include one or more application programming interfaces (APIs) 4516, which facilitate communication of information about the usage of the beverage machine 4504 to the beverage assignment subsystem 4530. For example, the APIs 4516 may provide a device trigger 4518 to the beverage assignment subsystem 4530. The device trigger 4518 may include information about the time at which a beverage 4540 was dispensed, the type of beverage dispensed, and/or the amount of beverage 4540 dispensed. Similar to the flow trigger 4512, the device trigger 4518 may also be used to select images 4528 from appropriate times for assigning the beverage to the correct person 4502. While the example of FIG. 45 shows a manually operated beverage machine 4504 that dispenses a beverage 4540 into a cup 4508 placed below the dispensing mechanism 4506, this disclosure contemplates the beverage machine 4504 being any machine that is operated by a person 4502 to dispense a beverage 4540.

The angled-view sensor 4520 is configured to generate angled-view images 4528 (e.g., color and/or depth images) of at least a portion of the space 102. The angled-view sensor 4520 generates angled-view images 4528 for a field-of-view 4522 which includes at least a zone 4524 encompassing the dispensing mechanism 4506 of the beverage machine 4504 and a zone 4526 which encompasses a region where a cup 4508 is placed to receive dispensed beverage 4540. The angled-view sensor 4520 may include one or more sensors, such as a color camera, a depth camera, an infrared sensor, and/or the like. The angled-view sensor 4520 may be the same as or similar to the angled-view sensor 108*b* of FIG. 22 or the angled-view sensor 3914 of FIG. 39. In some embodiments, the beverage machine 4504 includes at least one visible marker 4542 (e.g., the same as or similar to markers 3922*a-c* of FIG. 39) positioned and configured to identify a position of one or both of the first zone 4524 and the second zone 4526. The beverage assignment subsystem 4530 may detect the marker(s) 4542 and automatically determine, based on the detected marker 4542, an extent the first zone 4524 and/or the second zone 4526.

The angled-view images 4528 are provided to the beverage assignment subsystem 4530 (e.g., the server 106 and/or client(s) 105 described above) and used to detect the person 4502 dispensing beverage 4540 into a cup 4508, identify the dispensed beverage 4540, and assign the beverage 4540 to the person 4502. For example, the beverage assignment subsystem 4530 may update the digital shopping cart 4538 associated with the person 4502 to include an identification of the beverage 4540 (e.g., a type and amount of the beverage 4540). The digital shopping cart 4538 may be the same or similar to the digital shopping carts (e.g., digital cart 1410 and/or digital shopping cart 3926) described above with respect to FIGS. 12-18 and 39-44.

The beverage assignment subsystem 4530 may determine a beverage assignment 4536 using interaction detection 4532 and pose estimation 4534, as described in greater detail below with respect to FIGS. 46 and 47. In some cases, interaction detection 4532 involves the detection, based on angled-view images 4528, of an interaction between the person 4502 and the beverage machine 4504, as described in greater detail with respect to FIG. 46 below. For instance, an interaction may be detected if the person 4502 (e.g., the hand, wrist, or other relevant body part of the person 4502) enters both the first zone 4524 associated with operating the dispensing mechanism 4506 of the beverage machine 4504 and the second zone 4526 associated with placing and removing a cup 4508 to receive beverage 4540. In some cases, pose estimation 4534 may be performed to provide further verification that beverage 4540 was dispensed from the beverage machine 4504 (e.g., based on the location of a wrist or hand of the person 4502 determined via pose estimation 4534). Beverage assignment 4536 is performed based on the characteristics of the detected interaction and/or the determined pose. For instance, a beverage 4540 may be added to the digital shopping cart of the person 4502, if the beverage assignment subsystem 4530 determines that the hand of the person 4502 entered both zones 4524 and 4526 and that the cup 4508 remained in the second zone 4526 for at least a threshold time (e.g., such that the cup 4508 was in the zone 4526 a sufficient amount of time for the beverage 4540 to be dispensed). Further details of beverage assignment based on angled-view images 4528 are provided below with respect to FIG. 46.

Figure 47:
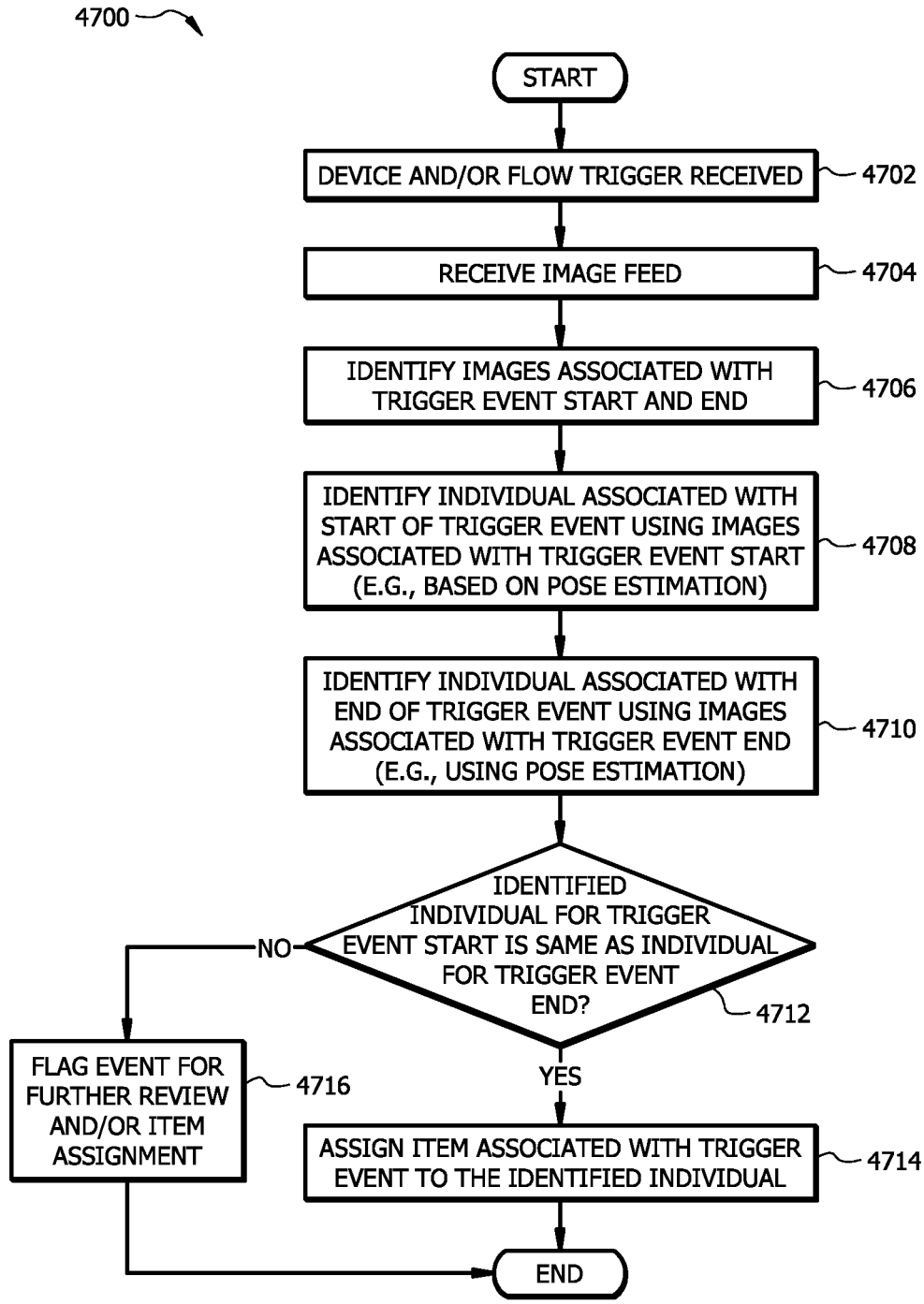
FIG. 47 is a flow chart of another embodiment of a beverage assignment method using the tracking system.

In other cases, such as the example illustrated in FIG. 47, interaction detection 4532 involves receipt of a trigger 4512 and/or 4518, which indicates that beverage 4540 is dispensed. For instance, an interaction may be detected if a trigger 4512 and/or 4518 is received. In some cases, pose estimation 4534 may be performed, using angled-view images 4528, to provide further verification that the same person 4502 dispensed the beverage 4540 and removed the beverage 4540 (e.g., the cup 4508) from the zone 4526. The beverage 4540 may be added to the digital shopping cart 4538 of the person 4502, if the same person 4502 dispensed the beverage 4540 at an initial time (e.g., reached into zone 4526 to place the cup 4508 to receive the beverage) and removed the cup 4508 from the zone 4526 at a later time. Further details of beverage assignment based on a trigger 4512 and/or 4518 and angled-view images 4528 are provided below with respect to FIG. 47.

a. Image-Based Detection and Assignment

Figure 46:
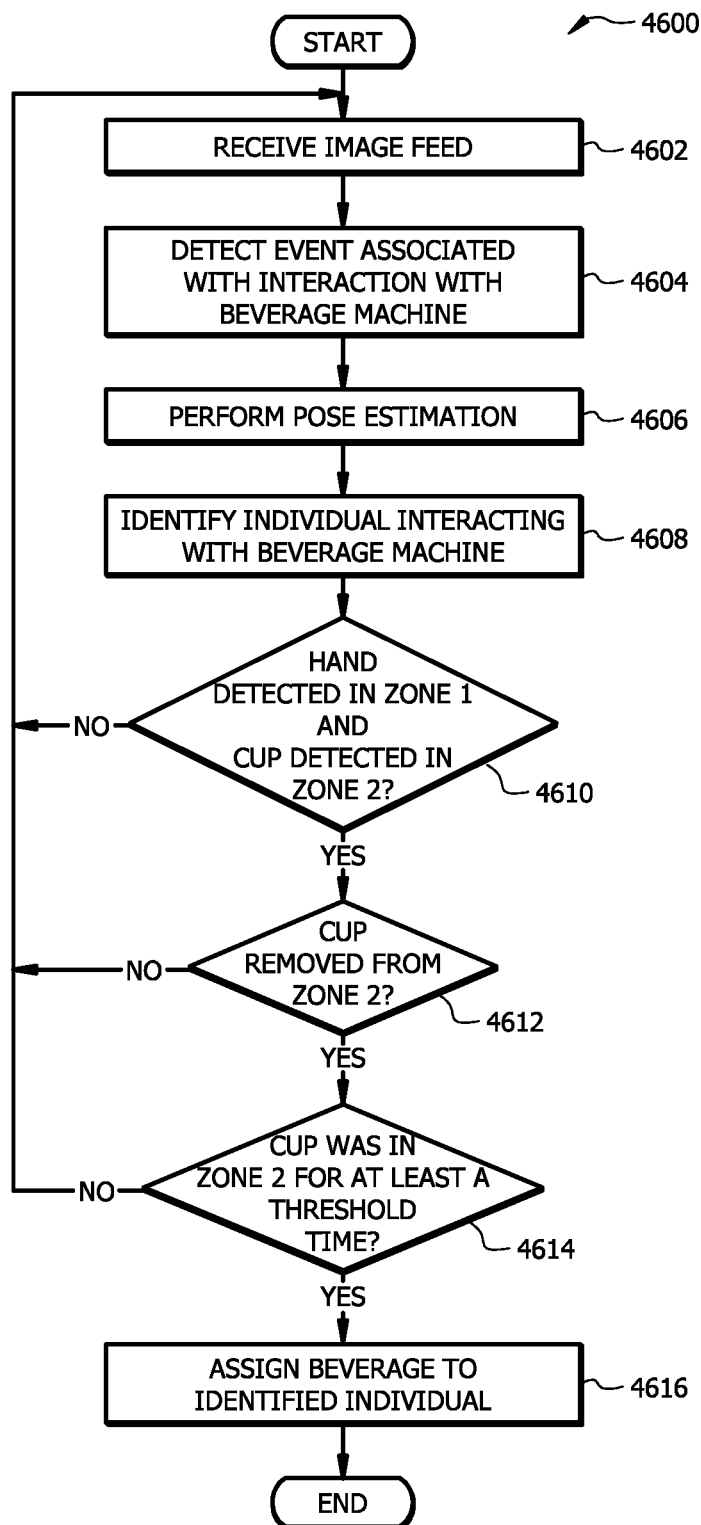
FIG. 46 is a flow chart of an embodiment of a beverage assignment method using the tracking system.

FIG. 46 illustrates a method 4600 of operating the system 4500 of FIG. 45 to assign a beverage 4540 to a person using angled-view images 4528 captured by the angle-view sensor 4520. The method 4600 may begin at step 4602 where an image feed comprising the angled-view images 4528 is received by the beverage assignment subsystem 4530. In some embodiments, the angled-view images 4528 may be received after the person 4502 is within a threshold distance of the beverage machine 4502. For instance, top-view images captured by sensors 108 within the space 102 (see FIG. 1) may be used to determine when a proximity trigger (e.g., the same as or similar to proximity trigger 4002 of FIG. 40) should cause the beverage assignment subsystem 4530 to begin receiving angled-view images 4528. As described above with respect to FIG. 45, the angled view images 4528 are from a field-of-view 4522 that encompasses at least a portion of the beverage machine 4504, including the first zone 4524 associated with operating the dispensing mechanism 4506 of the beverage machine 4504 and the second zone 4526 in which the cup 4508 is placed to receive the beverage 4540 from the beverage machine 4504.

At step 4604, the beverage assignment subsystem 4530 detects, based on the received angled-view images 4528 an event associated with an object entering one or both of the first zone 4524 and the second zone 4526. In some embodiments, the beverage assignment subsystem 4530 may identify a subset of the images 4528 that are associated with the detected event and which should be analyzed in subsequent steps to determine the beverage assignment 4536 (see FIG. 45). For instance, as part of or in response to detecting the event at step 4604, the beverage assignment subsystem 4530 may identify a first set of one or more images 4528 associated with the start of the detected event. The first set of images 4528 may include images 4528 from a first predefined time before the detected event until a second predefined time period after the detected event. A second set of images 4528 may also be determined following the determination of the removal of the cup 4508 from the zone 4526 at step 4612, described below. The second set of images 4528 include images 4528 from a predefined time before the cup 4508 is removed from the second zone 4526 until a predefined time after the cup 4508 is removed. Image analysis tasks may be performed more efficiently in these sets of images 4528, rather than evaluating every image 4528 received by the beverage assignment subsystem 4530.

At step 4606, the beverage assignment subsystem 4530 may perform pose estimation (e.g., using any appropriate pose estimation algorithm) to determine a pose of the person 4502. For example, a skeleton may be determined using a pose estimation algorithm (e.g., as described above with respect to the determination of skeletons 3302e and 3302f shown in FIG. 33C and skeleton 4104 shown in FIGS. 41 and 42). Information from pose estimation may inform determinations in subsequent steps 4608, 4610, 4612, and/or 4614, as described further below.

At step 4608, the beverage assignment subsystem 4530 may determine an identity of the person 4502 interacting with the beverage machine 4504. For example, the person 4502 may be identified based on features and/or descriptors, such as height, hair color, clothing properties, and/or the like of the person 4502 (see, e.g., FIGS. 27-32 and corresponding description above). In some embodiments, features may be extracted from a skeleton determined by pose estimation at step 4606. For instance, a shoulder width, height, arm length, and/or the like may be used, at least in part, to determine an identity of the person 4502. The identity of the person 4502 is used to assign the beverage 4540 to the correct person 4502, as described with respect to step 4616 below. In some cases, the identity of the person 4502 may be used to verify that the same person 4502 is identified at different time points (e.g., at the start of the event detected at step 4604 and at the time the cup 4508 is removed from the second zone 4526). The beverage 4540 may only be assigned at step 4616 (see below) if the same person 4502 is determined to have initiated the event (e.g., operated the dispensing mechanism 4506) detected at step 4604 and removed the cup 4508 from the second zone 4526 (see step 4612).

At step 4610, the beverage assignment subsystem 4530 determines, in a first one or more images 4528 associated with a start of the detected event (e.g., from the first set of images 4528 determined at step 4604), that both a hand of the person 4502 enters the first zone 4524 and the cup 4508 is placed in the second zone 4526. For example, the position of the hand of the person 4502 may be determined from the pose determined at step 4506. If both of (1) the hand of the person 4502 entering the first zone 4524 and (2) the cup 4508 being placed in the second zone 4526 are not detected at step 4610, the beverage assignment subsystem 4530 may return to the start of method 4600 to continue receiving images 4528. If the both of (1) the hand of the person 4502 entering the first zone 4524 and (2) the cup 4508 being placed in the second zone 4526 are detected, the beverage assignment subsystem 4530 proceeds to step 4612.

At step 4612, the beverage assignment subsystem 4530 determines if, at a subsequent time, the cup 4508 is removed from the second zone 4526. For example, the beverage assignment subsystem 4530 may determine if the cup 4508 is no longer detected in the second zone 4526 in images 4528 corresponding to a subsequent time to the event detected at step 4604 and/or if movement of the cup 4508 out of the second zone 4526 is detected across a series of consecutive images 4528 (e.g., corresponding to the person 4502 moving the cup 4508 out of the second zone 4526). If the cup 4508 is not removed from the zone 4526, the beverage assignment subsystem 4530 may return to the start of the method 4600 to detect subsequent person-beverage machine interaction events. If the cup 4508 is removed from the zone 4526, the beverage assignment subsystem 4530 proceeds to step 4614.

At step 4614, following detecting that the cup 4508 is removed from the second zone 4526, the beverage assignment subsystem 4530 determines whether the cup 4508 was in the second zone 4526 for at least a threshold length of time. For example, the beverage assignment subsystem 4530 may determine a length of time during which the cup 4508 remained in the second zone 4526. If the determined length of time is at least a threshold time, the beverage assignment subsystem 4530 may proceed to step 4616 to assign the beverage 4540 to the person 4502 whose hand entered the first zone 4524. If the cup 4508 did not remain in in the second zone 4526 for at least the threshold time, the beverage assignment subsystem 4530 may return to the start of the method 4600, and the beverage 4540 is not assigned to the person 4502 whose hand entered the first zone 4524.

At step 4616, the beverage assignment subsystem 4530 assigns the beverage 4540 to the person 4502 whose hand entered the first zone 4524, as determined at step 4610. For example, the beverage 4540 may be assigned to the person 4502 by adding an indicator of the beverage 4540 to the digital shopping cart 4538 associated with the person 4502. The beverage assignment subsystem 4530 may determine properties of the beverage 4540 and include these properties in the digital shopping cart 4538. For example, the beverage assignment subsystem 4530 may determine a type of the beverage 4540. The type of the beverage 4540 may be predetermined for the beverage machine 4504 that is viewed by the angled-view camera 4520 which views the beverage machine 4504. For instance, the angled-view images 4528 may be predefined as images 4528 of a beverage machine 4504 known to dispense a beverage of a given type (e.g., coffee). A size of the beverage 4540 may be determined based on the size of the cup 4508 detected in the images 4528.

In one embodiment, the beverage assignment subsystem 4530 may determine a beverage type based on the type of cup that is placed in the second zone 4526. For example, the beverage assignment subsystem 4530 may determine the beverage type is coffee when a coffee cup or mug is placed in the second zone 4526. As another example, the beverage assignment subsystem 4530 may determine the beverage type is a frozen drink or a soft drink when a particular type of cup is placed in the second zone 4526. In this example, the cup may have a particular color, size, shape, or any other detectable type of feature.

b. Detection and Assignment for "Smart" Beverage Machines

FIG. 47 illustrates a method 4700 of operating the system 4500 of FIG. 45 to assign a beverage 4540 to a person 4502, based on a trigger 4512, 4518 and using angled-view images 4528 captured by the angle-view sensor 4520. In one embodiment, the system 4500 may be configured as a contact-less device that allows a person 4502 to order a beverage without contacting the beverage dispensing device. For example, the system 4500 may be configured to allow a person 4502 to order a drink remotely using a user device (e.g. a smartphone or computer) and to dispense the drink before the person 4502 arrives to retrieve their beverage. The system 4500 may use geolocation information, time information, or any other suitable type of information to determine when to dispense a beverage for the person 4502. As an example, the system 4500 may use geolocation information to determine when the person 4502 is within a predetermined range of the beverage dispensing device. In this example, the system 4500 dispenses the beverage when the person 4502 is within the predetermined range of the beverage dispensing device. As another example, the system 4500 may be time information to determine a scheduled time for dispensing the beverage for the person 4502. In this example, the person 4502 may specify a time when they order their beverage. The system 4500 will schedule the beverage to be dispensed by the requested time. In other examples, the system 4500 may use any other suitable type or combination of information to determine when to dispense a beverage for the person 4502.

The method 4700 may begin at step 4702 where a flow trigger 4512 and/or a device trigger 4518 are received. For example, a flow trigger 4518 may be provided based on a measured flow of the beverage 4540 by a flow meter 4510 out of the dispensing mechanism 4506. The flow trigger 4512 may include a time when the flow of the beverage 4540 started and/or stopped, a volume of the beverage 4540 that was dispensed, and/or a type of the beverage 4540 dispensed. A device trigger 4518 may be communicated by a device computer 4514 of the beverage machine 4504 (e.g., from an API 4516 of the device computer 4514), as described above with respect to FIG. 45. The device trigger 4518 may indicate a time when the flow of the beverage 4540 started and/or stopped, a volume of the beverage 4540 that was dispensed, and/or a type of the beverage 4540 dispensed. Information from one or both of the triggers 4512, 4518 may be used to identify appropriate images 4518 (e.g., at appropriate times or from appropriate time intervals) to evaluate in subsequent steps of the method 4700 (e.g., to identify images 4528 at step 4706). Information from one or both of the triggers 4512, 4518 may also or alternatively be used, at least in part, to identify the beverage 4540 that is assigned to the person 4502 at step 4714.

At step 4704, an image feed comprising the angled-view images 4528 is received by the beverage assignment subsystem 4530. The angled-view images 4528 may begin to be received in response to the trigger 4512, 4518. For example, the angled-view sensor 4520 may become active and begin capturing and transmitting angled-view images 4528 following the trigger 4512, 4518. In some embodiments, the angled-view images 4528 may be received after the person 4502 is within a threshold distance of the beverage machine 4502. For instance, top-view images captured by sensors 108 within the space 102 (see FIG. 1) may be used to determine when a proximity trigger (e.g., the proximity trigger 4002 of FIG. 40) should cause the beverage assignment subsystem 4530 to begin receiving angled-view images 4528. As described above with respect to FIG. 45, the angled view images 4528 are from a field-of-view 4522 that encompasses at least a portion of the beverage machine 4504, including the first zone 4524 associated with operating the dispensing mechanism 4506 of the beverage machine 4504 and the second zone 4526 in which the cup 4508 is placed to receive the beverage 4540 from the beverage machine 4504.

At step 4706, the beverage assignment subsystem 4530 determines angled-view images 4528 that are associated with the start and end of a beverage-dispensing event associated with the trigger 4512, 4518. For example, the beverage assignment subsystem 4530 may determine a first one or more images 4528 associated with the start of the beverage 4540 being dispensed by detecting a hand of the person 4502 entering the zone 4524 in which the dispensing mechanism 4506 of the beverage machine 4504 is located. In some cases, the image(s) 4528 associated with the start of the beverage 4540 being dispensed by detecting that the person 4502 is within a threshold distance of the beverage machine 4504, determining a hand or wrist position of the person 4502 using pose estimation algorithm (e.g., as described above with respect to the determination of skeletons 3302e and 3302f shown in FIG. 33C and skeleton 4104 shown in FIGS. 41 and 42), and determining that the hand or wrist position enters zone 4524. The beverage assignment subsystem 4530 may also determine a second one or more images 4528 associated with an end of the beverage 4540 being dispensed by detecting the hand or wrist of the person 4502 exiting the zone 4526 (e.g., based on pose estimation). In some cases, the second image(s) 4528 may be determined by determining that the hand or wrist position of the person 4502 exits the zone 4524.

At step 4708, the beverage assignment subsystem 4530 determines, based on the images 4528 identified at step 4706 associated with the start of the beverage being dispensed, a first identifier of the person 4502 whose hand entered the zone 4524. For example, the person 4502 may be identified based on features and/or descriptors, such as height, hair color, clothing properties, and/or the like of the person 4502 (see, e.g., FIGS. 27-32 and 46 and corresponding descriptions above). At step 4710, the beverage assignment subsystem 4530 determines, based on the images 4528 identified at step 4706 associated with the end of the beverage being dispensed, a second identifier of the person 4502 whose hand exited the zone 4526 (e.g., to remove the cup 4508). The person may be identified using the same approach described above with respect to step 4708.

At step 4712, the beverage assignment subsystem 4530 determines if the first identifier from step 4708 is the same as the second identifier from step 4710. In other words, the beverage assignment subsystem 4530 determines whether the same person 4502 began dispensing the beverage 4540 and removed the cup 4508 containing the beverage 4540 after the beverage 4540 was dispensed. If the first identifier from step 4708 is the same as the second identifier from step 4710, the beverage assignment subsystem 4530 proceeds to step 4714 and assigns the beverage 4540 to the person 4502. However, if the first identifier from step 4708 is not the same as the second identifier from step 4710, the beverage assignment subsystem 4530 may proceed to step 4716 to flag the event for further review and/or beverage assignment. For example, the beverage assignment subsystem 4530 may track movement of the person 4502 and/or cup 4508 through the space 102 after the cup 4508 is removed from zone 4526 to determine if the beverage 4540 should be assigned to the person 4502, as described above with respect to FIGS. 36A-B and 37.

At step 4714, the beverage 4540 is assigned to the person 4502. For example, the beverage 4540 may be assigned to the person 4502 by adding an indicator of the beverage 4540 to the digital shopping cart 4538 associated with the person 4502. The beverage assignment subsystem 4530 may determine properties of the beverage 4540 and include these properties in the digital shopping cart 4538. For example, the properties may be determined based on the trigger 4512, 4518. For instance, a device trigger 4518 may include an indication of a drink type and size that was dispensed, and the assigned beverage 4540 may include these properties. In some cases, before assigning the beverage 4540 to the person 4502, the beverage assignment subsystem 4530 may check that a time interval between the start of the beverage 4540 being dispensed and the end of the beverage 4540 being dispensed is at least a threshold value (e.g., to verify that the dispensing process lasted long enough for the beverage 4540 to have been dispensed).

Sensor Mounting Assembly

FIGS. 49-56 illustrate various embodiments of a sensor mounting assembly that is configured to support a sensor 108 and its components within a space 102. For example, the sensor mounting assembly may be used to mount a sensor 108 near a ceiling of a store. In other examples, the sensor mounting assembly may be used to mount a sensor 108 in any other suitable type of location. The sensor mounting assembly generally comprises a sensor 108, a mounting ring 4804, a faceplate support 4802, and a faceplate 5102. Each of these components is described in more detail below.

Figure 48:
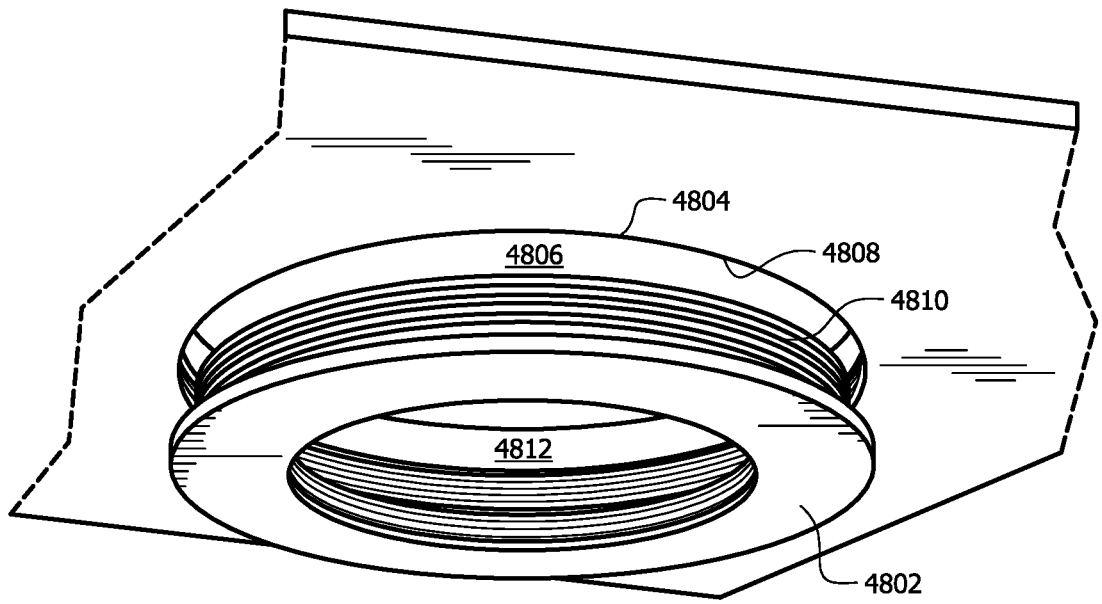
FIG. 48 is a perspective view of an embodiment of a faceplate support being installed into a mounting ring.

FIG. 48 is a perspective view of an embodiment of a faceplate support 4802 being installed into a mounting ring 4804. The mounting ring 4804 provides an interface that allows a sensor 108 to be integrated within a structure that can be installed near a ceiling of space 102. Examples of a structure include, but are not limited to, ceiling tiles, a housing (e.g. a canister), a rail system, or any other suitable type of structure for mounting sensors 108. The mounting ring 4804 comprises an opening 4806 and a plurality of threads 4808 disposed within the opening 4806 of the mounting ring 4804. The opening 4806 is sized and shaped to allow the faceplate support 4802 to be installed within the opening 4806.

The faceplate support 4802 comprises a plurality of threads 4810 and an opening 4812. The threads 4810 of the faceplate support 4802 are configured to engage the threads 4808 of the mounting ring 4804 such that the faceplate support 4802 can be threaded into the mounting ring 4804. Threading the faceplate support 4802 to the mounting ring 4804 couples the two components together to secure the faceplate support 4802 within the mounting ring 4804. The opening 4812 is sized and shaped to allow a faceplate 5102 and sensor 108 to be installed within the opening 4812. Additional information about the faceplate 5102 is described below in FIGS. 51-55.

Figure 49:
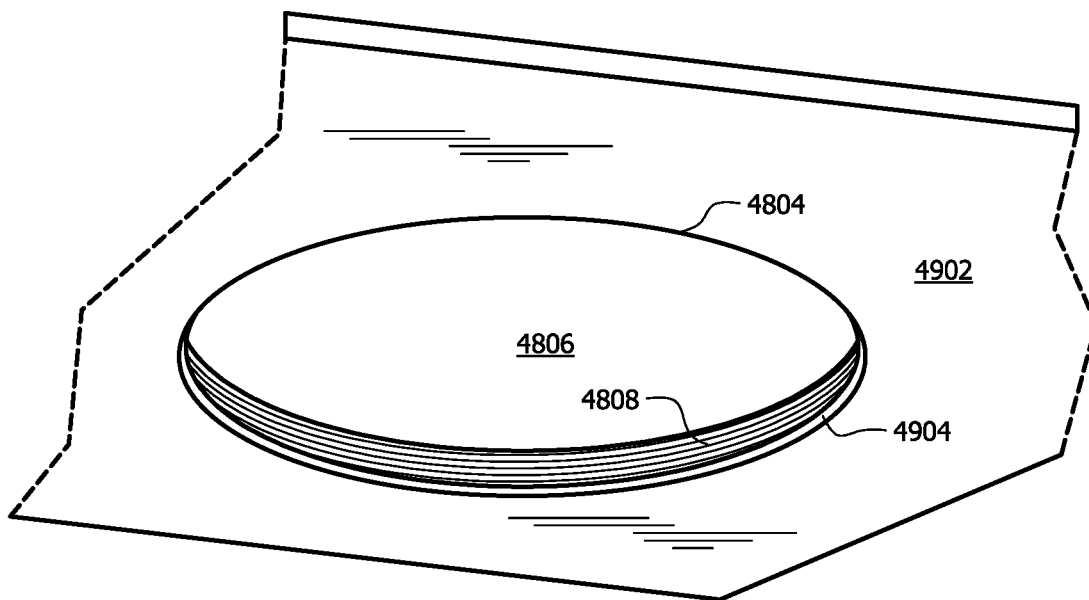
FIG. 49 is a perspective view of an embodiment of a mounting ring.

FIG. 49 is a perspective view of an embodiment of a mounting ring 4804. In FIG. 49, the mounting ring 4804 is shown integrated with a ceiling tile 4902. In some embodiments, the mounting ring 4804 further comprises a recess 4904 disposed circumferentially about the opening 4806 of the mounting ring 4804. In this configuration, the recess 4904 is configured such that the faceplate support 4802 can be installed substantially flush with the ceiling tile 4902.

Figure 50:
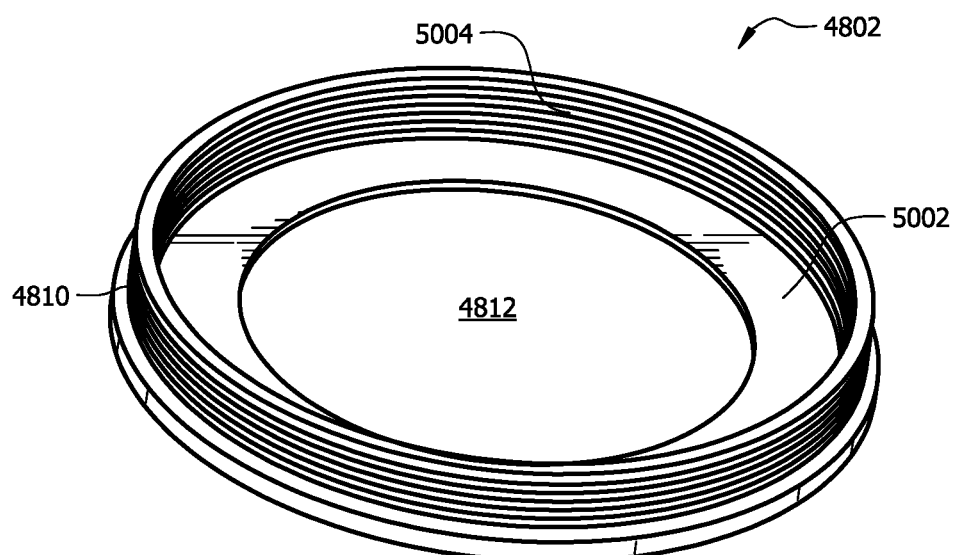
FIG. 50 is a perspective view of an embodiment of a faceplate support.

FIG. 50 is a perspective view of an embodiment of a faceplate support 4802. In some embodiments, the faceplate support 4802 further comprises a lip 5002 disposed about the opening 4812 of the faceplate support 4802. The lip 5002 is configured to support a faceplate 5102 by allowing the faceplate 5102 to rest on top of the lip 5002. In this configuration, the faceplate 5102 may be allowed to rotate about the opening 4812 of the faceplate support 4802. This configuration allows the field-of-view of the sensor 108 to be rotated by rotating the faceplate 5102 after the sensor 108 has been installed onto the faceplate 5102. In some embodiments, the faceplate support 4802 may be configured to allow the faceplate 5102 to freely rotate about the opening 4812 of the faceplate support 4802. In other embodiments, the faceplate support 4802 may be configured to allow the faceplate 5102 to rotate to fixed angles about the opening 4812 of the faceplate support 4802.

In some embodiments, the faceplate support 4802 may further comprise additional threads 5004 that are configured to allow additional components to be coupled to the faceplate support 4802. For example, a housing or cover may be coupled to the faceplate support 4802 by threading onto the threads 5004 of the faceplate support 4802. In other examples, any other suitable type of component may be coupled to the faceplate support 4802.

Figure 51:
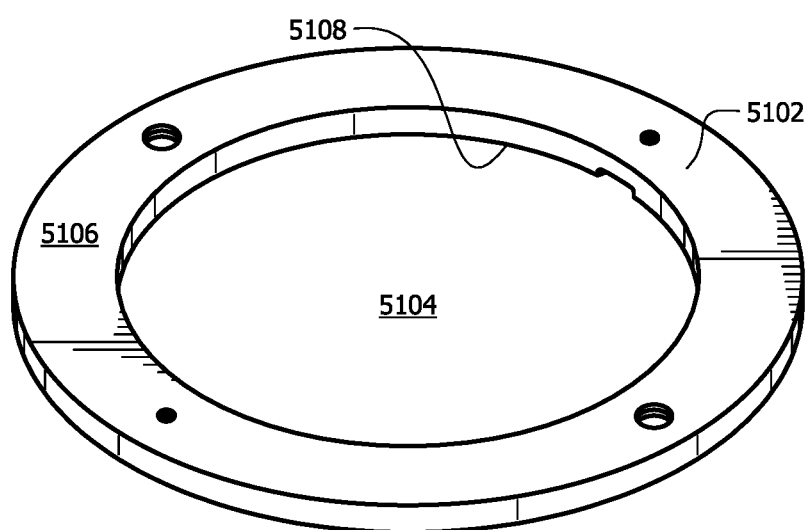
FIG. 51 is a perspective view of an embodiment of a faceplate.

FIG. 51 is a perspective view of an embodiment of a faceplate 5102. The faceplate 5102 is configured to support a sensor 108 and its components. The faceplate 5102 may comprise one or more interfaces or surfaces that allow a sensor 108 and its components to be coupled or mounted to the faceplate 5102. For example, the faceplate 5102 may comprise a mounting surface 5106 for a sensor 108 that is configured to face an upward direction or a ceiling of a space 102. As another example, the faceplate 5102 may comprise a mounting surface 5108 for a sensor 108 that is configured to face a downward direction or a ground surface of a space 102. The faceplate 5102 further comprises an opening 5104. The opening 5104 may be sized and shaped to support various types of sensors 108. Examples of different types of faceplate 5102 configurations are described below in FIGS. 52-55.

Examples of an Installed Sensor

Figure 52:
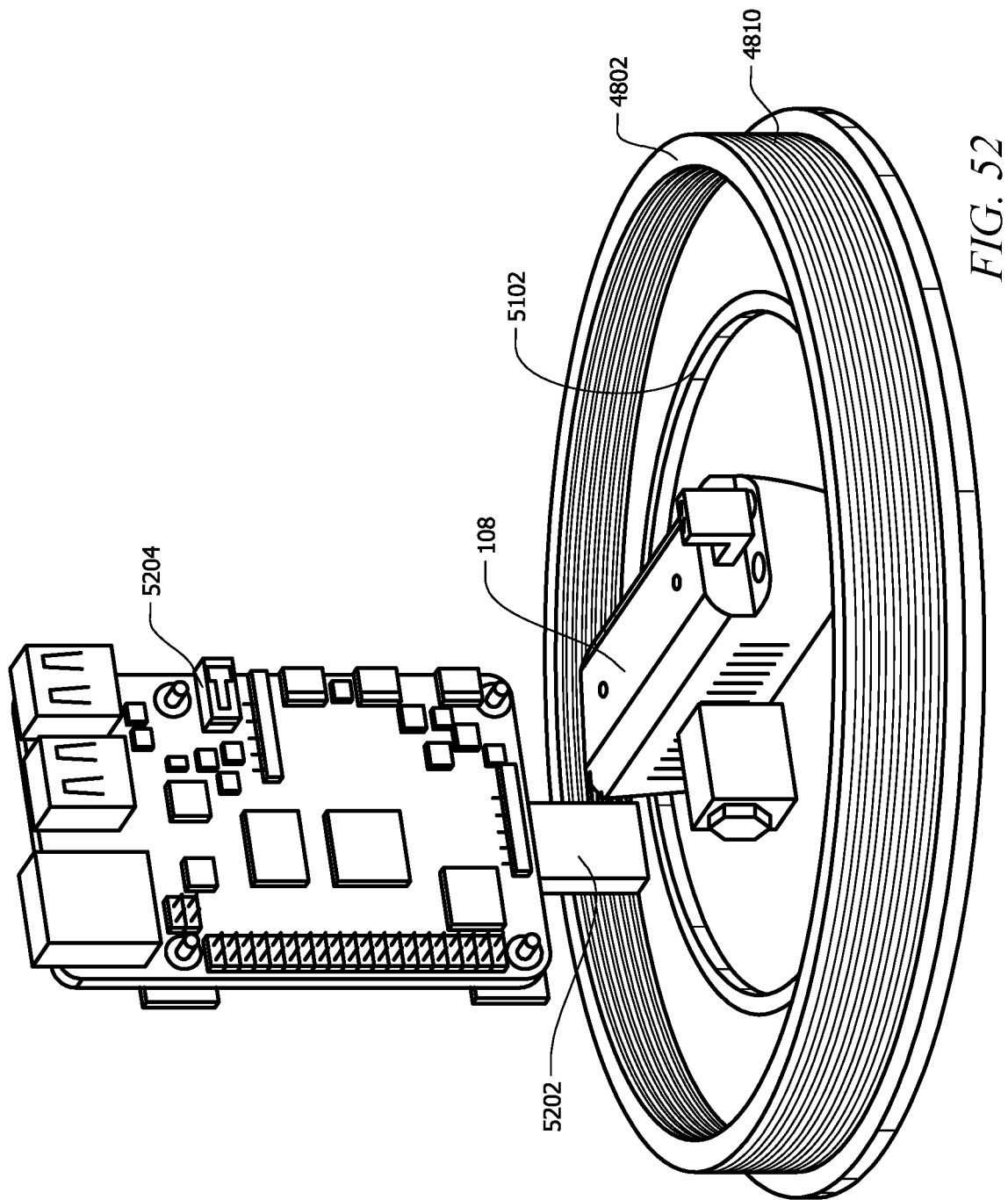
FIG. 52 is a perspective view of an embodiment of a sensor installed onto a faceplate.
Figure 53:
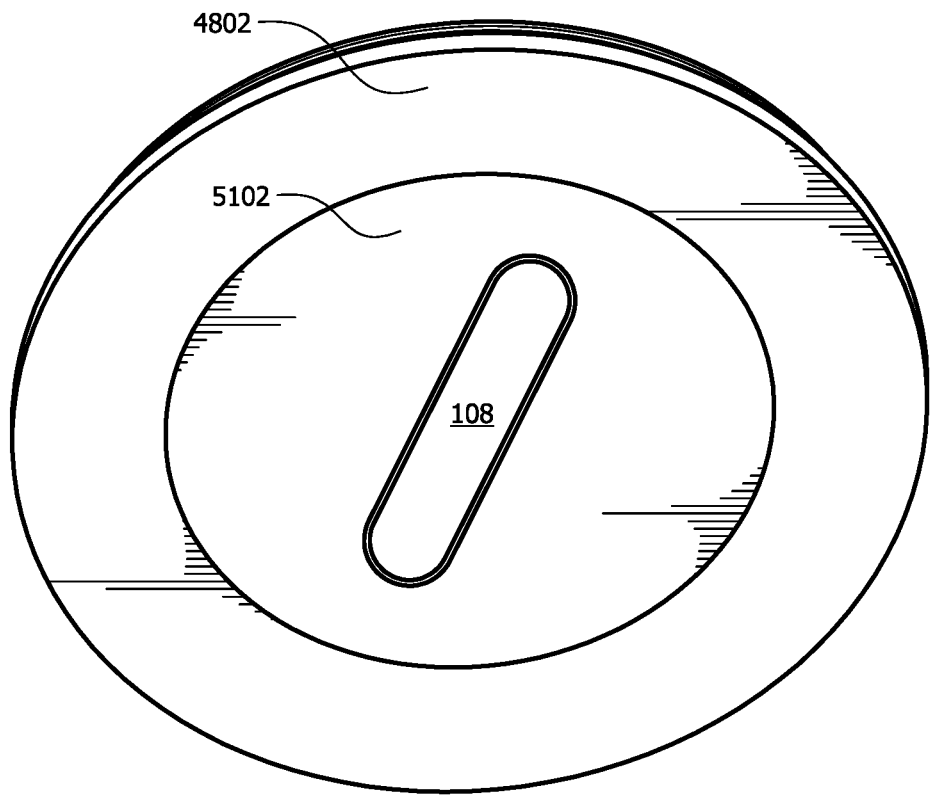
FIG. 53 is a bottom perspective view of an embodiment of a sensor installed onto a faceplate.

FIGS. 52 and 53 combine to show different perspectives of an embodiment of a sensor 108 installed onto a faceplate 5102. FIG. 52 is a top perspective view of a sensor 108 installed onto a faceplate 5102. FIG. 53 is a bottom perspective view of the sensor 108 installed onto the faceplate 5102. In this example, the sensor 108 is coupled to faceplate 5102 and oriented with a field-of-view in a downward direction through the opening 5104 of the faceplate 5102. The sensor 108 may be configured to capture two-dimensional and/or three-dimensional images. For example, the sensor 108 may be a three-dimensional camera that is configured to capture depth information. In other examples, the sensor 108 may be a two-dimensional camera that is configured to capture RGB, infrared, or intensity images. In some examples, the sensor 108 may be configured with more than one camera and/or more than one type of camera. The sensor 108 may be coupled to the faceplate 5102 using any suitable type of brackets, mounts, and/or fasteners.

In this example, the faceplate further comprises a support 5202. The support 5202 is an interface for coupling additional components. For example, one or more supports 5202 may be coupled to printed circuit boards 5204, microprocessors, power supplies, cables, or any other suitable type of component that is associated with the sensor 108. Here, the support 5202 is coupled to a printed circuit board 5204 (e.g.

a microprocessor) for the sensor 108. In FIG. 52, the printed circuit board 5204 is shown in a vertical orientation. In other examples, the printed circuit board 5204 may be positioned in a horizontal orientation.

Figure 54:
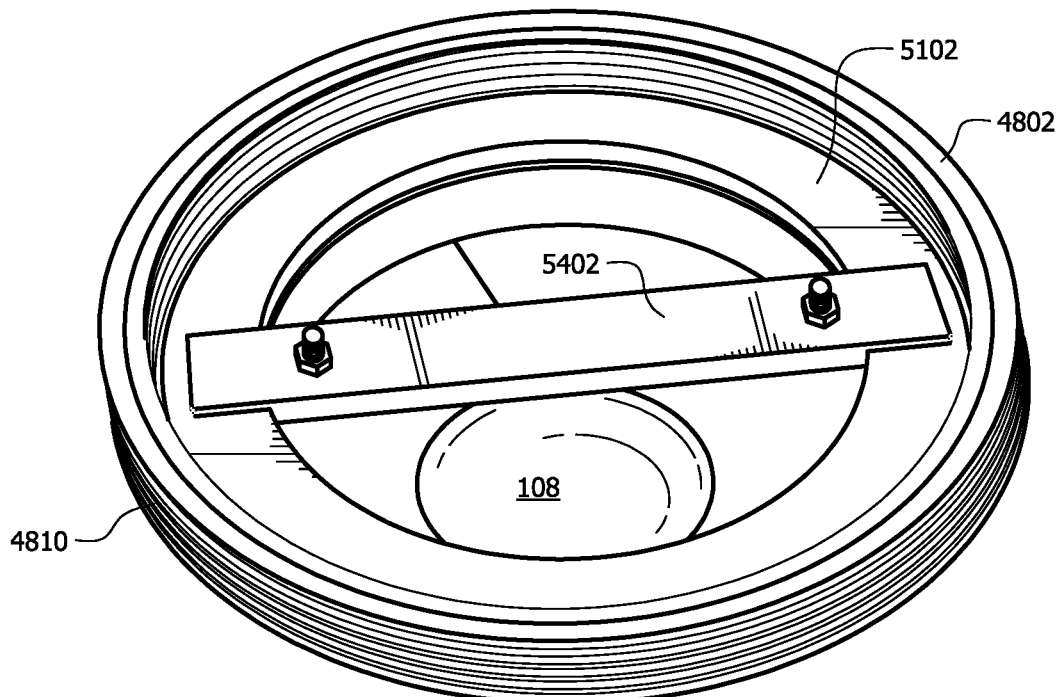
FIG. 54 is a perspective view of another embodiment of a sensor installed onto a faceplate.
Figure 55:
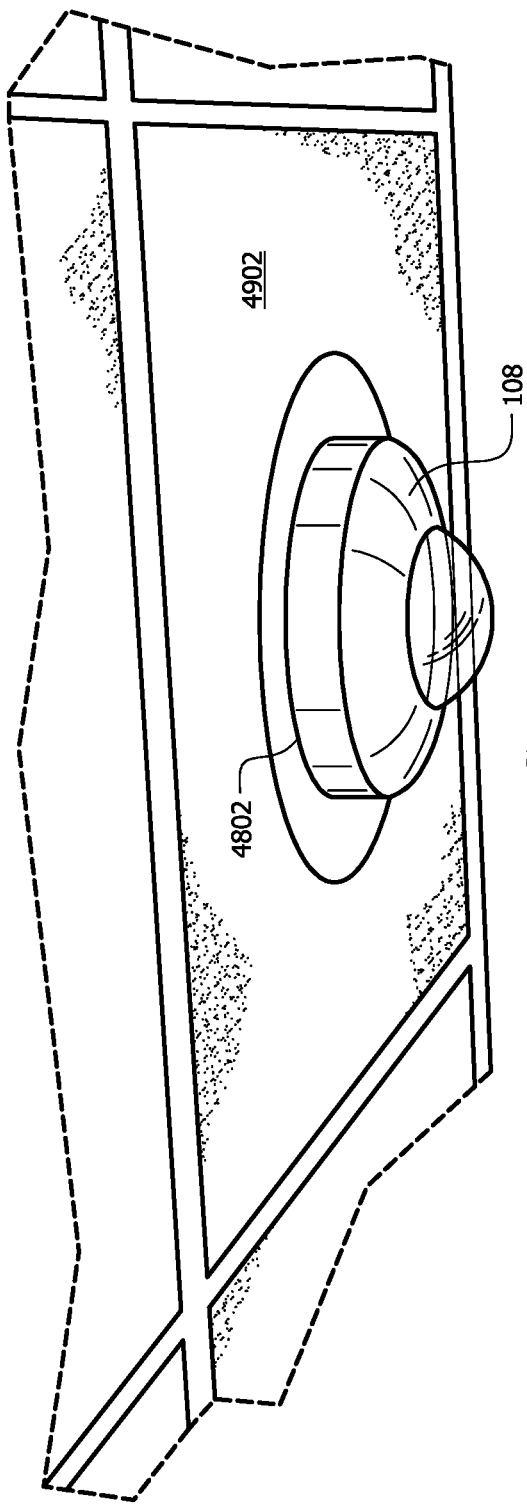
FIG. 55 is a bottom perspective view of an embodiment of a sensor installed onto a faceplate.

FIGS. 54 and 55 combine to show different perspectives of another embodiment of a sensor 108 installed onto a faceplate 5102. FIG. 54 is a top perspective view of a sensor 108 installed onto a faceplate 5102. FIG. 55 is a bottom perspective view of the sensor 108 installed onto the faceplate 5102. In this configuration, the sensor 108 is a dome-shaped camera that is attached to a mounting surface of the faceplate 5102 that faces a ground surface. In other words, the sensor 108 is configured to hang from beneath the faceplate 5102. In this example, the faceplate 5102 comprises a support 5402 for mounting the sensor 108. In other examples, the sensor 108 may be coupled to the faceplate 5102 using any suitable type of brackets, mounts, and/or fasteners.

Adjustable Positioning System

Figure 56:
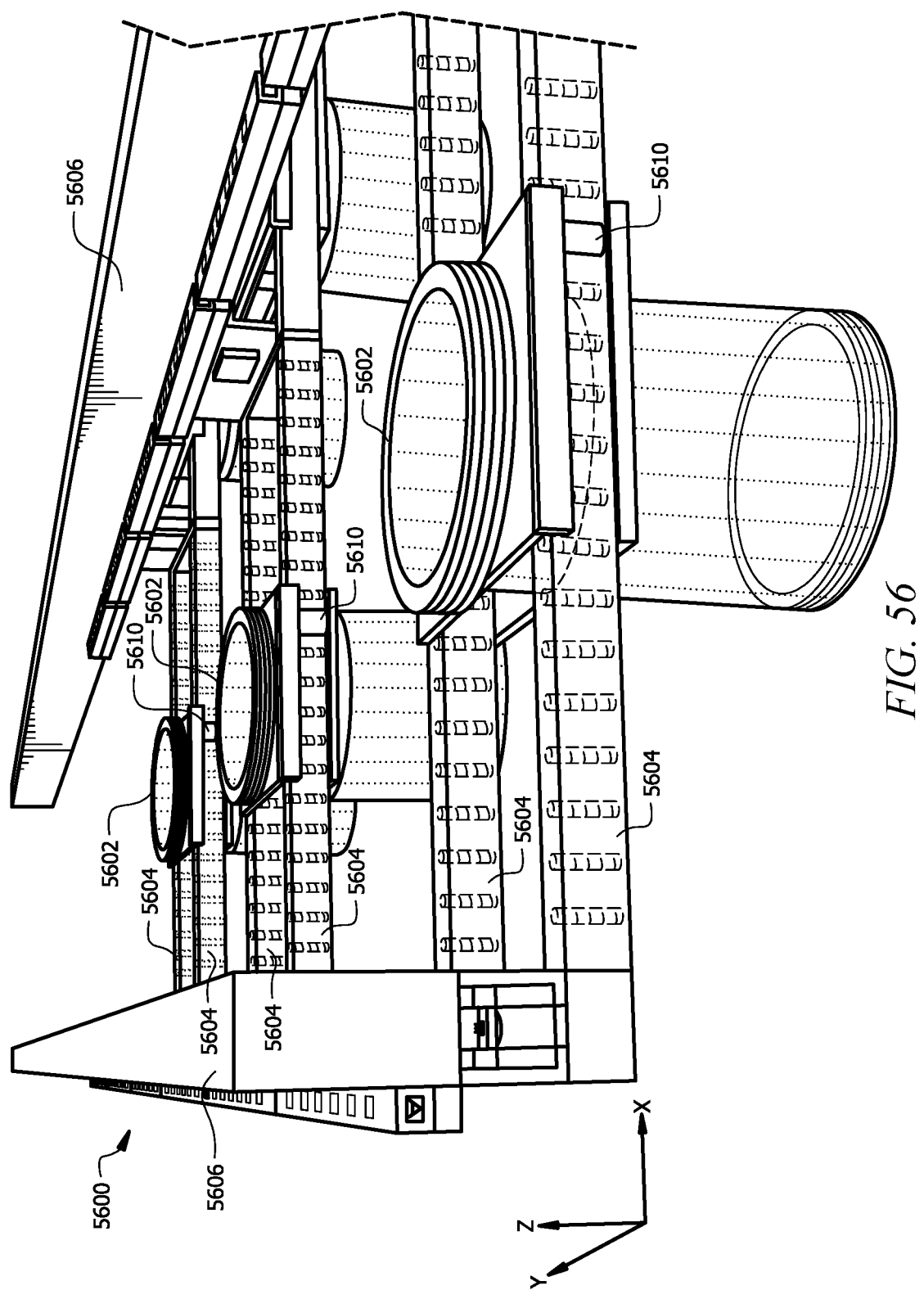
FIG. 56 is a perspective view of an embodiment of a sensor assembly installed onto an adjustable positioning system.

FIG. 56 is a perspective view of an embodiment of a sensor assembly 5602 installed onto an adjustable positioning system 5600. The adjustable positioning system 5600 comprises a plurality of rails (shown as rails 5604 and 5606) that are configured to hold a sensor assembly 5602 in a fixed location with respect to a global plane 104 of a space 102. For example, the adjustable positioning system 5600 may be installed in a store to position a plurality of sensor assemblies 5602 near a ceiling of the store. The adjustable positioning system 5600 allows the sensor assemblies 5602 to be distributed to such that these sensor assemblies 5602 are able to collectively provide coverage for the store. In this example, each sensor assembly 5602 is integrated within a canister or cylindrical housing. In other examples, a sensor assembly 5602 may be integrated within any other suitable shape housing. For instance, a sensor assembly 5602 may be integrated within a cuboid housing, a spherical housing, or any other suitable shape housing.

In this example, rails 5604 are configured to allow a sensor assembly 5602 to be repositioned along an x-axis of the global plane 104. Rails 5606 are configured to allow a sensor assembly 5602 to be repositioned along a y-axis of the global plane 104. In one embodiment, the rails 5604 and 5606 may comprise a plurality of notches or recesses that are configured to hold a sensor assembly 5602 at a particular location. For example, a sensor assembly 5602 may comprise one or more pins or interfaces that are configured to engage a notch or recess of a rail. In this example, the position of the sensor assembly 5602 becomes fixed with respect to global plane 104 when the sensor assembly 5602 is coupled to the rails 5604 and 5604 of the adjustable positioning system 5600. The sensor assembly 5602 may be repositioned at a later time by decoupling the sensor assembly 5602 from the rails 5604 and 5604, repositioning the sensor assembly 5602, and recoupling the sensor assembly 5602 to the rails 5604 and 5604. In other examples, the adjustable positioning system 5600 may use any other suitable type of mechanism for coupling a sensor assembly 5602 to the rails 5604 and 5606.

Position Sensors

In one embodiment, a position sensor 5610 may be coupled to each of the sensor assemblies 5602. Each position sensor 5610 is configured to output a location for a sensor 108. For example, a position sensor 5610 may be an electronic device configured to output an (x,y) coordinate for a sensor 108 that described the physical location of the sensor 108 with respect to the global plane 104 and the space 102. Examples of a position sensor include, but are not limited to, Bluetooth beacons or an electrical contact-based circuit. In some examples, a position sensor 5610 may be further configured to output a rotation angle for a sensor 108. For instance, the position sensor 5610 may be configured to determine a rotation angle of a sensor 108 with respect to the ground plane 104 and to output the determined rotation angle. The position sensor 5610 may use an accelerometer, a gyroscope, or any other suitable type of mechanism for determining a rotation angle for a sensor 108. In other examples, the position sensor 5610 may be replaced with marker or mechanical indicator that indicates the location and/or the rotation of a sensor 108.

Draw Wire Encoder System

Figure 57:
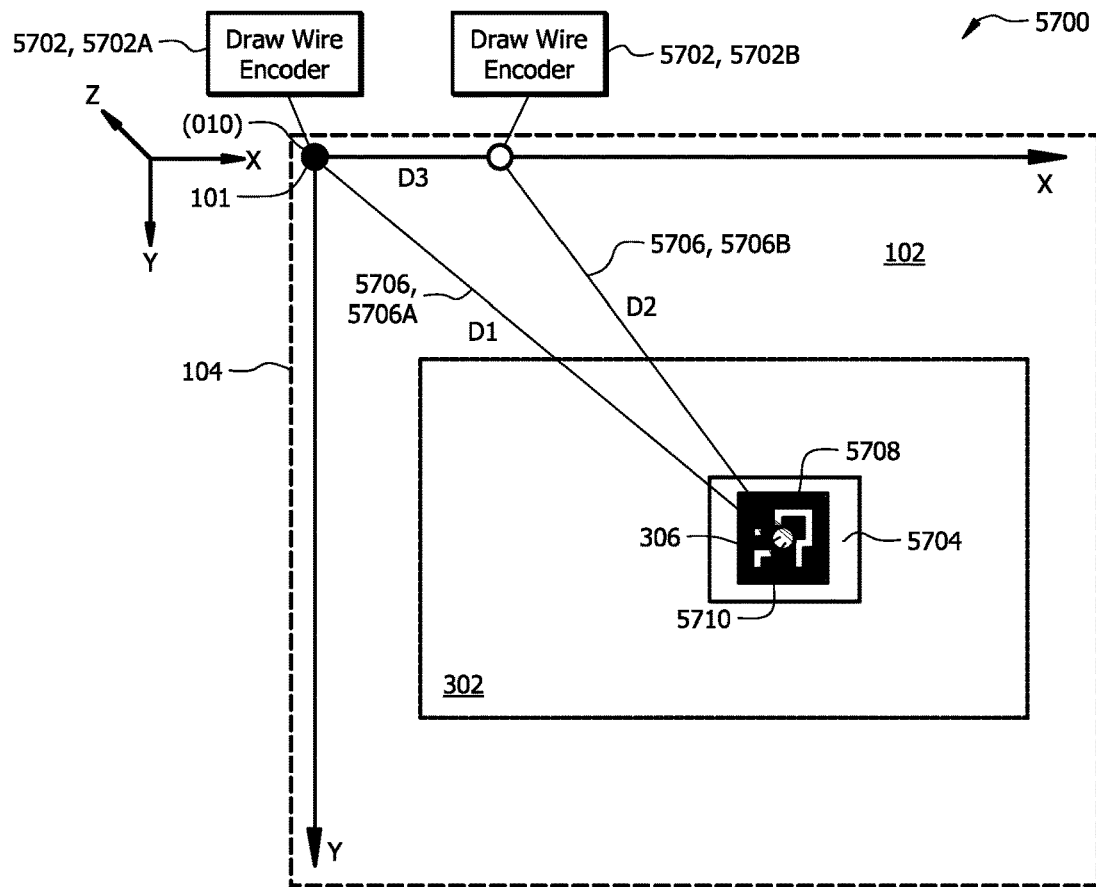
FIG. 57 is an overhead view of an example of a draw wire encoder system.
Figure 58:
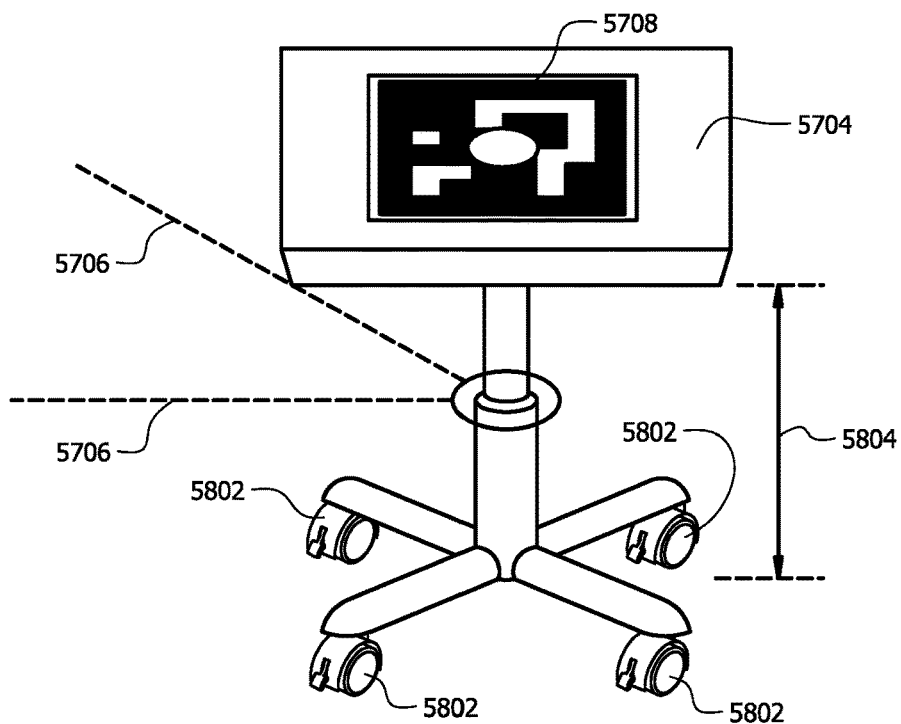
FIG. 58 is a perspective view of a platform for a draw wire encoder system.

FIGS. 57 and 58 illustrate an embodiment of a draw wire encoder system 5700 that can be employed for generating a homography 118 for a sensor 108 of the tracking system 100. The draw wire encoder system 5700 may be configured to provide an autonomous process for repositioning one or more markers 5708 within a space 102 and capturing frames 302 of the marker 5708 that can be used to generate a homography 118 for a sensor 108. An example of a process for using the draw wire encoder system 5700 is described in FIG. 59.

Draw Wire Encoder System Overview

FIG. 57 is an overhead view of an example of a draw wire encoder system 5700. The draw wire encoder system 5700 comprises a plurality of draw wire encoders 5702. Each of the draw wire encoders 5702 is a distance measuring device that is configured to measure the distance between a draw wire encoder 5702 and an object that is operably coupled to the draw wire encoder 5702. The locations of the draw wire encoders 5702 is known and fixed within the global plane 104. In one embodiment, a draw wire encoder 5702 comprises a housing, a retractable wire 5706 that is stored within the housing, and an encoder. The encoder is configured to output a signal or value that corresponds with an amount of the retractable wire 5706 that extends outside of the housing. In other words, the encoder is configured to report a distance between a draw wire encoded 5702 and an object (e.g. platform 5704) that is attached to the end of the retractable wire 5706.

In one embodiment, the draw wire encoders 5702 are configured to wirelessly communicate with sensors 108 and the tracking system 100. For example, the draw wire encoders 5702 may be configured to receive data requests from a sensor 108 and/or the tracking system 100. In response to receiving a data request, a draw wire encoder 5702 may be configured to send information about the distance between the draw wire encoder 5702 and a platform 5704. The draw wire encoders 5702 may communicate wirelessly using Bluetooth, WiFi, Zigbee, Z-wave, and any other suitable type of wireless communication protocol.

The draw wire encoder system 5700 further comprises a moveable platform 5704. An example of the platform 5704 is described in FIG. 58. The platform 5704 is configured to be repositionable within a space 102. For example, the platform 5704 may be physically moved to different locations within a space 102. As another example, the platform 5704 may be remotely controlled to reposition the platform 5704 within a space 102. For instance, the platform 5704 may be integrated with a remote-controlled device that can be repositioned within a space 102 by an operator. As another example, the platform 5704 may an autonomous device that is configured to reposition itself within a space 102. In this example, the platform 5704 may be configured to freely roam a space 102 or may be configured to follow a predetermined path within a space 102. In FIG. 57, the draw wire encoder system 5700 is configured with a single platform 5704. In other examples, the draw wire encoder system 5700 may be configured to use a plurality of platforms 5704.

The platform 5704 is coupled to the retractable wires 5706 of the draw wire encoders 5702. The draw wire encoder system 5700 is configured to determine the location of the platform 5704 within the global plane 104 of the space 102 based on the information that is provided by the draw wire encoders 5702. For example, the draw wire encoder system 5700 may be configured to use triangulation to determine the location of the platform 5704 within the global plane 104. For instance, the draw wire encoder system 5700 may determine the location of the platform 5704 within the global plane 104 using the following expressions:

$$\gamma = \cos^{-1}\left(\frac{D1^2 + D3^2 - D2^2}{2*D1*D3}\right)$$

$$y = D1*\cos(90-\gamma)$$

$$x = D1*\cos(90-\gamma)$$

where D1 is the distance between a first draw wire encoder 5702A and the platform 5704, D2 is the distance between a second draw wire encoder 5702B and the platform 5704, D3 is the distance between the first draw wire encoder 5702A and the second draw wire encoder 5702B, x is the x-coordinate of the platform 5704 in the global plane 104, and y is the y-coordinate of the platform 5704 in the global plane 104. In other examples, the draw wire encoder system 5700 may compute the location of the platform 5704 within the global plane 104 using any other suitable technique. In other examples, the draw wire encoder system 5700 may be configured to use any other suitable mapping function to determine the location of the platform 5704 within the global plane 104 based on the distances reported by the draw wire encoders 5702.

The platform 5704 comprises one or more markers 5708 that are visible to a sensor 108. Examples of markers 5708 include, but are not limited, to text, symbols, encoded images, light sources, or any other suitable type of marker that can be detected by a sensor 108. Referring to the example in FIGS. 57 and 58, the platform 5704 comprises an encoded image disposed on a portion of the platform 5704 that is visible to a sensor 108. As another example, the platform 5704 may comprise a plurality of encoded images that are disposed on a portion of the platform 5704 that is visible to a sensor 108. As another example, the platform 5704 may comprise a light source (e.g. an infrared light source) that is disposed on a portion of the platform 5704 that is visible to a sensor 108. In other examples, the platform 5704 may comprise any other suitable type of marker 5708.

As an example, a sensor 108 may capture a frame 302 that includes a marker 5708. The tracking system 100 will process the frame 302 to detect the marker 5708 and to determine a pixel location 5710 within the frame 302 where the marker 5708 is located. The tracking system 100 uses pixel locations 5710 of a plurality of markers 5708 with the corresponding physical locations of the markers 5708 within the global plane 104 to generate a homography 118 for the sensor 108. An example of this process is described in FIG. 59.

In other examples, the tracking system 100 may use any other suitable type of distance measuring device in place of the draw wire encoders 5702. For example, the tracking system 100 may use Bluetooth beacons, Global Position System (GPS) sensors, Radio-Frequency Identification (RFID) tags, millimeter wave (mmWave) radar or laser, or any other suitable type of device for measuring distance or providing location information. In these examples, each distance measuring device is configured to measure and output a distance between the distance measuring device and an object that is operably coupled to the distance measuring device.

FIG. 58 is a perspective view of a platform 5704 for a draw wire encoder system 5700. In this example, the platform 5704 comprises a plurality of wheels 5802 (e.g. casters). In other examples, the platform 5704 may comprise any other suitable type of mechanism that allows the platform 5704 to be repositioned within a space 102. In some embodiments, the platform 5704 be configured with an adjustable height 5804 that allows the platform 5704 to change the elevation of the markers 5708. In this configuration, the height 5804 of the marker 5708 can be adjusted which allows the tracking system 100 to generate homographies 118 at more than one elevation level for a space being mapped by a sensor 108. For example, the tracking system 100 may generate homographies 118 for more than one plane (e.g. x-y plane) or cross-section along the vertical axis (e.g. the z-axis) dimension. This process allows the tracking system 100 to use more than one elevation level when determining the physical location of an object or person within the space 102, which improves the accuracy of the tracking system 100.

Sensor Mapping Process Using a Draw Wire Encoder System

Figure 59:
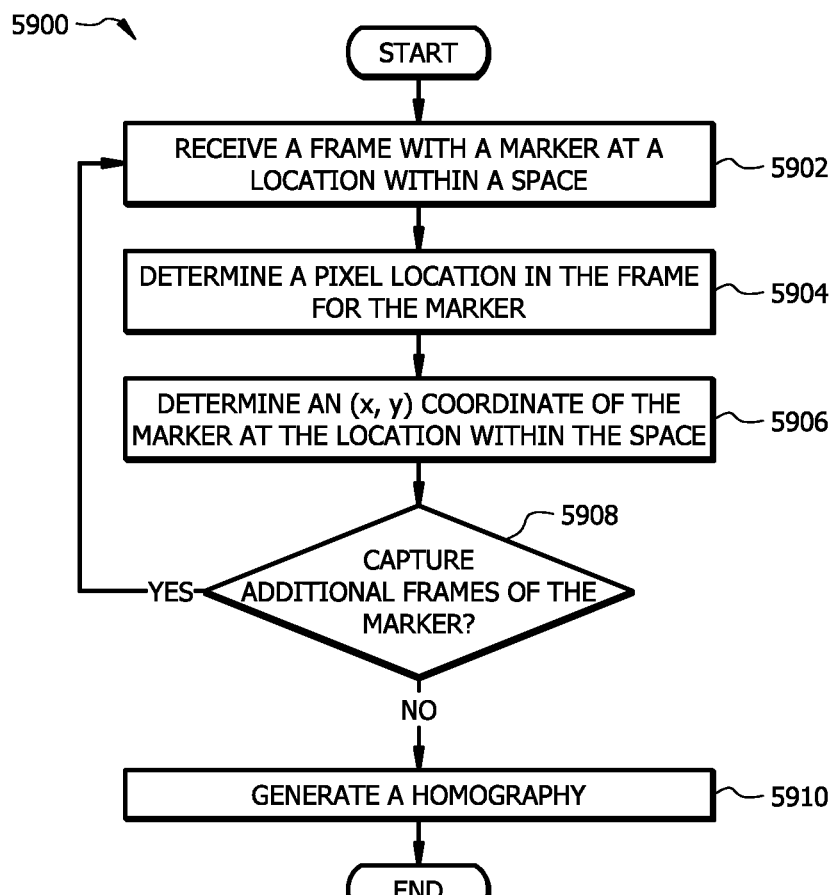
FIG. 59 is a flowchart of an embodiment of a sensor mapping process using a draw wire encoder system.

FIG. 59 is a flowchart of an embodiment of a sensor mapping method 5900 using a draw wire encoder system 5700. The tracking system 100 may employ method 5900 to autonomously generate a homography 118 for a sensor 108. This process involves using the draw wire encoder system 5700 to reposition markers 304 within the field of view of the sensor 108. Using the draw wire encoder system 5700, the tracking system 100 is able to simultaneously obtain location information for the markers 304 which reduces the amount of time it takes the tracking system 100 to generate a homography 118. Using the draw wire encoder system 5700, the tracking system 100 may also autonomously reposition the markers 304 within the field of view of the sensor 108 improves the efficiency of the tracking system 100 and further reduces the amount of time it takes to generate a homography 118. The following is a non-limiting of a process for generating a homography 118 for a single sensor 108. This process can be repeated for generating a homography 118 for other sensors 108. In this example, the tracking system 100 employs draw wire encoders 5702. However, in other examples, the tracking system 100 may employ a similar process using any other suitable type of distance measuring device in place of the draw wire encoders 5702.

At step 5902, the tracking system 100 receives a frame 302 with a marker 5708 at a location within the space 102 from a sensor 108. Here, the tracking system 100 receives a frame 302 from a sensor 108. For example, the sensor 108 may capture an image or frame 302 of the global plane 104 for at least a portion of the space 102. The frame 302 may comprise one or more markers 5708.

At step 5904, the tracking system 100 determine pixel locations 5710 in the frame 302 for the markers 5708. In one embodiment, the tracking system 100 uses object detection to identify markers 5708 within the frame 302. For example, the markers 5708 may have known features (e.g. shape, pattern, color, text, etc.) that the tracking system 100 can search for within the frame 302 to identify a marker 5708. Referring to the example in FIG. 57, the marker 5708 comprises an encoded image. In this example, the tracking system 100 may search the frame 302 for encoded images that are present within the frame 302. The tracking system 100 will identify the marker 5708 and any other markers 5708 within the frame 302. In other examples, the tracking system 100 may employ any other suitable type of image processing technique for identifying markers 5708 within the frame 302. After identifying a marker 5708 within the frame 302, the tracking system 100 will determine a pixel location 5701 for the marker 5708. The pixel location 5710 comprises a pixel row and a pixel column indicating where the marker 5708 is located in the frame 302. The tracking system 100 may repeat this process for any suitable number of markers 304 that are within the frame 302.

At step 5906, the tracking system 100 determines (x,y) coordinates 304 of the markers 5708 within the space 102. In one embodiment, the tracking system 100 may send a data request to the draw wire encoders 5702 to request location information for the platform 5704. The tracking system 100 may then determine the location of a marker 5708 based on the location of the platform 5704. For example, the tracking system 100 may use a known offset between the location of the markers 5708 and location where the platform 5704 is connected to the draw wire encoders 5702. In the example shown in FIG. 57, the marker 5708 is positioned with zero offset from the location where the draw wire encoders 5702 are connected to the platform 5704. In other words, the marker 5708 is positioned directly above where the platform 5704 is connected to the draw wire encoders 5702. In this example, the tracking system 100 may send a first data request to the first draw wire encoder 5702A to request location information for the marker 5708. The tracking system 100 may also send a second data request to the second draw wire encoder 5702B to request location information for the marker 5708. The tracking system 100 may send the data requests to the draw wire encoders 5702 using any suitable type of wireless or wired communication protocol.

The tracking system 100 may receive a first distance from the first draw wire encoder 5702A in response to sending the first data request. The first distance corresponds to the distance between the first draw wire encoder 5702A and the platform 5704. In this example, since the marker 5708 has a zero offset with where the platform 5704 is tethered to the first draw wire encoder 5704A, the first distance also corresponds with the location of the marker 5708. In other examples, the tracking system 100 may determine the location of a marker 5708 based on an offset distance between the location of the marker 5708 and the location where the platform 5704 is tethered to a draw wire encoder 5702. The tracking system 100 may receive a second distance from the second draw wire encoder 5702B in response to the second data request. The tracking system 100 may use a similar process to determine the location of the marker 5708 based on the second distance. The tracking system 100 may then use a mapping function to determine an (x,y) coordinate for the marker 5708 based on the first distance and the second distance. For example, the tracking system 100 may use the mapping function described in FIG. 57. In other examples, the tracking system 100 may use any other suitable mapping function to determine an (x,y) coordinate for the marker 5708 based on the first distance and the second distance.

In some embodiments, the draw wire encoders 5702 may be configured to directly output an (x,y) coordinate for the marker 5708 in response to a data request from the tracking system 100. For example, the tracking system 100 may send data requests to the draw wire encoders 5702 and may receive location information for the platform 5704 and/or the markers 5708 in response to the data requests.

At step 5908, the tracking system 100 determines whether to capture additional frames 302 of the markers 5708. Each time a marker 5708 is identified and located within the global plane 104, the tracking system 100 generates an instance of marker location information. In one embodiment, the tracking system 100 may count the number of instances of marker location information that have been recorded for markers 5708 within the global plane 104. The tracking system 100 then determines whether the number of instances of marker location information is greater than or equal to a predetermined threshold value. The tracking system 100 may compare the number of instances of marker location information to the predetermined threshold value using a process similar to the process described in step 210 of FIG. 2. The tracking system 100 determines to capture additional frames 5708 in response to determining that the number of instances of marker location information is less than the predetermined threshold value. Otherwise, the tracking system 100 determines not to capture additional frames 302 in response to determining that the number of instances of marker location information is greater than or equal to the predetermined threshold value.

The tracking system 100 returns to step 5902 in response to determining to capture additional frames 302 of the marker 5708. In this case, the tracking system 100 will collect additional frames 302 of the marker 5708 after the marker 5708 is repositioned within the global plane 104. This process allows the tracking system 100 to generate additional instances of marker location information that can be used for generating a homography 118. The tracking system 100 proceeds to step 5910 in response to determining not to capture additional frames 302 of the marker 5708. In this case, the tracking system 100 determines that a suitable number of instances of marker location information have been recorded for generating a homography 118.

At step 5910, the tracking system 100 generates a homography 118 for the sensor 108. The tracking system 100 may generate a homography 118 using any of the previously described techniques. For example, the tracking system 100 may generate a homography 118 using the process described in FIGS. 2 and 6. After generating the homography 118, the tracking system 100 may store an association between the sensor 108 and the generated homography 118. This process allows the tracking system 100 to use the generated homography 118 for determining the location of objects within the global plane 104 using frames 302 from the sensor 108.

Food Detection Process

Figure 60:
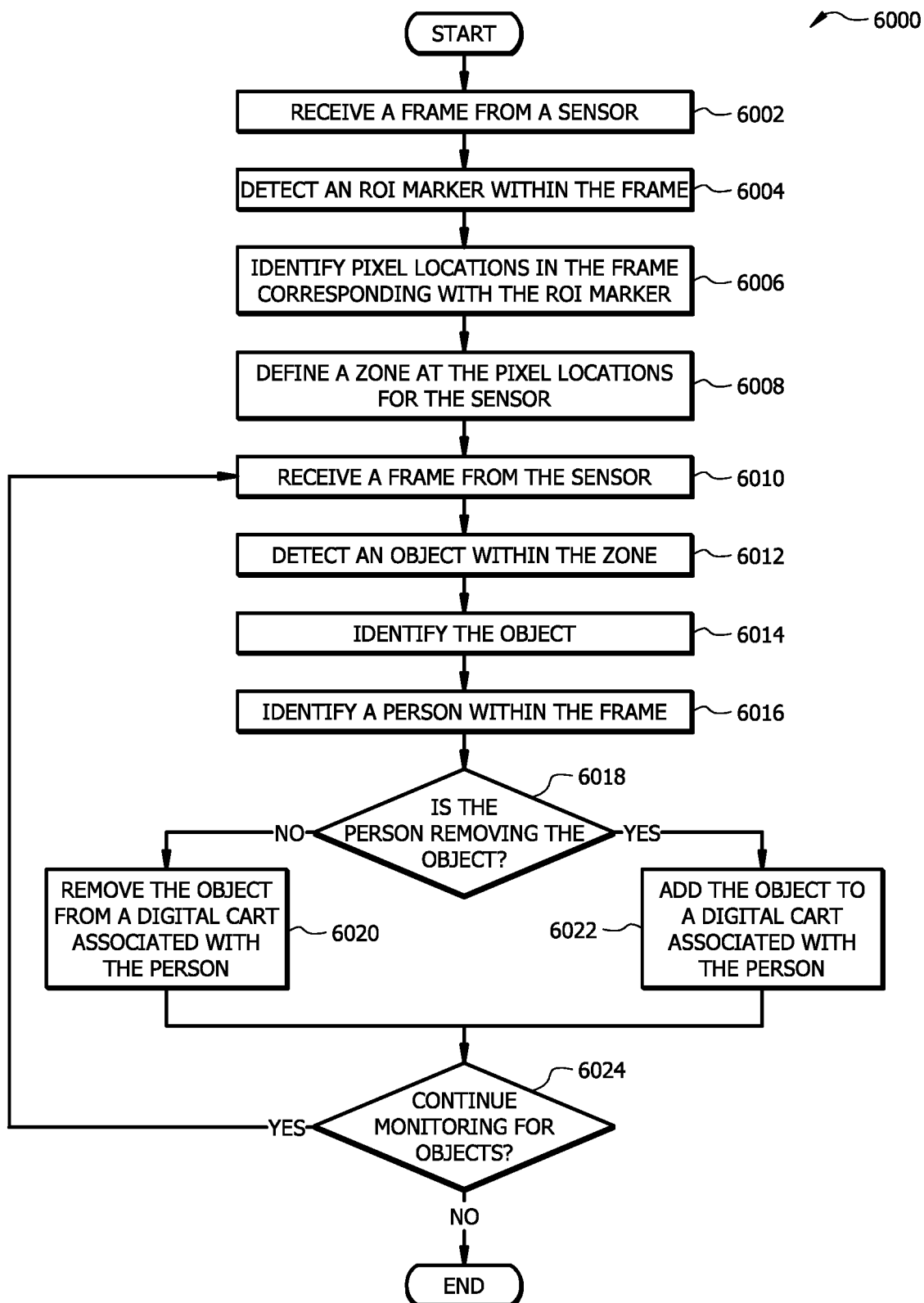
FIG. 60 is a flowchart of an object tracking process for the tracking system.
Figure 61:
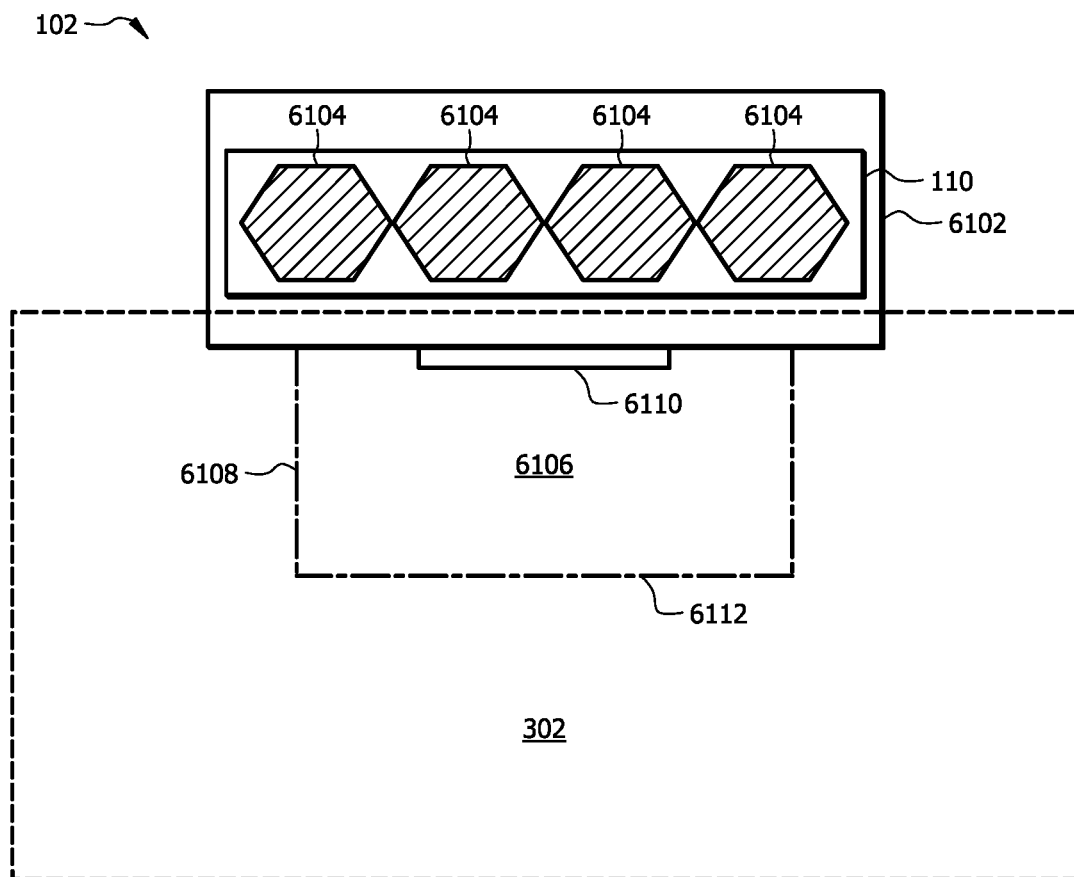
FIG. 61 is an example of a first phase of an object tracking process for the tracking system.

FIG. 60 is a flowchart of an object tracking method 6000 for the tracking system 100. In one embodiment, the tracking system 100 may employ method 6000 for detecting when a person removes or replaces item 6104 from a food rack 6102. In a first phase of method 6000, the tracking system 100 uses a region-of-interest (RIO) marker to define a ROI or zone 6108 within the field of view of a sensor 108. This phase allows the tracking system 100 to reduce the search space when detecting and identifying objects within the field of view of a sensor 108. This process improves the performance of the system by reducing search time and reducing the utilization of processing resources. In a second phase of method 6000, the tracking system 100 uses the previously define zone 6108 to detect and identify objects that a person removes or replaces from a food rack 6102.
Defining a Region-of-Interest At step 6002, the tracking system 100 receives a frame 302 from a sensor 108. Referring to FIG. 61 as an example, this figure illustrates an overheard view of a portion of space 102 (e.g. a store) with a food rack 6102 that is configured to store a plurality of items 6104 (e.g. food or beverage items). For example, the food rack 6102 may be configured to store hot food, fresh food, canned food, frozen food, or any other suitable types of items 6104. In this example, the sensor 108 may be configured to capture frames 302 of a top view or a perspective view of a portion of the space 102. The sensor 108 is configured to capture frames 302 adjacent to the food rack 6102.

Returning to FIG. 60 at step 6004, the tracking system 100 detects an ROI marker 6106 within the frame 302. The ROI marker 6106 is a marker that is visible to the sensor 108. Examples of a ROI marker 6106 include, but are not limited to, a colored surface, a patterned surface, an image, an encoded image, or any other suitable type of marker that is visible to the sensor 108. Returning to the example in FIG. 61, the ROI marker 6106 may be a removable surface (e.g. a mat) that comprises a predetermined color or pattern that is visible to the sensor 108. In this example, the ROI marker 6106 is positioned near an access point 6110 (e.g. a door or opening) where a customer would reach to access the items 6104 in the food rack 6102. The tracking system 100 may employ any suitable type of image processing technique to identify the ROI marker 6106 in the frame 302. For example, the ROI marker 6106 may be a predetermined color. In this example, the tracking system 100 may apply pixel value thresholds to identify the predetermined color and the ROI marker 6106 within the frame 302. As another example, the ROI marker 6106 may comprise a predetermined pattern or image. In this example, the tracking system 100 may use pattern or image recognition to identify the ROI marker 6106 within the frame 302.

Figure 62:
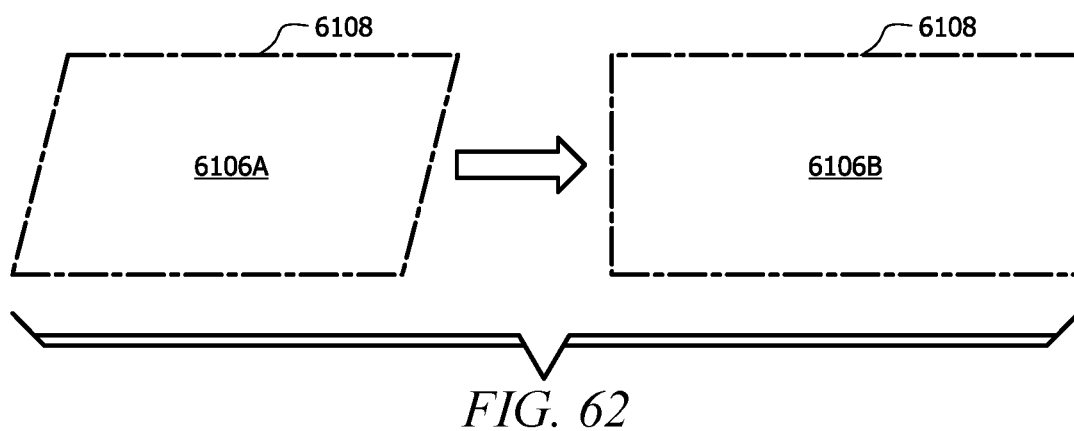
FIG. 62 is an example of an affine transformation for the object tracking process.
Figure 63:
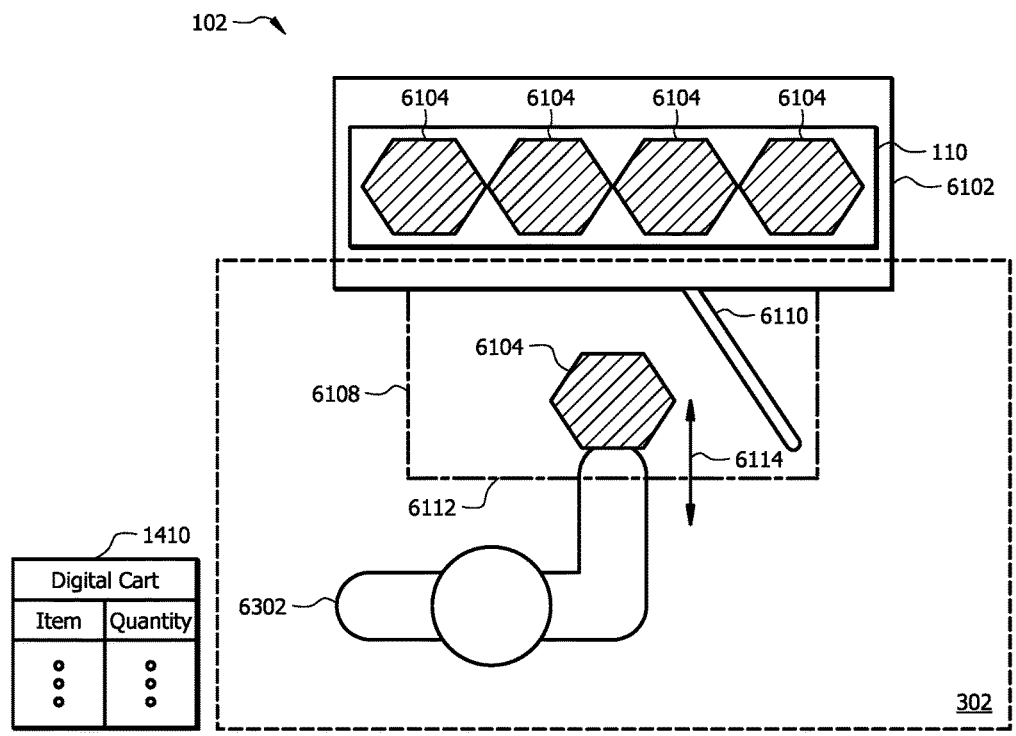
FIG. 63 is an example of a second phase of the object tracking process for the tracking system.

In some embodiments, the tracking system 100 may apply an affine transformation to the detected ROI marker 6106 to correct for perspective view distortion. Referring to FIG. 62, an example of a skewed ROI marker 6106A is illustrated. In this example, the ROI marker 6106A may be skewed because the sensor 108 is configured to capture a perspective or angled view of the space 102 with the ROI marker 6106A. In this case, the tracking system 100 may apply an affine transformation matrix to frame 302 that includes the ROI marker 6106A to correct the skewing of the ROI marker 6106A. In other words, the tracking system 100 may apply an affine transformation to the ROI marker 6106A to change the shape of the ROI marker 6106A into a rectangular shape. An example of a corrected ROI marker 6106B is illustrated in FIG. 62. In one embodiment, an affine transformation matrix comprises a combination translation, rotation, and scaling coefficients that reshape the RIO marker 6106A within the frame 302. The tracking system 100 may employ any suitable technique for determining affine transformation matrix coefficients and applying an affine transformation matrix to the frame 302. This process assists the tracking system 100 later when determining the pixel locations of the ROI marker 6106 with the frame 302.

Returning to FIG. 60 at step 6006, the tracking system 100 identifies pixel locations in the frame 302 corresponding with the ROI marker 6106. Here, the tracking system 100 identifies the pixels within the frame 302 that correspond with the ROI marker 6106. The tracking system 100 then determines the pixel locations (i.e. the pixel columns and pixel rows) that correspond with the identified pixels within the frame 302.

At step 6008, the tracking system 100 defines a zone 6108 at the pixel locations for the sensor 108. The zone 6108 corresponds with a range of pixel columns and pixels rows that correspond with the pixel locations where the ROI marker 6106 was detected. Here, the tracking system 100 defines these pixel locations as a zone 6108 for subsequent frames 302 from the sensor 108. This process defines a subset of pixel locations within frames 302 from the sensor 108 where an object is most likely to be detected. By defining a subset of pixel locations within frames 302 from the sensor, this process allows the tracking system 100 to reduce the search space when detecting and identifying objects near the food rack 6102.

Object Tracking Using the Region-of-Interest

After the tracking system 100 defines the zone 6110 within the frame 302 from the sensor 108, the ROI marker 6106 may be removed from the space 102 and the tracking system 100 will begin detecting and identifying items 6104 that are removed from the food rack 6102. At step 6010, the tracking system 100 receives a new frame 302 from the sensor 108. In one embodiment, the tracking system 100 is configured to periodically receive frames 302 from the sensor 108. For example, the sensor 108 may be configured to continuously capture frames 302. In other embodiments, the tracking system 100 may be configured to receive a frame 302 from the sensor 108 in response to a triggering event. For example, the food rack 6102 may comprise a door sensor configured to output an electrical signal when a door of the food rack 6102 is opened. In this example, the tracking system 100 may detect that the door sensor was triggered to an open position and receives the new frame 302 from the sensor 108 in response to detecting the triggering event. As another example, the tracking system 100 may be configured to detect motion based on differences between subsequent frames 302 from the sensor 108 a s triggering event. As another example, the tracking system 100 may be configured to detect vibrations at or near food rack 6102 using an accelerometer. In other examples, the tracking system 100 may be configured to use any other suitable type of triggering event.

At step 6012, the tracking system 100 detects an object within the zone 6108 of the frame 302. The tracking system 100 may monitor the pixel locations within the zone 6108 to determine whether an item 6104 is present within the zone 6108. In one embodiment, the tracking system 100 detect an item 6104 within the zone 6108 by detecting motion within the zone 6108. For example, the tracking system 100 may compare subsequent frames 302 from the sensor 108. In this example, the tracking system 100 may detect motion based on differences between subsequent frames 302. For example, the tracking system 100 may first receive a frame 302 that does not include an item 6104 within the zone 6108. In a subsequent frame 302, the tracking system 100 may detect that the item 6104 is present within the zone 6108 of the frame 302. In other examples, the tracking system 100 may detect the item 6104 within the zone 6108 using any other suitable technique.

At step 6014, the tracking system 100 identifies the object within the zone 6108 of the frame 302. In one embodiment, the tracking system 100 may use image processing to identify the item 6104. For example, the tracking system 100 may search within the zone 6108 of the frame 302 for known features (e.g. shapes, patterns, colors, text, etc.) that correspond with a particular item 6104.

In another embodiment, the sensor 108 may be configured to capture thermal or infrared frames 302. In this example, each pixel value in an infrared frame 302 may correspond with a temperature value. In this example, the tracking system 100 may identify a temperature differential within the infrared frame 302. The temperature differential within the infrared frame 302 can be used to locate an item 6104 within the frame 302 since the item 6104 will typically be cooler or hotter than ambient temperatures. The tracking system 100 may identify the pixel locations within the frame 302 that are greater than a temperature threshold which corresponds with the item 6104.

Figure 64:
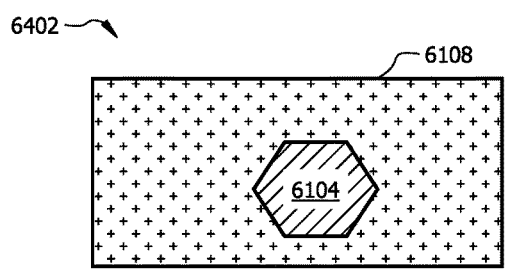
FIG. 64 is an example of a binary mask for the object tracking process.

After identifying pixel locations within the frame 302, the tracking system 100 may generate a binary mask 6402 based on the identified pixel location. The binary mask 6402 may have the same pixel dimensions as the frame 302 or the zone 6108. In this example, the binary mask 6402 is configured such that pixel locations outside of the identified pixel locations corresponding with the item 6104 are set to a null value. This process generates a sub-ROI by removing the information from pixel locations outside of the identified pixel locations corresponding with the item 6104 which isolates the pixel locations associated with the item 6104 in the frame 302. After generating the binary mask 6402, the tracking system 100 applies the binary mask 6402 to the frame 302 to isolates the pixel locations associated with the item 6104 in the frame 302. An example of applying the binary mask 6402 to the frame 302 is shown in FIG. 64. In this example, the tracking system 100 first removes pixel locations outside of the zone 6108 to reduce the search space for locating the item 6104 within the frame 302. The tracking system 100 then applies the binary mask 6402 to the remaining pixel locations to isolate the item 6104 within the frame 302. After isolating the item 6104 within the frame 302, the tracking system 100 may then use any suitable object detection technique to identify the item 6104. In other embodiments, the tracking system 100 may use any other suitable technique to identify the item 6104.

Returning to FIG. 60 at step 6016, the tracking system 100 identifies a person 6302 within the frame 302. In one embodiment, the tracking system 100 identifies the person 6302 that is closest to the food rack 6102 and the zone 6108 of the frame 302. For example, the tracking system 100 may determine a pixel location in the frame 302 for the person 6302. The tracking system 100 may determine a pixel location for the person 6302 using a process similar to the process described in step 1004 of FIG. 10. The tracking system 100 may use a homography 118 that is associated with the sensor 108 to determine an (x,y) coordinate in the global plane 104 for the person 6302. The homography 118 is configured to translate between pixel locations in the frame 302 and (x,y) coordinates in the global plane 104. The homography 118 is configured similar to the homography 118 described in FIGS. 2-5B. As an example, the tracking system 100 may identify the homography 118 that is associated with the sensor 108 and may use matrix multiplication between the homography 118 and the pixel location of the person 6302 to determine an (x,y) coordinate in the global plane 104. The tracking system 100 may then identify which person 6302 is closest to the food rack 6102 and the zone 6108 based on the person's 6302 (x,y) coordinate in the global plane 104.

At step 6018, the tracking system 100 determines whether the person 6302 is removing the object from the food rack 6102. In one embodiment, the zone 6108 comprises an edge 6112. The edge 6112 comprises a plurality of pixels within the zone 6112 that can be used to determine an object travel direction 6114. For example, the tracking system 100 may use subsequent frames 302 from the sensor 108 to determine whether an item 6104 is entering or exiting the zone 6108 when it crosses the edge 6112. As an example, the tracking system 100 may first detect an item 6104 within the zone 6108 in a first frame 302. The tracking system 100 may then determine that the item 6108 is no longer in the zone 6108 after it crosses the edge 6112 of the zone 6108. In this example, the tracking system 100 determines that the item 6104 was removed from the food rack 6102 based on its travel direction 6114. As another example, the tracking system 100 may first detect that an item 6104 is not present within the zone 6108. The tracking system 100 may then detect that the item 6104 is present in the zone 6108 of the frame 302 after it crosses the edge 6112 of the zone 6108. In this example, the tracking system 100 determines that the item 6104 is being returned to the food rack 6102 based on its travel direction 6114.

In another embodiment, the tracking system 100 may use weight sensors 110 to determine whether the item 6104 is being removed from the food rack 6102 or the item 6104 is being returned to the food rack 6102. As an example, the tracking system 100 may detect a weight decrease from a weight sensor 110 before the item 6104 is detected within the zone 6108. The weight decrease corresponds with the weight of the item 6104 be lifted off of the weight sensor 110. In this example, the tracking system 100 determines that the item 6104 is being removed from the food rack 6102. As another example, the tracking system 100 may detect a weight increase on a weight sensor 110 after the item 6104 is detected within the zone 6108. The weight increase corresponds with the weight of the item 614 be placed onto the weight sensor 110. In this example, the tracking system 100 determines that the item 6104 is being returned to the food rack 6102. In other embodiments, the tracking system 100 may use any other suitable technique for determining whether the item 6104 is being removed from the food rack 6102 or the item 6104 is being returned to the food rack 6102.

The tracking system 100 proceeds to step 6020 in response to determining that the person 6302 is not removing the object. In this case, the tracking system 100 determines that the person is 6302 is putting the item 6104 back into the food rack 6102. This means that the item 6104 will need to be removed from their digital cart 1410. At step 6020, the tracking system 100 removes the object from the digital cart 1410 that is associated with the person 6302. In one embodiment, the tracking system 100 may determine a number of items 6104 that are being returned to the food rack 6102 using image processing. For example, the tracking system 100 may use object detection to determine a number of items 6104 that are present in the frame 302 when the person 6302 returns the item 6104 to the food rack 6102. In another embodiment, the tracking system 100 may use weight sensors 110 to determine a number of items 6104 that were returned to the food rack 6102. For example, the tracking system 100 may determine a weight increase amount on a weight sensor 110 after the person 6302 returns one or more items 6104 to the food rack 6102. The tracking system 100 may then determine an item quantity based on the weight increase amount. For example, the tracking system 100 may determine an individual item weight for the items 6104 that are associated with the weight sensor 110. For instance, the weight sensor 110 may be associated with an item 6104 that has an individual weight of eight ounces.

When the weight sensor 110 detects a weight increase of sixteen ounces, the weight sensor 110 may determine that two of the items 6104 were returned to the food rack 6102. In other embodiments, the tracking system 100 may determine a number of items 6104 that were returned to the food rack 6102 using any other suitable type of technique. The tracking system 100 then removes the identified quantity of the item 6104 from the digital cart 1410 that is associated with the person 6302.

Returning to step 6018, the tracking system 100 proceeds to step 6022 in response to determining that the person 6302 is removing the object. In this case, the tracking system 100 determines that the person 6302 is removing the item 6104 from the food rack 6102 to purchase the item 6104. At step 6022, the tracking system 100 adds the object to the digital cart 1410 that is associated with the person 6302. In one embodiment, the tracking system 100 may determine a number of items 6104 that were removed from the food rack 6102 using image processing. For example, the tracking system 100 may use object detection to determine a number of items 6104 that are present in the frame 302 when the person 6302 removes the item 6104 from the food rack 6102. In another embodiment, the tracking system 100 may use weight sensors 110 to determine a number of items 6104 that were removed from the food rack 6102. For example, the tracking system 100 may determine a weight decrease amount on a weight sensor 110 after the person 6302 removes one or more items 6104 from the weight sensor 110. The tracking system 100 may then determine an item quantity based on the weight decrease amount. For example, the tracking system 100 may determine an individual item weight for the items 6104 that are associated with the weight sensor 110. For instance, the weight sensor 110 may be associated with an item 6104 that has an individual weight of eight ounces. When the weight sensor 110 detects a weight decrease of sixteen ounces, the weight sensor 110 may determine that two of the items 6104 were removed from the weight sensor 110. In other embodiments, the tracking system 100 may determine a number of items 6104 that were removed from the food rack 6102 using any other suitable type of technique. The tracking system 100 then adds the identified quantity of the item 6104 from the digital cart 1410 that is associated with the person 6302.

At step 6024, the tracking system 100 determines whether to continue monitoring. In one embodiment, the tracking system 100 may be configured to continuously monitor for items 6104 for a predetermined amount of time after a triggering event is detected. For example, the tracking system 100 may be configured to use a timer to determine an amount of time that has elapsed after a triggering event. If an item 6104 or a customer is not detected after a predetermined amount of time has elapsed, then the tracking system 100 may determine to discontinue monitoring for items 6104 until the next triggering event is detected. If an item 6104 or customer is detected within the predetermined time interval, then the tracking system 100 may determine to continue monitoring for items 6104.

The tracking system 100 returns to step 6010 in response to determining to continue monitoring. In this case, the tracking system 100 returns to step 6010 to continue monitoring frames 302 from the sensor 108 to detect when a person removes or replaces an item 6104 from the food rack 6102. Otherwise, the tracking system 100 terminates method 6000 in response to determining to discontinue monitoring. In this case, the tracking system 100 has finished detecting and identifying items 6104 and may terminate method 6000.

Sensor Reconfiguration Process

Figure 65:
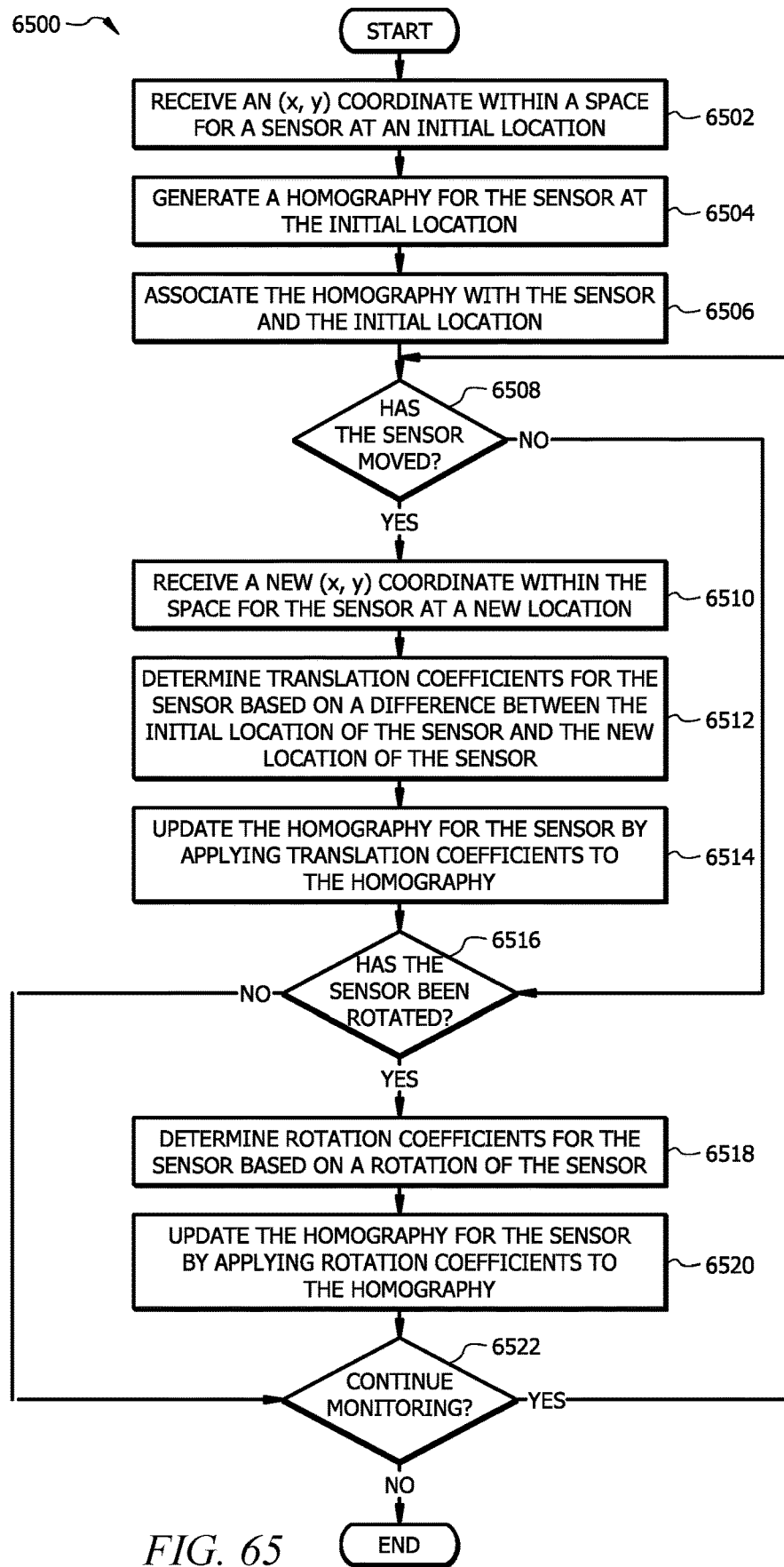
FIG. 65 is a flowchart of an embodiment of a sensor reconfiguration process for the tracking system.

FIG. 65 is a flowchart of an embodiment of a sensor reconfiguration method 6500 for the tracking system 100. The tracking system 100 may employ method 6500 to update a homography 118 for a sensor 108 without having to use markers 304 to generate a new homography 118. This process generally involves determining whether a sensor 108 has moved or rotated with respect to the global plane 104. In response to determining that the sensor 108 has been moved or rotated, the tracking system 100 determines translation coefficients 6704 and rotation coefficients 6706 based on the new orientation of the sensor 108 and uses the translation coefficients 6704 and the rotation coefficients 6706 to update an existing homography 118 that is associated with the sensor 108. This process improves the performance of the tracking system 100 by bypassing the sensor calibration steps that involve placing and detecting markers 304. During these sensor calibration steps, the sensor 108 is typically taken offline until its new homography 118 has been generated. In contrast, this process bypasses these sensor calibration steps which reduces the downtime of the tracking system 100 since the sensor 108 does not need to be taken offline to update its homography 118.

Creating an Initial Homography

Figure 66:
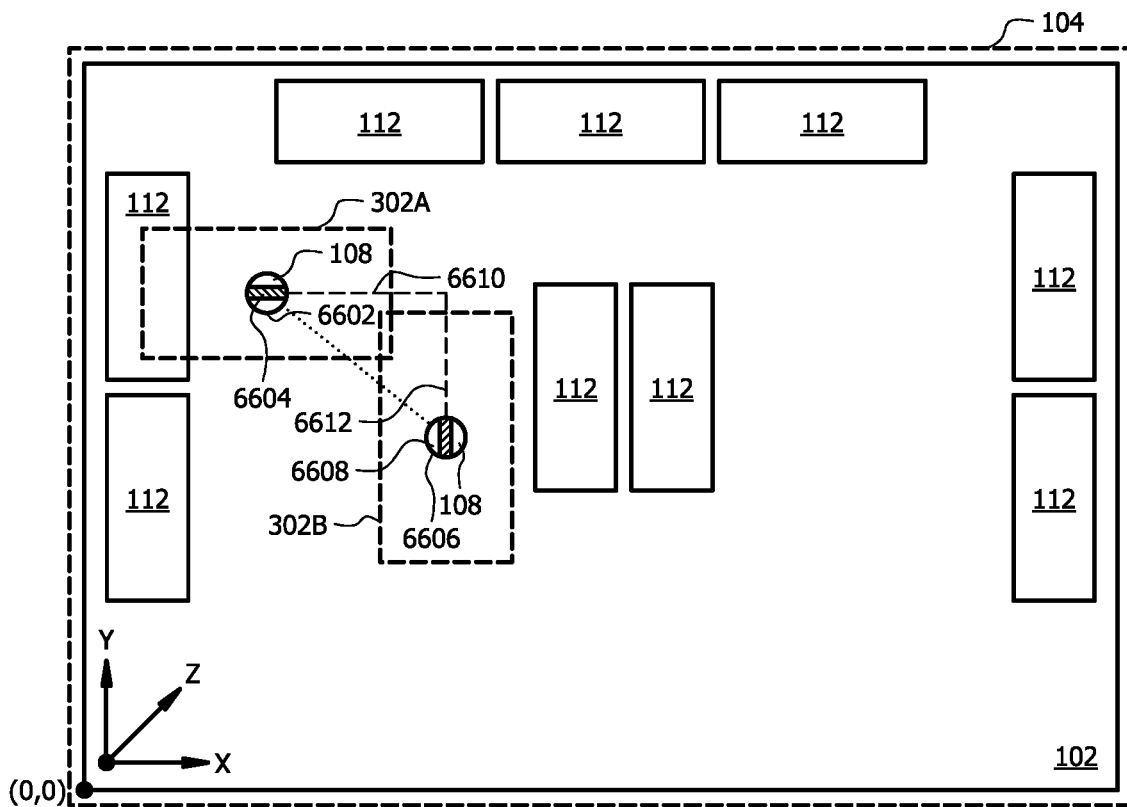
FIG. 66 is an overhead view of an example of the sensor reconfiguration process for the tracking system.

At step 6502, the tracking system 100 receives an (x,y) coordinate 6602 within a space 102 for a sensor 108 at an initial location 6604. Referring to FIG. 66 as an example, the sensor 108 may be positioned within a space 102 (e.g. a store) with an overhead view of at least a portion of the space 102. In this example, the sensor 108 is configured to capture frames 302 of the global plane 104 for at least a portion of the store. In one embodiment, the tracking system 100 may employ position sensors 5610 that are configured to output the location of the sensor 108. The position sensor 5610 may be configured similarly to the position sensors 5610 described in FIG. 56. In other embodiments, the tracking system 100 may be configured to receive location information (e.g. an (x,y) coordinate) for the sensor 108 from a technician or using any other suitable technique.

Returning to FIG. 65 at step 6504, the tracking system 100 generates a homography 118 for the sensor 108 at the initial location 6604. The tracking system 100 may generate a homography 118 using any of the previously described techniques. For example, the tracking system 100 may generate a homography 118 using the process described in FIGS. 2 and 6. The generated homography 118 is specific to the location and the orientation of the sensor 108 within the global plane 104.

At step 6506, the tracking system 100 associates the homography 118 with the sensor 108 and the initial location 6604. For example, the tracking system 100 may store an association between the sensor 108, the generated homography 118, and the initial location 6604 of the sensor 104 within the global plane 104. The tracking system 100 may also associate the generated homography 1180 with a rotation angle for the sensor 108 or any other suitable type of information about the configuration of the sensor 108.

Updating the Existing Homography

At step 6508, the tracking system 100 determines whether the sensor 108 has moved. Here, the tracking system 100 determines whether the position of the sensor 108 has changed with respect to the global plane 104 by determining whether the sensor 108 has moved in the x-, y-, and/or z-direction within the global plane 104. For example, the sensor 108 may have been intentionally or unintentionally moved to a new location within the global plane 104. In one embodiment, the tracking system 100 may be configured to periodically sample location information (e.g. an (x,y) coordinate) for the sensor 108 from a position sensor 5610. In this configuration, the tracking system 100 may compare the current (x,y) coordinate for the sensor 108 to the previous (x,y) coordinate for the sensor 108 to determine whether the sensor 108 has moved within the global plane 104. The tracking system 100 determines that the sensor 108 moved when the current (x,y) coordinate for the sensor 108 does not match the previous (x,y) coordinate for the sensor 108. In other examples, the tracking system 100 may determine that the sensor 108 has moved based on an input provided by a technician or using any other suitable technique. The tracking system 100 proceeds to step 6510 in response to determining that the sensor 108 has moved. In this case, the tracking system 100 will determine the new location of the sensor 108 to update the homography 118 that is associated with the sensor 108. This process allows the tracking system 100 to update the homography 118 that is associated with the sensor 108 without having to use markers to recompute the homography 118.

At step 6510, the tracking system 100 receives a new (x,y) coordinate 6606 within the space 102 for the sensor 108 at a new location 6608. The tracking system 100 may determine the new (x,y) coordinate 6606 for the sensor 108 using a process similar to the process that is described in step 6502.

At step 6512, the tracking system 100 determines translation coefficients 6704 for the sensor 108 based on a difference between the initial location of the sensor 108 and the new location of the sensor 108. The translation coefficients 6704 identify an offset between the initial location of the sensor 108 and the new location of the sensor 108. The translation coefficients 6704 may comprise an x-axis offset value, a y-axis offset value, and a z-axis offset value. Returning to the example in FIG. 66, the tracking system 100 compares the new (x,y) coordinate 6606 of the sensor 108 to the initial (x,y) coordinate 6602 to determine an offset with respect to each axis of the global plane 104. In this example, the tracking system 100 determines an x-axis offset value that corresponds with an offset 6610 with respect to the x-axis of the global plane 104. The tracking system 100 also determines a y-axis offset value that corresponds with an offset 6612 with respect to the y-axis of the global plane 104. In other examples, the tracking system may also determine a z-axis offset value that corresponds with an offset with respect to the z-axis of the global plane 104.

Figure 67:
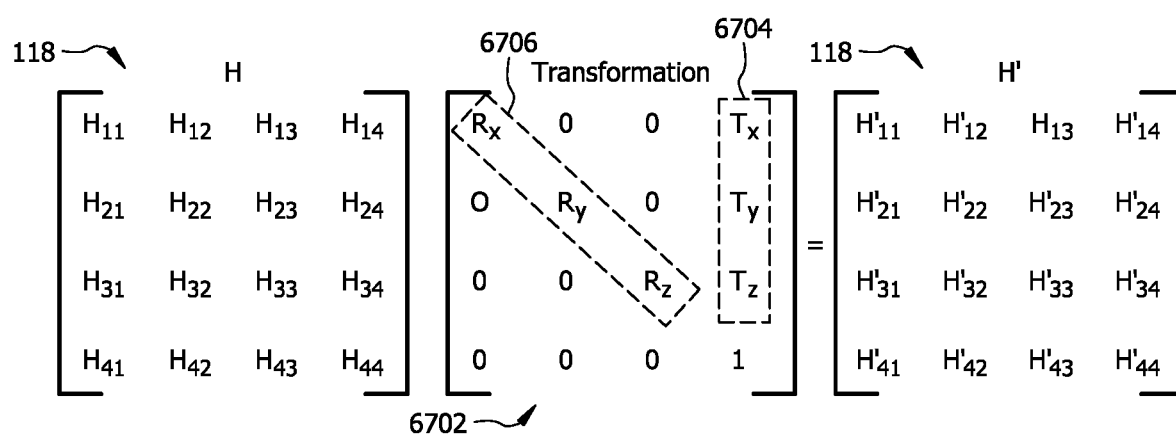
FIG. 67 is an example of applying a transformation matrix to a homography matrix to update the homography matrix.

Returning to FIG. 65 at step 6514, the tracking system 100 updates the homography 118 for the sensor by applying the translation coefficients 6704 to the homography 118. The tracking system 100 may use the translation coefficients 6704 in a transformation matrix 6702 that can be applied to the homography 118. FIG. 67 illustrates an example of applying a transformation matrix 6702 to a homography matrix 118 to update the homography matrix 118. In this example, Tx corresponds with an x-axis offset value, Ty corresponds with a y-axis offset value, and Tz corresponds with a z-axis offset value. The tracking system 100 includes the translation coefficients 6704 within the transformation matrix 6702 and then uses matrix multiplication to apply the translation coefficients 6704 and update the homography 118. The tracking system 100 may set the rotation coefficients 6706 to a value of one when no rotation is being applied to the homography 118.

Returning to FIG. 65 at step 6508, the tracking system 100 proceeds to step 6516 in response to determining that the sensor 108 has not moved. In this case, the tracking system 100 determines that the sensor 108 has not moved when the current (x,y) coordinate for the sensor 108 matches the previous (x,y) coordinate for the sensor 108. The tracking system 100 may then determine whether the sensor 108 has been rotated with respect to the global plane 104. At step 6516, the tracking system 100 determines whether the sensor 108 has been rotated. Returning to the example in FIG. 66, the sensor 108 has been rotated after the sensor 108 was moved to the new (x,y) coordinate 6606. In this example, the sensor 108 was rotated about ninety degrees. In other examples, the sensor 108 may be rotated by any other suitable amount. In one embodiment, the tracking system 100 may periodically receive location information (e.g. a rotation angle) for the sensor 108 from a position sensor 5610. For example, the position sensor 5610 may comprise an accelerometer or gyroscope that is configured to output a rotation angle for the sensor 108. In other examples, the tracking system 100 may receive a rotation angle for the sensor 108 from a technician or using any other suitable technique. The tracking system 100 determines that the sensor 108 has been rotated in response to receive a rotation angle greater than zero degrees for the sensor 108.

The tracking system 100 proceeds to step 6522 in response to determining that the sensor 108 has not been rotated. In this case, the tracking system 100 does not update the homography 118 based on a rotation of the sensor 108. Since the sensor 108 has not been rotated, this means that the homography 118 that is associated with the sensor 108 is still valid. The tracking system 100 proceeds to step 6518 in response to determining that the sensor 108 has been rotated. In this case, the tracking system 100 determines to update the homography 118 based on the rotation of the sensor 108. Since the sensor 108 has been rotated, this means that the homography 118 that is associated with the sensor 108 is no longer valid.

At step 6518, the tracking system 100 determines rotation coefficients 6706 for the sensor 108 based on the rotation of the sensor 108. The rotation coefficients 6706 identify a rotational orientation of the sensor 108 with respect to the ground plane 104, for example, the x-y plane of the ground plane 104. The rotation coefficients 6706 comprise an x-axis rotation value, a y-axis rotation value, and/or a z-axis rotation value. The rotation coefficients 6706 may be in degrees or radians.

At step 6520, the tracking system 100 updates the homography 118 for the sensor 108 by applying the rotation coefficients 6706 to the homography 118. The tracking system 100 may use the rotation coefficients 6706 in the transformation matrix 6702 that can be applied to the homography 118. Returning to the example in FIG. 67, Rx corresponds with the x-axis rotation value, Ry corresponds with the y-axis rotation value, and Rz corresponds with the z-axis rotation value. The tracking system 100 includes the rotation coefficients 6706 within the transformation matrix 6702 and then uses the uses matrix multiplication to apply the rotation coefficients 6706 and update the homography 118. The tracking system 100 may set the translation coefficients 6704 to a value of zero when no translation is being applied to the homography 118.

In one embodiment, the tracking system 100 may first populate the translation matrix 6702 with the translation coefficients 6704 and the rotation coefficients 6706 and then use matrix multiplication to simultaneously apply the translation coefficients 6704 and the rotation coefficients 6706 to the homography 118. After updating the homography 118, the tracking system 100 may store a new association between the sensor 108, the updated homography 118, the current position of the sensor 108, and the rotation angle of the sensor 108.

At step 6522, the tracking system 100 determines whether to continue monitoring the position of the sensor 108. In one embodiment, the tracking system 100 may be configured to continuously monitor the position of the sensor 108. In another embodiment, the tracking system 100 may be configured to check the position and orientation of the sensor 108 in response to a user input from a technician. In this case, the tracking system 100 may discontinue monitoring the position of the sensor 108 until another user input is provided by a technician. In other embodiments, the tracking system 100 may use any other suitable criteria for determining whether to continue monitoring the position of the sensor 108.

The tracking system 100 returns to step 6508 in response to determining to continue monitoring the position of the sensor. In this case, the tracking system 100 will return to step 6508 to continue monitoring for changes in the position and orientation of the sensor 108. Otherwise, the tracking system 100 terminates method 6500 in response to determining to discontinue monitoring the position of the sensor. In this case, the tracking system 100 will suspend monitoring for changes in the position and orientation of the sensor 108 and will terminate method 6500.

Homography Error Correction Overview

Figure 68:
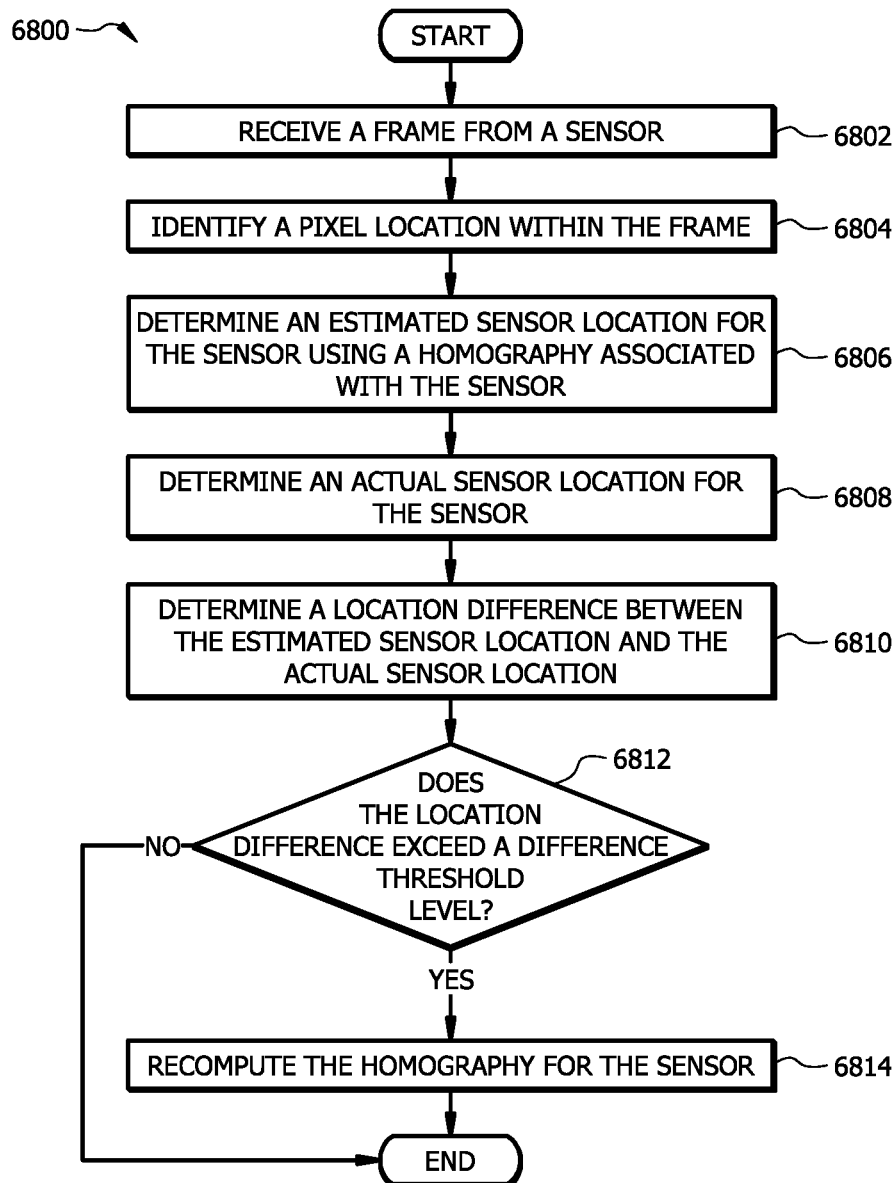
FIG. 68 is a flowchart of an embodiment of a homography error correction process for the tracking system.
Figure 69:
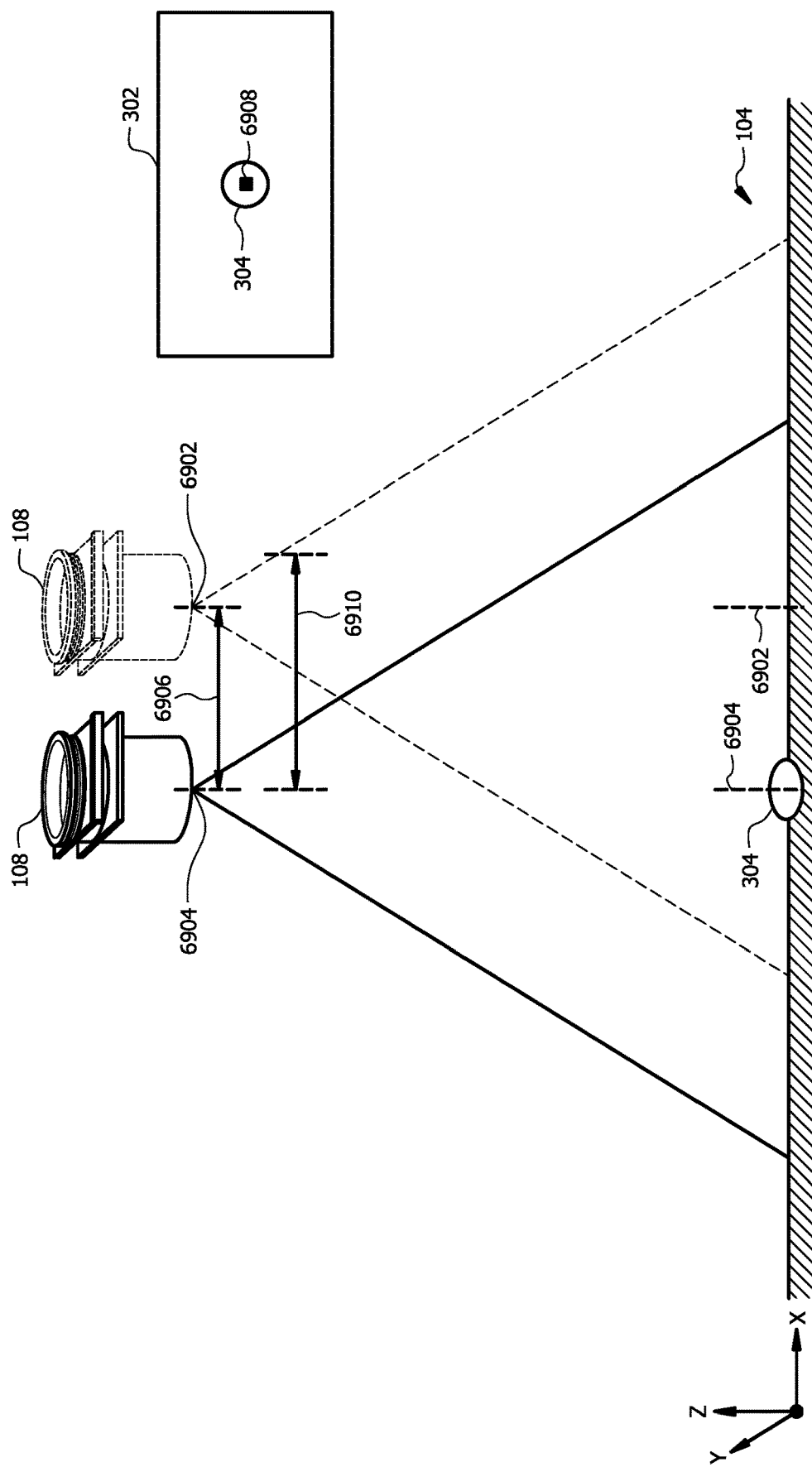
FIG. 69 is an example of a homography error correction process for the tracking system.
Figure 70:
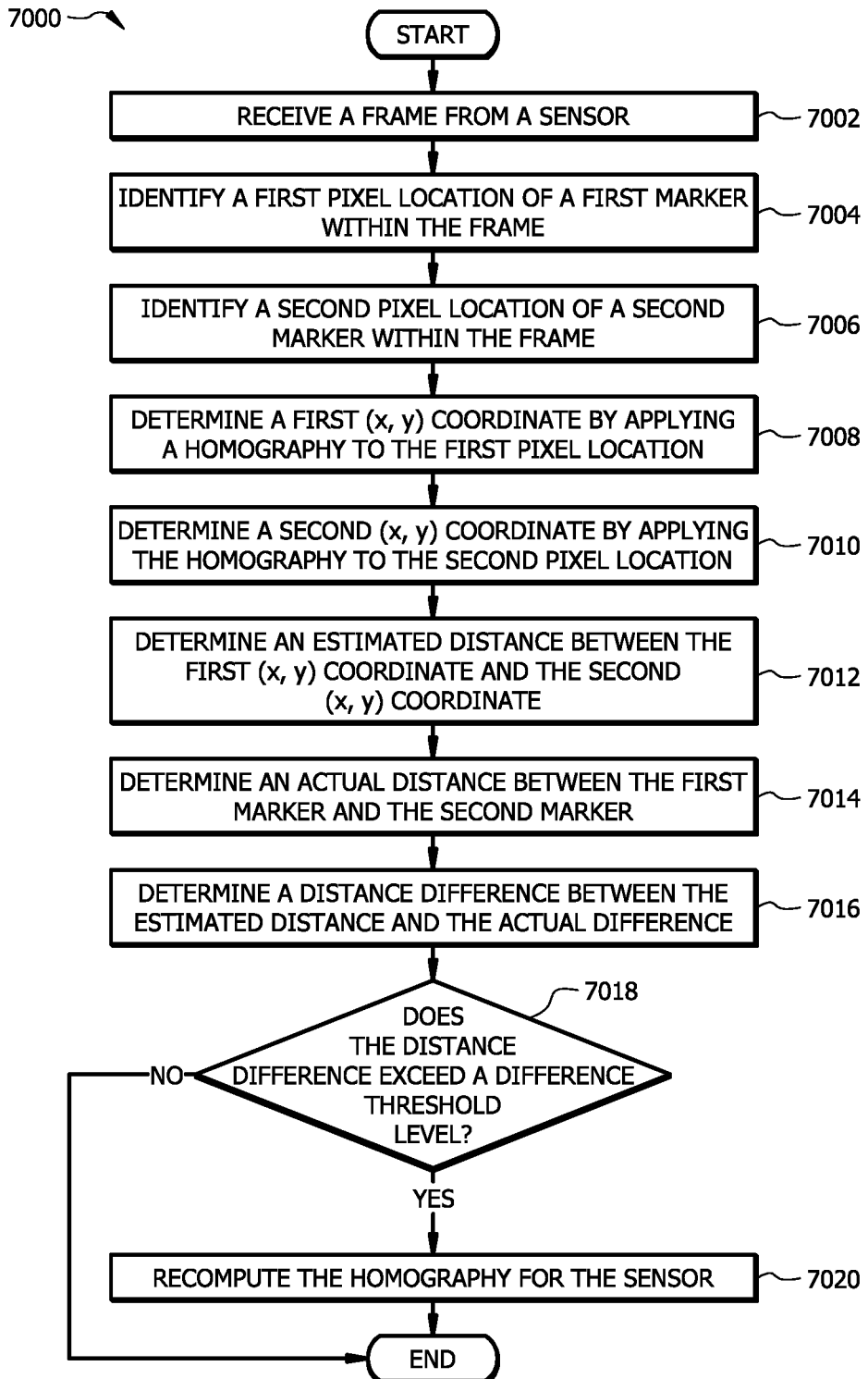
FIG. 70 is a flowchart of another embodiment of a homography error correction process for the tracking system.
Figure 71:
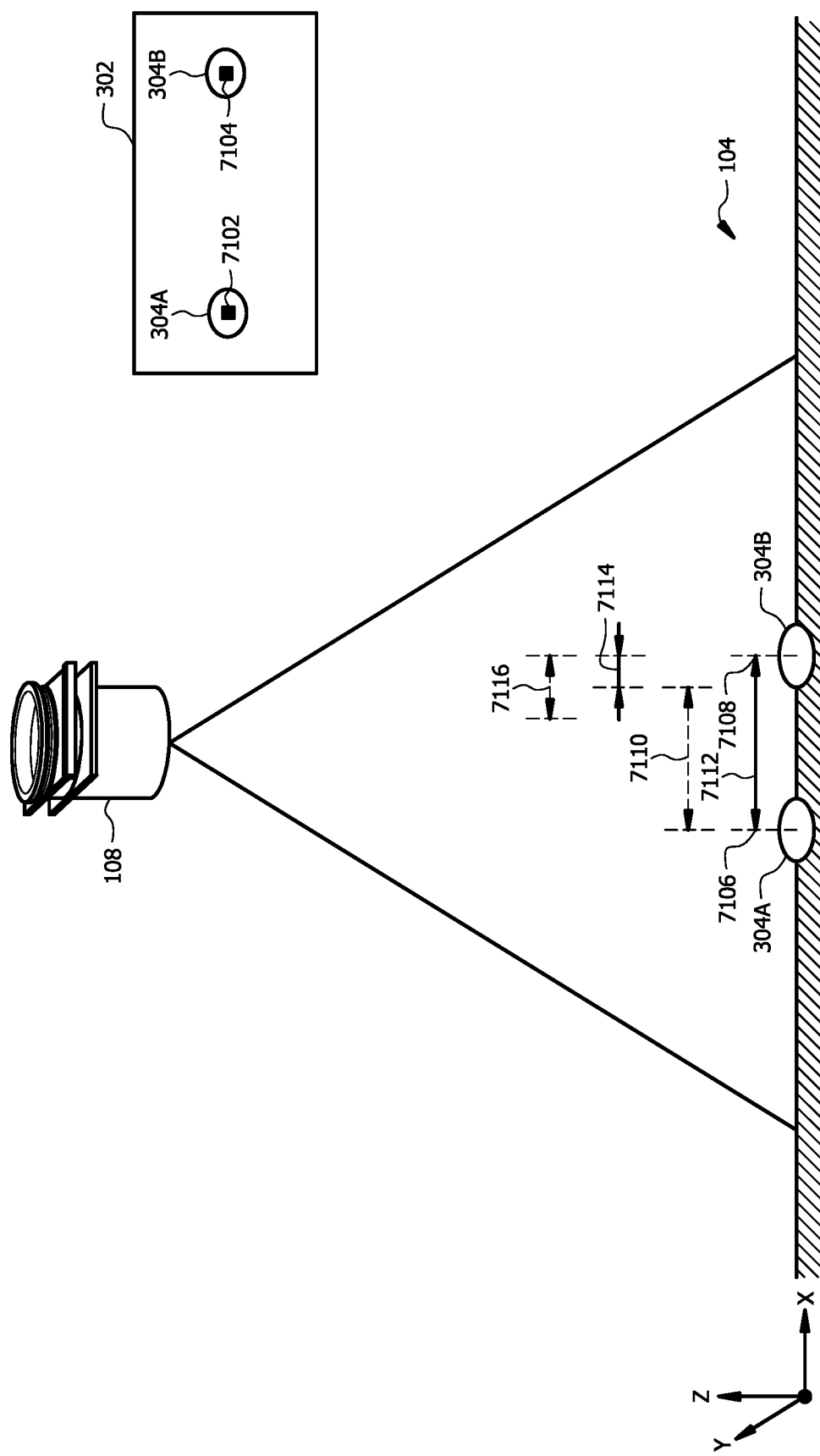
FIG. 71 is another example of a homography error correction process for the tracking system.
Figure 72:
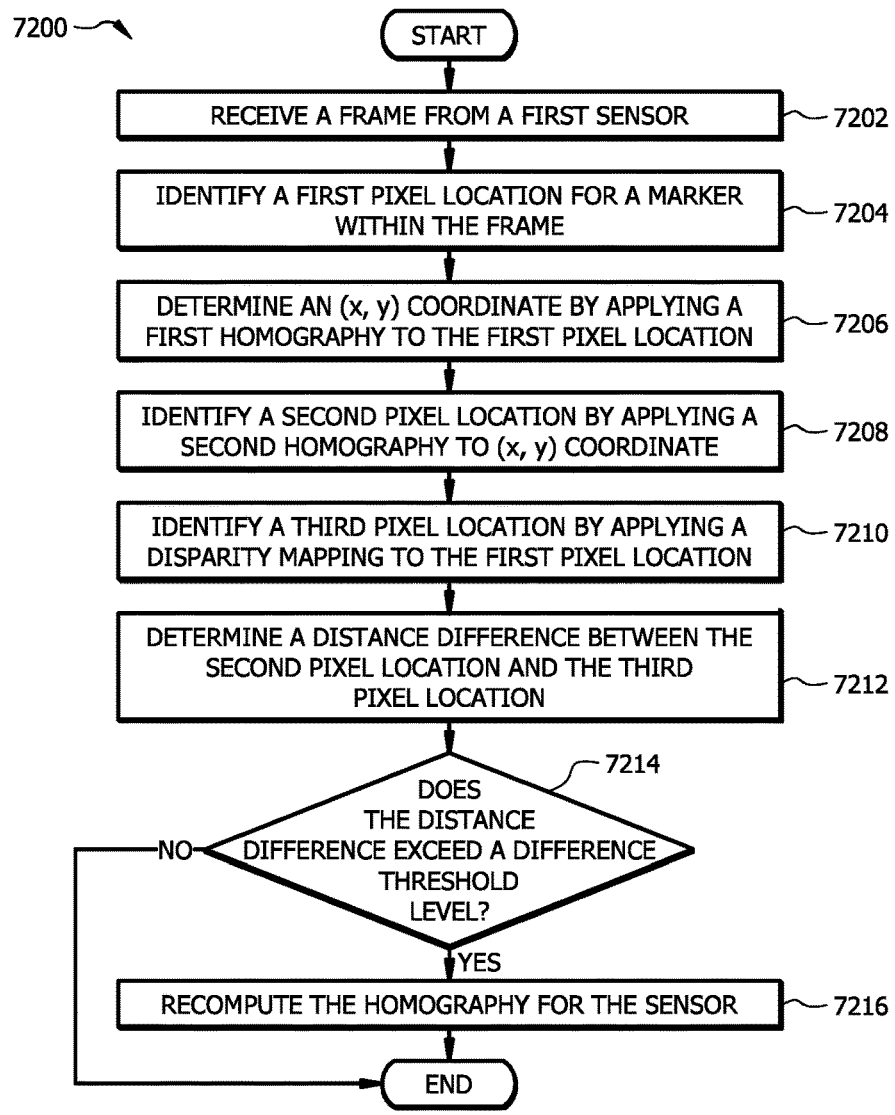
FIG. 72 is a flowchart of another embodiment of a homography error correction process for the tracking system.
Figure 73:
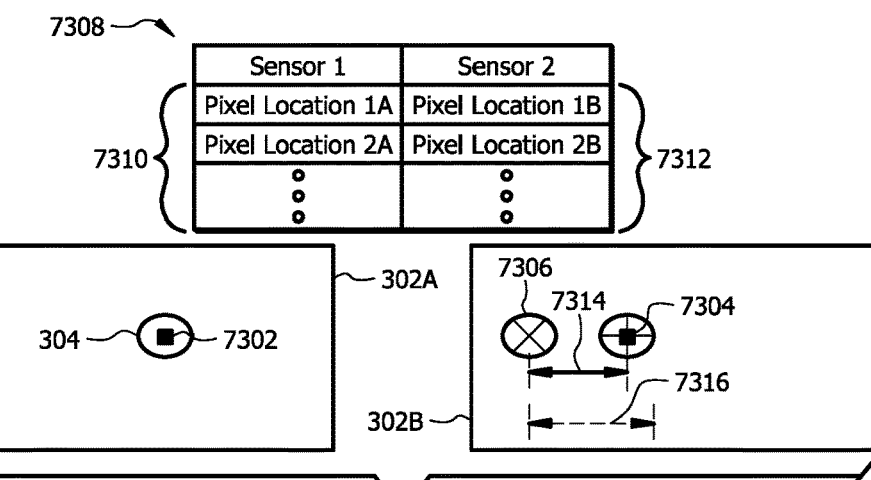
FIG. 73 is another example of a homography error correction process for the tracking system.
Figure 74:
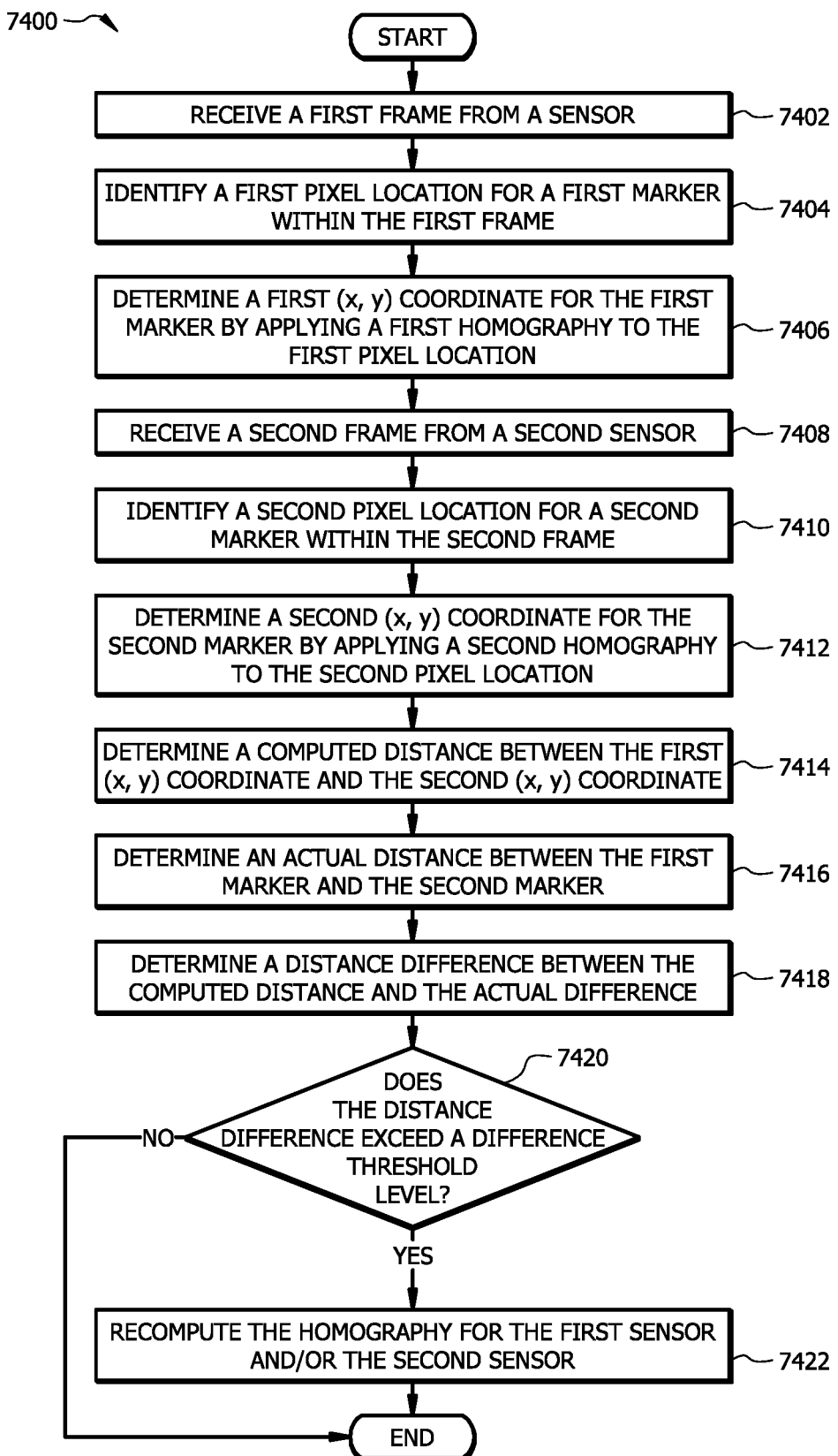
FIG. 74 is a flowchart of another embodiment of a homography error correction process for the tracking system.
Figure 75:
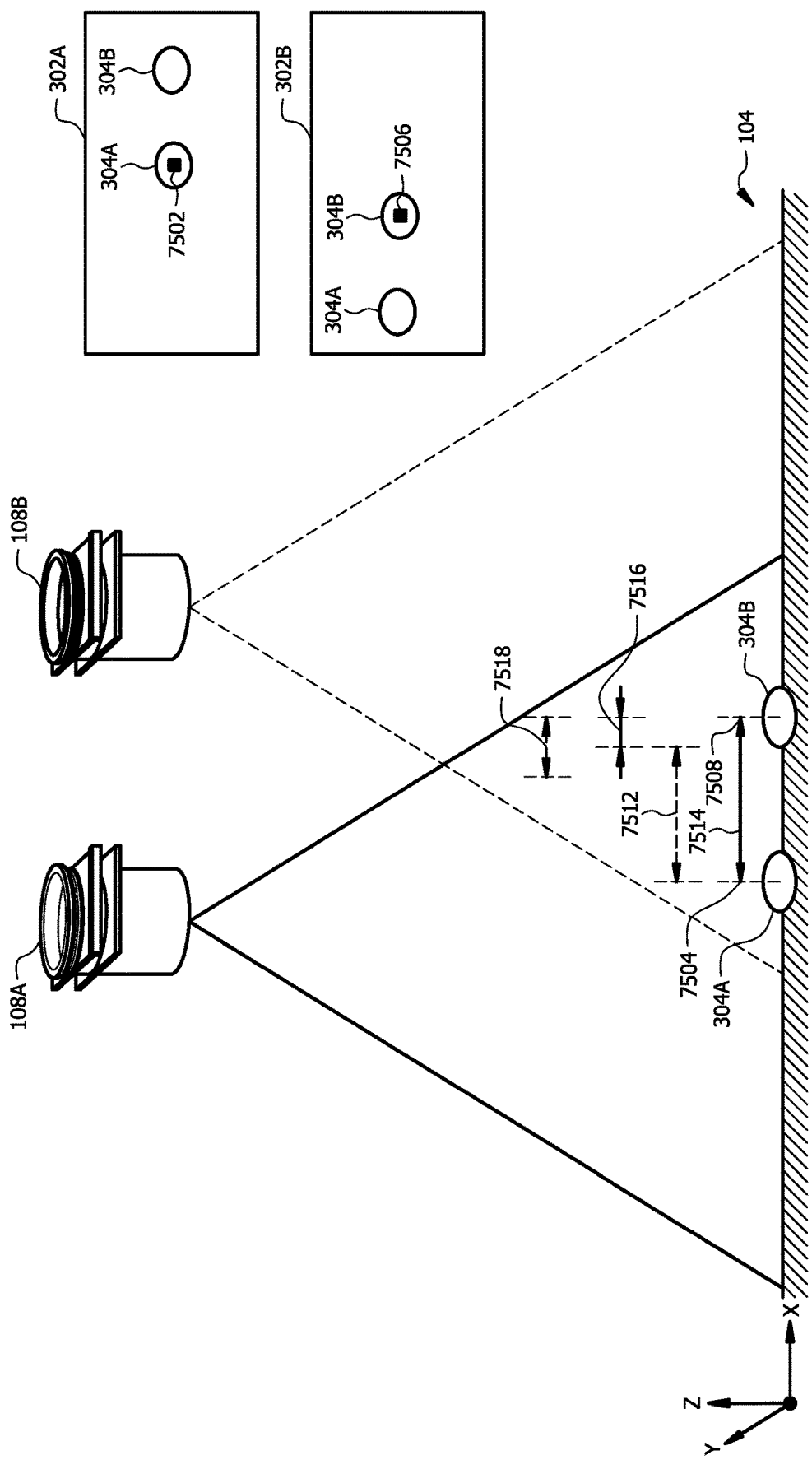
FIG. 75 is another example of a homography error correction process for the tracking system.

FIGS. 68-75 provide various embodiments of homography error correction techniques. More specifically, FIGS. 68 and 69 provide an example of a homography error correction process based on a location of sensor 108. FIGS. 70 and 71 provide an example of a homography error correction process based on distance measurements using a sensor 108. FIGS. 72 and 73 provide an example of a homography error correction process based on a disparity mapping using adjacent sensors 108. FIGS. 74 and 75 provide an example of a homography error correction process based on distance measurements using adjacent sensors 108. The tracking system 100 may employ one or more of these homography error correction techniques to determine whether a homography 118 is within the accuracy tolerances of the system 100. When a holography 118 is beyond the accuracy tolerances of the system 100, the ability of the system 100 to accurately track people and objects may decline which may reduce the overall performance of the system 100. When the tracking system 100 determines that the homography 118 is beyond the accuracy tolerances of the system 100, the tracking system will recompute the homography 118 to improve its accuracy.

Homography Error Correction Process Based on Sensor Location

FIG. 68 is a flowchart of an embodiment of a homography error correction method 6800 for the tracking system 100. The tracking system 100 may employ method 6800 to check whether a homography 118 of a sensor 108 is providing results within the accuracy tolerances of the system 100. This process generally involves using a homography 118 to estimate a physical location (i.e. an (x,y) coordinate in the global plane 104) of a sensor 108. The tracking system 100 then compares the estimated physical location of the sensor 108 to the actual physical location of the sensor 108 to determine whether the results provided using the homography 118 are within the accuracy tolerances of the system 100. In the event that the results provided using the homography 118 is outside of the accuracy tolerances of the system 100, the tracking system 100 will recompute the homography 118 to improve its accuracy.

At step 6802, the tracking system 100 receives a frame 302 from a sensor 108. Referring to FIG. 69 as an example, the sensor 108 is positioned within a space 102 (e.g. a store) with an overhead view of the space 102. The sensor 108 is configured to capture frames 302 of the global plane 104 for at least a portion of the space 102. In this example, a marker 304 is positioned within the field of view of the sensor 108. In one embodiment, the marker 304 is positioned to be in the center of the field of view of the sensor 108. In this configuration, the marker 304 is aligned with a centroid or the center of the sensor 108. The tracking system 100 receives a frame 302 from the sensor 108 that includes the marker 304.

At step 6804, the tracking system 100 identifies a pixel location 6908 within the frame 302. In one embodiment, the tracking system 100 uses object detection to identify the marker 304 within the frame 302. For example, the tracking system 100 may search the frame 302 for known features (e.g. shapes, patterns, colors, text, etc.) that correspond with the marker 304. In this example, the tracking system 100 may identify a shape in the frame 302 that corresponds with the marker 304. In other embodiments, the tracking system 100 may use any other suitable technique to identify the marker 304 within the frame 302. After detecting the marker 304, the tracking system 100 identifies a pixel location 6908 within the frame 302 that corresponds with the marker 304. In one embodiment, the pixel location 6908 corresponds with a pixel in the center of the frame 302.

At step 6806, the tracking system 100 determines an estimated sensor location 6902 using a homography 118 that is associated with the sensor 108. Here, the tracking system 100 uses a homography 118 that is associated with the sensor 108 to determine an (x,y) coordinate in the global plane 104 for the marker 304. The homography 118 is configured to translate between pixel locations in the frame 302 and (x,y) coordinates in the global plane 104. The homography 118 is configured similarly to the homography 118 described in FIGS. 2-5B. As an example, the tracking system 100 may identify the homography 118 that is associated with the sensor 108 and may use matrix multiplication between the homography 118 and the pixel location of the marker 304 to determine an (x,y) coordinate for the marker 304 in the global plane 104. Since the marker 304 is aligned with the centroid of the sensor 108, the (x,y) coordinate of the marker 304 also corresponds with the (x,y) coordinate for the sensor 108. This means that the tracking system 100 can use the (x,y) coordinate of the marker 304 as the estimated sensor location 6902.

At step 6808, the tracking system 100 determines an actual sensor location 6904 for the sensor 108. In one embodiment, the tracking system 100 may employ position sensors 5610 that are configured to output the location of the sensor 108. The position sensor 5610 may be configured similarly to the position sensors 5610 described in FIG. 56. In this case, the position sensor 5610 may output an (x,y) coordinate for the sensor 108 that indicates where the sensor 108 is physically located with respect to the global plane 104. In other embodiments, the tracking system 100 may be configured to receive location information (i.e. an (x,y) coordinate) for the sensor 108 from a technician or using any other suitable technique.

At step 6810, the tracking system 100 determines a location difference 6906 between the estimated sensor location 6902 and the actual sensor location 6904. The location difference 6906 is in real-world units and identifies a physical distance between the estimated sensor location 6902 and the actual sensor location 6904 with respect to the global plane 104. As an example, the tracking system 100 may determine the location difference 6906 by determining a Euclidian distance between the (x,y) coordinate corresponding with the estimated sensor location 6902 and the (x,y) coordinate corresponding with the actual sensor location 6904. In other examples, the tracking system 100 may determine the location difference 6906 using any other suitable type of technique.

At step 6812, the tracking system 100 determines whether the location difference 6906 exceeds a difference threshold level 6910. The difference threshold level 6910 corresponds with an accuracy tolerance level for a homography 118. Here, the tracking system 100 compares the location difference 6906 to the difference threshold level 6910 to determine whether the location difference 6906 is less than or equal to the difference threshold level 6910. The difference threshold level 6910 is in real-world units and identifies a physical distance within the global plane 104. For example, the difference threshold level 6910 may be fifteen millimeters, one hundred millimeters, six inches, one foot, or any other suitable distance.

When the location difference 6906 is less than or equal to the difference threshold level 6910, this indicates that the distance between the estimated sensor location 6902 and the actual sensor lotion 6904 is within the accuracy tolerance for the system. In the example shown in FIG. 69, the location difference 6906 is less than the difference threshold level 6910. In this case, the tracking system 100 determines that the homography 118 is within accuracy tolerances and that the homography 118 does not need to be recomputed. The tracking system 100 terminates method 6800 in response to determining that the location difference 6906 does not exceed the difference threshold value.

When location difference 6906 exceeds the difference threshold level 6910, this indicates that the distance between the estimated sensor location 6902 and the actual sensor location 6904 is too great to provide accurate results using the current homography 118. In this case, the tracking system 100 determines that the homography 118 is inaccurate and that the homography 118 should be recomputed to improve accuracy. The tracking system 100 proceeds to step 6814 in response to determining that the location difference 6906 exceeds the difference threshold value.

At step 6814, the tracking system 100 recomputes the homography 118 for the sensor 108. The tracking system 100 may recompute the homography 118 using any of the previously described techniques for generating a homography 118. For example, the tracking system 100 may generate a homography 118 using the process described in FIGS. 2 and 6. After recomputing the homography 118, the tracking system 100 associates the new homography 118 with the sensor 108.

Homography Error Correction Process Based on Distance Measurements

FIG. 70 is a flowchart of another embodiment of a homography error correction method 7000 for the tracking system 100. The tracking system 100 may employ method 7000 to check whether a homography 118 of a sensor 108 is providing results within the accuracy tolerances of the system 100. This process generally involves using a homography 118 to compute a distance between two markers 304 that are within the field of view of the sensor 108. The tracking system 100 then compares the computed distance to the actual distance between the markers 304 to determine whether the results provided using the homography 118 are within the accuracy tolerances of the system 100. In the event that the results provided using the homography 118 is outside of the accuracy tolerances of the system 100, the tracking system 100 will recompute the homography 118 to improve its accuracy.

At step 7002, the tracking system 100 receives a frame 302 from a sensor 108. Referring to FIG. 71 as an example, the sensor 108 is positioned within a space 102 (e.g. a store) with an overhead view of the space 102. The sensor 108 is configured to capture frames 302 of the global plane 104 for at least a portion of the space 102. In this example, a first marker 304A and a second marker 304B are positioned within the field of view of the sensor 108. The tracking system 100 receives a frame 302 from the sensor 108 that includes the first marker 304A and the second marker 304B.

At step 7004, the tracking system 100 identifies a first pixel location 7102 for a first marker 304A within the frame 302. In one embodiment, the tracking system 100 may use object detection to identify the first marker 304A within the frame 302. For example, the tracking system 100 may search the frame 302 for known features (e.g. shapes, patterns, colors, text, etc.) that correspond with the first marker 304A. In this example, the tracking system 100 may identify a shape in the frame 302 that corresponds with the first marker 304A. In other embodiments, the tracking system 100 may use any other suitable technique to identify the first marker 304A within the frame 302. After detecting the first marker 304A, the tracking system 100 identifies a pixel location 7102 within the frame 302 that corresponds with the first marker 304A.

At step 7006, the tracking system 100 identifies a second pixel location 7104 for a second marker 304B within the frame 302. The tracking system 100 may use a process similar to the process described in step 7004 to identify the second pixel location 7104 for the second marker 304B within the frame 302.

At step 7008, the tracking system 100 determines a first (x,y) coordinate 7106 for the first marker 304A by applying a homography 118 to the first pixel location 7102. Here, the tracking system 100 uses a homography 118 that is associated with the sensor 108 to determine an (x,y) coordinate in the global plane 104 for the first marker 304A. The homography 118 is configured to translate between pixel locations in the frame 302 and (x,y) coordinates in the global plane 104. The homography 118 is configured similar to the homography 118 described in FIGS. 2-5B. As an example, the tracking system 100 may identify the homography 118 that is associated with the sensor 108 and may use matrix multiplication between the homography 118 and the pixel location of the marker 304 to determine an (x,y) coordinate 7102 for the first marker 304A in the global plane 104.

At step 7010, the tracking system 100 determines a second (x,y) coordinate 7108 for the second marker 304B by applying the homography 118 to the second pixel location 7104. The tracking system 100 may use a process similar to the process described in step 7008 to determines a second (x,y) coordinate 7108 for the second marker 304B.

At step 7012, the tracking system 100 determines an estimated distance 7110 between the first (x,y) coordinate 7106 and the second (x,y) coordinate 7108. The estimated distance 7110 is in real-world units and identifies a physical distance between the first marker 304A and the second marker 304B with respect to the global plane 104. As an example, the tracking system 100 may determine the estimated distance 7110 by determining a Euclidian distance between the first (x,y) coordinate 7106 and the second (x,y) coordinate 7108. In other examples, the tracking system 100 may determine the estimated distance 7110 using any other suitable type of technique.

At step 7014, the tracking system 100 determines an actual distance 7112 between the first marker 304A and the second marker 304B. The actual distance 7112 is in real-world units and identifies the actual physical distance between the first marker 304A and the second marker 304B with respect to the global plane 104. The tracking system 100 may be configured to receive an actual distance 7112 between the first marker 304A and the second marker 304B from a technician or using any other suitable technique.

At step 7016, the tracking system 100 determines a distance difference 7114 between the estimated distance 7110 and the actual distance 7112. The distance difference 7114 indicates a measurement difference between the estimated distance 7110 and the actual distance 7112. The distance difference 7114 is in real-world units and identifies a physical distance within the global plane 104. In one embodiment, the tracking system 100 may use the absolute value of the difference between the estimated distance 7110 and the actual distance 7112 as the distance difference 7114.

At step 7018, the tracking system 100 determines whether the distance difference 7114 exceeds a difference threshold value 7116. The difference threshold level 7116 corresponds with an accuracy tolerance level for a homography 118. Here, the tracking system 100 compares the distance difference 7114 to the difference threshold level 7116 to determine whether the distance difference 7114 is less than or equal to the difference threshold level 7116. The difference threshold level 7116 is in real-world units and identifies a physical distance within the global plane 104. For example, the difference threshold level 7116 may be fifteen millimeters, one hundred millimeters, six inches, one foot, or any other suitable distance.

When the distance difference 7114 is less than or equal to the difference threshold level 7116, this indicates the difference between the estimated distance 7110 and the actual distance 7112 is within the accuracy tolerance for the system. In the example shown in FIG. 71, the distance difference 7114 is less than difference threshold level 7116. In this case, the tracking system 100 determines that the homography 118 is within accuracy tolerances and that the homography 118 does not need to be recomputed. The tracking system 100 terminates method 7000 in response to determining that the distance difference 7114 does not exceed the difference threshold value 7116.

When distance difference 7114 exceeds the difference threshold level 7116, this indicates that the difference between the estimated distance 7110 and the actual distance 7112 is too great to provide accurate results using the current homography 118. In this case, the tracking system 100 determines that the homography 118 is inaccurate and that the homography 118 should be recomputed to improve accuracy. The tracking system 100 proceeds to step 7020 in response to determining that the distance difference 7114 exceeds the difference threshold value 7116.

At step 7020, the tracking system 100 recomputes the homography 118 for the sensor 108. The tracking system 100 may recompute the homography 118 using any of the previously described techniques for generating a homography 118. For example, the tracking system 100 may generate a homography 118 using the process described in FIGS. 2 and 6. After recomputing the homography 118, the tracking system 100 associates the new homography 118 with the sensor 108.

Homography Error Correction Process Using Stereoscopic Vision Based on a Disparity Mapping FIGS. 72-75 are embodiments of homography error correction methods using adjacent sensors 108 in a stereoscopic sensor configuration. In a stereoscopic sensor configuration, the disparity between similar points on the frames 302 from each sensor 108 can be used to 1) correct an existing homography 118 or 2) generate a new homography 118. In the first case, the tracking system 100 may correct an existing homography 118 when the distance between two sensors 108 is known and the distances between a series of similar points in the real-world (e.g. the global plane 104) are also known. In this case, the distance between similar points can be found by calculating a disparity mapping 7308. In one embodiment, a disparity mapping 7308 can be defined by the following expressions:

$$D_x = \overline{P}_x = P_{xa} - P_{xb} = f \frac{d_{a,b}}{G_z}$$

$$D_y = \overline{P}_y = P_{ya} - P_{yb} = f \frac{d_{a,b}}{G_z}$$

$$D = \sqrt{D_x^2 + D_y^2}$$

where D is the disparity mapping 7308, P is the location of a real-world point, Px is the distance between a similar point in two cameras (e.g. camera 'a' and camera 'b'), $P_{xa}$ is the x-coordinate of a point with respect to camera 'a,' $P_{xb}$ is the x-coordinate of a similar point with respect to camera 'b,' $P_{ya}$ is the y-coordinate of a point with respect to camera 'a,' $P_{yb}$ is the y-coordinate of a similar point with respect to camera 'b,' f is the focal length, $d_{a,b}$ is the real distance between a camera 'a' and camera 'b,' $G_z$ is the vertical distance between a camera to a real-world point. The disparity mapping 7308 may be used to determine 3D world points for a marker 304 using the following expression:

$$G_{x,y} = \frac{d_{a,b} P_{x,y}^a}{D}$$

where $G_{x,y}$ is the global position of a marker 304. Using this process, the tracking system 100 may compare the disparity between homography projected distances between points and stereo estimated distances between the points to determine the accuracy of the homographies 118 for the adjacent sensors 108.

In the second case, the tracking system 100 may generate a new homography 118 when the distance between two sensors 108 is known. In this case, the real distances between similar points are also known. The tracking system 100 may use the stereoscopic sensor configuration to calculate a homography 118 for each sensor 108 to the global plane 104. Since $G_{x,y}$ is known for each sensor 108, the tracking system 100 may use this information to compute a homography 118 between the sensors 108 and the global plane 104. For example, the tracking system 100 may use the stereoscopic sensor configuration to determine 3D point locations for a set of markers 104. The tracking system 100 may then determine the position of the markers 304 with respect to the global plane 104 using $G_{x,y}$. The tracking system 100 may then use the 3D point locations for a set of markers 104 and the position of the markers 304 with respect to the global plane 104 to compute a homography 118 for a sensor 108.

FIG. 72 is a flowchart of another embodiment of a homography error correction method 7200 for the tracking system 100. The tracking system 100 may employ method 7200 to check whether the homographies 118 of a pair of sensors 108 are providing results within the accuracy tolerances of the system 100. This process generally involves using homographies 118 to determine first pixel location within a frame 302 for a marker 304 that is within the field of view of a pair of adjacent sensors 108. The tracking system 100 then determines a second pixel location within the frame 302 using a disparity mapping 7308. The disparity mapping 7308 is configured to map between pixel locations 7310 in frames 302A from the first sensor 108 and pixel locations 7312 in frames 302B from the second sensor 108. The tracking system 100 then computes a distance between the first pixel location and the second pixel location to determine whether the results provided using the homographies 118 are within the tolerances of the system 100. In the event that the results provided using the homographies 118 are outside of the accuracy tolerances of the system 100, the tracking system 100 will recompute the homographies 118 to improve their accuracy.

At step 7202, the tracking system 100 receives a frame 302A from a first sensor 108. In one embodiment, the first sensor 108 is positioned within a space 102 (e.g. a store) with an overhead view of the space 102. The sensor 108 is configured to capture frames 302A of the global plane 104 for at least portion of the space 102. In this example, a marker 304 is positioned within the field of view of the first sensor 108. Referring to FIG. 73 as an example, the tracking system 100 receives a frame 302A from the first sensor 108 that includes the marker 304.

At step 7204, the tracking system 100 identifies a first pixel location 7302 for the marker 304 within the frame 302A. In one embodiment, the tracking system 100 may use object detection to identify the marker 304 within the frame 302A. For example, the tracking system 100 may search the frame 302A for known features (e.g. shapes, patterns, colors, text, etc.) that correspond with the marker 304. In this example, the tracking system 100 may identify a shape in the frame 302A that corresponds with the marker 304. In other embodiments, the tracking system 100 may use any other suitable technique to identify the marker 304 within the frame 302A. After detecting the marker 304, the tracking system 100 identifies a pixel location 7302 within the frame 302A that corresponds with the marker 304.

At step 7206, the tracking system 100 determines an (x,y) coordinate by applying a first homography 118 to the first pixel location 7302. Here, the tracking system 100 uses a first homography 118 that is associated with the first sensor 108 to determine an (x,y) coordinate in the global plane 104 for the marker 304. The first homography 118 is configured to translate between pixel locations in the frame 302A and (x,y) coordinates in the global plane 104. The first homography 118 is configured similar to the homography 118 described in FIGS. 2-5B. As an example, the tracking system 100 may identify the first homography 118 that is associated with the sensor 108 and may use matrix multiplication between the first homography 118 and the pixel location 7302 of the marker 304 to determine an (x,y) coordinate for the marker 304 in the global plane 104.

At step 7208, the tracking system 100 identifies a second pixel location 7304 by applying a second homography 118 to the (x,y) coordinate. The second pixel location 7304 is a pixel location within a frame 302B of a second sensor 108. For example, a second sensor 108 may be positioned adjacent to the first sensor 108 such that frames 302A from the first sensor 108 at least partially overlap with frames 302B from the second sensor 108. The tracking system 100 uses a second homography 118 that is associated with the second sensor 108 to determine a pixel location 7304 based on the determined (x,y) coordinate of the marker 304. The second homography 118 is configured to translate between pixel locations in the frame 302B and (x,y) coordinates in the global plane 104. The second homography 118 is configured similarly to the homography 118 described in FIGS. 2-5B. As an example, the tracking system 100 may identify the second homography 118 that is associated with the second sensor 108B and may use matrix multiplication between the second homography 118 and the (x,y) coordinate of the marker 304 to determine the second pixel location 7304 within the second frame 302B.

At step 7210, the tracking system 100 identifies a third pixel location 7306 by applying a disparity mapping 7308 to the first pixel location 7302. In FIG. 73, the disparity mapping 7308 is shown as a table. In other examples, the disparity mapping 7308 may be a mapping function that is configured to translate between pixel locations 7310 in frames 302A from the first sensor 108 and pixel locations 7312 in frames 302B from the second sensor 108. The tracking system 100 uses the first pixel location 7302 as input for the disparity mapping 7308 to determine a third pixel location 7306 within the second frame 302B.

At step 7212, the tracking system 100 determines a distance difference 7314 between the second pixel location 7304 and the third pixel location 7306. The distance difference 7314 in in pixel units and identifies the pixel distance between the second pixel location 7304 and the third pixel location 7306. As an example, the tracking system 100 may determine the distance difference 7314 by determining a Euclidean distance between the second pixel location 7304 and the third pixel location 7306. In other examples, the tracking system 100 may determine the distance difference 7314 using any other suitable type of technique.

At step 7214, the tracking system 100 determines whether the distance difference 7314 exceeds a difference threshold value 7316. The difference threshold level 7316 corresponds with an accuracy tolerance level for a homography 118. Here, the tracking system 100 compares the distance difference 7314 to the difference threshold level 7316 to determine whether the distance difference 7314 is less than or equal to the difference threshold level 7316. The difference threshold level 7316 is in pixel units and identifies a distance within a frame 302. For example, the difference threshold level 7316 may be one pixel, five pixel, ten pixels, or any other suitable distance.

When the distance difference 7314 is less than or equal to the difference threshold level 7316, this indicates the difference between the second pixel location 7304 and the third pixel location 7306 is within the accuracy tolerance for the system. In the example shown in FIG. 73, the distance difference 7314 is less than difference threshold level 7316. In this case, the tracking system 100 determines that the homographies 118 for the first sensor 108 and the second sensor 108 are within accuracy tolerances and that the homographies 118 do not need to be recomputed. The tracking system 100 terminates method 7200 in response to determining that the distance difference 7314 does not exceed the difference threshold value 7316.

When distance difference 7314 exceeds the difference threshold level 7316, this indicates that the difference between the second pixel location 7304 and the third pixel location 7306 is too great to provide accurate results using the current homographies 118. In this case, the tracking system 100 determines that at least one of the homographies 118 for the first sensor 108 or the second sensor 108 is inaccurate and that the homographies 118 should be recomputed to improve accuracy. The tracking system 100 proceeds to step 7216 in response to determining that the distance difference 7314 exceeds the difference threshold value 7316.

At step 7216, the tracking system 100 recomputes the homography 118 for the first sensor 108 and/or the second sensor 108. The tracking system 100 may recompute the homography 118 for the first sensor 108 and/or the second sensor 108 using any of the previously described techniques for generating a homography 118. For example, the tracking system 100 may generate a homography 118 using the process described in FIGS. 2 and 6. After recomputing the homography 118, the tracking system 100 associates the new homography 118 with the corresponding sensor 108.

Homography Error Correction Process Using Stereoscopic Vision Based on Distance Measurements FIG. 74 is a flowchart of another embodiment of a homography error correction method 7400 for the tracking system 100. The tracking system 100 may employ method 7400 to check whether the homographies 118 of a pair of sensors 108 are providing results within the accuracy tolerances of the system 100. This process generally involves using homographies 118 to compute a distance between two markers 304 using adjacent sensors 108. The tracking system 100 then compares the computed distance to the actual distance between the markers 304 to determine whether the results provided using the homographies 118 are within the accuracy tolerances of the system 100. In the event that the results provided using the homographies 118 are outside of the accuracy tolerances of the system 100, the tracking system 100 will recompute the homographies 118 to improve their accuracy.

At step 7402, the tracking system 100 receives a first frame 302A from a first sensor 108A. Referring to FIG. 75 as an example, the first sensor 108A is positioned within a space 102 (e.g. a store) with an overhead view of the space 102. The first sensor 108A is configured to capture frames 302A of the global plane 104 for at least a portion of the space 102. In this example, a first marker 304A and a second marker 304B are positioned within the field of view of the first sensor 108A. In one embodiment, the first marker 304A may be positioned in the center of the field of view of the first sensor 108A. The tracking system 100 receives a frame 302A from the first sensor 108A that includes the first marker 304A and the second marker 304B.

At step 7404, the tracking system 100 identifies a first pixel location 7502 for the first marker 304A within the first frame 302A. In one embodiment, the tracking system 100 may use object detection to identify the first marker 304A within the first frame 302A. For example, the tracking system 100 may search the first frame 302A for known features (e.g. shapes, patterns, colors, text, etc.) that correspond with the first marker 304A. In this example, the tracking system 100 may identify a shape in the first frame 302A that corresponds with the first marker 304A. In other embodiments, the tracking system 100 may use any other suitable technique to identify the first marker 304A within the first frame 302A. After detecting the first marker 304A, the tracking system 100 identifies a pixel location 7502 within the first frame 302A that corresponds with the first marker 304A. In one embodiment, the pixel location 7502 may correspond with a pixel in the center of the first frame 302A.

At step 7406, the tracking system 100 determines a first (x,y) coordinate 7504 for the first marker 304A by applying a first homography 118 to the first pixel location 7502. The tracking system 100 uses a first homography 118 that is associated with the first sensor 108A to determine a first (x,y) coordinate 7504 in the global plane 104 for the first marker 304A. The first homography 118 is configured to translate between pixel locations in the frame 302A and (x,y) coordinates in the global plane 104. The first homography 118 is configured similar to the homography 118 described in FIGS. 2-5B. As an example, the tracking system 100 may identify the first homography 118 that is associated with the first sensor 108A and may use matrix multiplication between the first homography 118 and the first pixel location 7502 to determine the first (x,y) coordinate 7504 for the first marker 304A in the global plane 104. In the example, where the pixel location 7502 corresponds with a pixel in the center of the first frame 302A, the first (x,y) coordinate 7504 may correspond with an estimated location for the first sensor 108A.

At step 7408, the tracking system 100 receives a second frame 302B from a second sensor 108B. Returning to the example in FIG. 75, the second sensor 108B is also positioned within the space 102 with an overhead view of the space 102. The second sensor 108B is configured to capture frames 302B of the global plane 104 for at least portion of the space 102. The second sensor 108B is positioned adjacent to the first sensor 108A such that frames 302A from the first sensor 108A at least partially overlap with frames 302B from the second sensor 108B. The first marker 304A and the second marker 304B are positioned within the field of view of the second sensor 108B. In one embodiment, the second marker 304B may be positioned in the center of the field of view of the second sensor 108B. The tracking system 100 receives a frame 302B from the second sensor 108B that includes the first marker 304A and the second marker 304B.

At step 7410, the tracking system 100 identifies a second pixel location 7506 for the second marker 304B within the second frame 302B. The tracking system 100 identifies the second pixel location 7506 for the second marker 304B using a process similar to the process described in step 7404. In one embodiment, the pixel location 7506 may correspond with a pixel in the center of the second frame 302B.

At step 7412, the tracking system 100 determines a second (x,y) coordinate 7508 for the second marker 304B by applying a second homography 118 to the second pixel location 7506. The tracking system 100 uses a second homography 118 that is associated with the second sensor 108B to determine a second (x,y) coordinate 7508 in the global plane 104 for the second marker 304B. The second homography 118 is configured to translate between pixel locations in the frame 302B and (x,y) coordinates in the global plane 104. The second homography 118 is configured similarly to the homography 118 described in FIGS. 2-5B. As an example, the tracking system 100 may identify the second homography 118 that is associated with the second sensor 108B and may use matrix multiplication between the second homography 118 and the second pixel location 7506 to determine the second (x,y) coordinate 7508 for the second marker 304B in the global plane 104. In the example, where the pixel location 7506 corresponds with a pixel in the center of the second frame 302AB, the second (x,y) coordinate 7508 may correspond with an estimated location for the second sensor 108B.

At step 7414, the tracking system 100 determines a computed distance 7512 between the first (x,y) coordinate 7504 and the second (x,y) coordinate 7508. The computed distance 7512 is in real-world units and identifies a physical distance between the first marker 304A and the second marker 304B with respect to the global plane 104. As an example, the tracking system 100 may determine the computed distance 7512 by determining a Euclidian distance between the first (x,y) coordinate 7504 and the second (x,y)

coordinate 7508. In other examples, the tracking system 100 may determine the computed distance 7512 using any other suitable type of technique.

At step 7416, the tracking system 100 determines an actual distance 7514 between the first marker 304A and the second marker 304B. The actual distance 7514 is in real-world units and identifies the actual physical distance between the first marker 304A and the second marker 304B with respect to the global plane 104. The tracking system 100 may be configured to receive an actual distance 7514 between the first marker 304A and the second marker 304B from a technician or using any other suitable technique.

At step 7418, the tracking system 100 determines a distance difference 7516 between the computed distance 7512 and the actual distance 7514. The distance difference 7516 indicates a measurement difference between the computed distance 7512 and the actual distance 7514. The distance difference 7516 is in real-world units and identifies a physical distance within the global plane 104. In one embodiment, the tracking system 100 may use the absolute value of the difference between the computed distance 7512 and the actual distance 7514 as the distance difference 7516.

At step 7420, the tracking system 100 determines whether the distance difference 7516 exceeds a difference threshold level 7518. The difference threshold level 7516 corresponds with an accuracy tolerance level for a homography 118. Here, the tracking system 100 compares the distance difference 7516 to the difference threshold level 7518 to determine whether the distance difference 7516 is less than or equal to the difference threshold level 7518. The difference threshold level 7518 is in real-world units and identifies a physical distance within the global plane 104. For example, the difference threshold level 7518 may be fifteen millimeters, one hundred millimeters, six inches, one foot, or any other suitable distance.

When the distance difference 7516 is less than or equal to the difference threshold level 7518, this indicates the difference between the computed distance 7512 and the actual distance 7514 is within the accuracy tolerance for the system. In the example shown in FIG. 75, the distance difference 7516 is less than difference threshold level 7518. In this case, the tracking system 100 determines that the homographies 118 for the first sensor 108A and the second sensor 108B are within accuracy tolerances and that the homographies 118 do not need to be recomputed. The tracking system 100 terminates method 7400 in response to determining that the distance difference 7516 does not exceed the difference threshold level 7518.

When distance difference 7516 exceeds the difference threshold level 7518, this indicates that the difference between the computed distance 7512 and the actual distance 7514 is too great to provide accurate results using the current homographies 118. In this case, the tracking system 100 determines that at least one of the homographies 118 for the first sensor 108A or the second sensor 108B is inaccurate and that the homographies 118 should be recomputed to improve accuracy. The tracking system 100 proceeds to step 7422 in response to determining that the distance difference 7516 exceeds the difference threshold level 7518.

At step 7422, the tracking system 100 recomputes the homography 118 for the first sensor 108A and/or the second sensor 108B. The tracking system 100 may recompute the homography 118 for the first sensor 108A and/or the second sensor 108B using any of the previously described techniques for generating a homography 118. For example, the tracking system 100 may generate a homography 118 using the process described in FIGS. 2 and 6. After recomputing the homography 118, the tracking system 100 associates the new homography 118 with the corresponding sensor 108.

While the preceding examples and explanations are described with respect to particular use cases within a retail environment, one of ordinary skill in the art would readily appreciate that the previously described configurations and techniques may also be applied to other applications and environments. Examples of other applications and environments include, but are not limited to, security applications, surveillance applications, object tracking applications, people tracking applications, occupancy detection applications, logistics applications, warehouse management applications, operations research applications, product loading applications, retail applications, robotics applications, computer vision applications, manufacturing applications, safety applications, quality control applications, food distributing applications, retail product tracking applications, mapping applications, simultaneous localization and mapping (SLAM) applications, 3D scanning applications, autonomous vehicle applications, virtual reality applications, augmented reality applications, or any other suitable type of application.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An object tracking system, comprising:
a sensor configured to capture frames of at least a portion of a global plane for a space, wherein:
the global plane represents (x,y) coordinates for the space;
each frame comprises a plurality of pixels; and
each pixel from the plurality of pixels is associated with a pixel location comprising a pixel row and a pixel column; and
a tracking system operably coupled to the sensor, comprising:
one or more memories operable to store a digital cart associated with a person; and
one or more processors operably coupled to the one or more memories, configured to:

receive a first frame from the sensor, wherein the first frame comprises a region-of-interest (ROI) marker that is visible within the space, wherein the ROI marker comprises a surface with a pattern;
identify a first set of pixel locations within the first frame corresponding with the ROI marker;
generate a virtual zone, correlated based at least in part upon the first set of pixel locations, for subsequent frames from the sensor, wherein the virtual zone represents a virtual curtain at an access area to a shelf where objects are located;
receive a second frame from the sensor;
detect an object within the virtual zone;
determine a pixel location associated with the object within the virtual zone in the second frame;
set values of a second set of pixel locations outside the determined pixel location to a null value in the second frame;
in response to setting the second set of pixel locations outside the determined pixel locations to the null value in the second frame:
  isolate the object within the second frame; and
  identify the object;
determine the person is within the second frame; and
modify the digital cart associated with the person based on the identified object.

2. The system of claim 1, wherein:
the virtual zone comprises an edge that is associated with a plurality of pixel; and
the one or more processors are further configured to:
  determine the object crosses the edge in subsequent frames from the sensor;
  determine an object travel direction based on the object crossing the edge in subsequent frames from the sensor;
  determine the person is returning the object based on the object travel direction; and
  remove the object from the digital cart associated with the person in response to determining that the person is returning the object.

3. The system of claim 1, wherein:
the virtual zone comprises an edge that is associated with a plurality of pixels; and
the one or more processors are further configured to:
  determine the object crosses the edge in subsequent frames from the sensor;
  determine an object travel direction based on the object crossing the edge in subsequent frames from the sensor;
  determine the person is removing the object based on the object travel direction; and
  add the object to the digital cart associated with the person in response to determining that the person is removing the object.

4. The system of claim 1, wherein:
the one or more processors are further configured to detect door sensor was triggered to an open position; and
receiving the second frame is in response to detecting the door sensor was triggered to an open position.

5. The system of claim 1, wherein:
the sensor is further configured to capture infrared frames of the at least a portion of the global plane for the space, wherein:
  each infrared frame comprises a second plurality of pixels that correspond with the plurality of pixels of frames from the sensor; and
  each pixel in the second plurality of pixels indicates a temperature value; and detecting the object within the virtual zone comprises:
    receiving an infrared frame corresponding with the second frame;
    identifying a temperature differential within the infrared frame;
    generating a binary mask based on the identified temperature differential within the infrared frame; and
    applying the binary mask to the second frame to generate a sub-ROI within the second frame.

6. The system of claim 1, wherein identifying pixel locations within the first frame corresponding with the ROI marker comprises applying an affine transformation to correct a skewing of the ROI marker.

7. The system of claim 1, wherein detecting the object within the virtual zone comprises identifying differences between the first frame and the second frame.

8. An object tracking method, comprising:
receiving a first frame from a sensor, wherein:
  the first frame comprises a region-of-interest (ROI) marker that is visible within the space, wherein the ROI marker comprises a surface with a pattern;
  the sensor is configured to capture frames of at least a portion of a global plane for a space, wherein:
    the global plane represents (x,y) coordinates for the space;
    each frame comprises a plurality of pixels; and
    each pixel from the plurality of pixels is associated with a pixel location comprising a pixel row and a pixel column;
identifying a first set of pixel locations within the first frame corresponding with the ROI marker;
generating a virtual zone, correlated based at least in part upon the first set of pixel locations, for subsequent frames from the sensor, wherein the virtual zone represents a virtual curtain at an access area to a shelf where objects are located;
receiving a second frame from the sensor;
detecting an object within the virtual zone;
determining a pixel location associated with the object within the virtual zone in the second frame;
setting values of a second set of pixel locations outside the determined pixel location to a null value in the second frame;
in response to setting the second set of pixel locations outside the determined pixel locations to the null value in the second frame:
  isolating the object within the second frame; and
  identifying the object;
determining the person is within the second frame; and
modifying a digital cart that is associated with the person based on the identified object.

9. The method of claim 8, further comprising:
determining the object crosses an edge of the virtual zone in subsequent frames from the sensor, wherein the edge is associated with a plurality of pixels within the virtual zone;
determining an object travel direction based on the object crossing the edge in subsequent frames from the sensor;
determining the person is returning the object based on the object travel direction; and removing the object from the digital cart associated with the person in response to determining that the person is returning the object.

10. The method of claim 8, further comprising:
determining the object crosses an edge of the virtual zone in subsequent frames from the sensor, wherein the edge is associated with a plurality of pixels within the virtual zone;
determining an object travel direction based on the object crossing the edge in subsequent frames from the sensor;
determining the person is removing the object based on the object travel direction; and
adding the object to the digital cart associated with the person in response to determining that the person is removing the object.

11. The method of claim 8, further comprising:
detecting a door sensor was triggered to an open position; and
receiving the second frame in response to detecting the door sensor was triggered to an open position.

12. The method of claim 8, wherein detecting the object within the virtual zone comprises:
receiving an infrared frame from the sensor corresponding with the second frame, wherein:
the infrared frame comprises a second plurality of pixels that correspond with the plurality of pixels of frames from the sensor; and
each pixel in the second plurality of pixels indicates a temperature value; identifying a temperature differential within the infrared frame;
generating a binary mask based on the identified temperature differential within the infrared frame; and
applying the binary mask to the second frame to generate a sub-ROI within the second frame.

13. The method of claim 8, wherein identifying pixel locations within the first frame corresponding with the ROI marker comprises applying an affine transformation to correct a skewing of the ROI marker.

14. The method of claim 8, wherein detecting the object within the virtual zone comprises identifying differences between the first frame and the second frame.

15. A non-transitory computer readable medium storing instructions that when executed by a processor cause the processor to:
receive a first frame from a sensor, wherein:
the first frame comprises a region-of-interest (ROI) marker that is visible within the space, wherein the ROI marker comprises a surface with a pattern;
the sensor is configured to capture frames of at least a portion of a global plane for the space, wherein:
the global plane represents (x,y) coordinates for the space;
each frame comprises a plurality of pixels; and
each pixel from the plurality of pixels is associated with a pixel location comprising a pixel row and a pixel column;
identify a first set of pixel locations within the first frame corresponding with the ROI marker;
generate a virtual zone, correlated based at least in part upon the first set of pixel locations, for subsequent frames from the sensor, wherein the virtual zone represents a virtual curtain at an access area to a shelf where objects are located;
receive a second frame from the sensor;
detect an object within the virtual zone;
determine a pixel location associated with the object within the virtual zone in the second frame;
set values of a second set of pixel locations outside the determined pixel location to a null value in the second frame;
in response to setting the second set of pixel locations outside the determined pixel locations to the null value in the second frame:
isolate the object within the second frame; and
identify the object;
determine the person is within the second frame; and
modify a digital cart that is associated with the person based on the identified object.

16. The non-transitory computer readable medium of claim 15, wherein the instructions further cause the processor to:
determine the object crosses an edge of the virtual zone in subsequent frames from the sensor, wherein the edge is associated with a plurality of pixels within the virtual zone;
determine an object travel direction based on the object crossing the edge in subsequent frames from the sensor;
determine the person is returning the object based on the object travel direction; and remove the object from the digital cart associated with the person in response to determining that the person is returning the object.

17. The non-transitory computer readable medium of claim 15, wherein the instructions further cause the processor to:
determine the object crosses an edge of the virtual zone in subsequent frames from the sensor, wherein the edge is associated with a plurality of pixels within the virtual zone;
determine an object travel direction based on the object crossing the edge in subsequent frames from the sensor;
determine the person is removing the object based on the object travel direction; and
add the object to the digital cart associated with the person in response to determining that the person is removing the object.

18. The non-transitory computer readable medium of claim 15, wherein the instructions further cause the processor to:
detect a door sensor was triggered to an open position; and
receive the second frame in response to detecting the door sensor was triggered to an open position.

19. The non-transitory computer readable medium of claim 15, wherein detecting the object within the virtual zone comprises:
receiving an infrared frame from the sensor corresponding with the second frame, wherein:
the infrared frame comprises a second plurality of pixels that correspond with the plurality of pixels of frames from the sensor; and
each pixel in the second plurality of pixels indicates a temperature value; identifying a temperature differential within the infrared frame;
generating a binary mask based on the identified temperature differential within the infrared frame; and
applying the binary mask to the second frame to generate a sub-ROI within the second frame.

20. The non-transitory computer readable medium of claim 15, wherein detecting the object within the virtual zone comprises identifying differences between the first frame and the second frame.

* * * * *